(12) United States Patent
Yang et al.

(10) Patent No.: US 11,214,631 B2
(45) Date of Patent: Jan. 4, 2022

(54) (DI)SILICON BRIDGED METALLOCENES THAT PRODUCE POLYETHYLENE WITH BROAD MOLECULAR WEIGHT DISTRIBUTION AND HIGH MOLECULAR WEIGHT

(71) Applicant: ExxonMobil Chemical Patents Inc., Baytown, TX (US)

(72) Inventors: Jian Yang, Houston, TX (US); Gregory J. Karahalis, Houston, TX (US); Timothy M. Boller, Houston, TX (US); Yan Jiang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 182 days.

(21) Appl. No.: 16/182,856

(22) Filed: Nov. 7, 2018

(65) Prior Publication Data

US 2019/0144571 A1 May 16, 2019

Related U.S. Application Data

(60) Provisional application No. 62/585,629, filed on Nov. 14, 2017.

(51) Int. Cl.
| | | |
|---|---|---|
| *C07F 17/00* | (2006.01) | |
| *C08F 4/6592* | (2006.01) | |
| *C08F 210/16* | (2006.01) | |
| *C08F 10/02* | (2006.01) | |
| *C08F 2/34* | (2006.01) | |

(52) U.S. Cl.
CPC .............. *C08F 10/02* (2013.01); *C07F 17/00* (2013.01); *C08F 4/65927* (2013.01); *C08F 2/34* (2013.01); *C08F 2420/01* (2013.01)

(58) Field of Classification Search
CPC ............................ C07F 17/00; C08F 4/65927
See application file for complete search history.

(56) References Cited

U.S. PATENT DOCUMENTS

| | | |
|---|---|---|
| 6,207,864 B1 | 3/2001 | Henningsen et al. |
| 6,376,407 B1 | 4/2002 | Burkhardt et al. |
| 6,376,408 B1 | 4/2002 | Burkhardt et al. |
| 6,376,409 B1 | 4/2002 | Burkhardt et al. |
| 6,376,410 B1 | 4/2002 | Burkhardt et al. |
| 6,376,411 B1 | 4/2002 | Burkhardt et al. |
| 6,376,412 B1 | 4/2002 | Burkhardt et al. |
| 6,376,413 B1 | 4/2002 | Kuchta et al. |
| 6,376,627 B1 | 4/2002 | Burkhardt et al. |
| 6,380,120 B1 | 4/2002 | Burkhardt et al. |
| 6,380,121 B1 | 4/2002 | Kuchta et al. |
| 6,380,123 B1 | 4/2002 | Kuchta et al. |
| 6,380,124 B1 | 4/2002 | Burkhardt et al. |
| 6,380,330 B1 | 4/2002 | Kuchta et al. |
| 6,380,331 B1 | 4/2002 | Kuchta et al. |
| 6,380,334 B1 | 4/2002 | Kuchta et al. |
| 6,399,723 B1 | 6/2002 | Burkhardt et al. |
| 6,414,095 B1 | 7/2002 | Burkhardt et al. |
| 6,784,305 B2 | 8/2004 | Schulte et al. .................. 556/53 |
| 6,825,372 B2 | 11/2004 | Burkhardt et al. |
| 6,828,394 B2 | 12/2004 | Vaughan et al. |
| 6,888,017 B2 | 5/2005 | Kuchta et al. |
| 6,894,179 B2 | 5/2005 | Kuchta et al. |
| 6,903,229 B2 | 6/2005 | Burkhardt et al. |
| 6,936,675 B2 | 8/2005 | Szul et al. |
| 7,157,531 B2 | 1/2007 | Szul et al. |
| 7,405,261 B2 | 7/2008 | Schulte et al. |
| 7,728,086 B2 | 6/2010 | Ciaccia |
| 7,842,764 B2 | 11/2010 | Nifant'ev |
| 8,058,461 B2 | 11/2011 | Voskoboynikov et al. |
| 8,609,793 B2 | 12/2013 | Buck et al. |
| 8,637,616 B2 | 4/2014 | Buck et al. |
| 8,865,848 B2 | 10/2014 | Castro et al. |
| 9,040,642 B2 | 5/2015 | Buck et al. |
| 9,040,643 B2 | 5/2015 | Buck et al. |
| 9,988,410 B2 | 6/2018 | Yang et al. |
| 2017/0081437 A1 | 3/2017 | Lernoux et al. |
| 2019/0263953 A1 | 8/2019 | Li et al. .............. C08F 210/16 |

FOREIGN PATENT DOCUMENTS

| | | | |
|---|---|---|---|
| EP | 0849273 | 6/1998 | |
| JP | 5487089 | 5/2014 | |
| JP | 2015/172037 | 10/2015 | |
| KR | 2015-065084 | 4/2017 | .............. C07F 17/00 |
| WO | 98/40331 | 9/1998 | |
| WO | 98/40333 | 9/1998 | |
| WO | 02/002576 | 1/2002 | |
| WO | 2005-058916 | 6/2005 | .............. C08F 10/08 |
| WO | 2009-027075 | 3/2009 | .............. C08F 4/656 |
| WO | 2013/151863 | 10/2013 | |

OTHER PUBLICATIONS

Perez-Camacho et al., "Si2Me4-bridged zirconocene dichlorides: crystal and molecular structure of meso-Si2Me4(3—SiMe3—C9H5)2ZrCl2," Journal of Organometallic Chemistry, 1999, vol. 585, No. 1, pp. 18-25.

Spaleck et al., "Stereospecific Metallocene Catalysts: Scope and Limits of Rational Catalyst Design," Macromolecular Symposia, 1995, vol. 89, pp. 237-247.

*Primary Examiner* — Caixia Lu

(57) ABSTRACT

This invention relates to catalyst systems comprising a catalyst compound having a bridged group 4 metal metallocene (where the bridge preferably contains an $(Me_2Si)_2$ group, an activator, and a support material. In some embodiments, the present disclosure provides for polyolefins and a process for producing a polyolefin composition comprising contacting at least one olefin with a catalyst system.

45 Claims, 21 Drawing Sheets

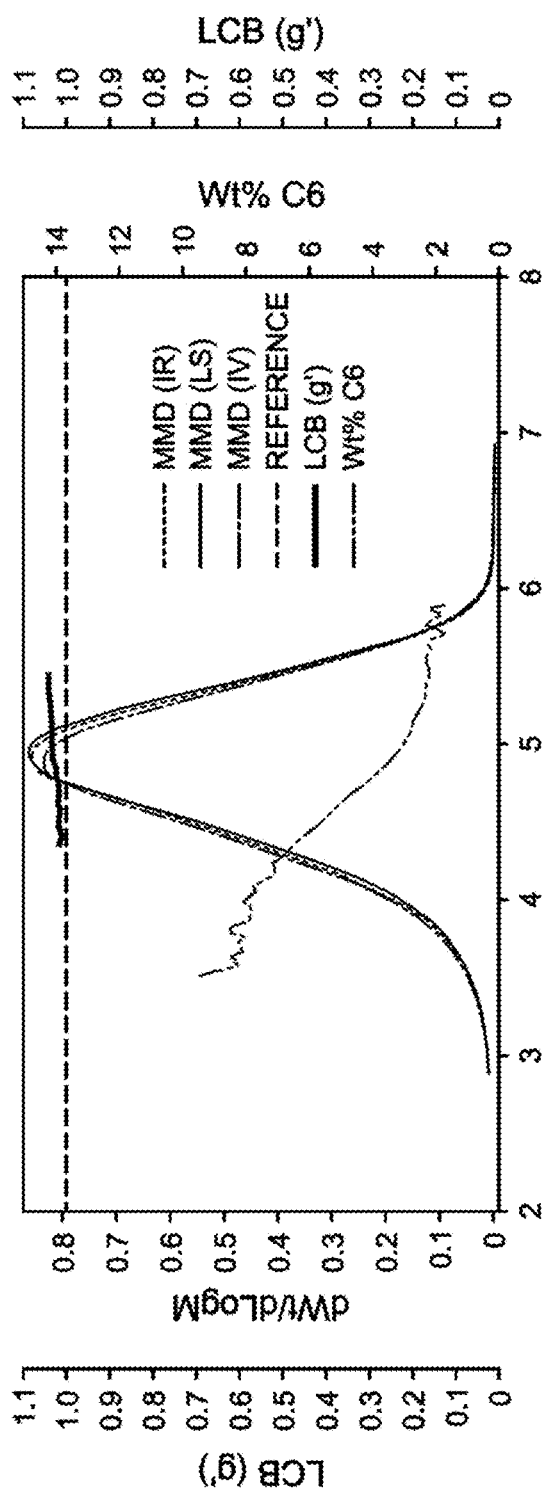

(DI)SILICON BRIDGED METALLOCENES THAT PRODUCE POLYETHYLENE WITH BROAD MOLECULAR WEIGHT DISTRIBUTION AND HIGH MOLECULAR WEIGHT

PRIORITY CLAIM

This application claims priority to and the benefit of U.S. Ser. No. 62/585,629, filed Nov. 14, 2017 and is incorporated by reference in its entirety.

FIELD OF THE INVENTION

The present disclosure provides catalyst compounds comprising —Si—Si— bridges, catalyst systems comprising catalyst compounds comprising —Si—Si— bridges, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization are often based on transition metal compounds, e.g., metallocenes, as catalyst precursors, which are activated either with alumoxane or an activator containing a non-coordinating anion.

WO 2002/002576 discloses metallocene compositions and their use in the preparation of catalyst systems for olefin polymerization, particularly propylene polymerization. The bridged bis (2-$R^3$-4-phenyl-indenyl) metallocenes described therein include those having at least one phenyl ring substituted at the 3' and 5' positions by butyl groups which may be the same or different, e.g., tert-butyl.

U.S. Publication No. 2014/0057777; U.S. Publication No. 2014/0107301; WO 2013/151863; and EP 0849273 B1 disclose $(Me_2Si)_2(Indenyl)_2ZrCl_2$.

WO 2017/011073 discloses substituted $(Me_2Si)_2(Indenyl)_2ZrCl_2$ compounds, such as tetramethylenedisilylene bis(4-(3',5'-di-tert-butylphenyl)-indenyl) zirconium dichloride.

U.S. Publication No. 2003/0088038 discloses $Me_2Si$—O—$SiMe_2$(indenyl)$_2ZrCl_2$.

JOURNAL OF ORGANOMETALLIC CHEMISTRY, Vol. 585, 1999, pp. 18-25, discloses $Si_2Me_4$-bridged zirconocene dichlorides, such as meso-$(Me_2Si)_2(Indenyl)_2ZrCl_2$ and meso-$Si_2Me_4$(3-$SiMe_3$-$C_9H_5$)$_2ZrCl_2$.

U.S. Publication No. 2012/0088890 A1 discloses metallocene compositions and their use in catalyst systems for olefin polymerization. The bridged metallocenes described therein include $((Me_2Si)_2(Indenyl)(Cp)ZrCl_2$.

MACROMOLECULAR SYMPOSIA, Vol. 89, 1995, pp. 237-247, discloses bridged zirconocenes: rac-$(Me_2Si)_2(Indenyl)_2ZrCl_2$, rac-$(Me_2Si)_2(2$-Me-4-Ph-Indenyl)$_2ZrCl_2$, rac-$(Me_2Si)_2(2$-Me-4,5-Benzo-Indenyl)$_2ZrCl_2$.

U.S. Pat. No. 9,988,410 discloses substituted bis indenyl metallocene catalyst compounds comprising —Si—Si— bridges and their use in catalyst systems for olefin polymerization.

U.S. Pat. No. 9,040,643 disclose various $(Me_2Si)_2$ bridged catalyst compounds, such as $(Me_2Si)_2(Cp)(3$-(3-phenylpropyl)-Indenyl)$ZrCl_2$; $(Me_2Si)_2(Cp)(3$-Allyl-Indenyl)$ZrCl_2$; $(Me_2Si)_2(Me_4Cp)(3$-Allyl-Indenyl)$ZrCl_2$; and $(Me_2Si)_2(Cp)(3,8$-di-tBu-Fluorenyl)$ZrCl_2$.

EP 849 273 A1 discloses $(Me_2Si)_2$ bridged catalyst compounds containing a seven membered ring fused with a cyclopentadienyl group.

KR 2015065084 discloses bis (substituted-fluorenyl) ($Me_2Si$—$CH_2$) bridged catalyst compounds U.S. Pat. Nos. 7,842,764 and 8,865,848 discloses bridged metallocenes, such as $(Me_2Si)_2(Indenyl)_2ZrCl_2$. The bridged metallocenes described therein have $C^6$ and $C^7$ of each indenyl ligand joined to form a saturated cyclic 5-membered ring.

U.S. Pat. No. 7,728,086 discloses bridged metallocene compositions having two indenyl ligands, such as $(Me_2Si)_2(Indenyl)_2ZrCl_2$.

JP 2015/172037 discloses bridged metallocene compositions such as $(Me_2Si)_2(Indenyl)(Cp)ZrCl_2$. The bridged metallocene compositions described therein consist of a hydrogen atom at $C^8$ of the indenyl ligand.

Other references of interest include: WO 2009027075; JP 2011-137146A; WO 98/403331; and U.S. Pat. Nos. 8,609,793; 8,058,461; 7,405,261; 7,157,531; 6,936,675; 6,903,229; 6,894,179; 6,888,017; 6,825,372; 6,784,305; 6,414,095; 6,399,723; 6,380,334; 6,380,331; 6,380,330; 6,380,124; 6,380,123; 6,380,121; 6,380,120; 6,376,627; 6,376,413; 6,376,412; 6,376,411; 6,376,410; 6,376,409; 6,376,408; and 6,376,407.

There is a need for new and improved catalyst systems for the polymerization of olefins in order to achieve specific polymer properties, such as high molecular weights, to increase conversion, improve comonomer incorporation, and/or to alter comonomer distribution without deteriorating the resulting polymer's properties.

SUMMARY OF THE INVENTION

The present disclosure provides bridged transition metal complexes represented by formula (I):

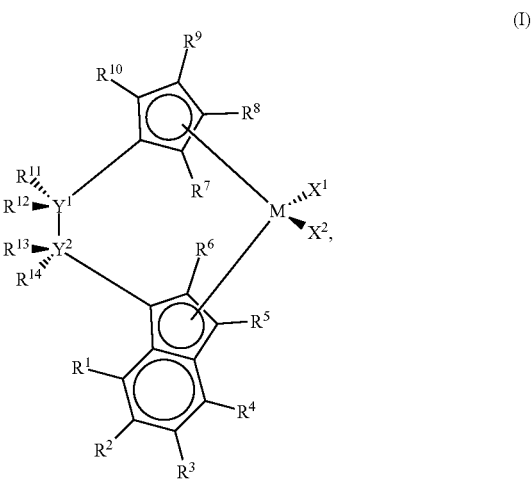

wherein:
M is a group 4 metal;
$Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si;
$X^1$ and $X^2$ are independently hydrogen, halide, hydroxyl, or $C_1$-$C_{50}$ substituted or unsubstituted hydrocarbyl, amide, alkoxide, sulfide, phosphide, halide, or a combination thereof, or $X^1$ and $X^2$ are joined together to form a metallocycle ring, or $X^1$ and $X^2$ are joined to form a chelating ligand, or an alkylidene;

each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring;

$R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —$NR'_2$, —$SR'$, —$OR$, —$OSiR'_3$, —$PR'_2$, where each $R'$ is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —$NR'_2$, —$SR'$, —$OR$, —$OSiR'_3$, —$PR'_2$, where each $R'$ is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I).

The present invention further relates to catalyst compounds represented by formula (I), wherein: M is a group 4 metal; $Y^1$ and $Y^2$ are independently Si, Ge, or C; $X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene; each of $R^1$, $R^2$, $R^3$, $R^5$, $R^6$, $R^7$, $R^9$, $R^{10}$, $R^{11}$, $R^{12}$, $R^{13}$, and $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$ are joined to form a saturated cyclic ring, substituted saturated cyclic ring, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —$NR'_2$, —$SR'$, —$OR$, —$OSiR'_3$, —$PR'_2$, where each $R'$ is hydrogen, halogen, $C_1$-$C_{10}$ alkyl, or $C_6$-$C_{10}$ aryl; wherein if $R^4$ is hydrogen, $R^2$ and $R^3$ are joined to form a saturated cyclic ring, substituted saturated cyclic ring, or an unsubstituted cyclic ring, and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —$NR'_2$, —$SR'$, —$OR$, —$OSiR'_3$, —$PR'_2$, where each $R'$ is hydrogen, halogen, $C_1$-$C_{10}$ alkyl, or phenyl.

In another embodiment, $R^4$ is hydrogen, $R^2$ and $R^3$ are joined to form a saturated cyclic ring, substituted saturated cyclic ring, or an unsubstituted unsaturated cyclic ring.

In another embodiment, $R^4$ is hydrogen and $R^2$ and $R^3$ are not joined to form a saturated cyclic ring, substituted saturated cyclic ring, or an unsubstituted unsaturated cyclic ring, and $R^8$ is not hydrogen.

In another embodiment, $R^4$ is hydrogen, $R^2$ and $R^3$ are not joined to form a saturated cyclic ring, substituted saturated cyclic ring, or an unsubstituted unsaturated cyclic ring, and $R^8$ is not hydrogen and is, optionally, not joined to $R^9$.

In another embodiment, a catalyst system is provided. The catalyst system includes (a) a transition metal complex represented by formula (I); and (b) a bridged or unbridged metallocene catalyst compound other than the transition metal complex of formula (I).

In another embodiment, a catalyst system is provided. The catalyst system includes a transition metal complex represented by formula (I); an activator; and a support material.

In another embodiment, a method of polymerizing olefins is provided. The method includes contacting at least one olefin with a catalyst system; and obtaining an olefin.

In another embodiment, an ethylene alpha-olefin copolymer is provided. The copolymer is obtained by contacting ethylene, at least one alpha-olefin, and a supported catalyst, the copolymer having an Mw/Mn of 3.5 or more and $g'_{vis}$ of 0.98 or more.

In another embodiment, a method of polymerizing olefins is provided. The method includes contacting at least one olefin with a catalyst system; and obtaining an olefin. In another embodiment, an ethylene alpha-olefin copolymer is provided. The copolymer is obtained by contacting ethylene, at least one alpha-olefin, and a supported catalyst, the copolymer having an Mw/Mn of 6 or more, $g'_{vis}$ of 0.98 or more and total unsaturation/1000 C of 0.15 or less.

The catalysts and catalyst systems described herein provide polymers, such as polyethylene polymers wherein incorporation of comonomers, such as $C_3$ to $C_8$ alkylene monomers, is less than 20%, more preferably less than 15% and even more preferably less than 10% by weight of the copolymer and with high molecular weights while maintaining good catalyst activities.

BRIEF DESCRIPTION OF THE FIGURES

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

FIG. 3F is a representative plot of dWt/d Log M versus Log M and a plot of 1-hexene incorporation (C$_6$ wt %) versus Log M of a polymer made by catalyst 5B.

DETAILED DESCRIPTION

Figure 1:
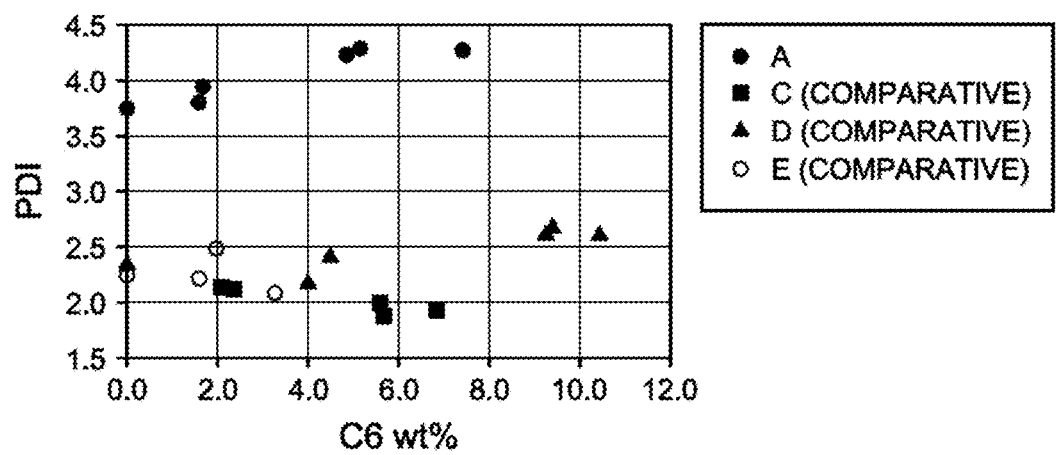
FIG. 1 is a representative plot of PDI (Mw/Mn) versus 1-hexene incorporation ($C_6$ wt %) for catalyst A in comparison to catalysts C, D, and E in Table 1.

Catalysts of the present disclosure include one larger ligand (such as an indenyl-type ligand) and one smaller ligand (such as a Cp-type ligand). Larger and smaller refers to the molecular weight of the ligand. Catalysts, catalyst systems and methods of the present disclosure provide polymers having broad molecular weight distribution (MWD), high polydispersity index (PDI), linearity, and improved comonomer incorporation. High PDI, linearity, and improved comonomer incorporation provide improved balance of processability and toughness of polymer compositions.

For purposes herein, the numbering scheme for the Periodic Table Groups is used as described in CHEMICAL AND ENGINEERING NEWS, 63(5), pg. 27 (1985). Therefore, a "group 4 metal" is an element from group 4 of the Periodic Table, e.g., Hf, Ti, or Zr.

The specification describes transition metal complexes. As used herein, the term "complex" is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which is believed to create a cation as a result of the removal of an anionic group, often referred to as a leaving group, from the transition metal.

In a preferred embodiment of the invention, copolymers of polyolefins, such as polyethylene, have a comonomer, such as hexene, incorporated into the polyethylene backbone. These copolymers provide varying physical properties compared to polyethylene alone and are typically produced in a low pressure reactor, utilizing, for example, solution, slurry, or gas phase polymerization processes. The comonomer content of a polyolefin (e.g., wt % of comonomer incorporated into a polyolefin backbone) influences the properties of the polyolefin (and composition of the copolymers) and is dependent on the identity of the polymerization catalyst.

A copolymer composition, such as a resin, has a composition distribution, which refers to the distribution of comonomer that forms short chain branches along the copolymer backbone. When the amount of short chain branches varies among the copolymer molecules, the composition is said to have a "broad" composition distribution. When the amount of comonomer per 1000 carbons is similar among the copolymer molecules of different chain lengths, the composition distribution is said to be "narrow".

Like comonomer content, the composition distribution influences the properties of a copolymer composition, for example, stiffness, toughness, environmental stress crack resistance, and heat sealing, among other properties. The composition distribution of a polyolefin composition may be readily measured by, for example, Temperature Rising Elution Fractionation (TREF) or Crystallization Analysis Fractionation (CRYSTAF).

Also like comonomer content, a composition distribution of a copolymer composition is influenced by the identity of the catalyst used to form the polyolefins of the composition. Ziegler-Natta catalysts and chromium based catalysts produce compositions with broad composition distributions, whereas metallocene catalysts typically produce compositions with narrow composition distributions.

Furthermore, polyolefins, such as polyethylene, which have high molecular weight, generally have desirable mechanical properties over their lower molecular weight counterparts. However, high molecular weight polyolefins can be difficult to process and can be costly to produce. Polyolefin compositions having a bimodal molecular weight distribution are desirable because they can combine the advantageous mechanical properties of a high molecular weight fraction of the composition with the improved processing properties of a low molecular weight fraction of the composition. As used herein, "high molecular weight" is defined as a number average molecular weight (Mn) value of 100,000 or more. "Low molecular weight" is defined as an Mn value of less than 100,000 g/mol.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$h$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per gram of catalyst (cat) used per hour (gPgcat$^{-}$$_1$h$^{-1}$).

As used herein, an "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, ethylene shall be considered an α-olefin.

For purposes of this invention and claims thereto, unless otherwise indicated, the term "substituted" means that a hydrogen group has been replaced with a heteroatom, a heteroatom containing group (such as halogen (such as Br, Cl, F or I) or at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, or where at least one heteroatom has been inserted within a hydrocarbyl ring), or a hydrocarbyl group, except that a "substituted hydrocarbyl" is a hydrocarbyl in which at least one hydrogen atom of the hydrocarbyl has been substituted with at least one heteroatom or heteroatom containing group, such as halogen (such as Br, Cl, F, or I) or at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$, and the like, or where at least one heteroatom has been inserted within a hydrocarbyl ring).

As used herein, Mn is number average molecular weight, Mw is weight average molecular weight, and Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weight units (e.g., Mw, Mn, Mz) are g/mol.

Unless otherwise noted all melting points (Tm) are DSC second melt.

The following abbreviations may be used herein: dme is 1,2-dimethoxyethane, Me is methyl, Ph is phenyl, Et is ethyl, Pr is propyl, iPr is isopropyl, n-Pr is normal propyl, Bu is butyl, cPR is cyclopropyl, iBu is isobutyl, tBu is tertiary butyl, p-tBu is para-tertiary butyl, nBu is normal butyl, sBu is sec-butyl, TMS is trimethylsilyl, TIBAL is triisobutylaluminum, TNOAL is tri(n-octyl)aluminum, MAO is methylalumoxane, p-Me is para-methyl, Ph is phenyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, and Cy is cyclohexyl.

As used herein, a "catalyst" includes a single catalyst, or multiple catalysts with each catalyst being conformational isomers or configurational isomers. Conformational isomers include, for example, conformers and rotamers. Configurational isomers include, for example, stereoisomers.

As used herein, a "catalyst system" includes at least one catalyst compound and at least one activator. When "catalyst system" is used to describe a catalyst compound/activator combination before activation, it means the unactivated catalyst complex (precatalyst) together with an activator and, optionally, a co-activator. When it is used to describe the combination after activation, it means the activated complex and the activator or other charge-balancing moiety. The transition metal compound may be neutral as in a precatalyst, or a charged species with a counter ion as in an activated catalyst system. As used herein, when catalyst systems are described as comprising neutral stable forms of the components, it is well understood by one of ordinary skill in the art, that the ionic form of the component is the form that reacts with the monomers to produce polymers.

As used herein, the metallocene catalyst may be described as a catalyst precursor, a pre-catalyst compound, metallocene catalyst compound or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the transition metal compound to form an alkylated transition metal compound.

A metallocene catalyst is defined as an organometallic compound with at least one π-bound cyclopentadienyl moiety (or substituted cyclopentadienyl moiety).

As used herein, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may include at least one aromatic group.

The terms "hydrocarbyl radical," "hydrocarbyl," "hydrocarbyl group," "alkyl radical," and "alkyl" are used interchangeably throughout this document. Likewise, the terms "group," "radical," and "substituent" are also used interchangeably in this document. For purposes of this disclosure, "hydrocarbyl radical" refers to $C_1$-$C_{100}$ radicals, that may be linear, branched, or cyclic, and when cyclic, aromatic or non-aromatic. Examples of such radicals include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one halogen (such as Br, Cl, F or I) or at least one functional group such as $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like, or where at least one heteroatom has been inserted within a hydrocarbyl ring.

For purposes of this invention and the claims thereto, when R groups are described as able to join and form a cyclic group (such as a substituted cyclic ring), this cyclic group can include its own groups that join to become a cyclic ring, e.g., the substituted cyclic ring can form multinuclearcyclic groups.

The term "alkenyl" means a straight-chain, branched-chain, or cyclic hydrocarbon radical having one or more double bonds. These alkenyl radicals may be optionally substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl, and the like, including their substituted analogues.

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxyl, and the like.

The term "aryl" or "aryl group" includes a $C_4$-$C_{20}$ aromatic ring, such as a six carbon aromatic ring, and the substituted variants thereof, including but not limited to, phenyl, 2-methyl-phenyl, xylyl, 4-bromo-xylyl. Likewise heteroaryl means an aryl group where a ring carbon atom (or two or three ring carbon atoms) has been replaced with a heteroatom, preferably N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise the term aromatic also refers to substituted aromatics.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

For any particular compound disclosed herein, any general or specific structure presented also encompasses all conformational isomers, regioisomers, and stereoisomers that may arise from a particular set of substituents, unless stated otherwise. Similarly, unless stated otherwise, the general or specific structure also encompasses all enantiomers, isomers, and other optical isomers whether in enantiomeric or racemic forms, as well as mixtures of stereoisomers, as would be recognized by a skilled artisan.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom-substituted ring where a hydrogen on a ring atom is replaced with a heteroatom. For example, tetrahydrofuran is a heterocyclic ring and 4-N,N-dimethylamino-phenyl is a heteroatom-substituted ring.

The term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res., 2000, Vol. 29, p. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

Transition Metal Complexes

In at least one embodiment, the present disclosure provides bridged metallocene transition metal complexes having at least one indenyl ligand substituted at the 4-position, a Cp ligand with particular combinations of substituents, and bridged with a —Si—Si—, —Si—C—, —Ge—Ge—, —Ge—C—, or —C—C— group. In some preferred embodiments, the $R^4$ position is $C_6$-$C_{10}$ aryl (such as phenyl or naphthyl) or fluorenylidenyl. The $C_6$-$C_{10}$ aryl and fluorenylidenyl can be substituted.

In at least one embodiment, the present disclosure relates to a catalyst compound, and catalyst systems comprising such compounds, represented by the formula (I):

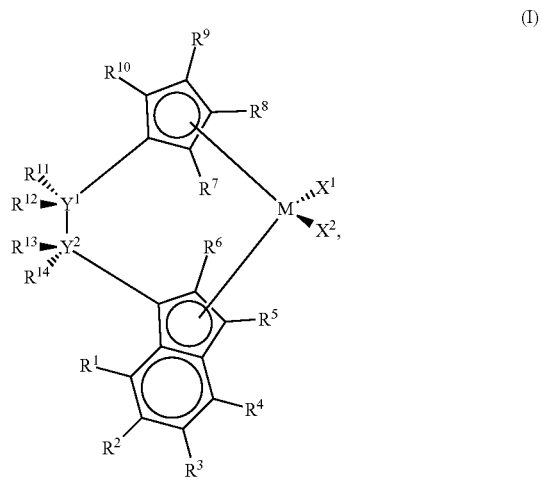

(I)

wherein:

M is a group 4 metal;

$Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si;

$X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene;

each of $R^1$, $R^2$, $R^3$, $R^5$, $R^6$, $R^7$, $R^9$, $R^{10}$, $R^{11}$, $R^{12}$, $R^{13}$, $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups do not cyclize to form a benzene ring (substituted or unsubstituted) fused with the cyclopentadienyl ring group of formula (I).

Alternately, this invention relates to catalyst compound represented by formula (I): wherein:

M is a group 4 metal;

$Y^1$ and $Y^2$ are independently Si, Ge, or C;

$X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene;

each of $R^1$, $R^2$, $R^3$, $R^5$, $R^6$, $R^7$, $R^9$, $R^{10}$, $R^{11}$, $R^{12}$, $R^{13}$, and $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring;

$R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl;

wherein if $R^4$ is hydrogen, $R^2$ and $R^3$ are joined to form a saturated cyclic ring, substituted saturated cyclic ring, or an unsubstituted unsaturated cyclic ring, and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl.

Preferably $R^8$ and $R^9$ do not form a cyclic ring, preferably $R^8$ and $R^9$ do not form an aromatic cyclic ring, preferably $R^8$ and $R^9$ do not form a mononuclear aromatic six membered cyclic ring. Preferably $R^8$ and $R^9$ do not cyclize to form indene (substituted or unsubstituted) with the five membered cyclopentadienyl ring.

Preferably $R^9$ and $R^{10}$ do not form a cyclic ring, preferably $R^9$ and $R^{10}$ do not form an aromatic cyclic ring, preferably $R^9$ and $R^{10}$ do not form a mononuclear aromatic six membered cyclic ring. Preferably $R^9$ and $R^{10}$ do not cyclize to form indene (substituted or unsubstituted) with the five membered cyclopentadienyl ring.

Preferably adjacent $R^7$, $R^8$, $R^9$ and/or $R^{10}$ groups do not cyclize to form a benzene group (substituted or unsubstituted) fused with the cyclopentadienyl ring group of formula (I) shown below:

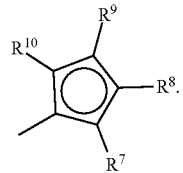

Preferably $R^3$ and $R^4$ do not form a cyclic ring, preferably $R^3$ and $R^3$ do not form an aromatic or saturated cyclic ring, preferably $R^3$ and $R^4$ do not form a mononuclear saturated five membered cyclic ring. Preferably $R^3$ and $R^4$ do not cyclize to form a-indacene or as-indacene (substituted or unsubstituted) with the indene group.

Preferably $R^1$, $R^2$, $R^3$ and/or $R^4$ do not cyclize to form a benzene group (substituted or unsubstituted) fused with the indenyl group of formula (I) shown below:

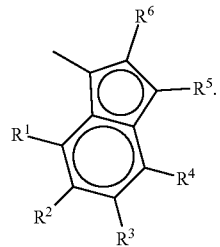

Preferably, when $R^8$ is not hydrogen, then $R^7$ and $R^{10}$ are hydrogen.

Preferably, when $R^8$ is not hydrogen, then $R^7$, $R^9$, and $R^{10}$ are hydrogen.

In at least one embodiment, $X^1$ and $X^2$ are independently halide, $C_1$-$C_{10}$ hydrocarbyl, or $C_1$-$C_{10}$ substituted hydrocarbyl.

In at least one embodiment, $R^4$ is halogen, $C_6$-$C_{10}$ aryl, substituted $C_6$-$C_{10}$ aryl, fluorenylidenyl, or substituted fluorenylidenyl, such as $C_6$-$C_{10}$ aryl or substituted $C_6$-$C_{10}$ aryl.

In at least one embodiment, $R^8$ is $C_1$-$C_{20}$ hydrocarbyl or substituted $C_1$-$C_{20}$ hydrocarbyl, such as substituted or unsubstituted methyl, ethyl, propyl, iso-propyl, n-butyl, iso-butyl, or tert-butyl.

In at least one embodiment, $R^2$ and $R^3$ combine to form a cyclobutyl ring, a cyclopentyl ring, or cyclohexyl ring, such as a cyclopentyl ring.

In at least one embodiment, $R^6$ is hydrogen, methyl, ethyl, propyl, iso-propyl, n-butyl, iso-butyl, or tert-butyl, such as hydrogen or methyl.

In at least one embodiment, M is preferably Ti, Hf, or Zr, preferably Zr.

In at least one embodiment, a catalyst represented by formula (I) is at least one of:

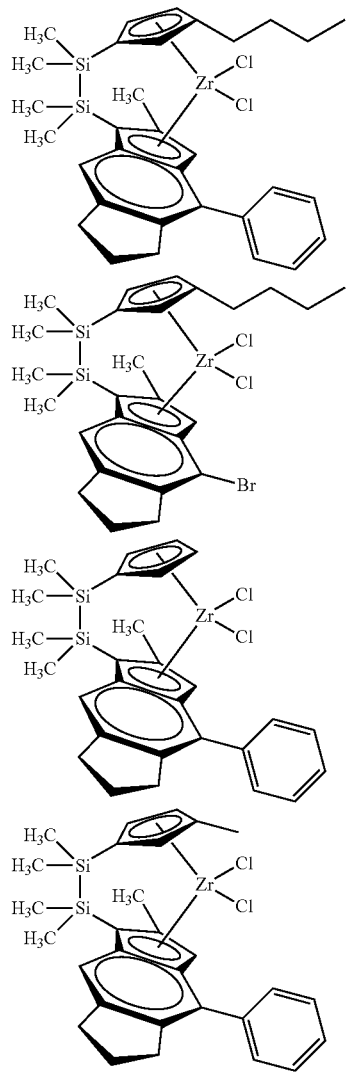

-continued

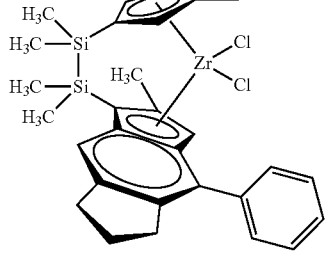

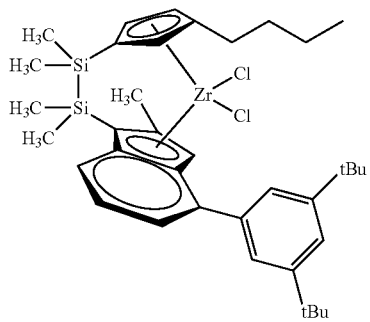

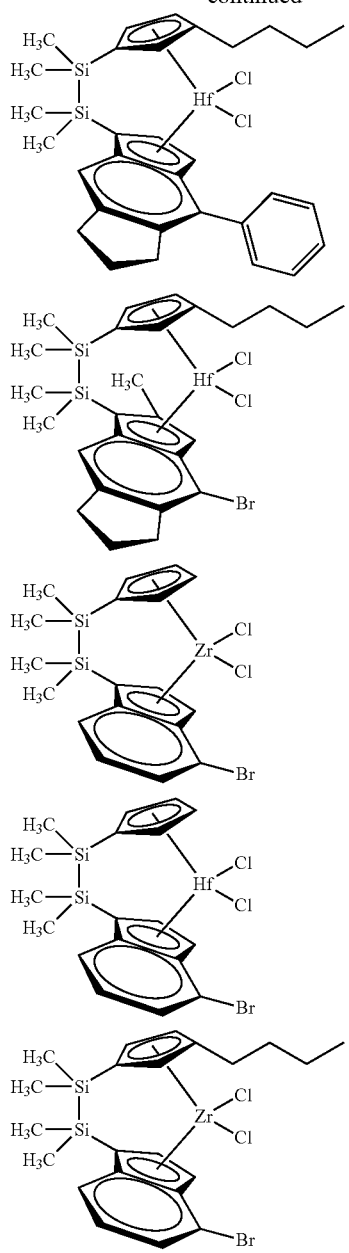

Likewise, while the dichloro-substituted compounds are enumerated above, the compounds where each of the chlorides are replaced with methyl groups (e.g., —Zr((CH$_3$)$_2$) are also expressly disclosed. And while the complexes are substituted at the 2-position of the Cp ring, and the indenyl ring is substituted at the 2-position and 4-position, and the 5 and 6-positions are joined to form a cyclic ring, analogs wherein the substitution occurs instead, and in addition, at other positions of the indene ring are also envisioned. Also, while the disilyl bridge of the compounds are enumerated above, analogs wherein some or each methyl is replaced with hydrogen or phenyl is expressly disclosed.

Catalyst compounds useful herein include those represented by the formulas below (including isomers thereof), where the Zr in each formula is optionally replaced by Hf:

| | Structure |
|---|---|
| 1 |  |
| 2 | 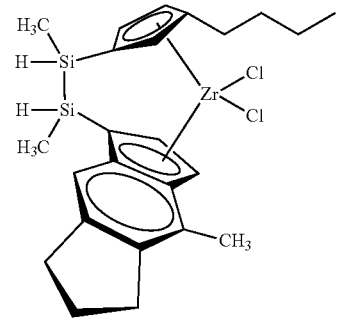 |
| 3 | 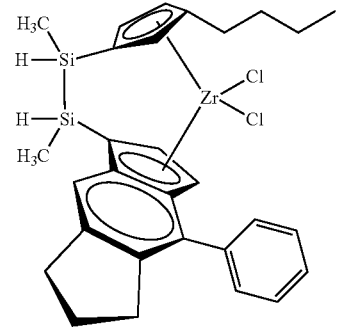 |
| 4 | 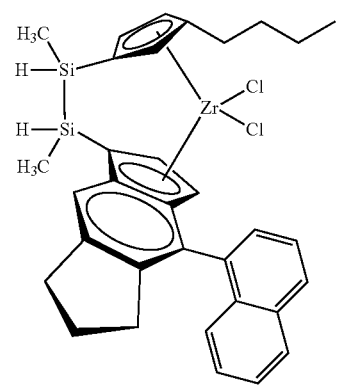 |

| | Structure |
|---|---|
| 5 | 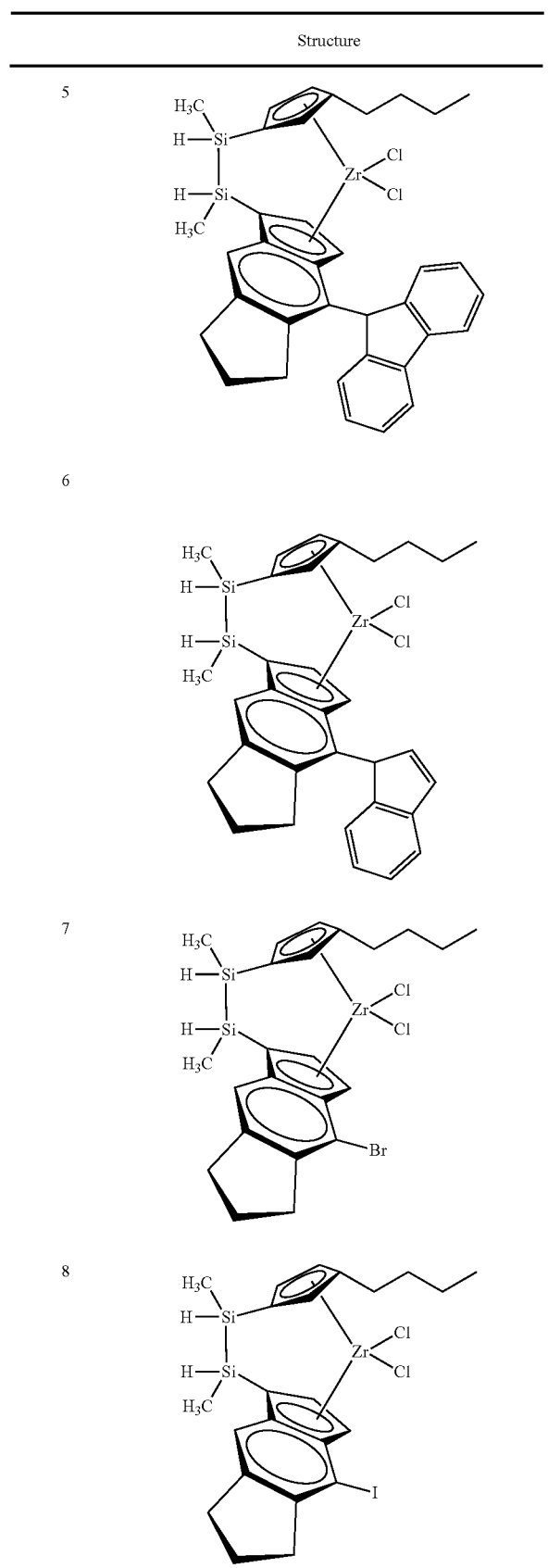 |
| 6 | |
| 7 | |
| 8 | |
| | Structure |
|---|---|
| 9 | 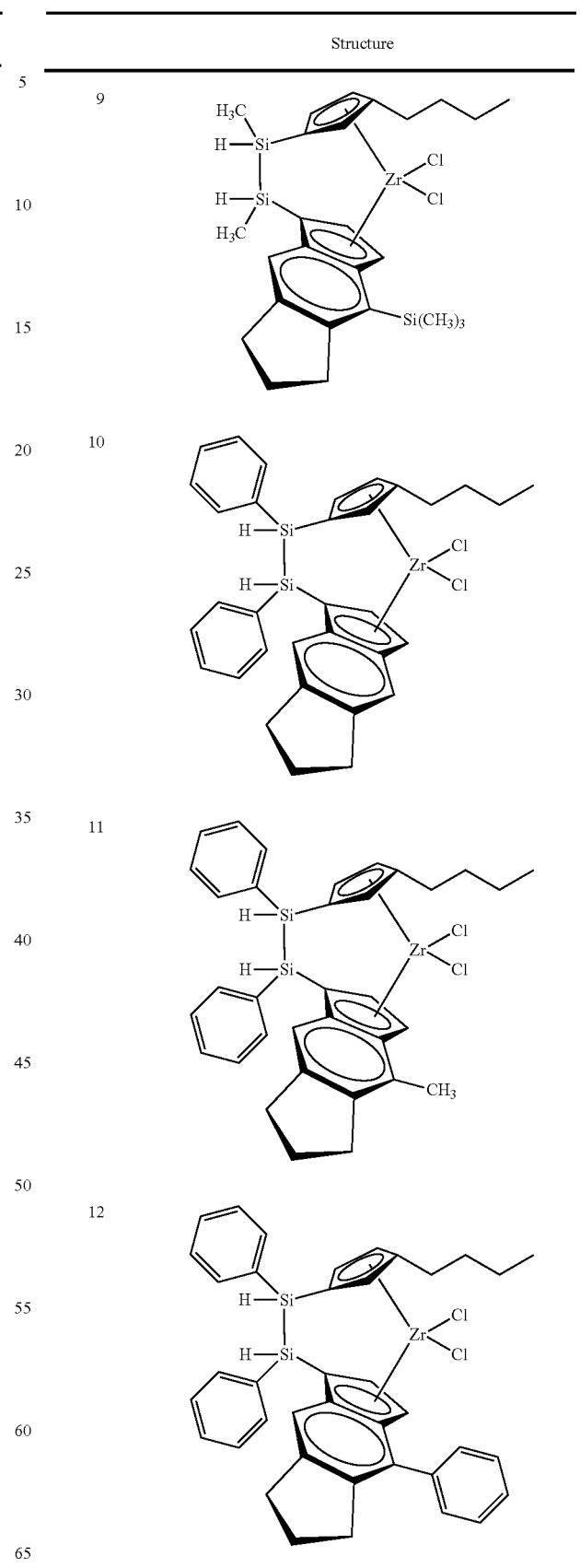 |
| 10 | |
| 11 | |
| 12 | |

-continued
| | Structure |
|---|---|
| 13 | |
| 14 | |
| 15 | |
| 16 | |
| 17 | |
| 18 | |
| 19 | |
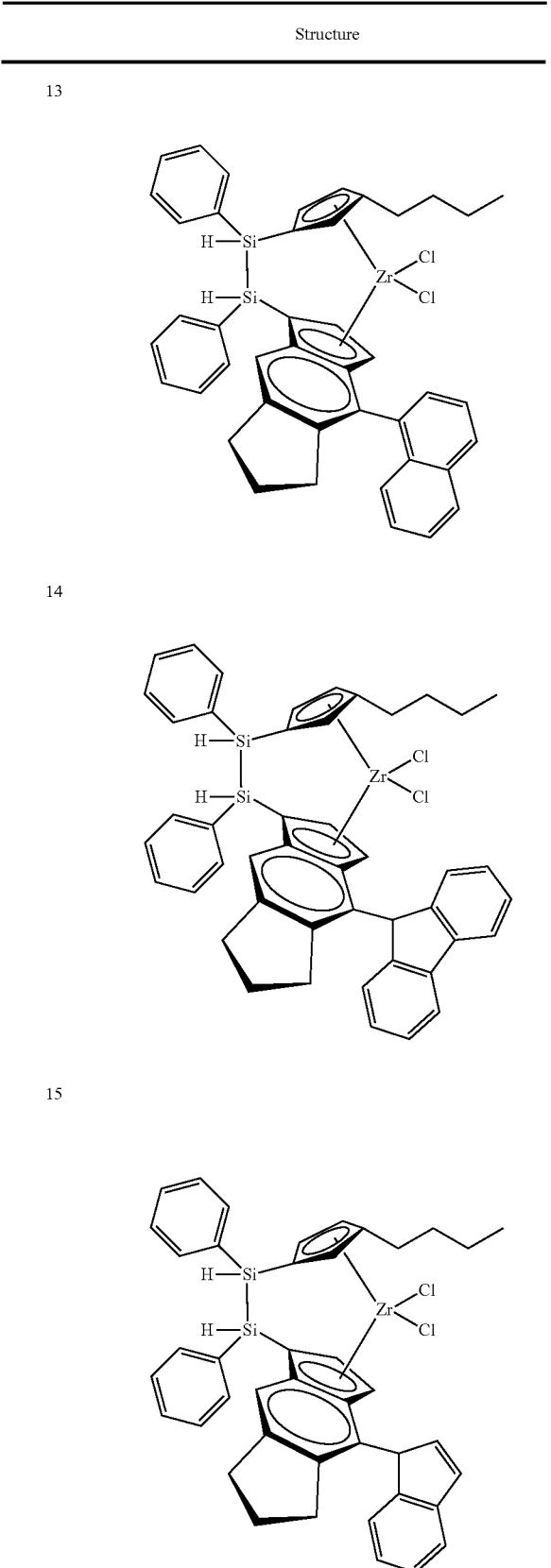

| | Structure | | | Structure |
|---|---|---|---|---|
| 20 | 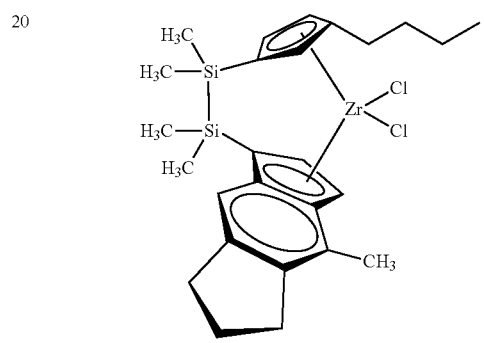 | | 24 | 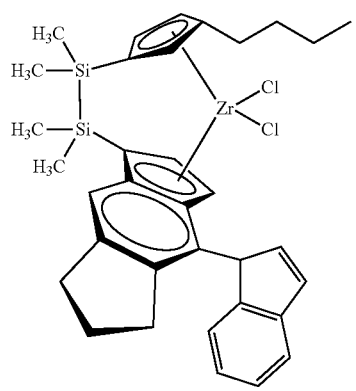 |
| 21 | 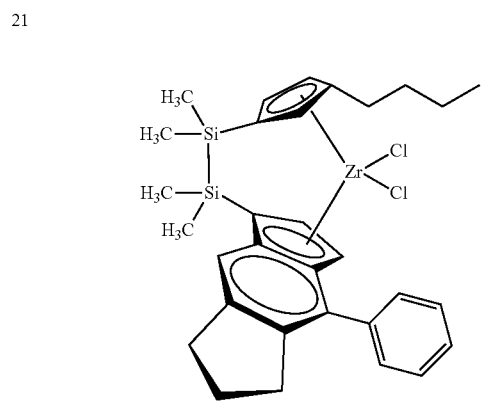 | | 25 | 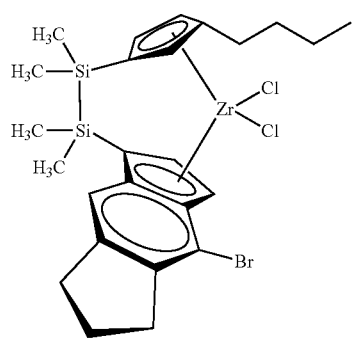 |
| 22 | 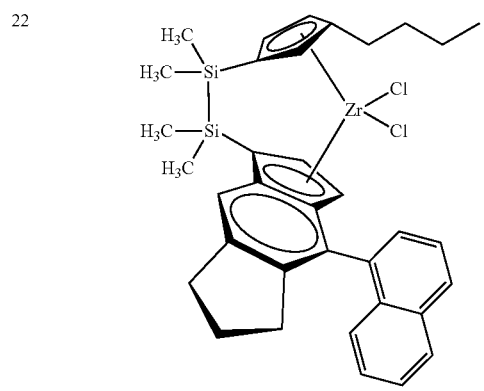 | | 26 | 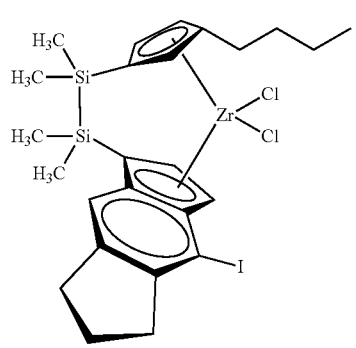 |
| 23 | 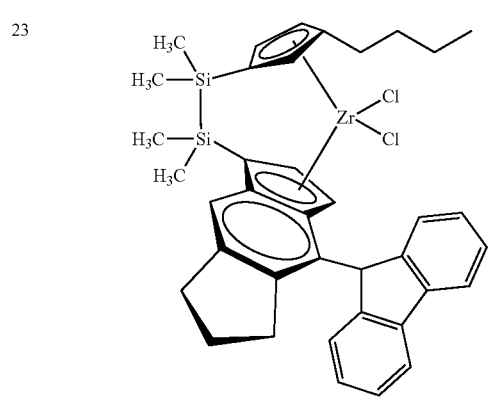 | | 27 | 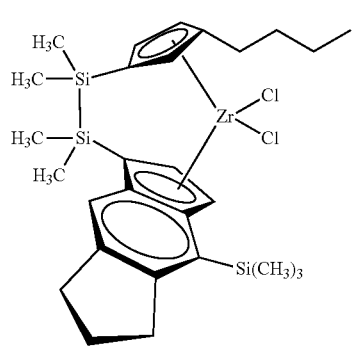 |

-continued
| | Structure |
|---|---|
| 28 | 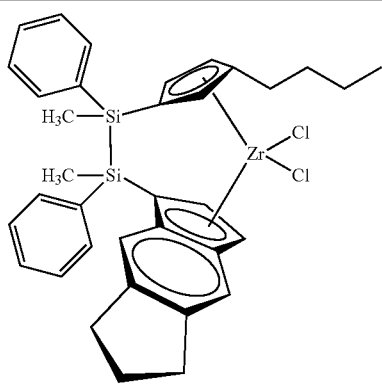 |
| 29 | 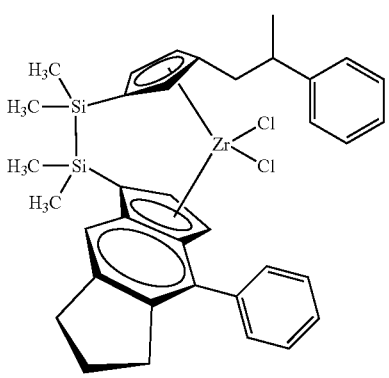 |
| 30 | 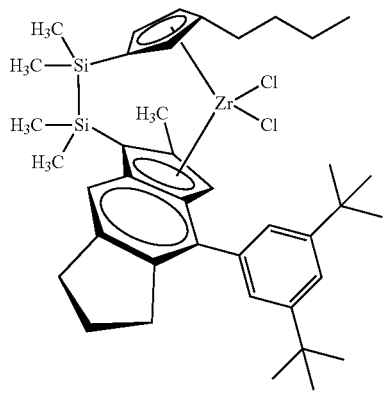 |
| 31 | 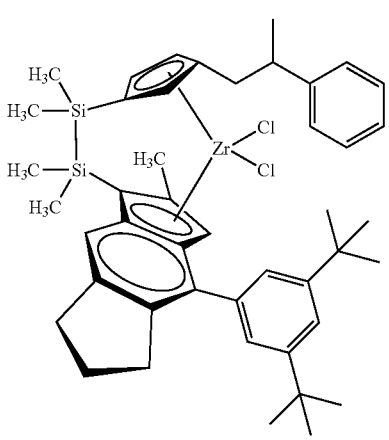 |
-continued
| | Structure |
|---|---|
| 32 | 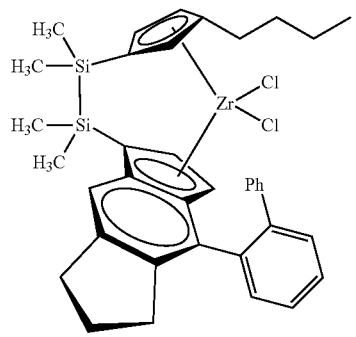 |
| 33 | 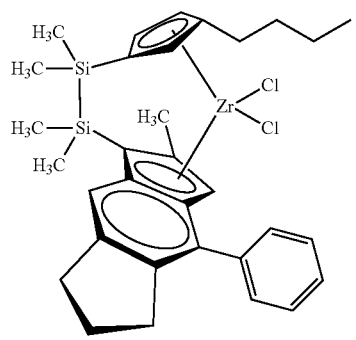 |
| 34 | 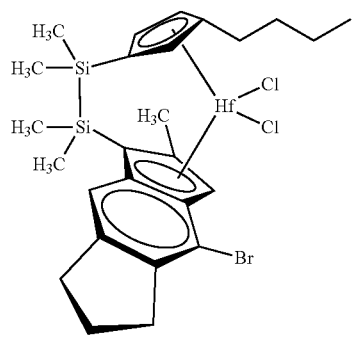 |
| 35 | 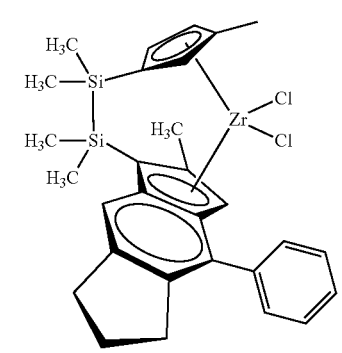 |

-continued
| | Structure |
|---|---|
| 36 | 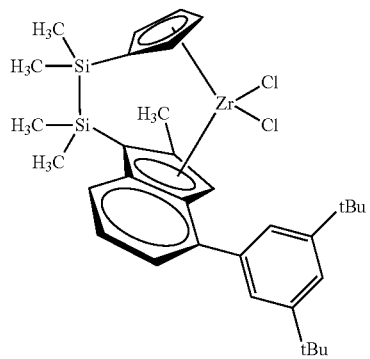 |
| 37 | 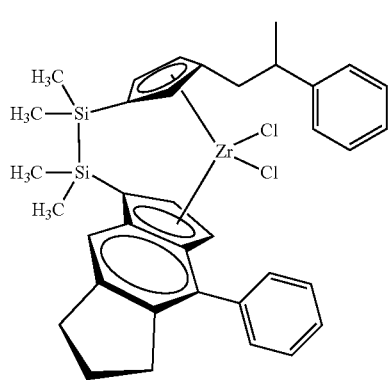 |
| 38 | 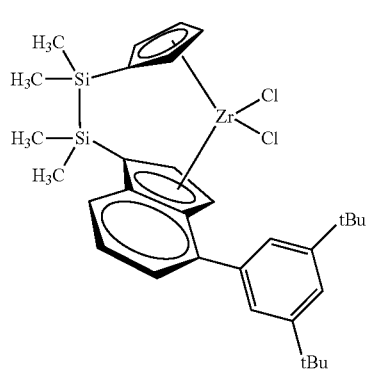 |
| 39 | 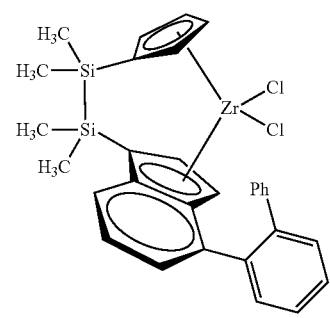 |
-continued
| | Structure |
|---|---|
| 40 | 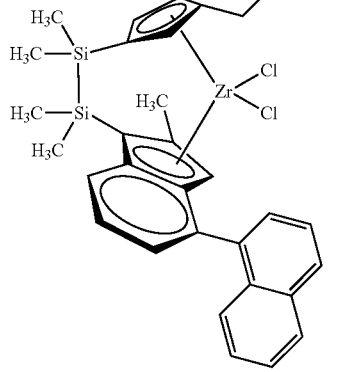 |
| 41 | 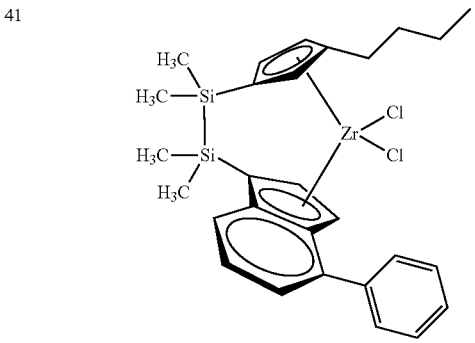 |
| 42 | 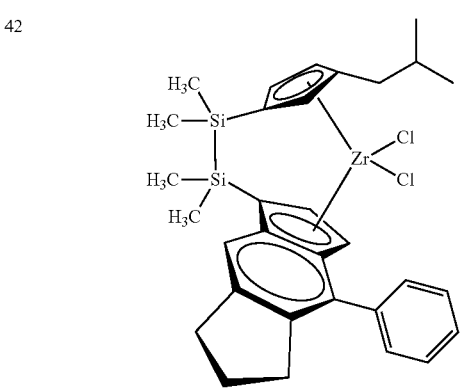 |
| 43 | 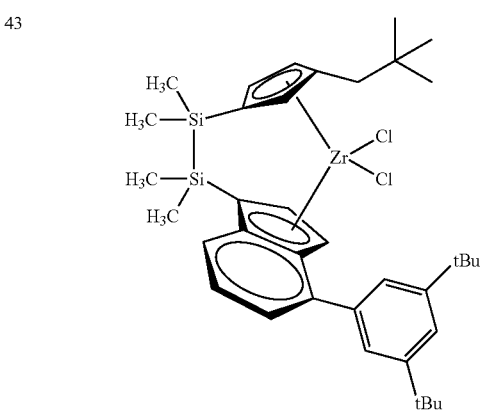 |

| Structure |
|---|
| 44 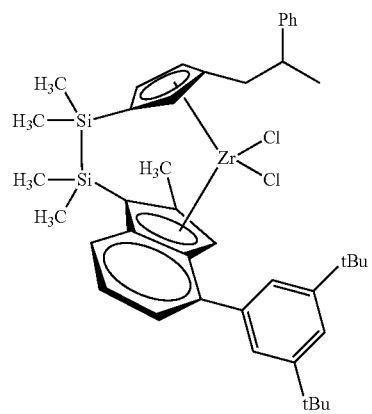 |
| 45 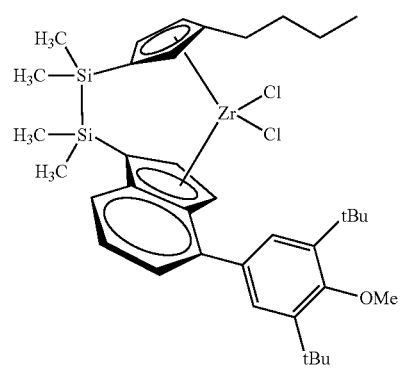 |
| 46  |
| Structure |
|---|
| 47 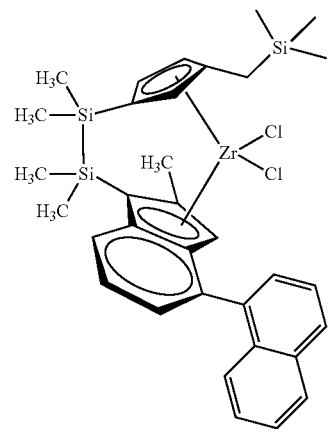 |
| 48 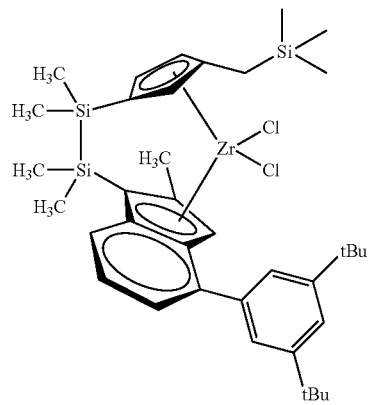 |
| 49 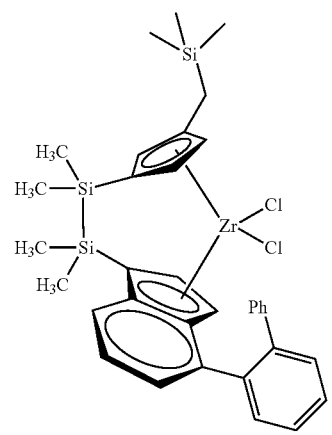 |

| | Structure |
|---|---|
| 50 | 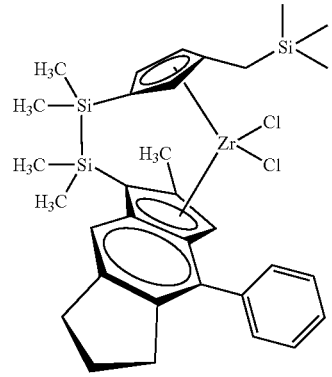 |
| 51 | 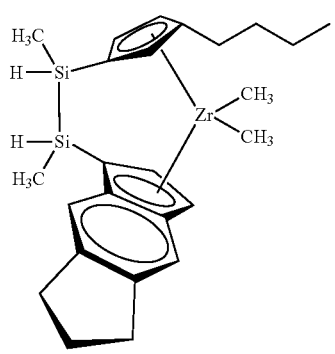 |
| 52 | 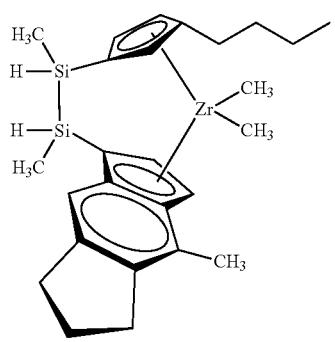 |
| 53 | 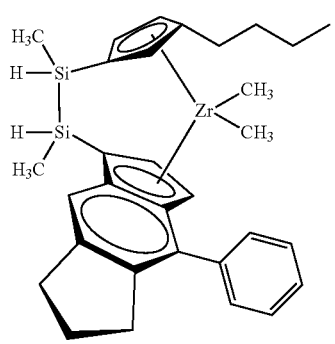 |
| 54 | 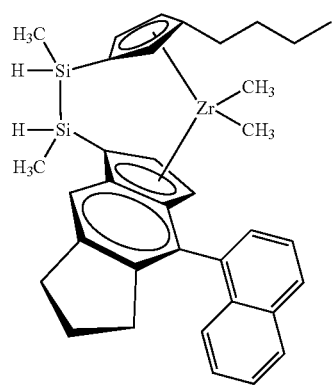 |
| 55 | 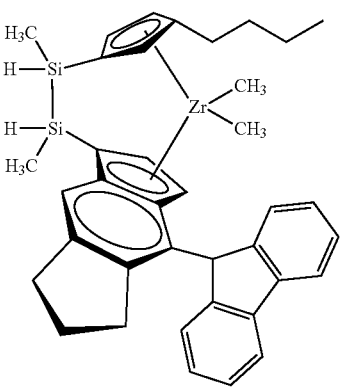 |
| 56 | 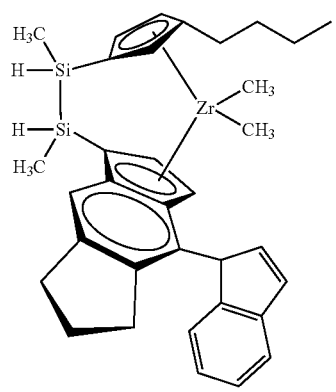 |
| 57 | 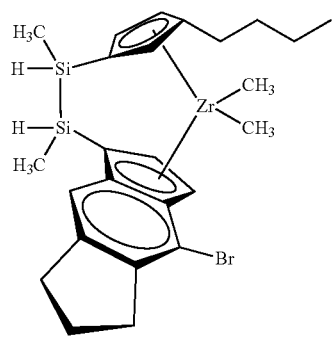 |

| | Structure |
|---|---|
| 58 | 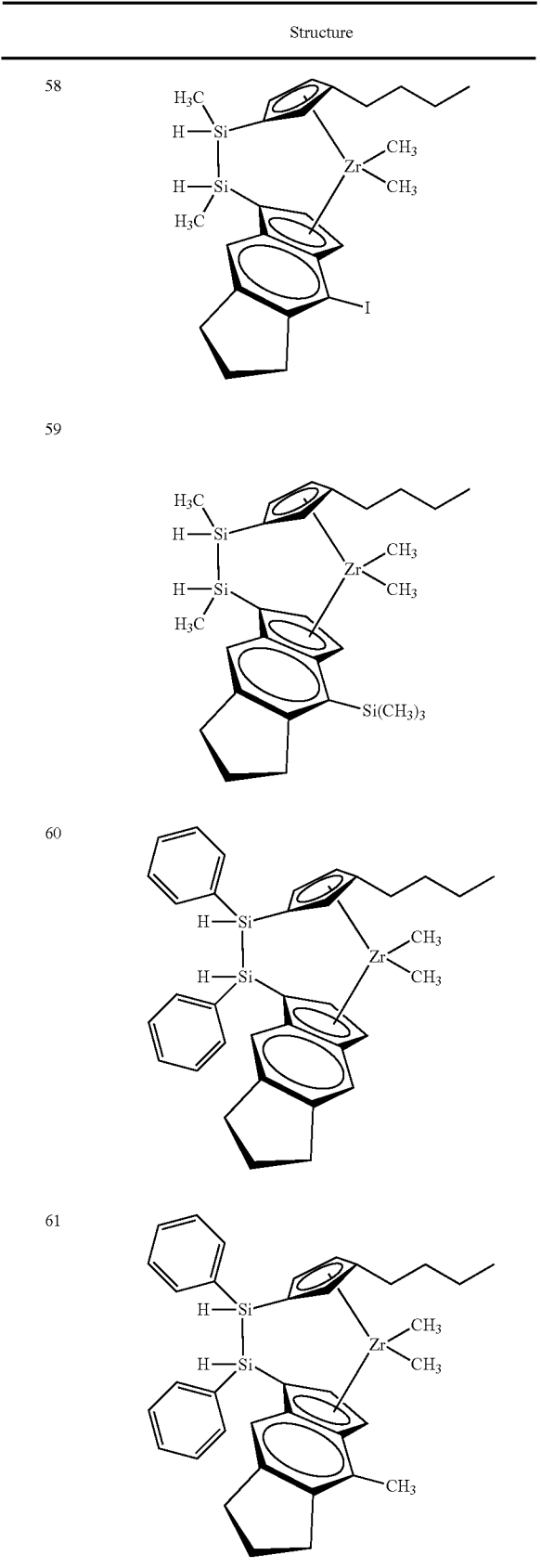 |
| 59 | |
| 60 | |
| 61 | |
| | Structure |
|---|---|
| 62 | 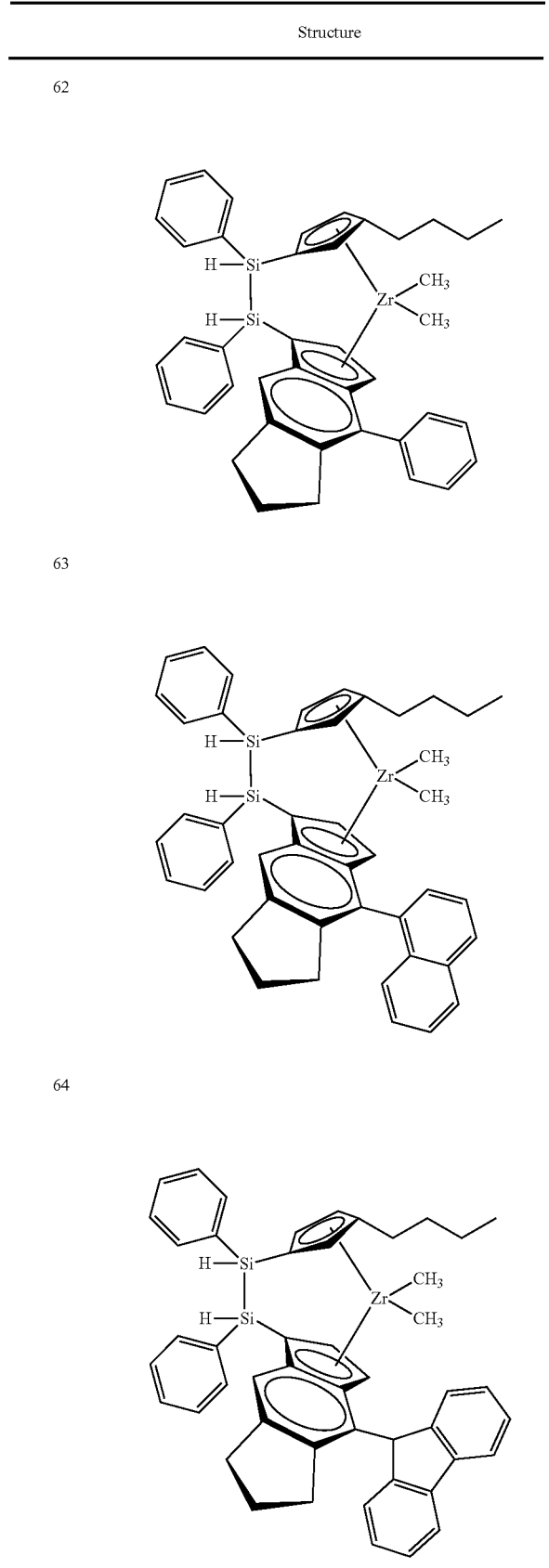 |
| 63 | |
| 64 | |

-continued
| | Structure |
|---|---|
| 65 | 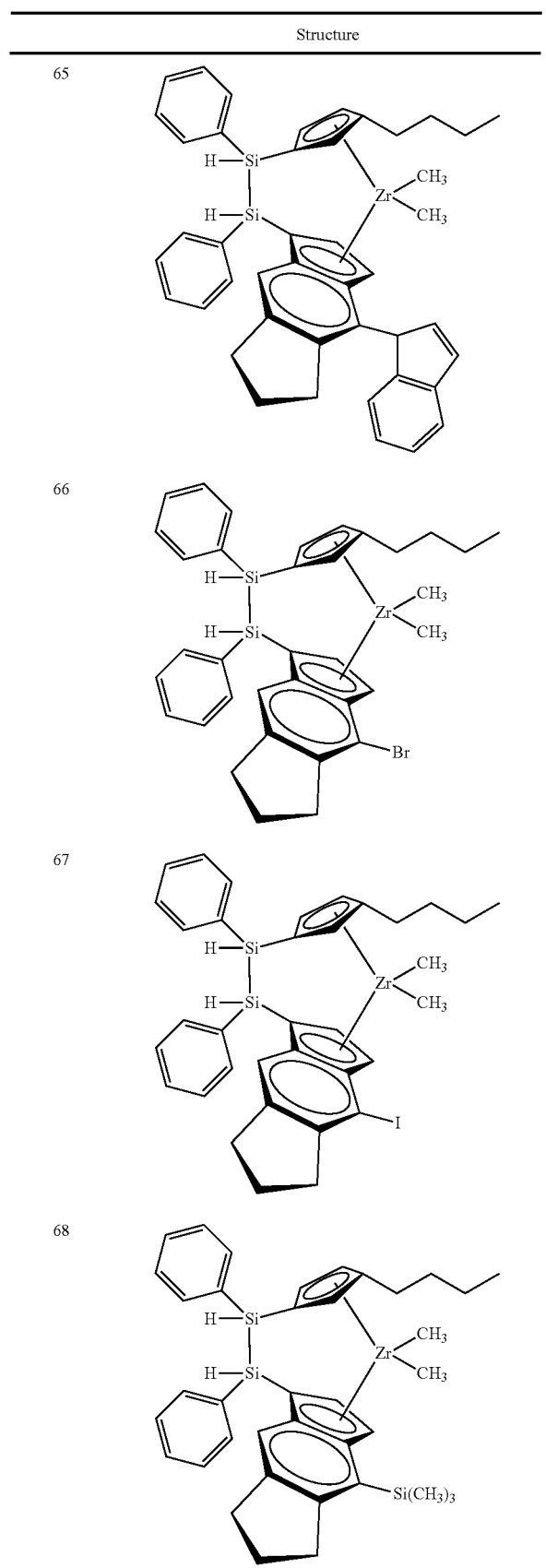 |
| 66 | |
| 67 | |
| 68 | |
-continued
| | Structure |
|---|---|
| 69 | 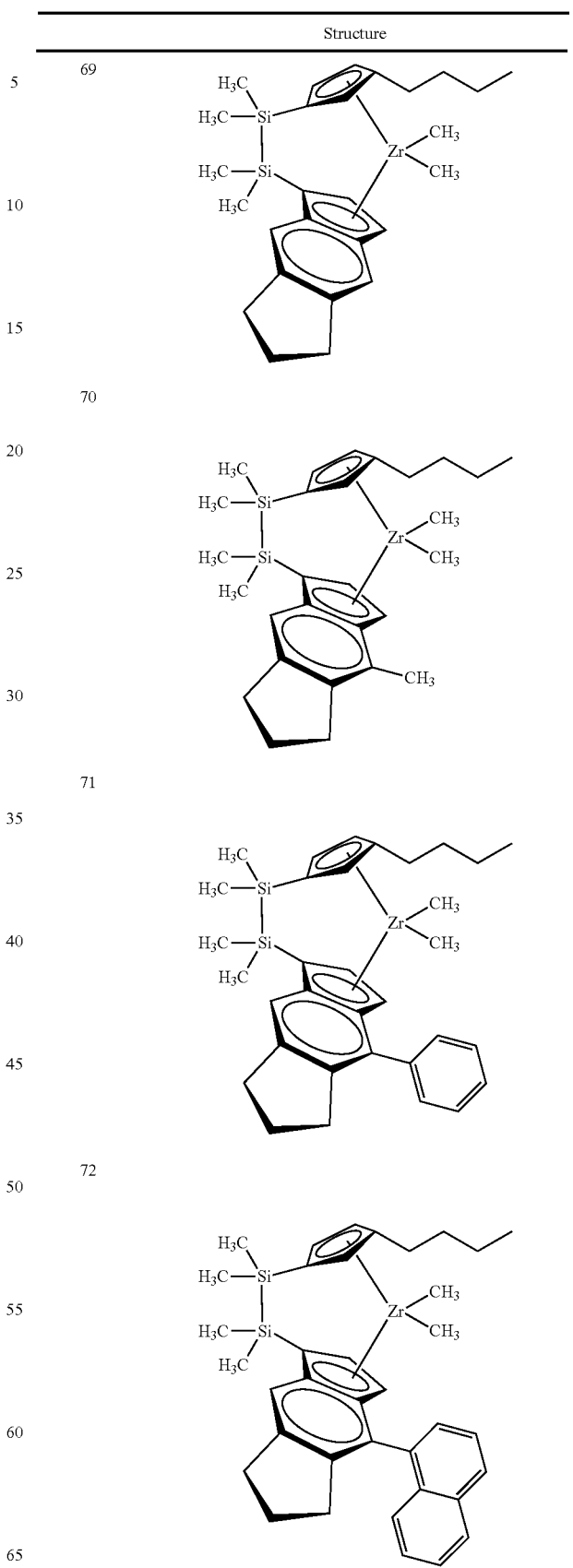 |
| 70 | |
| 71 | |
| 72 | |

| | Structure |
|---|---|
| 73 | 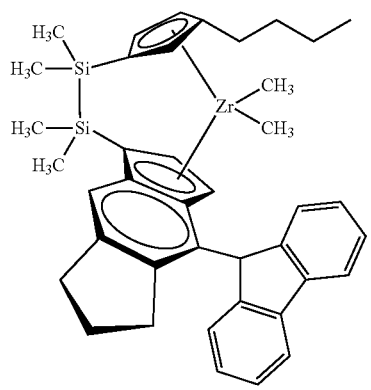 |
| 74 | 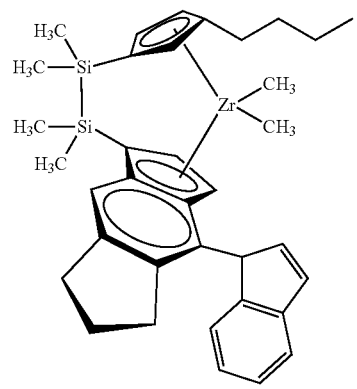 |
| 75 | 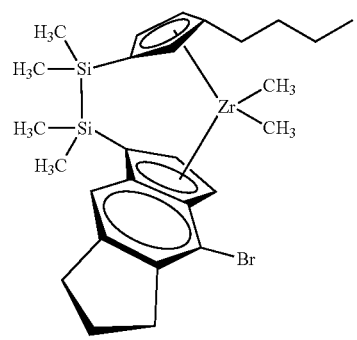 |
| 76 | 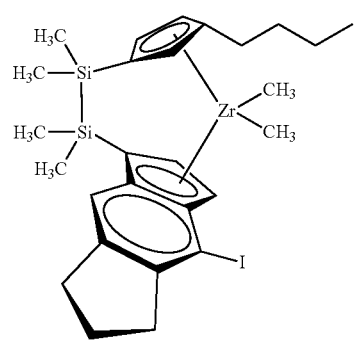 |
| | Structure |
|---|---|
| 77 | 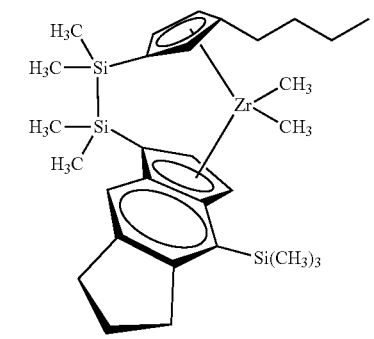 |
| 78 | 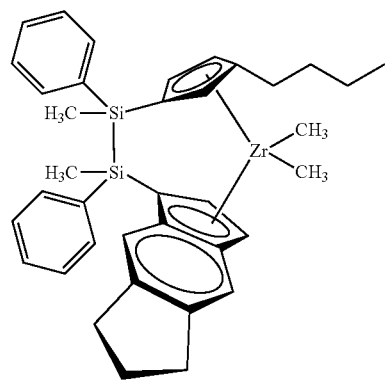 |
| 79 | 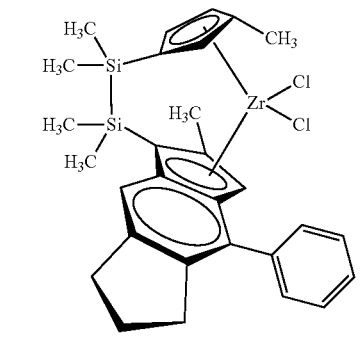 |
| 80 | 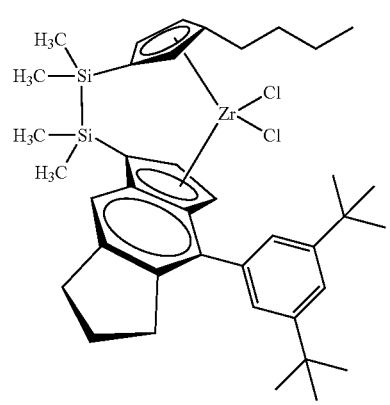 |

| 37 -continued | 38 -continued |
|---|---|
| Structure | Structure |
81
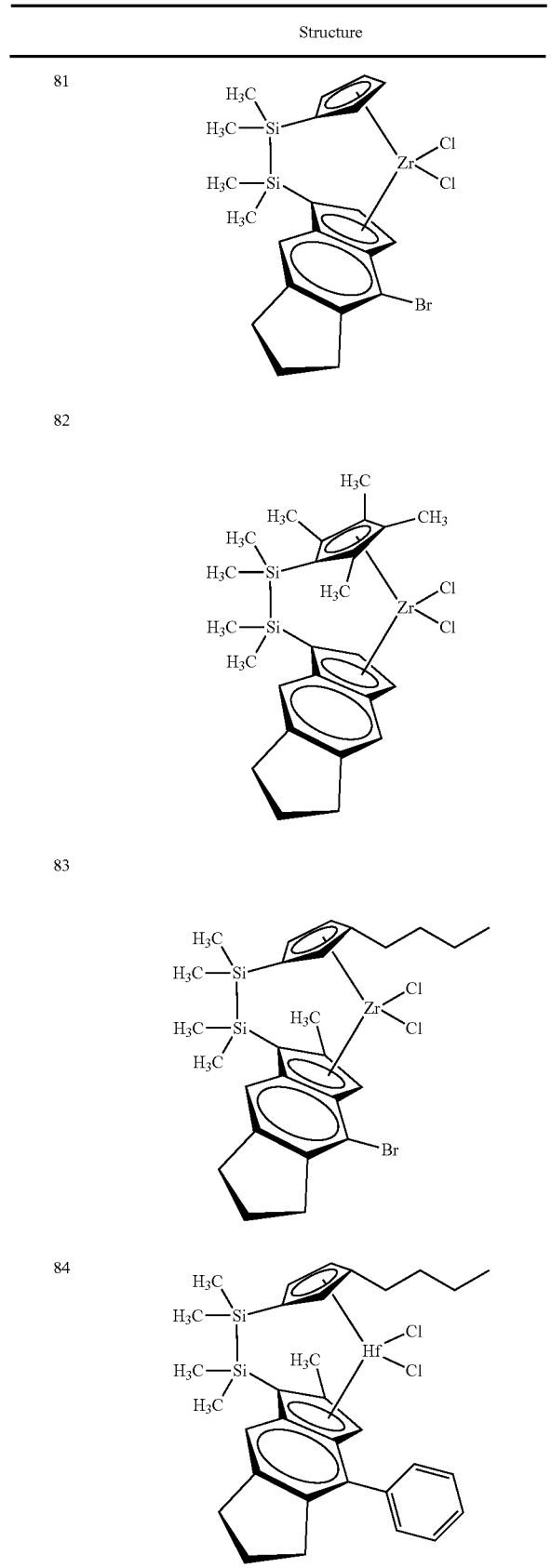
82
83
84
85
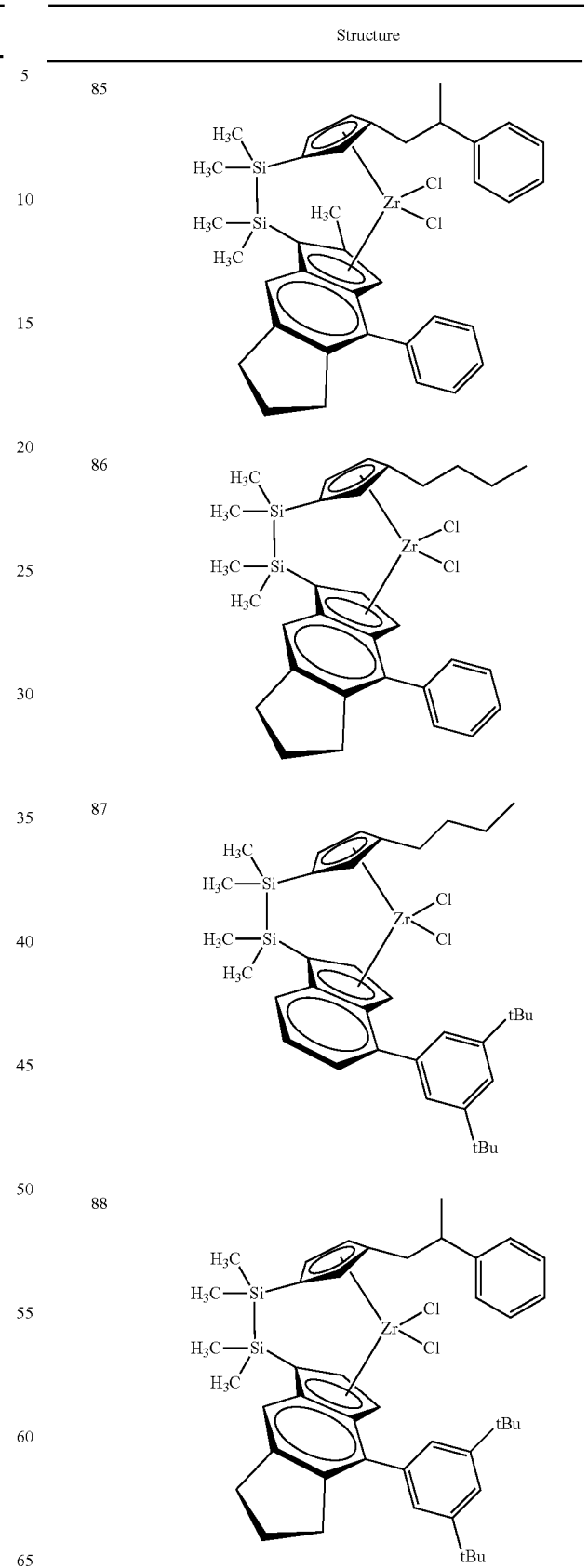
86
87
88

TABLE-continued
| | Structure |
|---|---|
| 89 | 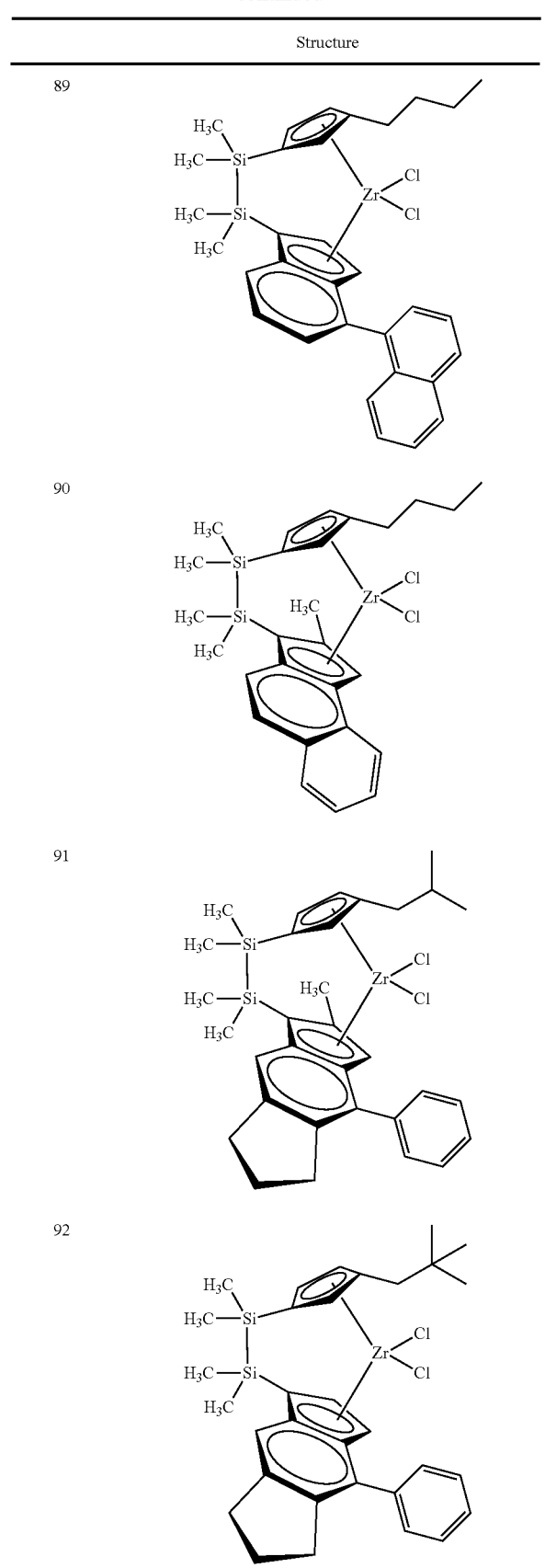 |
| 90 | |
| 91 | |
| 92 | |
TABLE-continued
| | Structure |
|---|---|
| 93 | 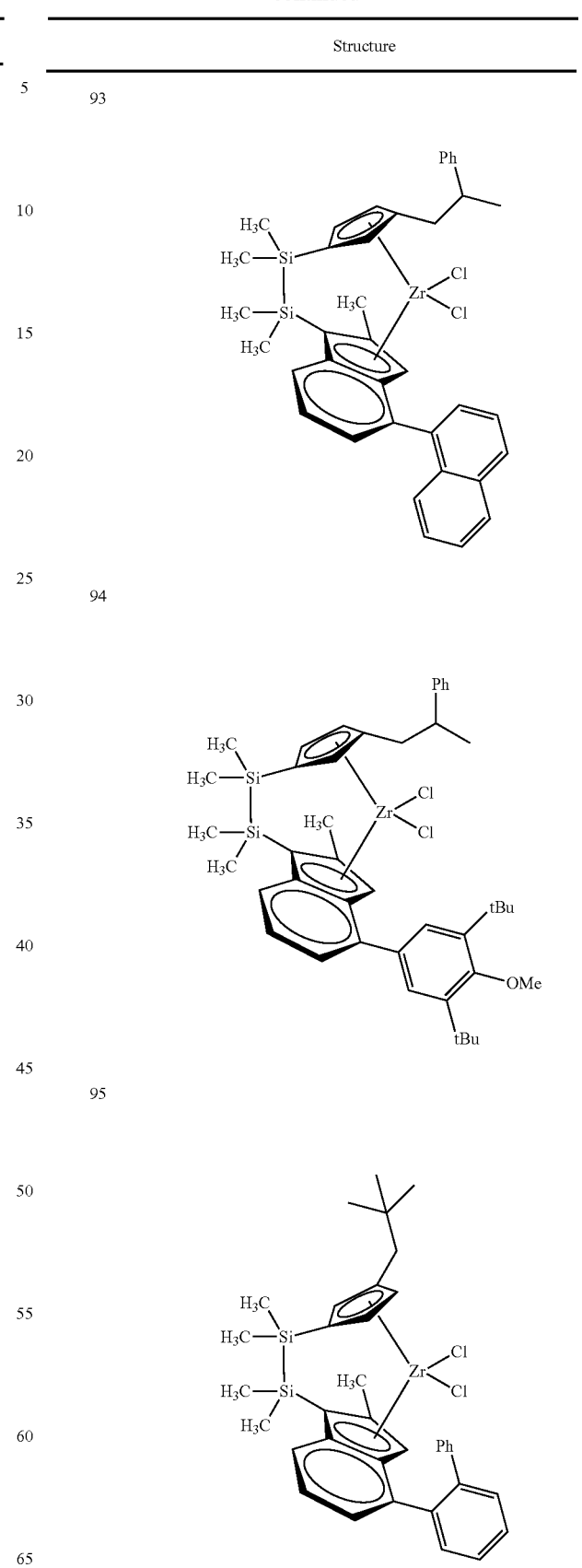 |
| 94 | |
| 95 | |

TABLE-continued
| | Structure |
|---|---|
| 96 | 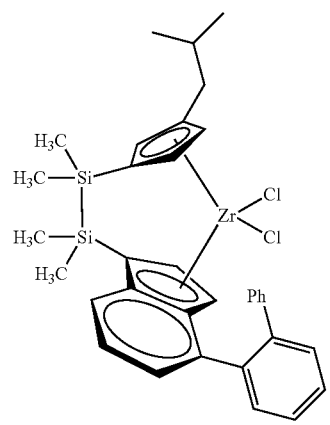 |
| 97 | 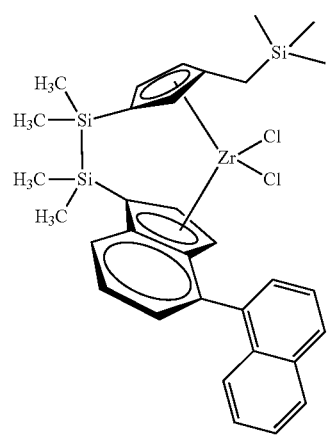 |
| 98 | 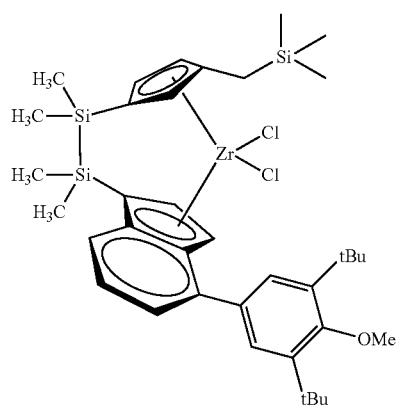 |
| | Structure |
|---|---|
| 99 | 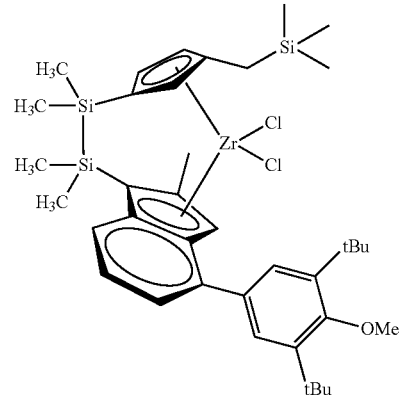 |
| 100 | 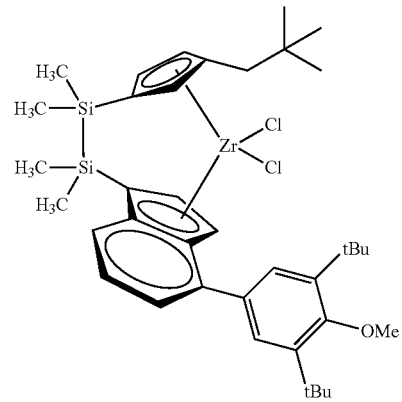 |
| 101 | 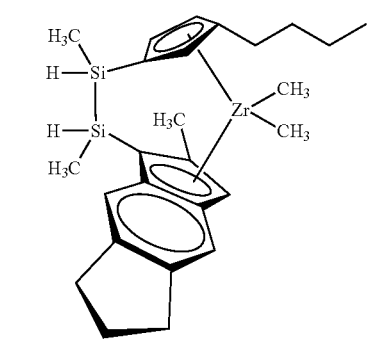 |
| 102 | 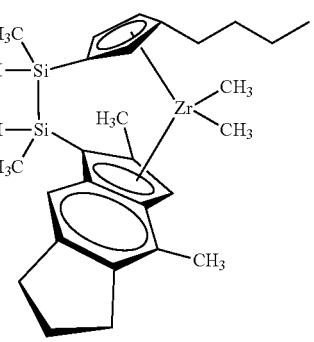 |

| | Structure |
|---|---|
| 103 | 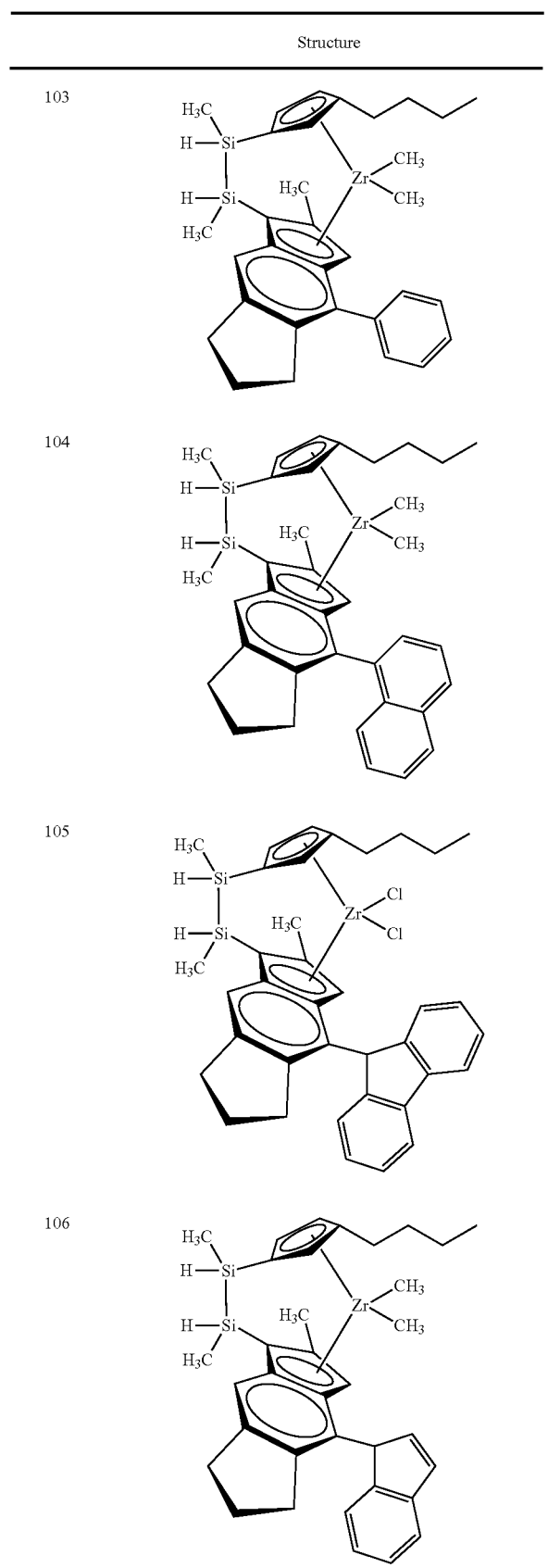 |
| 104 | |
| 105 | |
| 106 | |
| | Structure |
|---|---|
| 107 | 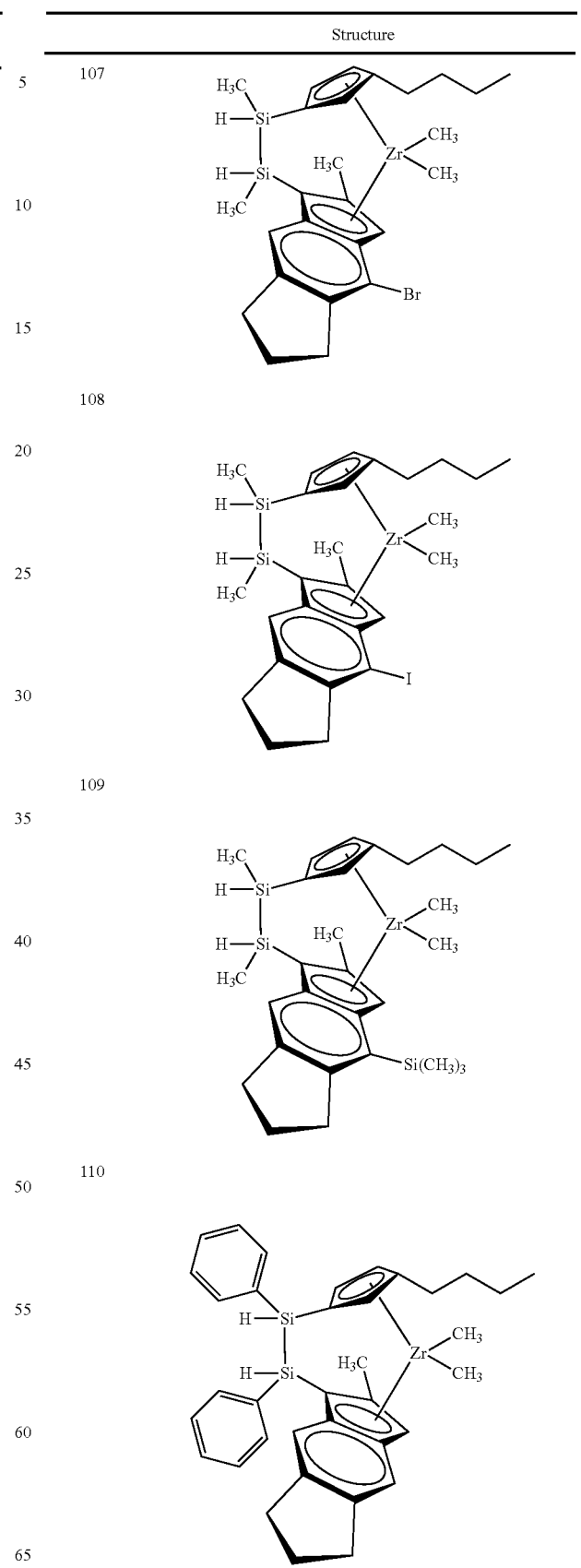 |
| 108 | |
| 109 | |
| 110 | |

| Structure |
|---|
| 111 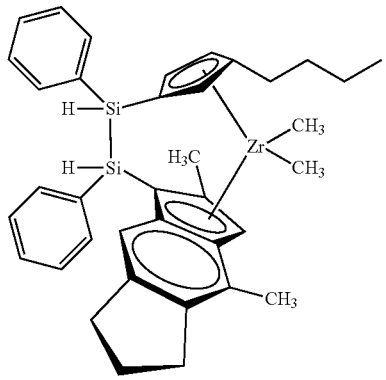 |
| 112 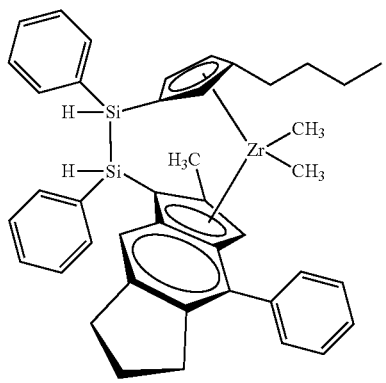 |
| 113 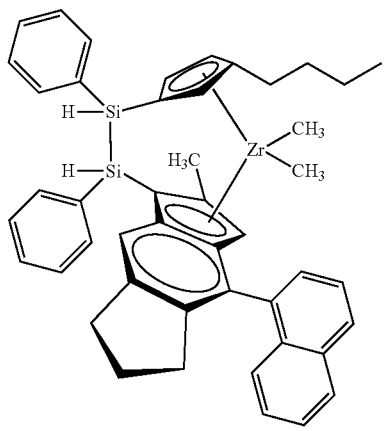 |
| Structure |
|---|
| 114 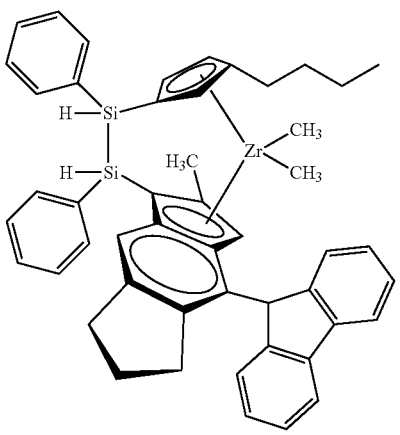 |
| 115 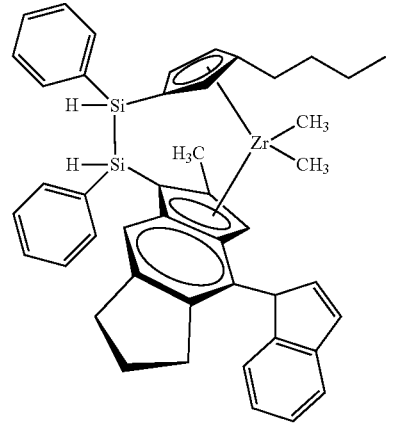 |
| 116 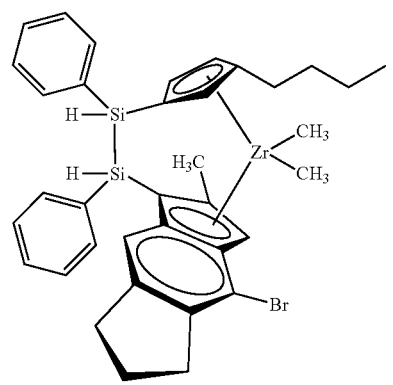 |

-continued
| | Structure |
|---|---|
| 117 | 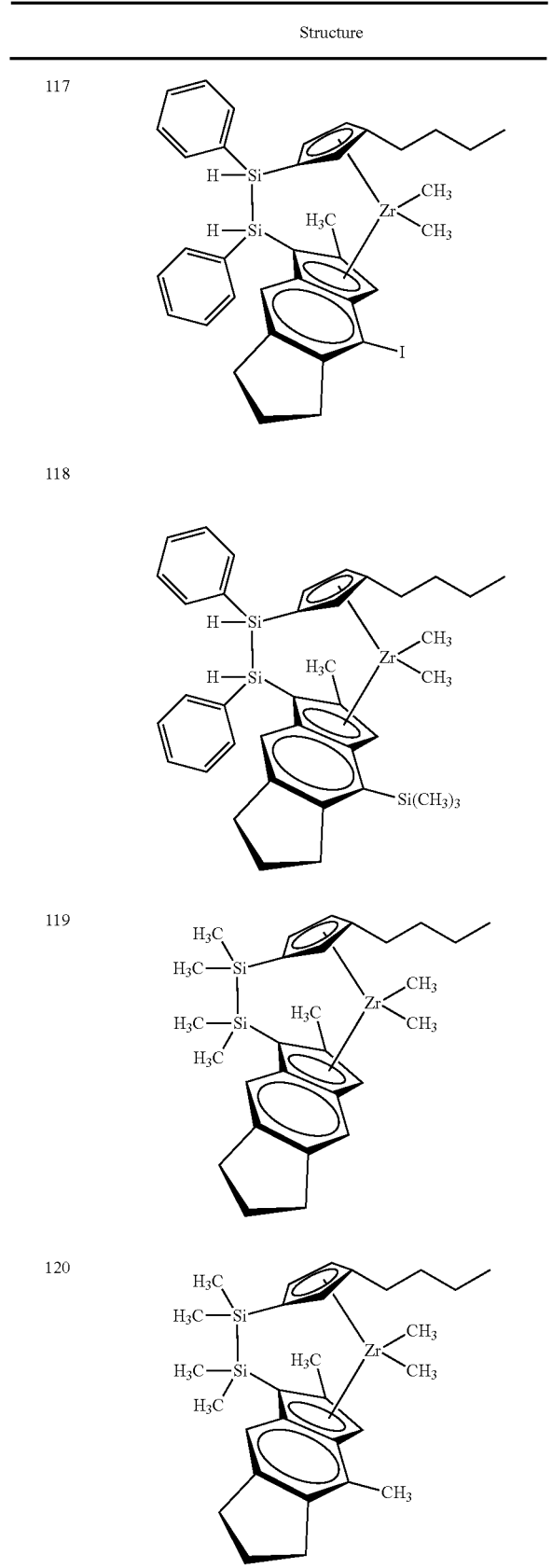 |
| 118 | |
| 119 | |
| 120 | |
-continued
| | Structure |
|---|---|
| 121 | 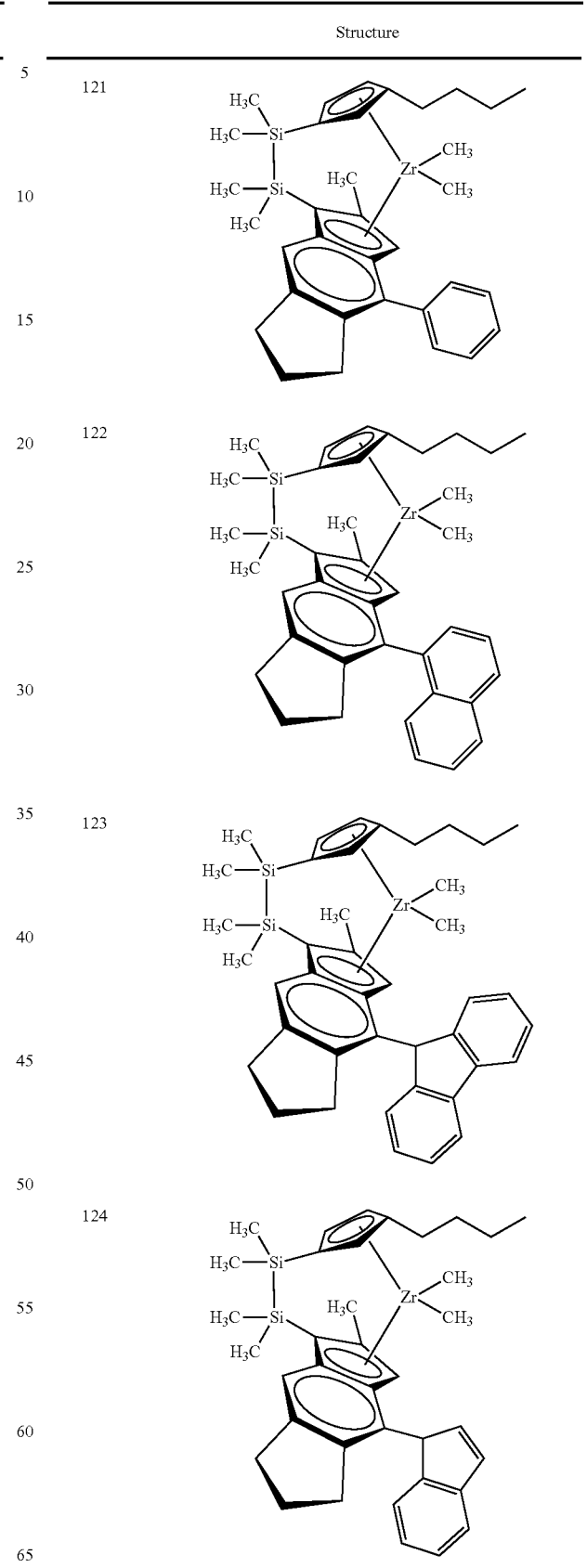 |
| 122 | |
| 123 | |
| 124 | |

-continued
| | Structure |
|---|---|
| 125 | 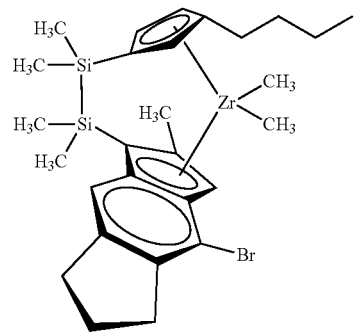 |
| 126 | 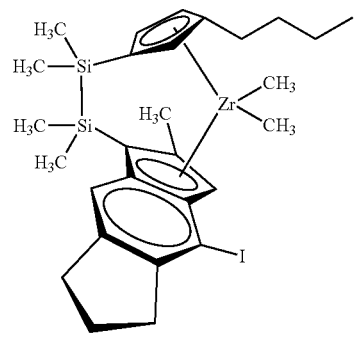 |
| 127 | 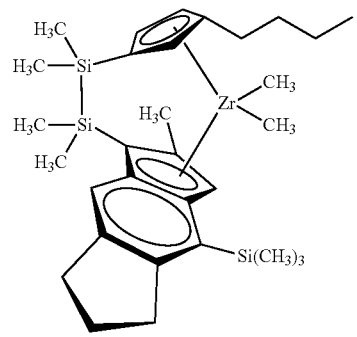 |
| 128 | 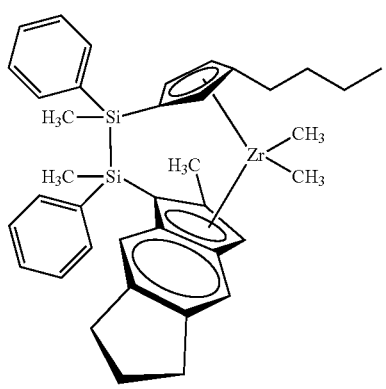 |
| 129 | 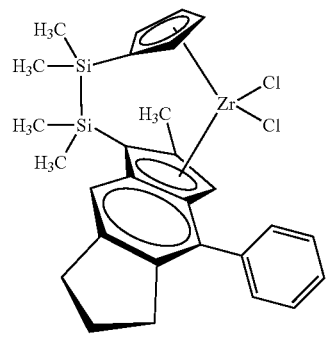 |
| 130 | 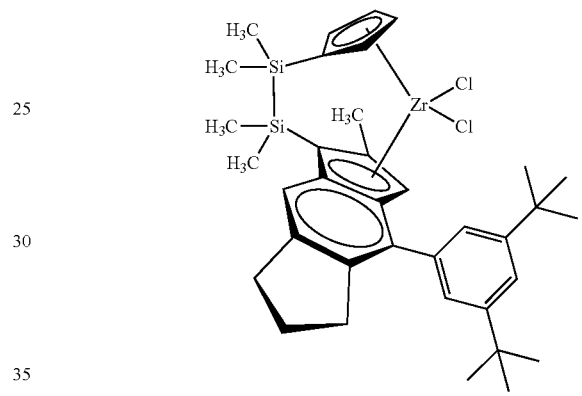 |
| 131 | 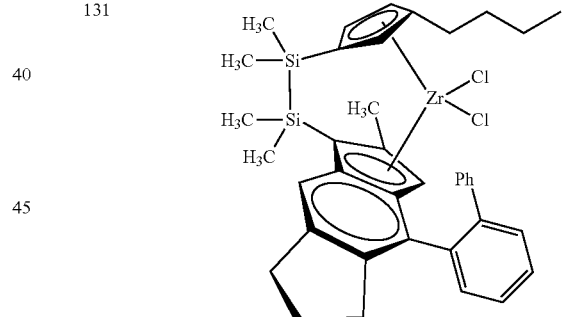 |
| 132 | 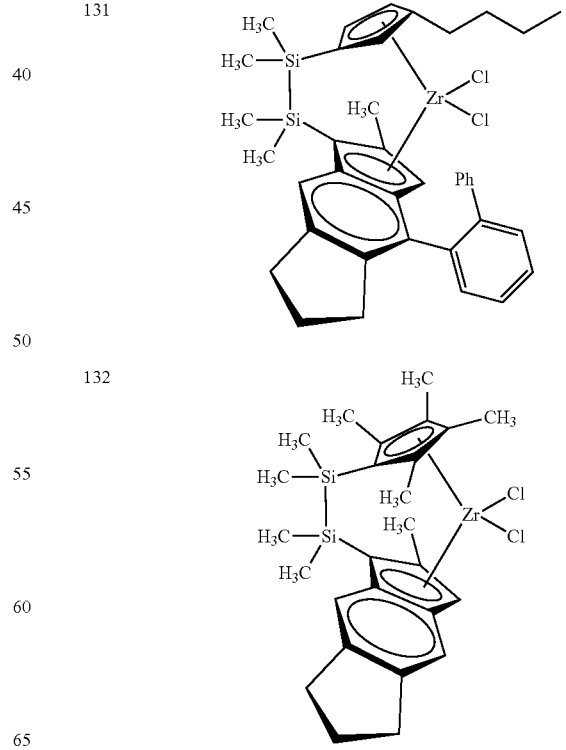 |

| Structure | | Structure |
|---|---|---|
| 133 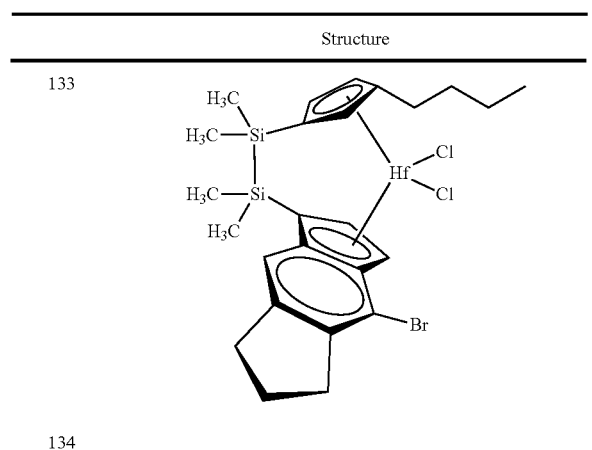 | 137 | 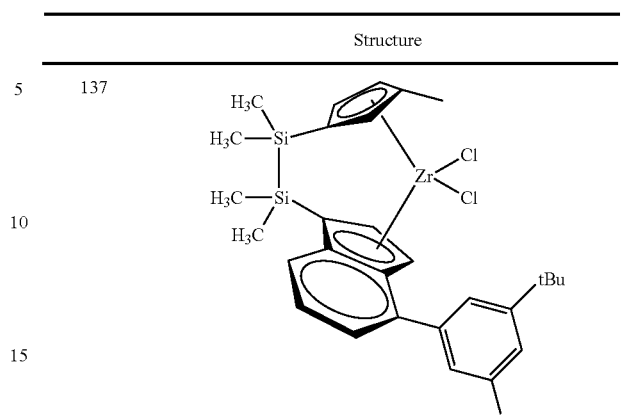 |
| 134 | 138 | 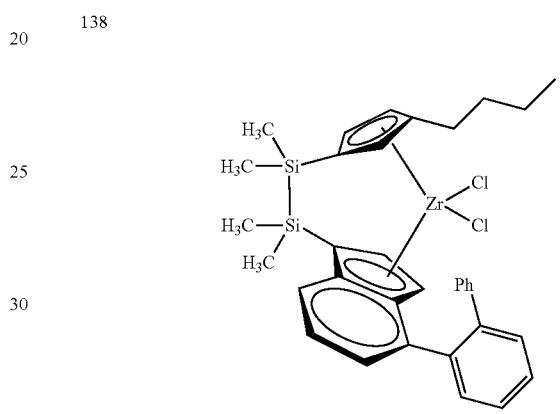 |
| 135 | 139 | 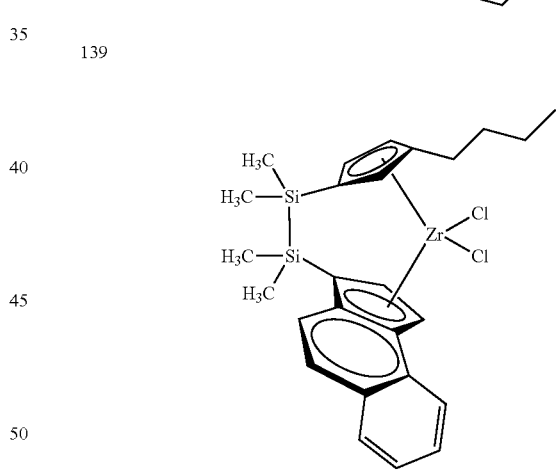 |
| 136 | 140 | 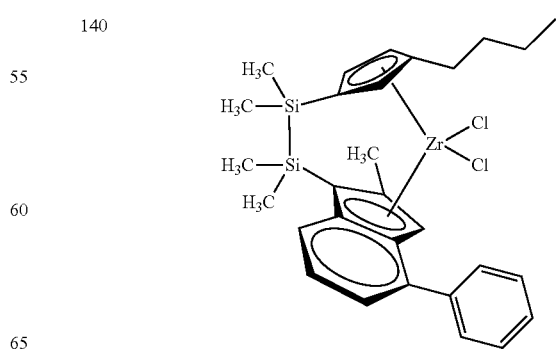 |

TABLE-continued
| Structure |
|---|
| 141 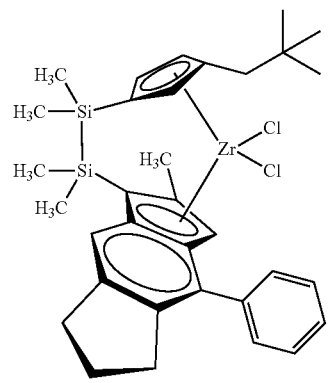 |
| 142 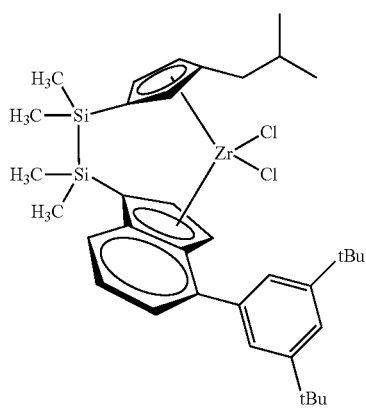 |
| 143 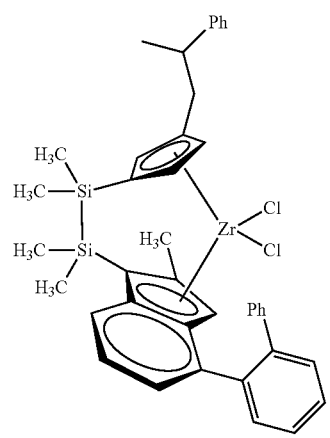 |
| Structure |
|---|
| 144 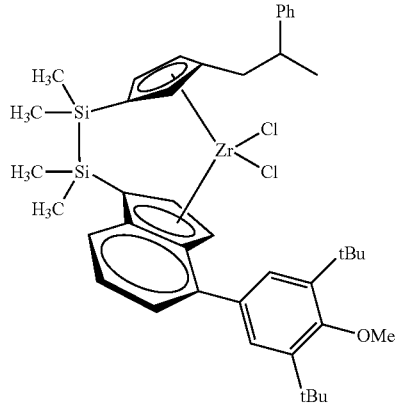 |
| 145 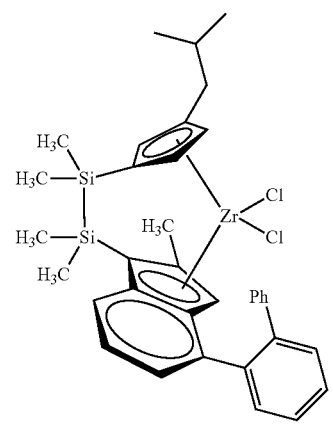 |
| 146 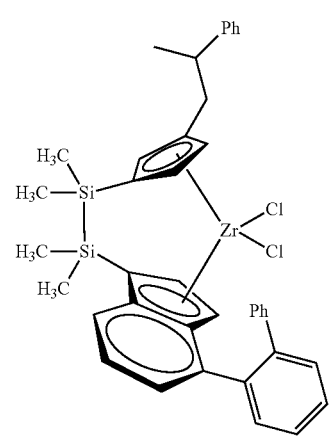 |

| Structure |
|---|
| 147 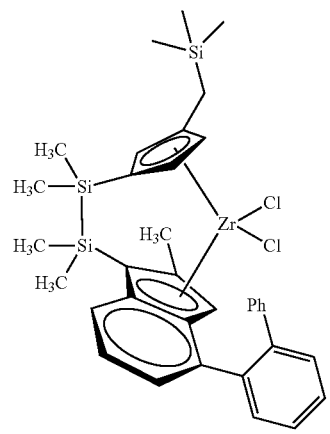 |
| 148 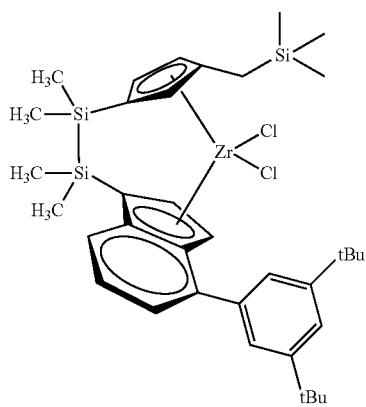 |
| 149 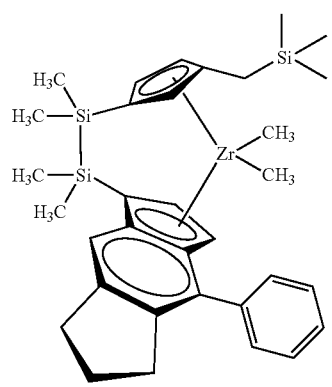 |
| Structure |
|---|
| 150 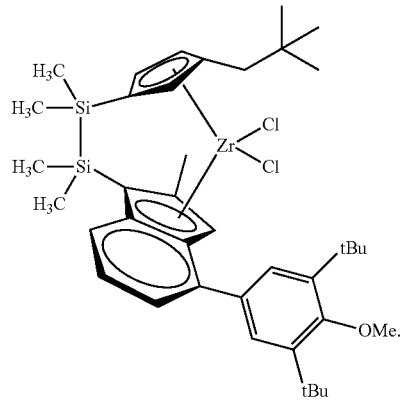 |
In another embodiment of the invention, the catalyst compound is represented by the formula:
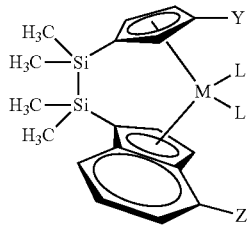
A1
M = Zr or Hf
L = Cl, Br or Me
Y = H, Me, Et, nPr, nBu, CH$_2$iPr, CH$_2$tBu or CH$_2$SiMe$_3$
Z = Me, Et, nPr, iPr, nBu, n-pentyl, n-hexyl, Ph.
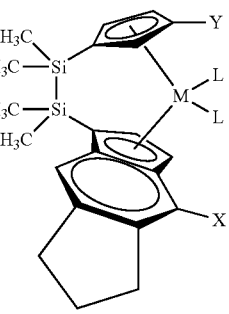
A2
M = Zr or Hf
L = Cl, Br or Me
X = F, Cl, Br, I;
Y = H, Me, Et, nPr, nBu, CH$_2$iPr, CH$_2$tBu, CH$_2$SiMe$_3$ -continued

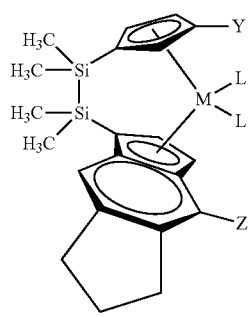

A3

M = Zr or Hf
L = Cl, Br or Me
Y = H, Me, Et, nPr, nBu,
   CH$_2$iPr, CH$_2$tBu or
   CH$_2$SiMe$_3$
Z = H, Me, Et, nPr, iPr, nBu,
   n-pentyl, n-hexyl, Ph.

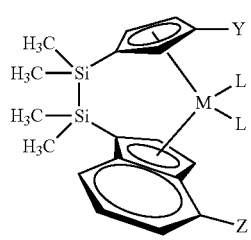

A4

M = Zr or Hf
L = Cl, Br or Me
Y = Me, Et, nPr, nBu, Ch$_2$iPr,
   Ch$_2$tBu or Ch$_2$SiMe$_3$
Z = H, Me, Et, nPr, iPr, nBu,
   n-pentyl, n-hexyl, Ph.

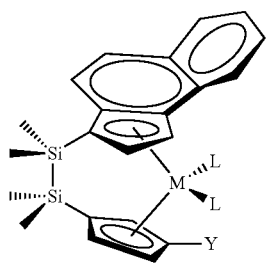

A5

M = Zr or Hf
L = Cl, Br or Me
Y = H, Me, Et, nPr, nBu,
   Ch$_2$iPr, Ch$_2$tBu,
   Ch$_2$SiMe$_3$

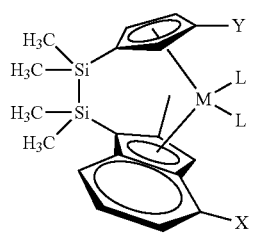

A6

M = Zr or Hf
L = Cl, Br or Me
X = F, Cl, Br, I;
Y = H, Me, Et, nPr, nBu,
   Ch$_2$iPr, Ch$_2$tBu or
   Ch$_2$SiMe$_3$

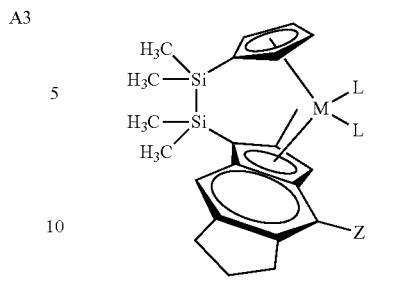

A7

M = Zr or Hf
L = Cl, Br or Me
Y = H, Me, Et, nPr, nBu,
   Ch$_2$iPr, Ch$_2$tBu or
   Ch$_2$SiMe$_3$
Z = H, Me, Et, nPr, iPr, nBu,
   n-pentyl, n-hexyl, Ph.

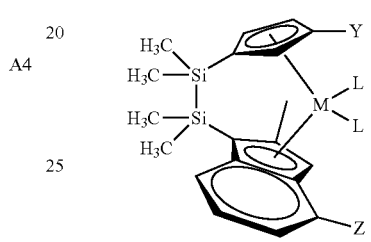

A8

M = Zr or Hf
L = Cl, Br or Me
Y = Me, Et, nPr, nBu, Ch$_2$iPr,
   Ch$_2$tBu or Ch$_2$SiMe$_3$
Z = H, Me, Et, nPr, iPr, nBu,
   n-pentyl, n-hexyl, Ph.

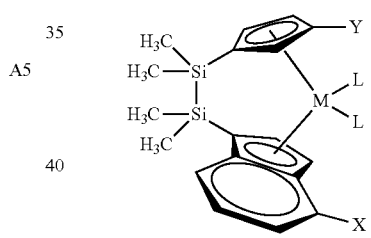

A9

M = Zr or Hf
L = Cl, Br or Me
X = F, Cl, Br, I;
Y = H, Me, Et, nPr, nBu,
   Ch$_2$iPr, Ch$_2$tBu,
   Ch$_2$SiMe$_3$

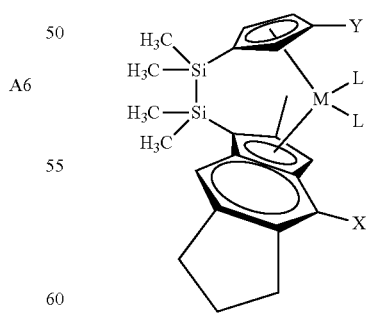

A10

M = Zr or Hf
L = Cl, Br or Me
X = F, Cl, Br, I;
Y = H, Me, Et, nPr, nBu,
   Ch$_2$iPr, Ch$_2$tBu or
   Ch$_2$SiMe$_3$

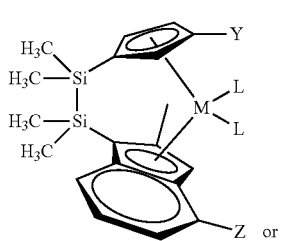

A11

M = Zr or Hf
L = Cl, Br or Me
Y = H, Me, Et, nPr, nBu,
Ch₂iPr, Ch₂tBu or
Ch₂SiMe₃
Z = Me, Et, nPr, iPr, nBu,
n-pentyl, n-hexyl, Ph.

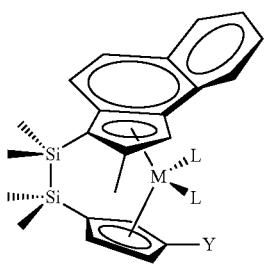

A12

M = Zr or Hf
L = Cl, Br or Me
Y = H, Me, Et, nPr, nBu,
Ch₂iPr, Ch₂tBu,
Ch₂SiMe₃.

In a preferred embodiment, the catalyst compounds represented by the formulas above are rac, meso, or a mixture of isomers.

Amounts of isomers are determined by proton NMR. $^1$H NMR data are collected at 23° C. in a 5 mm probe using a 400 MHz Bruker spectrometer with deuterated benzene or deuterated chloroform. Data is recorded using a maximum pulse width of 45°, 8 sec between pulses and signal averaging 16 transients. The spectrum is normalized to protonated benzene in the deuterated benzene, which is expected to show a peak at 7.16 ppm.

In at least one embodiment, one catalyst compound is used, e.g., the catalyst compounds are not different. As used herein, one metallocene catalyst compound is considered different from another if they differ by at least one atom. Catalyst compounds that differ only by isomer are considered the same for purposes as used herein.

In at least one embodiment, two or more different catalyst compounds are present in the catalyst system used herein. In at least one embodiment, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an $X^1$ or $X^2$ ligand which is not a hydride, hydrocarbyl, or substituted hydrocarbyl, then the alumoxane may be contacted with the transition metal compounds prior to addition of the non-coordinating anion activator.

Two transition metal compounds as described above may be used in a polymerization. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact transition metal compounds chosen, the method of activation, and the end product desired. In a particular embodiment, when using the two transition metal compound, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Alternately, two transition metal compounds (one represented by formula I above (A) and one and one not represented by formula I, such as those compounds represented by formula X below (B)) may be used in a polymerization. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact transition metal compounds chosen, the method of activation, and the end product desired. In a particular embodiment, when using the two transition metal compound, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Useful olefin polymerization catalysts include metallocene catalyst compounds represented by the formula (B):

$$T_y Cp_m M^6 G_n X^5_q \qquad (X),$$

wherein each Cp is, independently, a cyclopentadienyl group (such as cyclopentadiene, indene or fluorene) which may be substituted or unsubstituted, $M^6$ is a Group 4 transition metal, for example, titanium, zirconium, hafnium, G is a heteroatom group represented by the formula $JR^*_z$ where J is N, P, O, or S and $R^*$ is a $C_1$ to $C_{20}$ hydrocarbyl group and z is 1 or 2, T is a bridging group, and y is 0 or 1, $X^5$ is a leaving group (such as a halide, a hydride, an alkyl group, an alkenyl group or an arylalkyl group), and m=1 or 2, n=0, 1, 2, or 3, q=0, 1, 2, or 3, and the sum of m+n+q is equal to the oxidation state of the transition metal. See, for example, WO 2016/094843.

In an embodiment, each Cp is a cyclopentadiene, indene or fluorene, which may be substituted or unsubstituted, and each $M^6$ is titanium, zirconium, or hafnium, and each $X^5$ is, independently, a halide, a hydride, an alkyl group, an alkenyl group or an arylalkyl group. In any of the embodiments described herein, y may be 1, m may be one, n may be 1, J may be N, and $R^*$ may be methyl, ethyl, propyl, butyl, pentyl, hexyl, heptyl, octyl, nonyl, cyclooctyl, cyclododecyl, decyl, undecyl, dodecyl, adamantyl or an isomer thereof.

Methods to Prepare the Catalyst Compounds

The following is a generic scheme to prepare the catalysts described herein and further exemplified in the examples. Generally, metallocenes of this type are synthesized as shown below where (i) is a deprotonation via a metal salt of alkyl anion (e.g., n-BuLi) to form an substituted indenide (Ind*Li); (ii) reaction of indenide with an appropriate bridging precursor (e.g., ClMe$_2$SiSiMe$_2$Cl); (iii) reaction of the Ind*Me$_2$SiSiMe$_2$Cl with another substituted (or unsubstituted) CpLi (iv) double deprotonation via an alkyl anion (e.g., n-BuLi) to form a dianion; (v) reaction of the dianion with a metal halide (e.g., ZrCl$_4$) to get the metal complex.

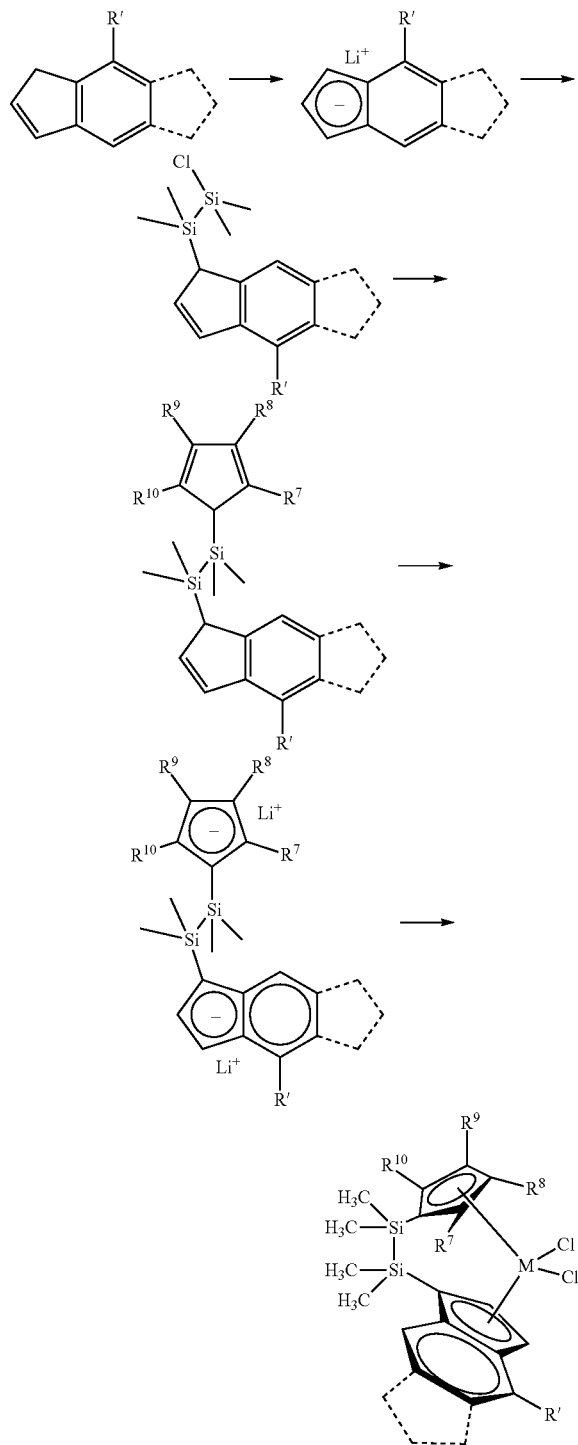

In another embodiment, a catalyst system is provided. The catalyst system includes (a) a transition metal complex represented by formula (I); and (b) a bridged or unbridged metallocene catalyst compound other than the transition metal complex of formula (I).

In at least one embodiment, this invention relates to a catalyst system includes a transition metal complex represented by formula (I); an activator; and a support material.

Activators

The terms "cocatalyst" and "activator" are used herein interchangeably and are defined to be any compound which can activate any one of the catalyst compounds described above by converting the neutral catalyst compound to a catalytically active catalyst compound cation.

After the complexes described above have been synthesized, catalyst systems may be formed by combining them with activators in any manner known from the literature including by supporting them for use in slurry or gas phase polymerization. The catalyst systems may also be added to or generated in solution polymerization or bulk polymerization (in the monomer). The catalyst system typically includes a complex as described above and an activator such as alumoxane or a non-coordinating anion.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, G-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing -Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

"Compatible" non-coordinating anions can be those which are not degraded to neutrality when the initially formed complex decomposes, and the anion does not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization.

It is within the scope of the present disclosure to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of the present disclosure to use neutral or ionic activators alone or in combination with alumoxane or modified alumoxane activators.

The catalyst systems of the present disclosure can include at least one non-coordinating anion (NCA) activator.

In a preferred embodiment, boron containing NCA activators represented by the formula below can be used:

where: Z is (L-H) or a reducible Lewis acid; L is a neutral Lewis base; H is hydrogen; $(L-H)^+$ is a Bronsted acid; $A^{d-}$ is a non-coordinating anion, for example a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl, preferably the reducible Lewis acids in "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Examples of boron compounds which may be used as an activating cocatalyst include the compounds described as (and particularly those specifically listed as) activators in U.S. Pat. No. 8,658,556, which is incorporated by reference herein.

Most preferably, the ionic activator $Z_d^+(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, or tropillium tetrakis(perfluoronaphthyl)borate.

Bulky activators are also useful herein as NCAs. "Bulky activator" as used herein refers to anionic activators represented by the formula:

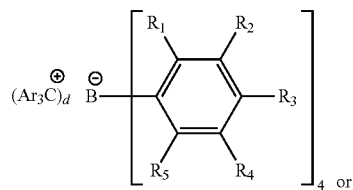

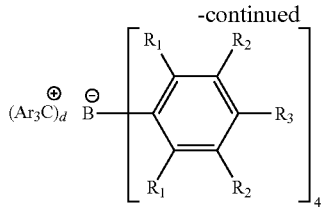

where:
each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and
L is a neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

Preferably $(Ar_3C)d^+$ is $(Ph_3C)d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3 $V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators as described in U.S. Pat. No. 8,658,556 which is incorporated by reference herein.

In another embodiment, one or more of the NCA activators is chosen from the activators described in U.S. Pat. No. 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$], 1-(4-(tris(pentafluorophenyl)borate)-2,3,5,6-tetrafluorophenyl)pyrrolidinium, and tetrakis(pentafluorophenyl)borate, 4-(tris(pentafluorophenyl)borate)-2,3,5,6-tetrafluoropyridine.

In a preferred embodiment, the activator includes a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator includes one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1, alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 which discuss the use of an alumoxane in combination with an ionizing activator).

Useful chain transfer agents are typically alkylalumoxanes, a compound represented by the formula AlR$_3$, ZnR$_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Scavengers or Co-Activators

In addition to these activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may include an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 m. More preferably, the surface area of the support material is in the range of from about 50 to about 500 $m^2/g$, pore volume of from about 0.5 to about 3.5 cc/g and average particle size of from about 10 to about 200 m. Most preferably, the surface area of the support material is in the range is from about 100 to about 400 $m^2/g$, pore volume from about 0.8 to about 3.0 cc/g and average particle size is from about 5 to about 100 m. The average pore size of the support material is in the range of from 10 to 1000 Å, preferably 50 to about 500 Å, and most preferably 75 to about 350 Å. In some embodiments, the support material is a high surface area, amorphous silica (surface area=300 $m^2/g$; pore volume of 1.65 $cm^3/g$). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 h to about 72 h, or from about 24 h to about 60 h. The calcined support material must have at least some reactive hydroxyl (OH) groups to produce supported catalyst systems. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator for a period of time in the range of from about 0.5 h to about 24 h, from about 2 h to about 16 h, or from about 4 h to about 8 h. The solution of the metallocene compound is then contacted with the isolated support/activator. In some embodiments, the supported catalyst system is generated in situ. In alternate embodiment, the slurry of the support material is first contacted with the catalyst compound for a period of time in the range of from about 0.5 h to about 24 h, from about 2 h to about 16 h, or from about 4 h to about 8 h. The slurry of the supported metallocene compound is then contacted with the activator solution.

The mixture of the metallocene, activator and support is heated to about 0° C. to about 70° C., preferably to about 23° C. to about 60° C., preferably at room temperature. Contact times typically range from about 0.5 h to about 24 h, from about 2 h to about 16 h, or from about 4 h to about 8 h.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Fluorided Support

In an embodiment, a fluorided (also referred to as fluoridated) support is used. The fluorided supports (such as fluorided silica) can be obtained through the addition of a solution of polar solvent (such as water) and fluorine compound (such as $(NH_4)_2SiF_6$) to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in U.S. Publication No. 2002/0123582 A1.

In an embodiment, an aqueous solution of fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 h).

In an embodiment, a solution of polar solvent and fluorinating agent (such as $(NH_4)_2SiF_6$) is added to a slurry of support (such as a toluene slurry of silica). Vigorous stirring of the mixture allows the dissolved fluorine compound (in water) to be evenly absorbed onto the hydrophilic support surface. After filtration, the wet support is allowed to air dry until it is free flowing, and then may be calcined (typically at temperatures over 100° C. for at least 1 h).

In a particularly useful embodiment, the catalyst systems described herein may be prepared by the following exemplary non-limiting method. This exemplary method is set forth for purposes of illustration, not limitation. One skilled in the art will appreciate that a method consistent with the spirit of the present disclosure may be used in other contexts.

Polymerization Processes

In some embodiments, a method of polymerizing olefins to produce at least one polyolefin composition is provided. The method includes contacting at least one olefin with any catalyst system described herein, and obtaining a polyolefin. In a preferred embodiment, the catalyst system includes a bridged transition metal complex represented by formula (I), wherein $R^4$ is halogen, $C_6$-$C_{10}$ aryl, or $C_6$-$C_{10}$ substituted aryl; $R^6$ is methyl; and $R^8$ is $C_3$-$C_{10}$ substituted hydrocarbyl or $C_3$-$C_{10}$ unsubstituted hydrocarbyl.

In at least one embodiment, a polymerization process includes contacting a monomer (such as propylene), and optionally comonomer, with a catalyst system comprising an activator and at least one metallocene compound. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment, the monomer includes propylene and an optional comonomer comprising one or more ethylene or $C_4$ to $C_{40}$ olefin, preferably $C_4$ to $C_{20}$ olefin, or preferably $C_6$ to $C_{12}$ olefin. The $C_4$ to $C_{40}$ olefin monomer may be linear, branched, or cyclic. The $C_4$ to $C_{40}$ cyclic olefin may be strained or unstrained, monocyclic or polycyclic, and may optionally include heteroatoms and/or one or more functional groups. In another preferred embodiment, the monomer includes ethylene and an optional comonomer comprising one or more $C_3$ to $C_{40}$ olefin, preferably $C_4$ to $C_{20}$ olefin, or preferably $C_6$ to $C_{12}$ olefin. The $C_3$ to $C_{40}$ olefin monomer may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbomene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene. The olefin monomers can be used separately or in combinations.

In a preferred embodiment, one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments, 0.1 ppm to 500 ppm or greater of the diene is added to the polymerization, preferably 0 ppm to 400 ppm, preferably 0 ppm to 300 ppm. In other embodiments, 50 ppm to 500 ppm or greater of diene is added to the polymerization, or 100 ppm to 500 ppm, or 150 ppm to 500 ppm.

Preferred diolefin monomers include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbomadiene, ethylidene norbornene, divinylbenzene, dicyclopentadiene or higher ring containing diolefins with or without substituents at various ring positions.

Polymerization processes can be carried out in any suitable manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 vol % or more.) Alternately, no solvent or diluent is present or added in the reaction medium, (except for the small amounts used as the carrier for the catalyst system or other additives, or amounts typically found with the monomer; e.g., propane in propylene).

In another embodiment, the process is a slurry process. According to an embodiment, a method of polymerizing olefins to produce at least one polyolefin composition includes contacting at least one olefin with any catalyst system described herein; and obtaining an olefin. This method can include introducing the first catalyst compound represented by Formula (I) into a reactor as a slurry.

As used herein, the term "slurry polymerization process" includes a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Suitable temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa. In a typical polymerization, the run time of the reaction is up to 300 min, preferably in the range of from about 5 to 250 min, or preferably from about 10 to 120 min.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In at least one embodiment, the activity of the catalyst is at least 50 g/mmol/hour, preferably 500 or more g/mmol/hour, preferably 5000 or more g/mmol/h, preferably 50,000 or more g/mmol/h. In at least one embodiment, the conversion of olefin monomer is at least 10%, based upon polymer yield and the weight of the monomer entering the reaction zone, preferably 20% or more, preferably 30% or more, preferably 50% or more, preferably 80% or more.

In at least one embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as trialkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) wherein the catalyst system used in the polymerization includes less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) the productivity of the catalyst compound is at least 80,000 g/mmol/h (preferably at least 150,000 g/mmol/h, preferably at least 200,000 g/mmol/h, preferably at least 250,000 g/mmol/h, preferably at least 300,000 g/mmol/h); 7) optionally scavengers (such as trialkyl aluminum compounds) are absent (e.g., present at zero mol %, alternately the scavenger is present at a molar ratio of scavenger metal to transition metal of less than 100:1, preferably less than 50:1, preferably less than 15:1, preferably less than 10:1); and 8) optionally, hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization includes no more than one catalyst compound. A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, pentyl, hexyl, octyl or an isomer thereof) or a combination thereof, such as diethyl zinc, methylalumoxane, trimethylaluminum, triisobutylaluminum, trioctylaluminum, or a combination thereof.

Polyolefin Products

The present disclosure provides compositions of matter produced by the methods described herein.

In a preferred embodiment, a process of the present disclosure produces $C_2$ to $C_{20}$ olefin homopolymers or copolymers, such as ethylene-hexene, propylene-ethylene and/or propylene-alpha olefin (preferably $C_3$ to $C_{20}$) copolymers (such as propylene-hexene copolymers or propylene-octene copolymers) having low comonomer incorporation (such as low $C_6$ wt %) and/or broad/high molecular weight distribution (Mw/Mn).

Likewise, a process of the present disclosure produces olefin polymers, preferably polyethylene and polypropylene homopolymers and copolymers. In a preferred embodiment, the polymers produced herein are homopolymers of ethylene or copolymers of ethylene preferably having from 0 to 25 mol % (alternately from 0.5 to 20 mol %, alternately from 1 to 15 mol %, preferably from 3 to 10 mol %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the polymers produced herein are homopolymers of propylene or are copolymers of propylene preferably having from 0 to 25 mol % (alternately from 0.5 to 20 mol %, alternately from 1 to 15 mol %, preferably from 3 to 10 mol %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 0.5 to 15 mol % hexene, alternately 1 to 10 mol %.

Typically, the polymers produced herein have an Mw of 20,000 to 1,000,000 g/mol (preferably 60,000 to 300,000 g/mol), and/or an Mw/Mn of greater than 1 to 40 (alternately greater than 7, alternately 1.2 to 20, alternately 1.3 to 10, alternately 1.4 to 8, alternately 1.5 to 6, alternately 2 to 6).

In a preferred embodiment, the polymer produced has an Mw/Mn of 2 or more, preferably 2.5 or more preferably 3 or more, a $g'_{vis}$ of 0.98 or more, preferably 0.99 or more, more preferably 1.0 or more, and a zero or negative slope that transitions to a positive slope in the GPC-4D plot of comonomer incorporation vs molecular weight (log M).

In a preferred embodiment, the polymer produced has an Mw/Mn of 2 or more, preferably 2.5 or more preferably 3 or more, a $g'_{vis}$ of 0.98 or more, preferably 0.99 or more, more preferably 1.0 or more, and a zero or positive slope in the GPC-4D plot of comonomer incorporation vs molecular weight (log M).

In a preferred embodiment, the polymer produced has an Mw/Mn of 3.5 or more. In another embodiment, the polymer produced has an Mw/Mn of 3.5 or more and a $g'_{vis}$ of 0.98 or more.

In a preferred embodiment, the polymer produced has an Mw/Mn greater than 6, more preferably an Mw/Mn of 6 or more and a $g'_{vis}$ of 0.98 or more.

In some embodiments, a copolymer is obtained by contacting ethylene, at least one alpha-olefin, and a supported catalyst as described herein, the copolymer having a Mw/Mn of 3.5 or more, more preferably 6 or more, and a $g'_{vis}$ of 0.95 or more, more preferably 0.98 or more. In some embodiments, the copolymer obtained has a total unsaturation/1000 C of 0.15 or less, or 0.12 or less.

In a preferred embodiment of the invention, the process described herein produces an ethylene alpha-olefin copolymer having an Mw/Mn of 3.5 or more and $g'_{vis}$ of 0.98 or more.

In a preferred embodiment of the invention, the process described herein produces an ethylene alpha-olefin copolymer having an Mw/Mn of 6 or more, $g'_{vis}$ of 0.98 or more and total unsaturation/1000 C of 0.15 or less.

In a preferred embodiment of the invention, the process described herein produces an ethylene alpha-olefin copolymer having an Mw/Mn of 3.5 or more, a $g'_{vis}$ of 0.98 or more, and a zero or positive slope that transitions to a negative slope in the GPC-4D plot of comonomer incorporation vs molecular weight (Log M).

In a preferred embodiment of the invention, the process described herein produces an ethylene alpha-olefin copolymer having a total unsaturation/1000 C of 0.8 or less, preferably 0.7 or less.

In a preferred embodiment of the invention, the process described herein produces an ethylene alpha-olefin copolymer having an Mw/Mn of 6 or more and total unsaturation/1000 C of 0.15 or less.

In a preferred embodiment of the invention, the process described herein produces an ethylene alpha-olefin copolymer having an Mw/Mn greater than 6.

In a preferred embodiment of the invention, the process described herein produces an ethylene alpha-olefin copolymer having an Mw/Mn of 6 or more and a $g'_{vis}$ of 0.98 or more and total unsaturation/1000 C of 0.15 or less.

In a preferred embodiment of the invention, the process described herein produces an ethylene alpha-olefin copolymer having a Mw/Mn of 6 or more and a $g'_{vis}$ of 0.98 or more and generally decreasing comonomer incorporation with increasing molecular weights (by GPC4D) and total unsaturation/1000 C of 0.15 or less.

In a preferred embodiment of the invention, the process described herein produces an ethylene alpha-olefin copolymer having an Mw/Mn of 3.5 or more and $g'_{vis}$ of 0.98 or more.

In a preferred embodiment of the invention, the process described herein produces an ethylene alpha-olefin copolymer having a Mw/Mn of 3.5 or more and $g'_{vis}$ of 0.98 or more and generally decreasing comonomer incorporation with increasing molecular weights (by GPC4D).

In a preferred embodiment of the invention, the process described herein produces an ethylene alpha-olefin copolymer having an Mw/Mn of 6 or more, $g'_{vis}$ of 0.98 or more and total unsaturation/1000 C of 0.15 or less.

In a preferred embodiment of the invention, the process described herein produces an ethylene alpha-olefin copolymer having a Mw/Mn of 6 or more, $g'_{vis}$ of 0.98 or more and total unsaturation/1000 C of 0.15 or less and generally decreasing comonomer incorporation with increasing molecular weights (by GPC4D).

In a preferred embodiment, a polymer has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Molecular weight and measurement methods are described in the Experimental Section, in the event of conflict between the "Rapid GPC" and the GPC-4D methods, the GPC-4D method shall control.

Blends

In another embodiment, a polymer (preferably the polyethylene or polypropylene) is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers o with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

A polymer, such as the foregoing polyethylenes or blends thereof, may be used in a variety of end-use applications. Such applications include, for example, mono- or multilayer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 m are usually suitable. Films intended for packaging are usually from 10 to 50 m thick. The thickness of the sealing layer is typically 0.2 to 50 µm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

This invention further relates to:

1. A catalyst compound represented by formula (I):

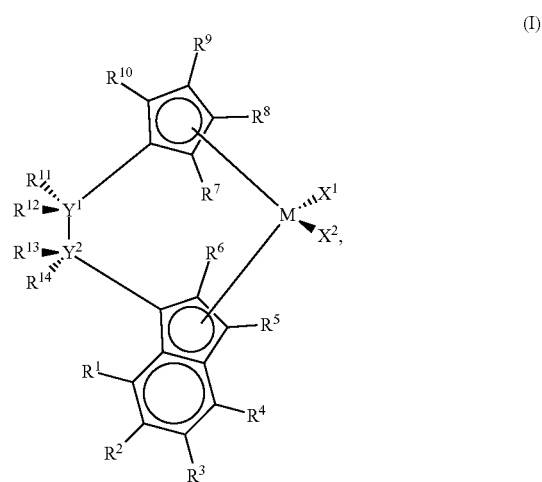

wherein: M is a group 4 metal (preferably Zr, Ti or Hf); $Y^1$ and $Y^2$ are independently Si, Ge, or C, where at least one of $Y^1$ and $Y^2$ is not C, preferably at least one of $Y^1$ and $Y^2$ is Si, preferably $Y^1$ and $Y^2$ are Si; $X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene; each of $R^1$, $R^2$, $R^3$, $R^5$, $R^6$, $R^7$, $R^9$, $R^{10}$, $R^{11}$, $R^{12}$, $R^{13}$, and $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, a substituted unsaturated, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, wherein: 1) if $R^4$ is hydrogen, then $R^2$ and $R^3$ are joined to form a saturated cyclic ring, substituted saturated cyclic ring, or an unsubstituted unsaturated cyclic ring, preferably provided that $R^8$ and $R^9$ do not form a saturated seven membered ring; 2) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen; 3) if $R^4$ is hydrogen and $R^2$ and $R^3$ are not joined to form a saturated cyclic ring, substituted saturated cyclic ring, or an unsubstituted unsaturated cyclic ring, then $R^7$, $R^8$, $R^9$ and/or $R^{10}$ are not the same; or 4) if $R^4$ is hydrogen and $R^2$ and $R^3$ are not joined to form a saturated cyclic ring, substituted saturated cyclic ring, or an unsubstituted unsaturated cyclic ring, then at least one of $R^8$ and $R^9$ is not hydrogen and $R^7$, $R^8$, $R^9$ and/or $R^{10}$ are not the same; and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —$NR'_2$, —SR', —OR, —$OSiR'_3$, —$PR'_2$, where each R' is hydrogen, halogen, $C_1$-$C_{10}$ alkyl, or phenyl, or $R^8$ and $R^9$ are joined to form a saturated cyclic ring, substituted saturated cyclic ring, a substituted unsaturated cyclic ring, or an unsubstituted unsaturated cyclic ring, provided that adjacent $R^7$, $R^8$, $R^9$ and/or $R^{10}$ groups provided that adjacent $R^7$, $R^8$, $R^9$ and/or $R^{10}$ groups do not cyclize to form a benzene ring (substituted or unsubstituted) fused with the cyclopentadienyl ring group of formula (I).

2. The catalyst compound of paragraph 1, wherein: M is a group 4 metal; $Y^1$ and $Y^2$ are independently Si, Ge, or C; $X^1$ and $X^2$ are independently hydrogen, halide, hydroxyl, or $C_1$-$C_{50}$ substituted or unsubstituted hydrocarbyl, amide, alkoxide, sulfide, phosphide, halide, or combination thereof, or $X^1$ and $X^2$ are joined together to form a metallocycle ring, or $X^1$ and $X^2$ are joined to form a chelating ligand, or an alkylidene; each of $R^1$, $R^2$, $R^3$, $R^5$, $R^6$, $R^7$, $R^9$, $R^{10}$, $R^{11}$, $R^{12}$, $R^{13}$, and $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, $R^5$ and $R^6$, and $R^9$ and $R^{10}$, are joined to form a saturated cyclic ring, substituted saturated cyclic ring, or an unsubstituted unsaturated cyclic ring; $R^4$ is hydrogen, halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —$NR'_2$, —SR', —OR, —$OSiR'_3$, —$PR'_2$, where each R' is hydrogen, halogen, $C_1$-$C_{10}$ alkyl, or $C_6$-$C_{10}$ aryl; wherein if $R^4$ is hydrogen, $R^2$ and $R^3$ are joined to form a saturated cyclic ring, substituted saturated cyclic ring, or an unsubstituted unsaturated cyclic ring, and $R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —$NR'_2$, —SR', —OR, —$OSiR'_3$, —$PR'_2$, where each R' is hydrogen, halogen, $C_1$-$C_{10}$ alkyl, or phenyl.

3. The catalyst compound of paragraph 1 or 2, wherein $X^1$ and $X^2$ are independently halide, $C_1$-$C_{10}$ hydrocarbyl, or $C_1$-$C_{10}$ substituted hydrocarbyl.

4. The catalyst compound of paragraph 1, 2 or 3, wherein $R^4$ is halogen, $C_6$-$C_{10}$ aryl, substituted $C_6$-$C_{10}$ aryl, fluorenylidenyl, or substituted fluorenylidenyl.

5. The catalyst compound of paragraph 1, 2, 3, or 4, wherein $R^8$ is $C_1$-$C_{20}$ hydrocarbyl or substituted $C_1$-$C_{20}$ hydrocarbyl, preferably substituted or unsubstituted methyl, ethyl, propyl, iso-propyl, n-butyl, iso-butyl, or tert-butyl.

6. The catalyst compound of paragraph 1, 2, 3, 4, or 5 wherein $R^2$ and $R^3$ combine to form a cyclobutyl ring, a cyclopentyl ring, or cyclohexyl ring.

7. The catalyst compound of paragraph 1, 2, 3, 4, 5, or 6 wherein $R^6$ is hydrogen, methyl, ethyl, propyl, iso-propyl, n-butyl, iso-butyl, or tert-butyl.

8. The catalyst compound of paragraph 1 wherein the catalyst compound represented by Formula (I) comprises one or more compounds represented by formulas 1 to 150 above, where the Zr in each formula is optionally replaced by Hf, or formulas A1 to A12 above.

9. A catalyst system comprising: (a) the catalyst compound of any of paragraphs 1 to 8, (b) an activator, and (c) optional support material (preferably silica or fluorided material).

10. The catalyst system of paragraph 9, wherein one catalyst compound represented by formula (I) is present.

11. The catalyst system of paragraph 9 or 10, further comprising: (c) a bridged or unbridged metallocene catalyst compound other than the catalyst of compound (a).

12. The catalyst system of paragraph 9, 10 or 11, wherein the activator comprises one or more of:
alkylalumoxane;
N,N-dimethylanilinium tetra(perfluorophenyl)borate,
N,N-dimethylanilinium tetrakis(perfluoronaphthyl)borate,
N,N-dimethylanilinium tetrakis(perfluorobiphenyl)borate,
N,N-dimethylanilinium tetrakis(3,5-bis(trifluoromethyl)phenyl)borate,
triphenylcarbenium tetrakis(perfluoronaphthyl)borate,
triphenylcarbenium tetrakis(perfluorobiphenyl)borate,
triphenylcarbenium tetrakis(3,5-bis(trifluoromethyl)phenyl)borate,
triphenylcarbenium tetra(perfluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate, and
tropillium tetrakis(perfluoronaphthyl)borate.

13. A method of polymerizing olefins to produce a polyolefin comprising: 1) contacting at least one olefin with the catalyst system of any of paragraphs 9 to 12; and obtaining polyolefin.

14. The method of paragraph 13, wherein: $R^4$ is halogen, $C_6$-$C_{10}$ aryl, or $C_6$-$C_{10}$ substituted aryl; $R^6$ is methyl; and $R^8$ is $C_3$-$C_{10}$ substituted hydrocarbyl or $C_3$-$C_{10}$ unsubstituted hydrocarbyl.

15. The method of paragraph 13 or 14, wherein the method occurs at a temperature of 0° C. to 300° C., at a pressure in the range of from 0.35 MPa to 10 MPa, and at a time up to 300 min.

16. The method of any of paragraphs 13 to 15, wherein the olefins comprise ethylene, propylene, butene, pentene, hexene, heptene, octene, nonene, decene, undecene, dodecene, or mixtures thereof.

17. The method of any of paragraphs 13 to 16, further comprising introducing the first catalyst compound represented by Formula (I) into a reactor as a slurry.

18. The method of any of paragraphs 13 to 17, wherein the polymer produced has a Mw/Mn greater than 3, preferably greater than 3.5, preferably 6 or more, optionally has a $g'_{vis}$ of 0.98 or more, and optionally has a total unsaturation/1000 C of 0.15 or less.

19. The method of any of paragraphs 13 to 17, wherein the polymer produced has a Mw/Mn of 2 or more, alternately 3.5 or more, a $g'_{vis}$ of 0.98 or more, and a zero or positive slope that transitions to a negative slope in the GPC-4D plot of comonomer incorporation vs molecular weight (log M).

20. The method of any of paragraphs 13 to 17, wherein the polymer produced has a Mw/Mn of 2 or more, preferably 2.5 or more, a $g'_{vis}$ of 0.98 or more, preferably 0.99 or more, more preferably 1.0 or more, and a zero or positive slope in the GPC-4D plot of comonomer incorporation vs molecular weight (log M)).

21. The method of any of paragraphs 13 to 20, wherein the method occurs at a temperature of 0° C. to 300° C., at a pressure in the range of from 0.35 MPa to 10 MPa, and at a time up to 300 min and the polyolefin produced has a total unsaturation/1000 C of 0.8 or less, alternately a total unsaturation/1000 C of 1.0 or less.

EXPERIMENTAL

Synthesis of Tetramethyldisilylene (3-n-butylcyclopentadienyl) (4-phenyl-1,5,6,7-tetrahydro-s-indacenyl) zirconium(IV) dichloride (Metallocene K)

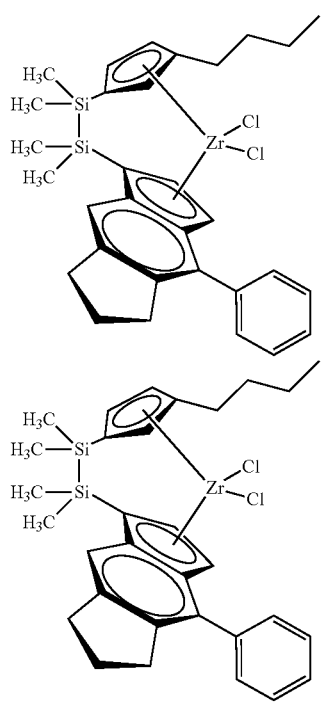

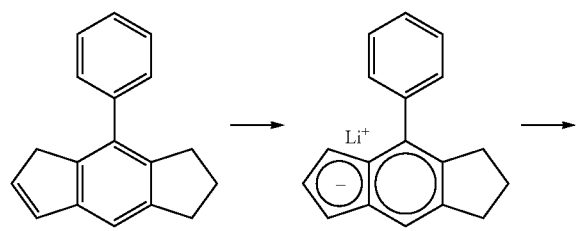

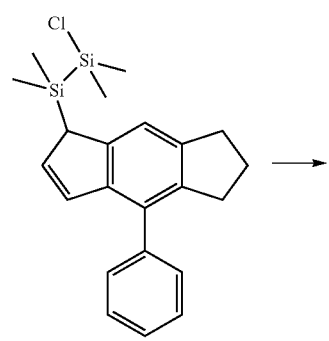

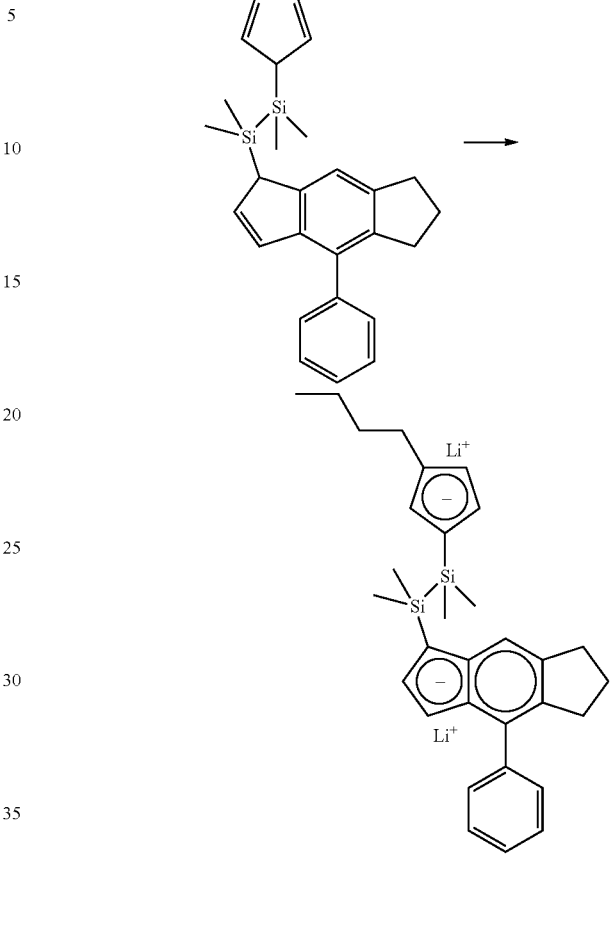

Lithium 4-phenyl-1,5,6,7-tetrahydro-s-indacen-1-ide

To a stirring solution of 4-phenyl-1,2,3,5-tetrahydro-s-indacene (1.916 g, 0.008 mol) in diethyl ether (20 mL), n-butyllithium (2.5M solution in hexane, 3.3 mL, 0.008 mol) was added. The reaction was stirred at room temperature for 65 minutes. Volatiles were removed under a stream of nitrogen and then under high vacuum. The residue was washed with hexane (10 mL) and diethyl ether (4×2 mL). The residue was then concentrated under high vacuum to afford the product as an off-white solid, containing diethyl ether (0.08 eq) and hexane (0.03 eq) (1.203 g).

1-Chloro-1,1,2,2-tetramethyl-2-(4-phenyl-1,5,6,7-tetrahydro-s-indacen-1-yl)disilane To a stirring solution of lithium 4-phenyl-1,5,6,7-tetrahydro-s-indacen-1-ide (0.798 g, 0.003 mol) in diethyl ether (20 mL), a solution of 1,2-dichloro-1,1,2,2-tetramethyldisilane (0.576 g, 0.003 mol) was added. The reaction was stirred at room temperature for 50 minutes. Volatiles were removed under a stream of nitrogen and then under high vacuum. The residue was extracted with pentane (20 mL) and filtered over Celite. The pentane extract was concentrated under a stream of nitrogen and then under high vacuum to afford the product as a clear, colorless oil (0.888 g).

1-(3-butylcyclopenta-2,4-dien-1-yl)-1,1,2,2-tetramethyl-2-(4-phenyl-1,5,6,7-tetrahydro-s-indacen-1-yl) disilane To a stirring solution of 1-chloro-1,1,2,2-tetramethyl-2-(4-phenyl-1,5,6,7-tetrahydro-s-indacen-1-yl)disilane (0.888 g, 0.002 mol) in tetrahydrofuran (10 mL), lithium 1-butyl-cyclopenta-2,4-dien-1-ide (0.297 g, 0.002 mol) with tetrahydrofuran (10 mL) was added. The reaction was stirred at room temperature for 16h. Volatiles were removed under a stream of nitrogen and then under high vacuum. The residue was stirred in hexane (20 mL) to facilitate precipitation of a white solid. The suspension was then concentrated under a stream of nitrogen and then under high vacuum. The residue was extracted with hexane (20 mL) and filtered over Celite. The pentane extract was concentrated under a stream of nitrogen and then under high vacuum to afford the product as an amber oil (0.974 g).

Lithium 1-(2-(3-butylcyclopenta-2,4-dien-1-ide-1-yl)-1,1,2,2-tetramethyldisilanyl)-4-phenyl-1,5,6,7-tetrahydro-s-indacen-1-ide To a stirring solution of 1-(3-butylcyclopenta-2,4-dien-1-yl)-1,1,2,2-tetramethyl-2-(4-phenyl-1,5,6,7-tetrahydro-s-indacen-1-yl)disilane (0.974 g, 0.002 mol) in diethyl ether (20 mL), n-butyllithium (2.5M solution in hexane, 1.7 mL, 0.004 mol) was added. The reaction was stirred at room temperature for 53 minutes. Volatiles were removed under a stream of nitrogen and then under high vacuum. The residue was washed with hexane (20 mL) and concentrated under high vacuum to afford the product as an orange foam (1.001 g).

Tetramethyldisilylene (3-n-butylcyclopentadienyl) (4-phenyl-1,5,6,7-tetrahydro-s-indacenyl) zirconium (IV) dichloride To a stirring solution of lithium 1-(2-(3-butylcyclopenta-2,4-dien-1-ide-1-yl)-1,1,2,2-tetramethyldisilanyl)-4-phenyl-1,5,6,7-tetrahydro-s-indacen-1-ide (1.001 g, 0.001 mol) in diethyl ether (20 mL), zirconium(IV) chloride (0.485 g, 0.002 mol, 1 eq) was added. The reaction was stirred at room temperature for 1 h. Volatiles were removed under a stream of nitrogen and then under high vacuum. The residue was extracted with dichloromethane (20 mL) and filtered over Celite. The extract was concentrated under a stream of nitrogen and then under high vacuum to give a yellow-orange foam. The dichloromethane extract was extracted with pentane. The pentane extract was concentrated under a stream of nitrogen and then under high vacuum. The pentane extract was extracted with cold pentane (−35° C.) and concentrated under a stream of nitrogen and then under high vacuum. The cold pentane extract was washed twice with minimal cold pentane (−35° C.) and concentrated under high vacuum to afford the product as a yellow foam (0.259 g, 19%, 1:1.4 ratio of isomers A and B). $^1$H NMR (400 MHz, CD$_2$Cl$_2$): δ 7.56-7.32 (m, 6H each isomer), 6.90 (d, 1H, J=6.5 Hz, isomer A, used for isomer ratio), 6.85 (d, 1H, J=6.5 Hz, isomer B, used for isomer ratio), 6.71-6.65 (m, 2H isomer A, 1H isomer B), 6.44-6.40 (m, 1H, isomer B), 6.22 (t, 1H, J=2.7 Hz, isomer B), 6.09 (t, 1H, J=2.1 Hz, isomer A), 6.07 (t, 1H, J=2.6 Hz, isomer A), 5.94 (t, 1H, J=2.6 Hz, isomer B), 3.20-2.96 (m), 2.71-2.61 (m), 2.54-2.33 (m), 2.24-2.08 (m), 2.00-1.86 (m), 1.54-1.19 (m), 0.92-0.81 (m), 0.65 (s, 3H, isomer A), 0.64 (s, 3H, isomer B), 0.54 (s, 3H, isomer B), 0.53 (s, 3H, isomer B), 0.52 (s, 6H, isomer A), 0.49 (s, 3H, isomer A), 0.47 (s, 3H, isomer B).

Synthesis of Tetramethyldisilylene cyclopentadienyl (4-phenyl-1,5,6,7-tetrahydro-s-indacenyl) zirconium(IV) dichloride

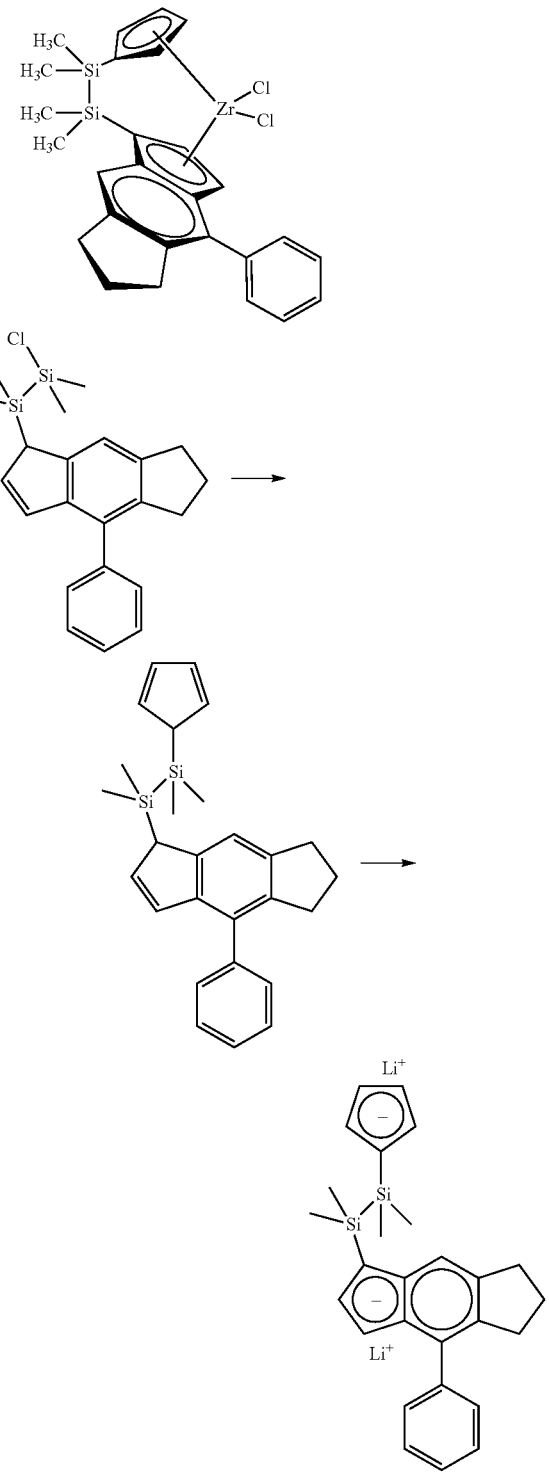

1-(cyclopenta-2,4-dien-1-yl)-1,1,2,2-tetramethyl-2-(4-phenyl-1,5,6,7-tetrahydro-s-indacen-1-yl)disilane To a stirring solution of 1-chloro-1,1,2,2-tetramethyl-2-(4-phenyl-1,5,6,7-tetrahydro-s-indacen-1-yl)disilane (0.378 g, 0.001 mol) in tetrahydrofuran, lithium cyclopentadienide (0.071 g, 0.001 mol) was added. The reaction was stirred at room temperature for 70 minutes. Volatiles were removed under a stream of nitrogen and then under high vacuum. The residue was extracted with pentane and filtered over Celite. The pentane extract was concentrated under a stream of nitrogen and then under high vacuum to afford the product (0.400 g).

Lithium 1-(2-(cyclopenta-2,4-dien-1-ide-1-yl)-1,1,2,2-tetramethyldisilanyl)-4-phenyl-1,5,6,7-tetrahydro-s-indacen-1-ide To a stirring solution of 1-(cyclopenta-2,4-dien-1,1-yl)-1,1,2,2-tetramethyl-2-(4-phenyl-1,5,6,7-tetrahydro-s-indacen-1-yl)disilane (0.400 g, 0.001 mol) in diethyl ether (20 mL), n-butyllithium (2.5M solution in hexane, 0.8 mL, 0.002 mol) was added. The reaction was stirred at room temperature for 45 minutes. Volatiles were removed under a stream of nitrogen and then under high vacuum to afford the product as an orange-white solid (0.447 g).

Tetramethyldisilylene cyclopentadienyl (4-phenyl-1,5,6,7-tetrahydro-s-indacenyl) zirconium(IV) dichloride To a stirring solution of lithium 1-(2-(cyclopenta-2,4-dien-1-ide-1-yl)-1,1,2,2-tetramethyldisilanyl)-4-phenyl-1,5,6,7-tetrahydro-s-indacen-1-ide (0.447 g, 0.001 mol) in diethyl ether (20 mL), zirconium(IV) chloride (0.226 g, 0.001 mol, 0.92 eq) was added. The reaction was stirred at room temperature for 15 h. Volatiles were removed under a stream of nitrogen and then under high vacuum. The residue was extracted with dichloromethane and filtered over Celite. The dichloromethane extract was concentrated under a stream of nitrogen and then under high vacuum to afford the product as an orange solid (0.144 g, 23%). $^1$H NMR (400 MHz, CD$_2$Cl$_2$): δ 7.54-7.30 (m, 6H), 6.87 (d, 1H, J=3.4 Hz), 6.72 (dt, 1H, J=3.2, 2.0 Hz), 6.68 (dd, 1H, J=3.5, 0.9 Hz), 6.43 (dt, 1H, J=3.1, 2.0 Hz), 6.3 (td, 1H, J=3.0, 1.9 Hz), 6.23 (td, 1H, J=3.0, 1.9 Hz), 3.20-2.98 (m, 2H), 2.69-2.61 (m, 1H), 2.18-2.09 (m, 1H), 1.98-1.80 (m, 2H), 0.65 (s, 3H), 0.54 (s, 6H), 0.52 (s, 3H).

Synthesis of Tetramethyldisilylene cyclopentadienyl (2-methyl-4-(3',5'-di-tBu-phenyl)-indenyl) zirconium(IV) dichloride

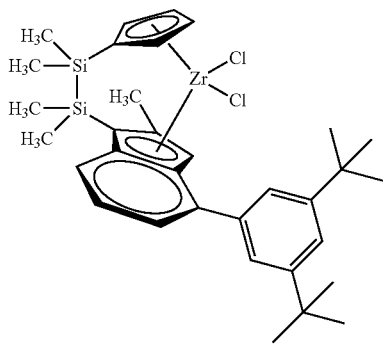

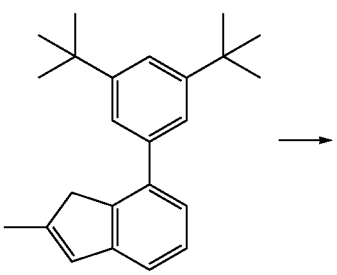

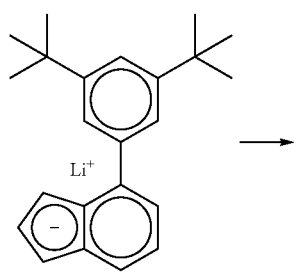

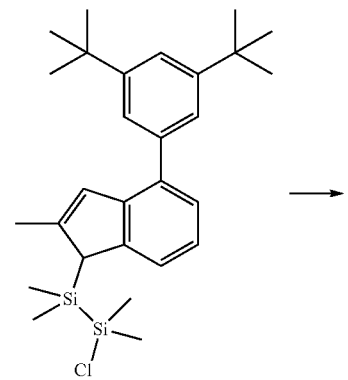

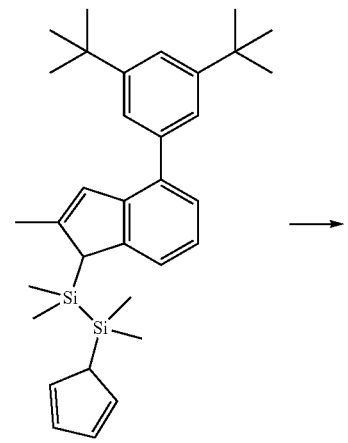

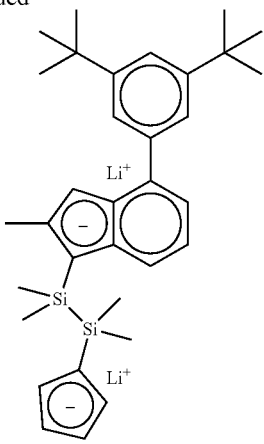

Lithium 4-(3,5-di-tert-butylphenyl)-2-methyl-1H-inden-1-ide

To a precooled, stirring solution of 4-(3,5-di-tert-butylphenyl)-2-methyl-1H-indene (0.980 g, 0.003 mol) in tetrahydrofuran (10 mL), n-butyllithium (2.5M in hexanes, 1.6 mL, 0.003 mol, 1.3 eq) was added. The reaction was stirred at room temperature for 19h. Volatiles were removed under a stream of nitrogen and then under high vacuum to afford the product as an orange powder, containing tetrahydrofuran (2.93 eq) (0.998 g).

1-Chloro-2-(4-(3,5-di-tert-butylphenyl)-2-methyl-1H-inden-1-yl)-1,1,2,2-tetramethyldisilane To a stirring solution of 1,2-dichloro-1,1,2,2-tetramethyldisilane (0.616 g, 0.003 mol, 1.01 eq) in diethyl ether (40 mL), lithium 4-(3,5-di-tert-butylphenyl)-2-methyl-1H-inden-1-ide (1.747 g, 0.003 mol) in diethyl ether (20 mL) was added dropwise. The reaction was stirred at room temperature for 55 minutes. Volatiles were removed under a stream of nitrogen and then under high vacuum. The residue was extracted with pentane (2×20 mL) and filtered over Celite. The combined pentane extracts were concentrated under a stream of nitrogen and then under high vacuum to afford the product (1.357 g).

1-(Cyclopenta-2,4-dien-1-yl)-2-(4-(3,5-di-tert-butylphenyl)-2-methyl-1H-inden-1-yl)-1,1,2,2-tetramethyldisilane To a stirring solution of 1-chloro-2-(4-(3,5-di-tert-butylphenyl)-2-methyl-1H-inden-1-yl)-1,1,2,2-tetramethyldisilane (0.679 g, 0.001 mol, 1.01 eq) in diethyl ether (10 mL), lithium cyclopentadienide (0.103 g, 0.001 mol) was added with tetrahydrofuran (20 mL). The reaction was stirred at room temperature for 1 h. Volatiles were removed under a stream of nitrogen and then under high vacuum. The residue was extracted with pentane (20 mL) and filtered over Celite. The pentane extract was concentrated under a stream of nitrogen and then under high vacuum to afford the product as an orange oil (0.605 g).

Lithium 1-(2-(cyclopenta-2,4-dien-1-ide-1-yl)-1,1,2,2-tetramethyldisilanyl)-4-(3,5-di-tert-butylphenyl)-2-methyl-1H-inden-1-ide To a stirring solution of 1-(cyclopenta-2,4-dien-1-yl)-2-(4-(3,5-di-tert-butylphenyl)-2-methyl-1H-inden-1-yl)-1,1,2,2-tetramethyldisilane (0.605 g, 0.001 mol) in diethyl ether (10 mL), n-butyllithium (2.5M in hexanes, 0.97 mL, 2 eq) was added. The reaction was stirred at room temperature overnight. The reaction was filtered on a fritted funnel and washed with diethyl ether (10 mL). The solid was collected and concentrated under high vacuum to afford the product as a white solid (0.293 g).

Tetramethyldisilylene cyclopentadienyl (2-methyl-4-(3',5'-di-tBu-phenyl)-indenyl) zirconium(IV) dichloride To a stirring suspension of zirconium(IV) chloride (0.134 g, 0.57 mmol, 1 eq) in diethyl ether (20 mL), lithium 1-(2-(cyclopenta-2,4-dien-1-ide-1-yl)-1,1,2,2-tetramethyldisilanyl)-4-(3,5-di-tert-butylphenyl)-2-methyl-1H-inden-1-ide (0.293 g, 0.57 mmol) was added with diethyl ether (10 mL). The reaction was stirred at room temperature for 3h. Volatiles were removed under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to afford the product as a yellow solid (0.367 g, 97%). $^1$H NMR (400 MHz, $CD_2Cl_2$): δ 7.77 (ddd, 1H, J=5.2, 4.3, 1.0 Hz), 7.49 (d, 2H, J=1.8 Hz), 7.44 (t, 1H, J=1.8 Hz), 7.28 (d, 1H, J=1.4 Hz), 7.27 (d, 1H, J=0.6 Hz), 6.76 (s, 1H), 6.72 (dt, 1H, J=3.0, 2.0 Hz), 6.38 (td, 1H, J=3.0, 2.0 Hz), 6.22 (dt, 1H, J=3.2, 2.1 Hz), 6.20 (td, 1H, J=3.0, 1.8 Hz), 2.40 (s, 3H), 1.36 (s, 18H), 0.73 (s, 3H), 0.58 (s, 6H), 0.53 (s, 3H).

Synthesis of Tetramethyldisilylene (3-n-butyl-cyclopentadienyl) (2-Me-4-(3',5'-di-tert-butylphenyl)-indenyl) zirconium(IV) dichloride (Metallocene J)

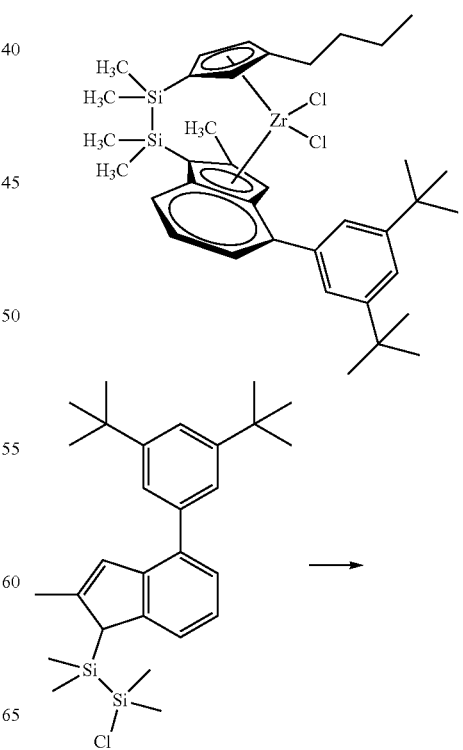

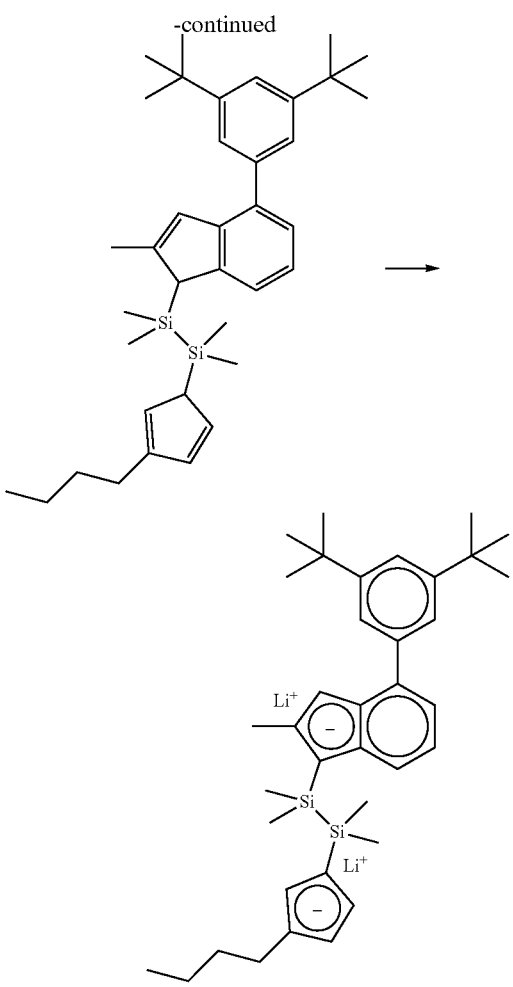

1-(3-Butylcyclopenta-2,4-dien-1-yl)-2-(4-(3,5-di-tert-butylphenyl)-2-methyl-1H-inden-1-yl)-1,1,2,2-tetramethyldisilane To a stirring solution of 1-chloro-2-(4-(3,5-di-tert-butylphenyl)-2-methyl-1H-inden-1-yl)-1,1,2,2-tetramethyldisilane (1.295 g, 0.003 mol) in diethyl ether (50 mL), lithium n-butylcyclopentadienide (0.358, 0.003 mol, 1.01 eq) was added with diethyl ether (20 mL). Tetrahydrofuran (20 mL) was added to the reaction. The reaction was stirred at room temperature for 6h. Volatiles were removed under a stream of nitrogen and then under high vacuum. The residue was extracted with pentane (40 mL) and filtered over Celite. The pentane extract was concentrated under a stream of nitrogen and then under high vacuum to afford the product as an oil (1.485 g).

Lithium 1-(2-(3-butylcyclopenta-2,4-dien-1-ide-1-yl)-1,1,2,2-tetramethyldisilanyl)-4-(3,5-di-tert-butylphenyl)-2-methyl-1H-inden-1-ide To a stirring solution of 1-(3-butylcyclopenta-2,4-dien-1-yl)-2-(4-(3,5-di-tert-butylphenyl)-2-methyl-H-inden-1-yl)-1,1,2,2-tetramethyldisilane (1.485 g, 0.003 mol) in diethyl ether (30 mL), n-butyllithium (2.5M in hexanes, 0.006 mol, 2.2 mL, 2.06 eq) was added. The reaction was stirred at room temperature for 4h. Volatiles were removed under a stream of nitrogen and then under high vacuum. The residue was washed with hexane (20 mL) and concentrated under high vacuum to afford the product as an orange-white solid (1.477 g).

Tetramethyldisilylene (3-n-butyl-cyclopentadienyl) (4-phenyl-1,5,6,7-tetrahydro-s-indacenyl) zirconium (IV) dichloride To a stirring solution of lithium 1-(2-(3-butylcyclopenta-2,4-dien-1-ide-1-yl)-1,1,2,2-tetramethyldisilanyl)-4-(3,5-di-tert-butylphenyl)-2-methyl-1H-inden-1-ide (1.477 g, 0.003 mol) in diethyl ether, zirconium(IV) chloride (0.610 g, 0.003 mol, 1.01 eq) was added. The reaction was stirred at room temperature for 16h. Volatiles were removed under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to afford the product as an amber-yellow solid (1.756 g, 92%) as a 1:1 ratio of isomers A and B. $^1$H NMR (400 MHz, CD$_2$Cl$_2$): δ 7.83-7.81 (m, 1H), 7.80-7.78 (m, 1H), 7.50 (s, 1H), 7.50 (s, 1H), 7.46-7.44 (m, 4H), 7.34-7.22 (m, 4H), 6.75 (s, 1H), 6.72-6.69 (m, 2H), 6.43 (t, 1H, J=2.2 Hz), 6.10 (dd, 1H, J=3.0, 2.1 Hz), 6.07 (dd, 1H, J=3.1, 2.4 Hz), 5.88 (dd, 1H, J=3.1, 2.0 Hz, isomer A, used for isomer ratio), 5.85 (t, 1H, J=2.2 Hz, isomer B, used for isomer ratio), 2.58-2.52 (m, 2H), 2.40 (s, 3H), 2.38 (s, 3H), 2.37-2.27 (m, 1H), 2.09-1.99 (m, 1H), 1.53-1.43 (m, 2H), 1.42-1.02 (m, 6H), 1.37 (s, 18H), 1.36 (s, 18H), 0.90-0.84 (m, 6H), 0.73 (s, 3H), 0.71 (s, 3H), 0.57-0.56 (m, 9H), 0.55 (s, 3H), 0.50 (s, 3H), 0.49 (s, 3H).

Synthesis of Tetramethyldisilylene cyclopentadienyl (2-methyl-4-phenyl-1,5,6,7-tetrahydro-s-indacenyl) zirconium(IV) dichloride (Metallocene G)

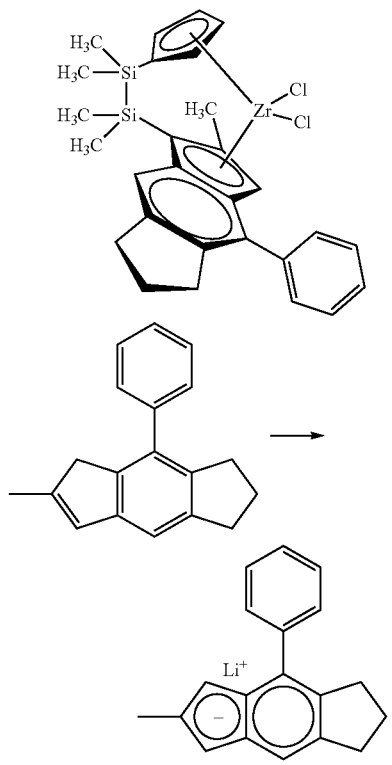

-continued

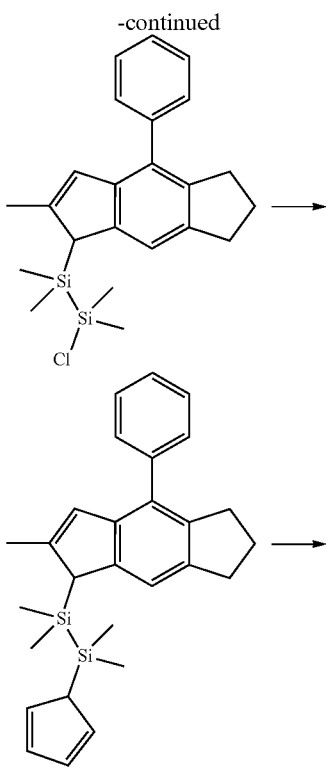

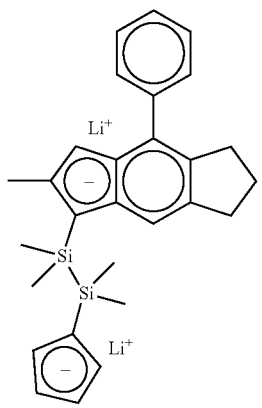

Lithium 2-methyl-4-phenyl-1,5,6,7-tetrahydro-s-indacen-1-ide

To a precooled, stirring solution of 6-methyl-8-phenyl-1,2,3,5-tetrahydro-s-indacene (2.408 g, 0.010 mol) in diethyl ether (30 mL), n-butyllithium (2.5M in hexanes, 4.0 mL, 0.010 mol, 1.02 eq) was added. The reaction was stirred at room temperature for 80 minutes. Volatiles were removed under a stream of nitrogen and then under high vacuum. The residue was washed with hexane and then concentrated under high vacuum to afford the product as an orange powder with diethyl ether (0.06 eq) and hexane (2.58 eq) (3.442 g).

1-Chloro-1,1,2,2-tetramethyl-2-(2-methyl-4-phenyl-1,5,6,7-tetrahydro-s-indacen-1-yl)disilane To a stirring solution of 1,2-dichloro-1,1,2,2-tetramethyldisilane (0.635 g, 0.003 mol, 1 eq) in diethyl ether, ithium 2-methyl-4-phenyl-1,5,6,7-tetrahydro-s-indacen-1-ide (0.856 g, 0.003 mol) in diethyl ether was added. The reaction was stirred at room temperature for 16h. Volatiles were removed under a stream of nitrogen and then under high vacuum. The residue was extracted with pentane (10 mL, then 5 mL) and filtered over Celite. The combined pentane extracts were concentrated under a stream of nitrogen and then under high vacuum to afford the product as a clear, colorless oil (1.174 g).

1-(Cyclopenta-2,4-dien-1-yl)-1,1,2,2-tetramethyl-2-(2-methyl-4-phenyl-1,5,6,7-tetrahydro-s-indacen-1-yl)disilane To a stirring suspension of lithium cyclopentadienide (0.058 g, 0.81 mmol, 1 eq) in diethyl ether (20 mL), 1-chloro-1,1,2,2-tetramethyl-2-(2-methyl-4-phenyl-1,5,6,7-tetrahydro-s-indacen-1-yl)disilane (0.321, 0.81 mmol) with diethyl ether (20 mL) was added. Tetrahydrofuran (20 mL) was added to the reaction. The reaction was stirred at room temperature for approximately 5.5h. Volatiles were removed under a stream of nitrogen and then under high vacuum. The residue was extracted with pentane (15 mL) and then hexane (15 mL) and filtered over Celite. The combined extracts were concentrated under a stream of nitrogen and then under high vacuum to afford the product as an oil (0.213 g).

Lithium 1-(2-(cyclopenta-2,4-dien-1-ide-1-yl)-1,1,2,2-tetramethyldisilanyl)-2-methyl-4-phenyl-1,5,6,7-tetrahydro-s-indacen-1-ide To a stirring solution of 1-(cyclopenta-2,4-dien-1-yl)-1,1,2,2-tetramethyl-2-(2-methyl-4-phenyl-1,5,6,7-tetrahydro-s-indacen-1-yl)disilane (0.213 g, 0.50 mmol) in diethyl ether (20 mL), n-butyllithium (2.5M in hexanes, 0.4 mL, 0.001 mol, 2 eq) was added. The reaction was stirred at room temperature for 35 minutes. Volatiles were removed under a stream of nitrogen and then under high vacuum to afford the product as a solid (0.226 g).

Tetramethyldisilylene cyclopentadienyl (2-methyl-4-phenyl-1,5,6,7-tetrahydro-s-indacenyl) zirconium (IV) dichloride To a precooled, stirring suspension of lithium 1-(2-(cyclopenta-2,4-dien-1-ide-1-yl)-1,1,2,2-tetramethyldisilanyl)-2-methyl-4-phenyl-1,5,6,7-tetrahydro-s-indacen-1-ide (0.226 g, 0.5 mmol) in diethyl ether (15 mL), zirconium(IV) chloride (0.120 g, 0.5 mmol, 1 eq) was added. The reaction was stirred at room temperature for 16h. Volatiles were removed under a stream of nitrogen and then under high vacuum. The residue was extracted with dichloromethane (15 mL) and filtered over Celite. The extract was concentrated under a stream of nitrogen and then under high vacuum. The dichloromethane extract was extracted with hexane (10 mL). The hexane extract was cooled to −35° C. to facilitate precipitation. The precipitate was collected and concentrated under high vacuum to afford the product as a yellow-orange solid (0.088 g, 29%). $^1$H NMR (400 MHz, CD$_2$Cl$_2$): δ 7.65 (s, 1H), 7.49-7.32 (m, 5H), 6.69 (dt, 1H, J=3.0, 2.0 Hz), 6.52 (s, 1H), 6.33 (td, 1H, J=3.0, 1.9 Hz), 6.17 (td, 1H, J=3.0, 1.8 Hz), 6.01 (dt, 1H, J=3.2, 2.0 Hz), 3.18-3.00 (m, 3H), 2.70 (ddd, 1H, J=16.4, 8.2, 4.3 Hz), 2.36

(s, 3H), 2.20-2.06 (m, 1H), 2.04-1.88 (m, 1H), 0.66 (s, 3H), 0.60 (s, 3H), 0.57 (s, 3H), 0.49 (s, 3H).

Synthesis of Tetramethyldisilylene (3-methyl-cyclopentadienyl) (2-methyl-4-phenyl-1,5,6,7-tetrahydro-s-indacenyl) zirconium(IV) dichloride (Metallocene H)

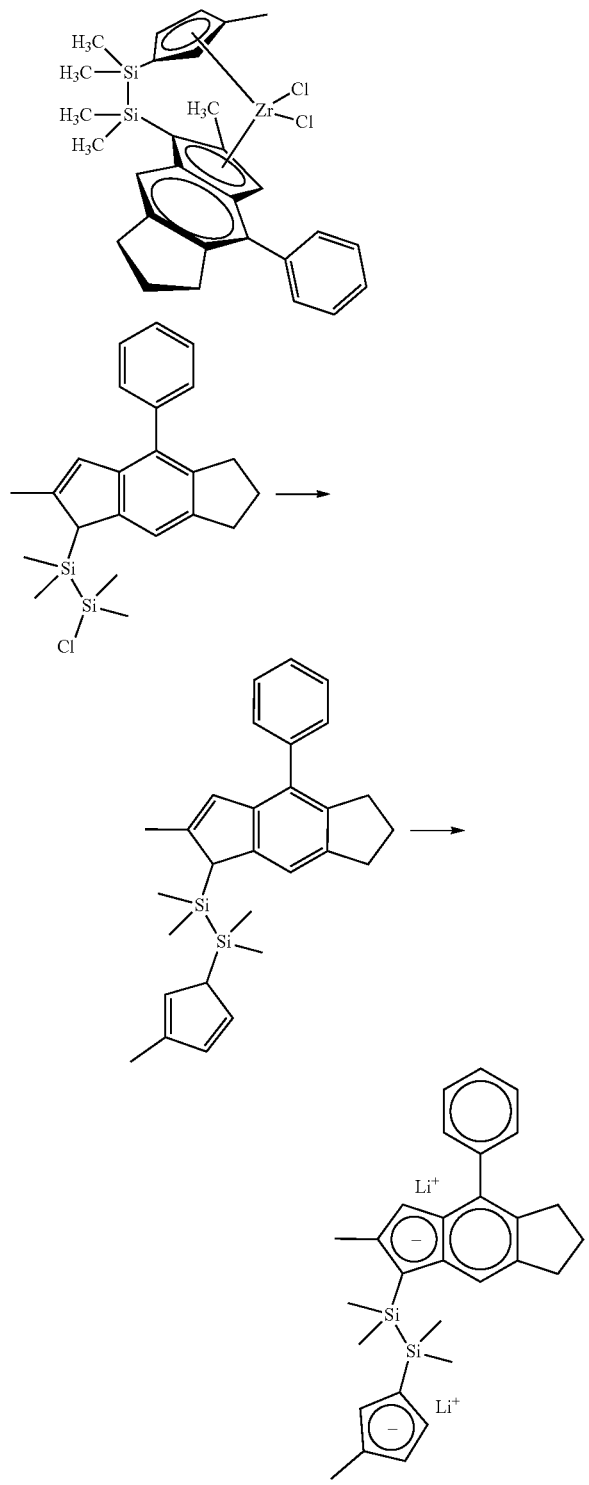

1,1,2,2-Tetramethyl-1-(2-methyl-4-phenyl-1,5,6,7-tetrahydro-s-indacen-1-yl)-2-(3-methylcyclopenta-2,4-dien-1-yl)disilane To a stirring solution of 1-chloro-1,1,2,2-tetramethyl-2-(4-phenyl-1,5,6,7-tetrahydro-s-indacen-1-yl)disilane (0.497 g, 0.001 mol) in tetrahydrofuran (20 mL), lithium 1-methylcyclopentadienide (0.114 g, 0.001 mol, 1.02 eq) was added with tetrahydrofuran (20 mL). The reaction was stirred at room temperature for 81 minutes. Volatiles were removed under a stream of nitrogen and then under high vacuum. The residue was extracted with pentane (2×20 mL) and filtered over Celite. The combined pentane extracts were concentrated under a stream of nitrogen and then under high vacuum to afford the product as an oil (0.493 g).

Lithium 2-methyl-4-phenyl-1-(1,1,2,2-tetramethyl-2-(3-methylcyclopenta-2,4-dien-1-ide-1-yl)disilanyl)-1,5,6,7-tetrahydro-s-indacen-1-ide To a stirring solution of 1,1,2,2-tetramethyl-1-(2-methyl-4-phenyl-1,5,6,7-tetrahydro-s-indacen-1-yl)-2-(3-methylcyclopenta-2,4-dien-1-yl)disilane (0.493 g, 0.001 mol) in diethyl ether (20 mL), n-butyllithium (2.5M in hexanes, 0.9 mL, 0.002 mol, 2.01 eq) was added. The reaction was stirred at room temperature for 55 minutes. Volatiles were removed under a stream of nitrogen and then under high vacuum. The residue was washed with hexane (20 mL) and concentrated under high vacuum to afford the product as an orange solid (0.548 g).

Tetramethyldisilylene (3-methyl-cyclopentadienyl) (2-methyl-4-phenyl-1,5,6,7-tetrahydro-s-indacenyl) zirconium(IV) dichloride To a stirring solution of lithium 2-methyl-4-phenyl-1-(1,1,2,2-tetramethyl-2-(3-methylcyclopenta-2,4-dien-1-ide-1-yl)disilanyl)-1,5,6,7-tetrahydro-s-indacen-1-ide (0.548 g, 0.001 mol) in diethyl ether (20 mL), zirconium(IV) chloride was added. The reaction was stirred at room temperature for 16h. Volatiles were removed under a stream of nitrogen and then under high vacuum. The residue was extracted with dichloromethane (15 mL) and filtered over Celite. The dichloromethane extract was concentrated under a stream of nitrogen and then under high vacuum to give an orange foam. The orange foam was extracted with hexane (10 mL). The hexane extract was cooled to −35° C. The precipitate formed was collected and concentrated under high vacuum to afford the product as a yellow solid (0.030 g, 4%, 1:1 ratio of isomers A and B). $^{1}$H NMR (400 MHz, $CD_2Cl_2$): δ 7.68 (s, 1H, isomer A, used for isomer ratio), 7.64 (s, 1H, isomer B, used for isomer ratio), 7.49-7.30 (m, 10H), 6.69 (dd, 1H, J=3.0, 2.3 Hz), 6.53 (s, 1H), 6.51 (s, 1H), 6.40-6.37 (m, 1H), 6.10-6.07 (m, 1H), 5.87 (ddd, 1H, J=3.1, 2.0, 0.6 Hz), 5.82 (td, 1H, J=2.2, 0.6 Hz), 5.78 (dd, 1H, J=3.1, 2.4 Hz), 3.18-2.97 (m, 6H), 2.77-2.62 (m, 2H), 2.35 (s, 3H), 2.34 (s, 3H), 2.14 (s, 3H), 2.10-1.87 (m, 4H), 1.84 (s, 3H), 0.70 (s, 3H), 0.66 (s, 3H), 0.59 (s, 3H), 0.55 (s, 3H), 0.54 (s, 3H), 0.53 (s, 3H), 0.46 (s, 3H), 0.45 (s, 3H).

Synthesis of Tetramethyldisilylene (3-n-butyl-cyclopentadienyl) (2-methyl-4-phenyl-1,5,6,7-tetrahydro-s-indacenyl) zirconium(IV) dichloride (Metallocene A)

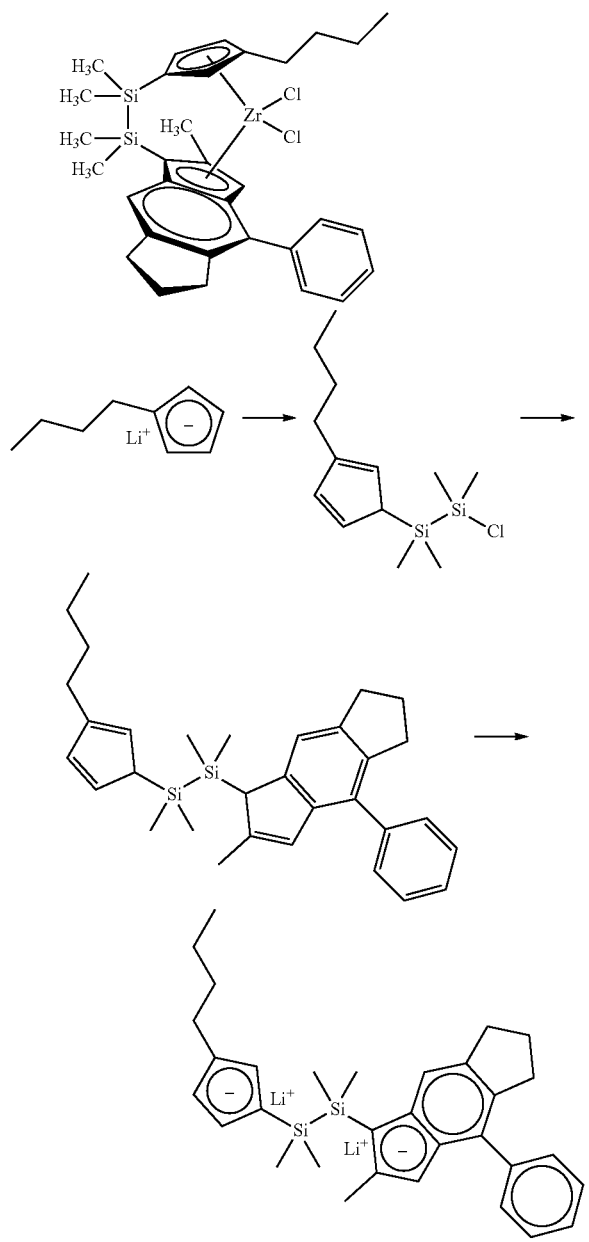

1-(3-Butylcyclopenta-2,4-dien-1-yl)-2-chloro-1,1,2,2-tetramethyldisilane

To a precooled, stirring solution of 1,2-dichloro-1,1,2,2-tetramethyldisilane (2.249 g, 0.012 mol) in diethyl ether (100 mL), lithium n-butylcyclopentadienide (1.543 g, 0.012 mol, 1 eq) was added with diethyl ether (20 mL). The reaction was stirred at room temperature for 16h. Volatiles were removed under a stream of nitrogen and then under high vacuum. The residue was extracted with toluene (3×10 mL) and filtered over Celite. The combined toluene extracts were concentrate under high vacuum at 40° C. to afford the product (3.117 g).

1-(3-butylcyclopenta-2,4-dien-1-yl)-1,1,2,2-tetramethyl-2-(2-methyl-4-phenyl-1,5,6,7-tetrahydro-s-indacen-1-yl)disilane To a stirring solution of 1-(3-butylcyclopenta-2,4-dien-1-yl)-2-chloro-1,1,2,2-tetramethyldisilane (0.976 g, 0.004 mol, 1.02 eq) in tetrahydrofuran (10 mL), a solution of lithium 2-methyl-4-phenyl-1,5,6,7-tetrahydro-s-indacen-1-ide (1.264 g, contained 1.5 eq tetrahydrofuran, 0.004 mol) in tetrahydrofuran (30 mL) was added. The reaction was stirred at room temperature overnight. Volatiles were removed under a stream of nitrogen and then under high vacuum. The residue was stirred in hexane (20 mL) to facilitate precipitation of a white solid. The suspension was concentrated under a stream of nitrogen and then under high vacuum. The residue was extracted with hexane (20 mL, then 10 mL) and filtered over Celite. The combined hexane extracts were concentrated under a stream of nitrogen and then under high vacuum to afford the product as a tan-yellow oil (1.678 g).

Lithium 1-(2-(3-butylcyclopenta-2,4-dien-1-ide-1-yl)-1,1,2,2-tetramethyldisilaneyl)-2-methyl-4-phenyl-1,5,6,7-tetrahydro-s-indacen-1-ide To a precooled, stirring solution of 1-(3-butylcyclopenta-2,4-dien-1-yl)-1,1,2,2-tetramethyl-2-(2-methyl-4-phenyl-1,5,6,7-tetrahydro-s-indacen-1-yl)disilane (1.678 g, 0.003 mol) in diethyl ether (15), n-butyllithium (2.5M in hexanes, 2.8 mL, 0.007 mol, 2.01 eq) was added. The reaction was stirred at room temperature for 38 minutes. Volatiles were removed under a stream of nitrogen and then under high vacuum. The residue was washed with hexane (10 mL) and concentrated under high vacuum to afford the product as a solid, containing diethyl ether(0.19 eq) and hexane (0.5 eq) (1.749 g).

Tetramethyldisilylene (3-n-butyl-cyclopentadienyl) (2-methyl-4-phenyl-1,5,6,7-tetrahydro-s-indacenyl) zirconium(IV) dichloride To a precooled, stirring suspension of 1-(2-(3-butylcyclopenta-2,4-dien-1-ide-1-yl)-1,1,2,2-tetramethyldisilanyl)-2-methyl-4-phenyl-1,5,6,7-tetrahydro-s-indacen-1-ide (1.057 g, 0.002 mol) in diethyl ether (20 mL), zirconium(IV) chloride (0.477 g, 0.002 mol, 1.07 eq) was added with diethyl ether (20 mL). The reaction was stirred at room temperature for 3h. Volatiles were removed under a stream of nitrogen and then under high vacuum. The residue was extracted with dichloromethane (2×20 mL) and filtered over Celite. The combined extracts were concentrated under a stream of nitrogen and then under high vacuum. The dichloromethane extract was washed with hexane (3×10 mL) and concentrated under high vacuum to afford the product as a pale yellow solid (0.225 g, 18%, ratio of 1:2 isomers A and B). $^1$H NMR (400 MHz, CD$_2$Cl$_2$): δ 7.69 (s, 1H, isomer A, used for isomer ratio), 7.67 (s, 1H, isomer B, used for isomer ratio), 7.48-7.40 (m, 4H each of A and B), 7.39-7.32 (m, 1H each of A and B), 6.69 (dd, 1H, J=3.0, 2.3 Hz, B), 6.51 (s, 1H, A), 6.49 (s, 1H, B), 6.40 (t, 1H, J=2.2 Hz, A), 6.09-6.05 (m, 1H, B), 5.88-5.86 (m, 1H, A), 5.79 (dd, 1H, J=3.1, 2.3 Hz, A), 5.76 (t, 1H, J=2.2 Hz, B), 3.18-2.97 (m, 3H each of A and B), 2.74-2.63 (m, 1H each of A and B), 2.52 (td, 1H, J=7.5, 2.8 Hz, B), 2.35 (s, 3H, B), 2.34 (s, 3H, A), 2.38-2.28

(m, 1H, A), 2.19-1.90 (m, 3H each of A and B), 1.53-1.12 (m, 4H each of A and B), 0.92-0.83 (m, 3H each of A and B), 0.67 (s, 3H, B), 0.66 (s, 3H, A), 0.59 (s, 3H, A), 0.57 (s, 3H, B), 0.55 (s, 3H, B), 0.54 (s, 3H, A), 0.46 (s, 3H, A), 0.45 (s, 3H, B).

Synthesis of Tetramethyldisilylene (3-n-butyl-cyclopentadienyl) (2-methyl-4-phenyl-1,5,6,7-tetrahydro-s-indacenyl) hafnium (IV) dichloride

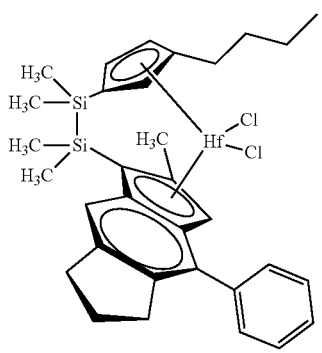

Tetramethyldisilylene (3-n-butyl-cyclopentadienyl) (2-methyl-4-phenyl-1,5,6,7-tetrahydro-s-indacenyl) hafnium (IV) dichloride To a precooled, stirring suspension of hafnium (IV) chloride (0.409 g, 0.001 mol, 1.04 eq) in diethyl ether (20 mL), lithium 1-(2-(3-butylcyclopenta-2,4-dien-1-ide-1-yl)-1,1,2,2-tetramethyldisilanyl)-2-methyl-4-phenyl-1,5,6,7-tetrahydro-s-indacen-1-ide (0.677 g, 0.001 mol) was added with diethyl ether (20 mL). The reaction was stirred at room temperature for 3.5h. Volatiles were removed under a stream of nitrogen and then under high vacuum. The residue was extracted with dichloromethane (2×20 mL) and filtered over Celite. The combined dichloromethane extracts were concentrated under a stream of nitrogen and then under high vacuum. The dichloromethane extract was extracted with hexane (10 mL). The hexane extract was concentrated under a stream of nitrogen to half the original volume, and the resulting suspension was further cooled to −35° ° C. The orange precipitate was collected and concentrated under high vacuum. The solid was washed with minimal cold hexane (2 mL) and then hexane (2 mL), and the solid was concentrated under high vacuum to afford the product as a tan solid (0.320 g, 35%, ratio of 1:1.4 isomers A and B). $^1$H NMR (400 MHz, CD$_2$Cl$_2$): δ 7.70 (s, 1H, isomer B, used for isomer ratio), 7.68 (s, 1H, isomer A, used for isomer ratio), 7.46-7.39 (m, 4H each of A and B), 7.39-7.31 (m, 1H each of A and B), 6.58 (dd, 1H, J=3.0, 2.3 Hz, A), 6.39 (s, 1H, B), 6.37 (s, 1H, A), 6.31-6.29 (m, 1H, B), 5.96 (dd, 1H, J=3.0, 2.1 Hz, A), 5.74 (dd, 1H, J=3.2, 2.0 Hz, B), 5.61-5.56 (m, 1H each of A and B), 3.27-3.01 (m, 3H each of A and B), 2.60-2.35 (m, 1H each of A and B), 2.44 (s, 3H, A), 2.43 (s, 3H, B), 2.20-1.87 (m, 3H each of A and B), 1.53-1.09 (m, 4H each A and B), 0.95-0.80 (m, 3H each A and B), 0.64 (s, 3H, A), 0.63 (s, 3H, B), 0.60 (s, 3H, B), 0.57 (s, 3H, A), 0.54 (s, 3H, A), 0.53 (s, 3H, B), 0.44 (s, 3H each of A and B).

Tetramethyldisilylene (3-n-butyl-cyclopentadienyl) (2-methyl-4-bromo-1,5,6,7-tetrahydro-s-indacenyl) zirconium(IV) dichloride (Metallocene B)

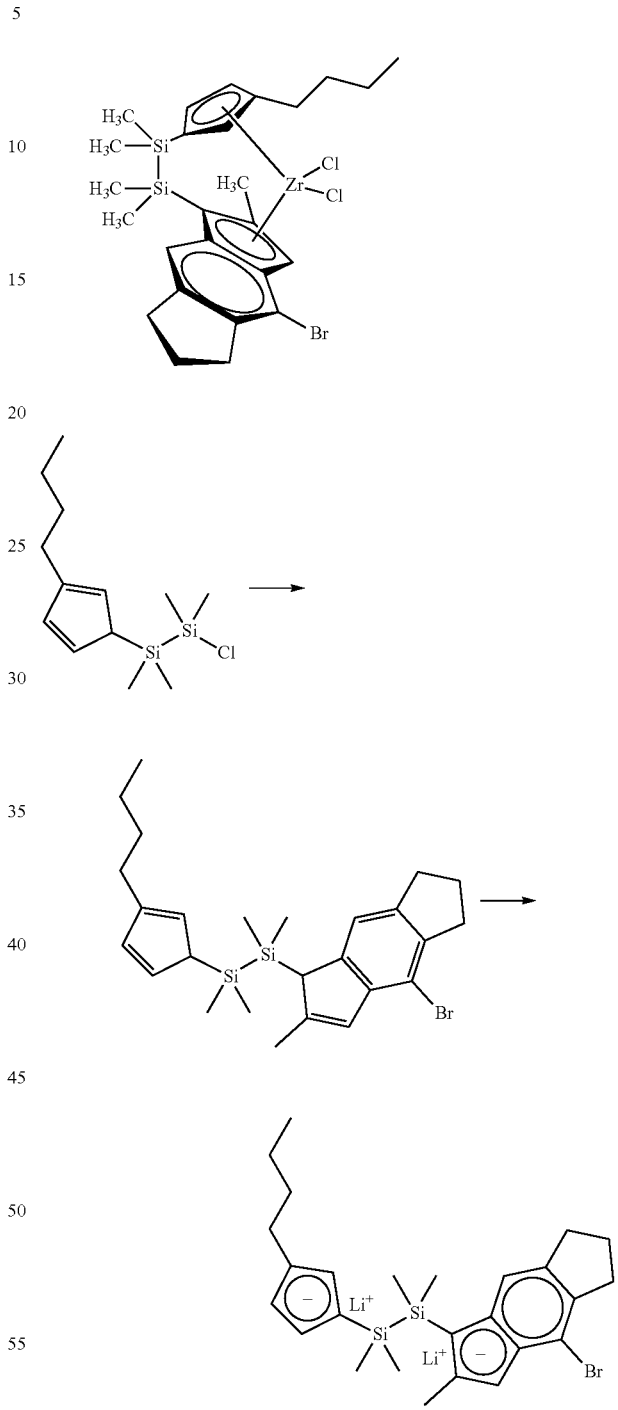

1-(4-Bromo-2-methyl-1,5,6,7-tetrahydro-s-indacen-1-yl)-2-(3-butylcyclopenta-2,4-dien-1-yl)-1,1,2,2-tetramethyldisilane To a precooled, stirring solution of 1-(3-butylcyclopenta-2,4-dien-1-yl)-2-chloro-1,1,2,2-tetramethyldisilane (0.590 g, 0.002 mol) in tetrahydrofuran (10 mL), lithium 4-bromo- 2-methyl-1,5,6,7-tetrahydro-s-indacen-1-ide (0.592 g, 0.002 mol, 1 eq) was added. The reaction was stirred at room temperature for 15 h. Volatiles were removed under a stream of nitrogen and then under high vacuum. The residue was extracted with hexane (3×10 mL) and filtered over Celite. The combined extracts were concentrated under a stream of nitrogen and then under high vacuum to afford the product as an amber oil (0.542 g).

4-Bromo-1-(2-(3-butylcyclopenta-2,4-dien-1-ide-1-yl)-1,1,2,2-tetramethyldisilaneyl)-2-methyl-1,5,6,7-tetrahydro-s-indacen-1-ide To a stirring solution of 1-(4-bromo-2-methyl-1,5,6,7-tetrahydro-s-indacen-1-yl)-2-(3-butylcyclopenta-2,4-dien-1-yl)-1,1,2,2-tetramethyldisilane (0.542 g, 0.001 mol) in diethyl ether (20 mL), n-butyllithium (2.5M in hexanes, 0.9 mL, 0.002 mol, 2.02 eq) was added. The reaction was stirred at room temperature for 93 minutes. Volatiles were removed under a stream of nitrogen and then under high vacuum to afford the product as a pale yellow solid, containing diethyl ether (0.26 eq) (0.555 g).

Tetramethyldisilylene (3-n-butyl-cyclopentadienyl) (2-methyl-4-bromo-1,5,6,7-tetrahydro-s-indacenyl) zirconium(IV) dichloride To a precooled, stirring suspension of zirconium(IV) chloride (0.660 g, 0.003 mol, 1.02 eq) in diethyl ether (20 mL), a solution of lithium 4-bromo-1-(2-(3-butylcyclopenta-2,4-dien-1-ide-1-yl)-1,1,2,2-tetramethyldisilanyl)-2-methyl-1,5,6,7-tetrahydro-s-indacen-1-ide (1.385 g, 0.003 mol) in diethyl ether (20 mL) was added. The reaction was stirred at room temperature for 15 h. Volatiles were removed under a stream of nitrogen and then under high vacuum. The residue was extracted with dichloromethane (3×10 mL) and filtered over Celite. The combined extracts were concentrated under a stream of nitrogen and then under high vacuum to give an orange-yellow solid. The dichloromethane extract was extracted with hexane (20 mL). The hexane extract was concentrated under a stream of nitrogen and then under high vacuum. The hexane washed dichloromethane extract was concentrated under high vacuum. The hexane washed dichloromethane extract was washed with diethyl ether (4×2 mL) and concentrated under high vacuum to afford one fraction of the product (0.250 g, 13%, ratio of 16:1 isomers A:B). The hexane extract of the dichloromethane extract was washed with cold diethyl ether (2 mL), hexane (2 mL), and toluene (2 mL) to afford another fraction of the product (0.137 g, 7%, ratio of 1:8 isomers A:B). $^1$H NMR (400 MHz, CD$_2$Cl$_2$): Diastereomer A δ 7.58 (s, 1H), 6.73 (dd, 1H, J=3.0, 2.3 Hz, isomer A, used for isomer ratio), 6.56 (s, 1H), 6.12 (dd, 1H, J=3.0, 2.2 Hz), 5.76 (t, 1H, J=2.2 Hz), 3.14 (ddd, 2H, J=8.2, 6.6, 1.3 Hz), 2.97 (t, 2H, J=7.3 Hz), 2.38 (s, 3H), 2.31-2.21 (m, 1H), 2.17-2.08 (m, 2H), 2.03-1.93 (m, 1H), 1.35-0.98 (m, 4H), 0.86 (t, 3H, J=7.2 Hz), 0.65 (s, 3H), 0.53 (s, 3H), 0.52 (s, 3H), 0.47 (s, 3H); Diastereomer B δ 7.61 (s, 1H), 6.58 (s, 1H), 6.46 (t, 1H, J=2.2 Hz), 5.88 (dd, 1H, J=3.1, 2.0 Hz, isomer B, used for isomer ratio), 5.77 (dd, 1H, J=3.2, 2.4 Hz), 3.18-3.10 (m, 2H), 3.02-2.93 (m, 2H), 2.60-2.54 (m, 2H), 2.38 (s, 3H), 2.19-2.07 (m, 2H), 1.55-1.44 (m, 2H), 1.35-1.21 (m, 2H), 0.87 (t, 3H, J=7.3 Hz), 0.61 (s, 3H), 0.56 (s, 3H), 0.52 (s, 3H), 0.46 (s, 3H).

Synthesis of Tetramethyldisilylene (3-n-butyl-cyclopentadienyl) (2-methyl-4-bromo-1,5,6,7-tetrahydro-s-indacenyl) hafnium (IV) dichloride

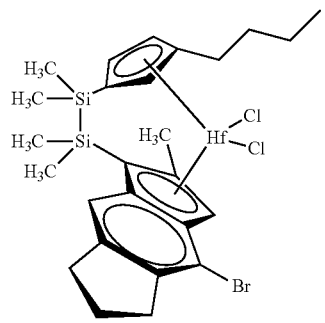

Tetramethyldisilylene (3-n-butyl-cyclopentadienyl) (2-methyl-4-bromo-1,5,6,7-tetrahydro-s-indacenyl) hafnium (IV) dichloride To a precooled, stirring suspension of hafnium(IV) chloride (0.316, 0.001 mol, 1 eq) in diethyl ether (20 mL), lithium 4-bromo-1-(2-(3-butylcyclopenta-2,4-dien-1-ide-1-yl)-1,1,2,2-tetramethyldisilanyl)-2-methyl-1,5,6,7-tetrahydro-s-indacen-1-ide (0.555, 0.001 mol) was added with diethyl ether (20 mL). The reaction was stirred at room temperature for 16h. Volatiles were removed under a stream of nitrogen and then under high vacuum. The residue was extracted with dichloromethane (2×10 mL) and filtered over Celite. The combined dichloromethane extracts were concentrated under a stream of nitrogen and then under high vacuum. The dichloromethane extract was extracted with hexane (10 mL). The hexane extract was concentrated under a stream of nitrogen and then under high vacuum. The hexane extract was washed with cold hexane (2 mL) and then room temperature hexane (2 mL) to afford the product as a tan solid (0.154 g, 21%, ratio of 5:1 isomers A:B). $^1$H NMR (400 MHz, CD$_2$Cl$_2$): δ 7.62 (s, 1H, isomer B, used for isomer ratio), 7.59 (s, 1H, isomer A, used for isomer ratio), 6.46 (s, 1H, B), 6.61 (dd, 1H, J=3.0, 2.3 Hz, A), 6.45 (s, 1H, A), 6.34 (t, 1H, J=2.2 Hz, B), 6.03-6.00 (m, 1H, A), 5.75 (dd, 1H, J=3.1, 2.0 Hz, B), 5.59 (t, 1H, J=3.1, 2.4 Hz, B), 5.59 (t, 1H, J=2.2 Hz, A), 3.23-3.16 (m, 2H each of A and B), 3.03-2.96 (m, 2H each of A and B), 2.61 (td, 2H, J=7.5, 3.0 Hz, B), 2.47 (s, 3H, A), 2.46 (s, 3H, B), 2.40-2.28 (m, 1H, A), 2.18-2.07 (m, 2H each of A and B), 2.07-1.97 (m, 1H, A), 1.54-1.18 (m, 4H each of A and B), 0.90-0.83 (m, 3H each of A and B), 0.62 (s, 3H, A), 0.58 (s, 3H, B), 0.56 (s, 3H, B), 0.53 (s, 3H, A), 0.52 (s, 3H, A), 0.51 (s, 3H, B), 0.45 (s, 3H, A), 0.44 (s, 3H, B).

Synthesis of Dimethylsilyl (3-n-butyl-cyclopentadienyl) (2-methyl-4-phenyl-1,5,6,7-tetrahydro-s-indacenyl) zirconium(IV) dichloride (Metallocene D)

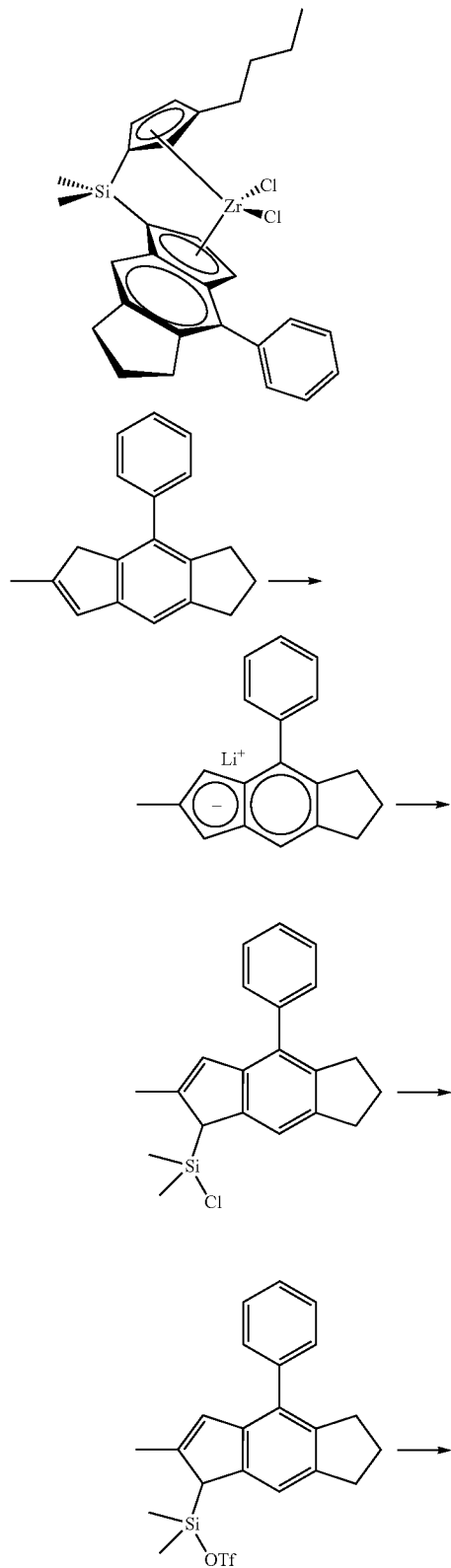

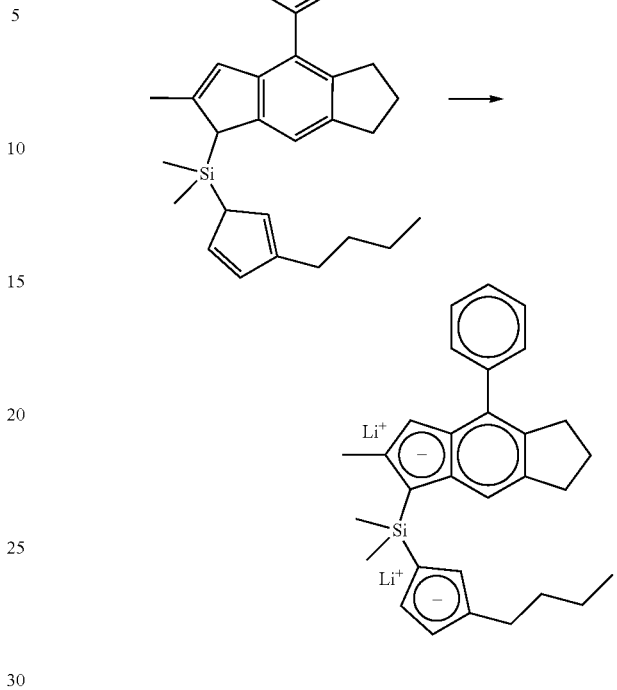

Lithium 2-methyl-4-phenyl-1,5,6,7-tetrahydro-s-indacen-1-ide

To a precooled, stirring solution of 6-methyl-8-phenyl-1,2,3,5-tetrahydro-s-indacene (2.408 g, 0.010 mol) in diethyl ether (30 mL), n-butyllithium (2.5M in hexanes, 4.0 mL, 0.010 mol, 1.02 eq) was added. The reaction was stirred at room temperature for 80 minutes. Volatiles were removed under a stream of nitrogen and then under high vacuum. The residue was washed with hexane and then concentrated under high vacuum to afford the product as an orange powder with diethyl ether (0.06 eq) and hexane (2.58 eq) (3.442 g).

Chlorodimethyl(2-methyl-4-phenyl-1,5,6,7-tetrahydro-s-indacen-1-yl)silane

To a precooled, stirring solution of lithium 2-methyl-4-phenyl-1,5,6,7-tetrahydro-s-indacen-1-ide (1.372 g, 0.004 mol, 70% purity by mass) in diethyl ether (20 mL), dichlorodimethylsilane (7.374 g, 0.057 g mol, 15.01 eq) was added. The reaction was stirred at room temperature for 15 h. Volatiles were removed under a stream of nitrogen and then under high vacuum. The residue was extracted with hexane (3×10 mL) and filtered over Celite. The combined hexane extracts were concentrated under a stream of nitrogen and then under high vacuum to afford the product as a yellow oil (1.233 g).

Dimethyl(2-methyl-4-phenyl-1,5,6,7-tetrahydro-s-indacen-1-yl)silyl trifluoromethanesulfonate To a stirring suspension of silver(I) trifluoromethanesulfonate (1.064 g, 0.004 mol, 1.09 eq) in toluene (10 mL), chlorodimethyl(2-methyl-4-phenyl-1,5,6,7-tetrahydro-s-indacen-1-yl)silane (1.233 g, 0.004 mol) in toluene (20 mL)

was added. The reaction was stirred at room temperature for 110 minutes. The reaction was filtered over Celite and further extracted with hexane (10 mL). Volatiles were removed under high vacuum at 60° C. The residue was extracted with hexane (2×20 mL) and filtered over Celite. The combined hexane extracts were concentrated under a stream of nitrogen and then under high vacuum to afford the product as a pale yellow oil (1.189 g).

(3-Butylcyclopenta-2,4-dien-1-yl)dimethyl(2-methyl-4-phenyl-1,5,6,7-tetrahydro-s-indacen-1-yl)silane To a precooled, stirring solution of dimethyl(2-methyl-4-phenyl-1,5,6,7-tetrahydro-s-indacen-1-yl)silyl trifluoromethanesulfonate (1.189 g, 0.003 mol) in diethyl ether (20 mL), lithium n-butylcyclopentadienide (0.365 g, 0.003 mol, 1.05 eq) and diethyl ether (10 mL) were added. The reaction was stirred at room temperature for 7h. Volatiles were removed under a stream of nitrogen and then under high vacuum. The residue was extracted with hexane (3×10 mL) and filtered over Celite. The combined hexane extracts were concentrated under a stream of nitrogen and then under high vacuum to afford the product as a tan oil (1.175 g).

Lithium 1-((3-butylcyclopenta-2,4-dien-1-ide-1-yl)dimethylsilyl)-2-methyl-4-phenyl-1,5,6,7-tetrahydro-s-indacen-1-ide To a precooled, stirring solution of (3-butylcyclopenta-2,4-dien-1-yl)dimethyl(2-methyl-4-phenyl-1,5,6,7-tetrahydro-s-indacen-1-yl)silane (1.175 g, 0.003 mol) in diethyl ether, n-butyllithium (2.5M in hexanes, 2.3 mL, 2.08 eq) was added. The reaction was stirred at room temperature for 80 minutes. Volatiles were removed under a stream of nitrogen and then under high vacuum to afford the product as a red-orange foam, containing hexane (0.96 eq) and diethyl ether (0.34 eq) (1.188 g).

Dimethylsilyl (2-methyl-4-phenyl-1,5,6,7-tetrahydro-s-indacenyl) (3-butyl-cyclopentadienyl) zirconium dichloride To a precooled, stirring suspension of zirconium(IV) chloride (0.254 g, 0.001 mol, 1.01 eq) in diethyl ether (20 mL), a stirring solution of lithium 1-((3-butylcyclopenta-2,4-dien-1-ide-1-yl)dimethylsilyl)-2-methyl-4-phenyl-1,5,6,7-tetrahydro-s-indacen-1-ide (0.588 g, 0.001 mol) in diethyl ether (20 mL) was added. The reaction was stirred at room temperature for 17h. Volatiles were removed under a stream of nitrogen and then under high vacuum. The residue was extracted with dichloromethane (2×20 mL) and filtered over Celite. The combined dichloromethane extracts were concentrated under a stream of nitrogen and then under high vacuum. The dichloromethane extract was extracted with hexane (20 mL). The hexane extract was concentrated under a stream of nitrogen and then under high vacuum. The hexane extract was washed with cold hexane (2×2 mL) and hexane (2 mL) and concentrated under high vacuum to afford the product as a red-orange solid (0.120 g, 18%, as a 1:1 ratio of isomers A and B). $^1$H NMR (400 MHz, CD$_2$Cl$_2$): δ 7.60-7.30 (m, 10H), 7.28 (s, 1H), 7.19 (s, 1H), 6.69 (s, 1H, isomer A, used for isomer ratio), 6.61 (s, 1H, isomer B, used for isomer ratio), 6.42-6.39 (m, 2H), 5.83-5.79 (m, 2H), 5.48-5.46 (m, 1H), 5.46-5.44 (m, 1H), 3.02-2.79 (m, 8H), 2.61 (dt, 2H, J=9.0, 6.3 Hz), 2.56-2.46 (m, 1H), 2.44-2.35 (m, 1H), 2.20 (d, 3H, J=0.6 Hz), 2.12 (d, 3H, J=0.6 Hz), 2.04-1.93 (m, 4H), 1.60-1.28 (m, 8H), 1.05 (s, 3H), 1.02 (s, 3H), 0.94-0.84 (m, 12H).

Synthesis of Tetramethyldisilylene (3-(2-phenylpropyl)-cyclopentadienyl) (2-methyl-4-phenyl-1,5,6,7-tetrahydro-s-indacenyl) zirconium(IV) dichloride (Metallocene I)

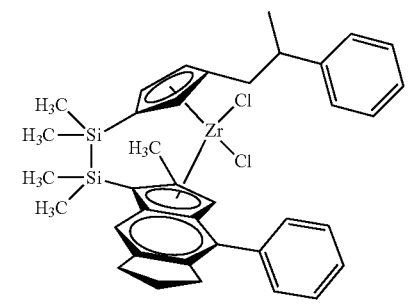

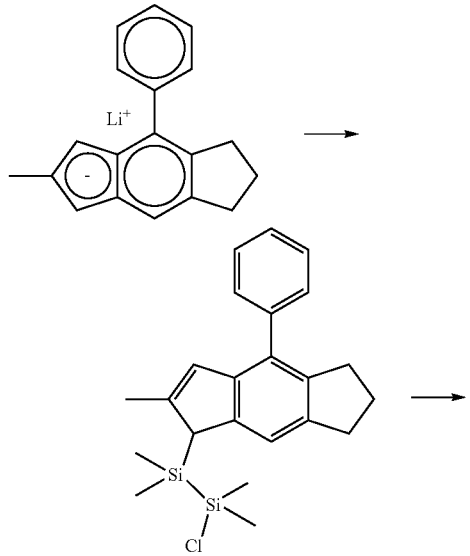

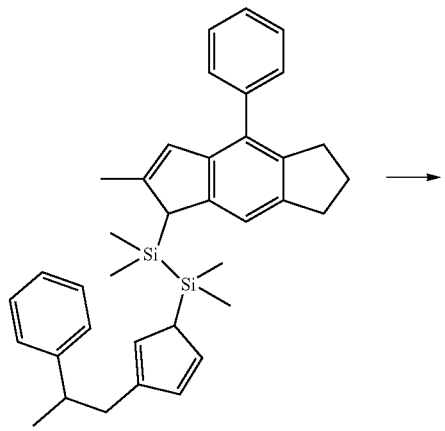

1-chloro-1,1,2,2-tetramethyl-2-(2-methyl-4-phenyl-1,5,6,7-tetrahydro-s-indacen-1-yl)disilane To a stirring solution of 1,2-dichloro-1,1,2,2-tetramethyldisilane (0.201 g, 0.001 mol, 1 eq) in diethyl ether (40 mL), a solution of lithium 2-methyl-4-phenyl-1,5,6,7-tetrahydro-s-indacen-1-ide (0.373 g, 0.001 mol) in tetrahydrofuran (5 mL) was added dropwise. The reaction was stirred at room temperature for 71 minutes. Volatiles were removed under a stream of nitrogen and then under high vacuum. The residue was extracted with pentane (2×20 mL) and filtered over Celite. The combined pentane extracts were concentrated under a stream of nitrogen and then under high vacuum to afford the product as a colorless oil (0.384 g).

1,1,2,2-tetramethyl-1-(2-methyl-4-phenyl-1,5,6,7-tetrahydro-s-indacen-1-yl)-2-(3-(2-phenylpropyl)cyclopenta-2,4-dien-1-yl)disilane

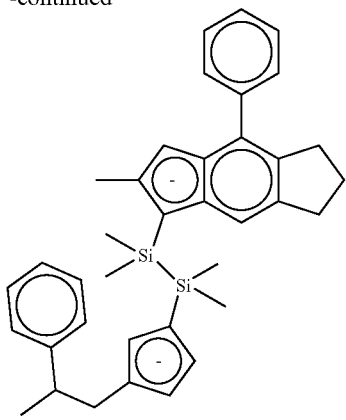

To a stirring solution of 1-chloro-1,1,2,2-tetramethyl-2-(2-methyl-4-phenyl-1,5,6,7-tetrahydro-s-indacen-1-yl)disilane (0.384 g, 0.97 mmol) in diethyl ether (30 mL), lithium 1-(2-phenylpropyl)cyclopenta-2,4-dien-1-ide (0.184 g, 0.97 mmol, 1 eq) was added with tetrahydrofuran (3 mL). The reaction was stirred at room temperature for 33 minutes. Volatiles were removed under a stream of nitrogen and then under high vacuum. The residue was extracted with pentane (2×20 mL) and filtered over Celite. The combined pentane extracts were concentrated under a stream of nitrogen and then under high vacuum to afford the product as a colorless oil (0.516 g).

lithium 2-methyl-4-phenyl-1-(1,1,2,2-tetramethyl-2-(3-(2-phenylpropyl)cyclopenta-2,4-dien-1-ide-1-yl)disilaneyl)-1,5,6,7-tetrahydro-s-indacen-1-ide To a stirring solution of 1,1,2,2-tetramethyl-1-(2-methyl-4-phenyl-1,5,6,7-tetrahydro-s-indacen-1-yl)-2-(3-(2-phenylpropyl)cyclopenta-2,4-dien-1-yl)disilane (0.516 g, 0.947 mmol) in diethyl ether (20 mL), n-butyllithium (2.5M in hexanes, 0.76 mL, 0.002 mol, 2.01 eq) was added. The reaction was stirred at room temperature for 19 minutes. Volatiles were removed under a stream of nitrogen and then under high vacuum to afford the product as an orange solid, containing diethyl ether (0.31 eq) and hexane (0.29 eq) (0.588 g).

Tetramethyldisilylene (3-(2-phenylpropyl)-cyclopentadienyl) (2-methyl-4-phenyl-1,5,6,7-tetrahydro-s-indacenyl) zirconium(IV) dichloride To a precooled, stirring solution of lithium 2-methyl-4-phenyl-1-(1,1,2,2-tetramethyl-2-(3-(2-phenylpropyl)cyclopenta-2,4-dien-1-ide-1-yl)disilanyl)-1,5,6,7-tetrahydro-s-indacen-1-ide (0.588 g, 0.973 mmol) in diethyl ether (20 mL), zirconium(IV) chloride (0.227 g, 0.973 mmol, 1 eq) was added with diethyl ether (10 mL). The reaction was stirred at room temperature for 15 h. Volatiles were removed under a stream of nitrogen and then under high vacuum. The residue was extracted with dichloromethane (15 mL) and filtered over Celite. The dichloromethane extract was concentrated under a stream of nitrogen and then under high vacuum to afford the product as an orange-yellow powder (0.614 g, 89%, 1:1.3:1.7:1.9 ratio of isomers A, B, C, and D).
$^1$H NMR (400 MHz, CD$_2$Cl$_2$): δ 6.65 (dd, 1H, J=3.0, 2.3 Hz), 6.63-6.60 (m, 1H), 6.49 (s, 2H), 6.47 (s, 1H), 6.46 (s, 1H), 6.30 (t, 1H, J=2.1 Hz), 6.07 (dd, 1H, J=3.1, 2.1 Hz), 5.97 (t, 1H, J=2.2 Hz), 5.88 (dd, 1H, J=3.0, 2.1 Hz), 5.86-5.83 (m, 1H), 5.71 (dd, 1H, J=3.1, 2.3 Hz), 5.66-5.63 (m, 1H), 5.59-5.56 (m, 2H), 5.25 (t, 1H, J=2.2 Hz), 3.16-2.58 and 2.18-1.85 (m, 9H for each diastereomer), 2.322 (s, 3H, isomer A, used for isomer ratio), 2.318 (s, 3H, isomer B, used for isomer ratio), 2.30 (s, 3H, isomer D, used for isomer ratio), 2.29 (s, 3H, isomer C, used for isomer ratio), 1.23 (d, 3H, J=6.7 Hz), 1.21 (d, 3H, J=6.7 Hz), 1.20 (d, 3H, J=6.8 Hz), 1.15 (d, 3H, J=7.0 Hz), 0.66 (s, 3H), 0.62 (s, 3H), 0.61 (s, 3H), 0.60 (s, 3H), 0.58 (s, 3H), 0.56 (s, 3H), 0.52 (s, 3H), 0.52 (s, 3H), 0.49 (s, 3H), 0.49 (s, 3H), 0.48 (s, 3H), 0.44 (s, 3H), 0.42 (s, 3H), 0.42 (s, 3H), 0.37 (s, 3H), 0.31 (s, 3H).

Tetramethyldisilylene bis(3-n-butyl-cyclopentadienyl) zirconium(IV) dichloride (Metallocene E)

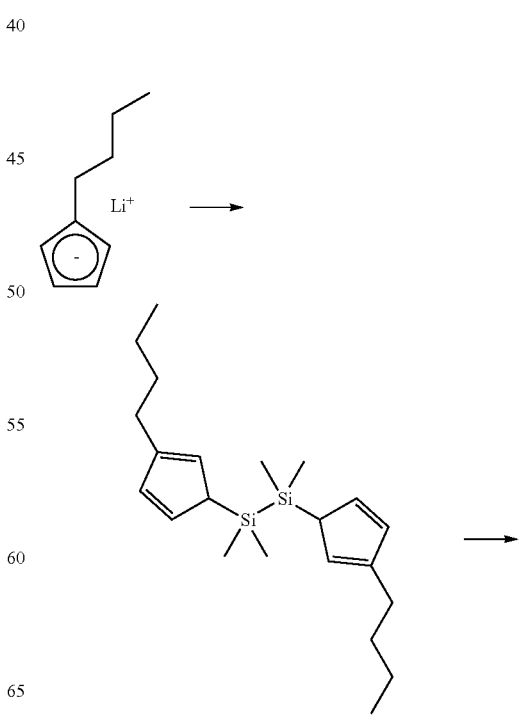

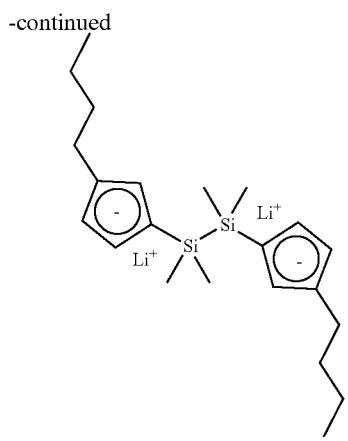

1,2-Bis(3-butylcyclopenta-2,4-dien-1-yl)-1,1,2,2-tetramethyldisilane

To a precooled, stirring solution of lithium 1-butylcyclopentadienide (0.589 g, 4.60 mmol, 2 eq) in tetrahydrofuran (10 mL), a precooled solution of 1,2-dichloro-1,1,2,2-tetramethyldisilane (0.430 g, 2.30 mmol) in tetrahydrofuran (5 mL) was added. The reaction was stirred at room temperature for 24h. Volatiles were removed under a stream of nitrogen and then under high vacuum. The residue was extracted with hexane and filtered over Celite. The extract was concentrated under a stream of nitrogen and then under high vacuum to afford the product (0.542 g).

Lithium 1,1'-(1,1,2,2-tetramethyldisilane-1,2-diyl)bis(3-butylcyclopenta-2,4-dien-1-ide)

To a precooled, stirring solution of 1,2-bis(3-butylcyclopenta-2,4-dien-1-yl)-1,1,2,2-tetramethyldisilane (0.542 g, 1.5 mmol) in diethyl ether (10 mL), n-butyllithium (2.5M in hexanes, 1.24 mL, 3.1 mmol, 2.05 eq) was added. The reaction was stirred at room temperature for 16h. Volatiles were removed under a stream of nitrogen and then under high vacuum. The residue was washed with hexane (3×5 mL) and concentrated under high vacuum to afford the product as a solid (0.537 g).

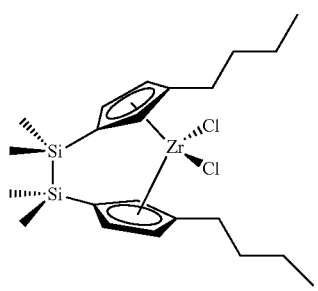

Tetramethyldisilylene Bis(3-n-butylcyclopentadienyl) zirconium(IV) chloride

To a precooled, stirring suspension of zirconium(IV) chloride (0.343 g, 1.48 mmol, 1.02 eq) in diethyl ether (10 mL), a precooled solution of lithium 1,1'-(1,1,2,2-tetramethyldisilane-1,2-diyl)bis(3-butylcyclopenta-2,4-dien-1-ide) (0.537 g, 1.45 mmol) in diethyl ether (20 mL) was added. The reaction was stirred at room temperature for 17h. Volatiles were removed under a stream of nitrogen and then under high vacuum. The residue was extracted with hexane. The hexane extract was concentrated under a stream of nitrogen and then high vacuum. The hexane extract was dissolved in hexane and cooled to −35° C. The precipitate was collected and washed with minimal cold hexane (5×1 mL). The cold hexane washed solid was concentrated under high vacuum to afford the product as a white solid (0.087 g, 11%, 1:4 ratio of diastereomers A and B). $^1$H NMR (400 MHz, $C_6D_6$): δ 6.50 (t, 2H, J=2.1 Hz, isomer A, used for isomer ratio), 6.48 (dd, 2H, J=3.1, 2.3 Hz, isomer B, used for isomer ratio), 6.33 (t, 2H, J=2.2 Hz, B), 6.26 (dd, 2H, J=3.1, 2.0 Hz, B), 6.25-6.23 (m, 2H, A), 6.19 (dd, 2H, J=3.1, 2.3 Hz, A), 2.99-2.77 (m, 4H of A, 2H of B), 2.73-2.63 (m, 2H, B), 1.62-1.41 (m, 4H each of A and B), 1.33-1.21 (m, 4H each of A and B), 0.90-0.80 (m, 6H each of A and B), 0.28 (s, 6H, A), 0.28 (s, 6H, B), 0.27 (s, 6H, B), 0.24 (s, 6H, A).

Synthesis of Tetramethyldisilylene cyclopentadienyl (4-bromo-indenyl) zirconium(IV) dichloride

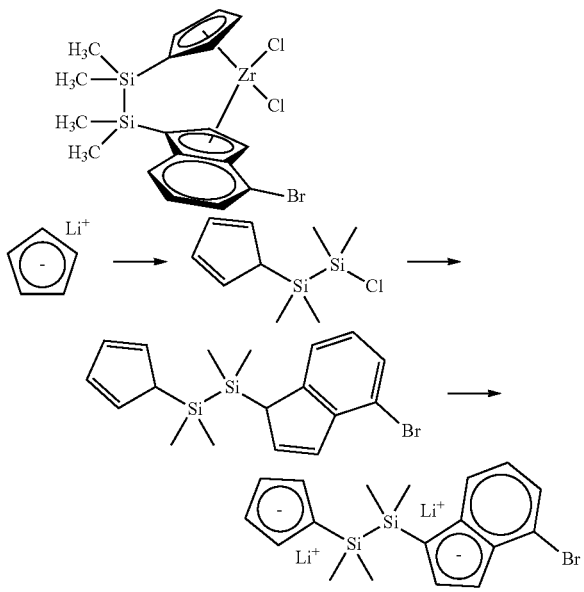

1-Chloro-2-(cyclopenta-2,4-dien-1-yl)-1,1,2,2-tetramethyldisilane

To a precooled, stirring solution of 1,2-dichloro-1,1,2,2-tetramethyldisilane (2.664 g, 14.23 mmol, 1 eq) in diethyl ether (100 mL), lithium cyclopentadienide (1.022 g, 14.19 mmol) was added with diethyl ether (10 mL). The reaction was stirred at room temperature for 2h. Then tetrahydrofuran (60 mL) was added, and diethyl ether was removed under a stream of nitrogen until all solids dissolved. The reaction was stirred at room temperature for 1.5h. Volatiles were removed under a stream of nitrogen and then under high vacuum. The residue was extracted with hexane (2×20 mL) and filtered over Celite. The combined hexane extracts were concentrated under a stream of nitrogen and then under high vacuum to afford the product as an amber oil (2.702 g).

1-(4-Bromo-1H-inden-1-yl)-2-(cyclopenta-2,4-dien-1-yl)-1,1,2,2-tetramethyldisilane To a precooled, stirring solution of 1-Chloro-2-(cyclopenta-2,4-dien-1-yl)-1,1,2,2-tetramethyldisilane (0.936 g, 4.32 mmol) in diethyl ether, lithium 4-bromo-1H-inden-1-ide (1.170 g, 4.36 mmol, 1.01 eq) was added. The reaction was stirred at room temperature for 20h. Volatiles were removed under a stream of nitrogen and then under high vacuum. The residue was extracted with hexane (2×10 mL) and filtered over Celite. The combined hexane extracts were concentrated under a stream of nitrogen and then under high vacuum to afford the product as an amber oil (1.71 g).

4-Bromo-1-(2-(cyclopenta-2,4-dien-1-ide-1-yl)-1,1,2,2-tetramethyldisilaneyl)-1H-inden-1-ide To a precooled, stirring solution of 1-(4-bromo-1H-inden-1-yl)-2-(cyclopenta-2,4-dien-1-yl)-1,1,2,2-tetramethyldisilane (1.170 g, 0.003 mol) in diethyl ether (20 mL), n-butyllithium (2.5M in hexanes, 2.5 mL, 0.006 mol, 2.01 eq) was added. The reaction was stirred at room temperature for 18h. Volatiles were removed under a stream of nitrogen and then under high vacuum. The residue was washed with hexane (10 mL) and concentrated under high vacuum to afford the product as a brown foam, containing diethyl ether (2.38 eq) (1.590 g).

Tetramethyldisilylene cyclopentadienyl (4-bromo-indenyl) zirconium(IV) dichloride To a precooled, stirring suspension of zirconium(IV) chloride (0.397 g, 0.002 mol, 1.01 eq) in diethyl ether (60 mL), lithium 4-bromo-1-(2-(cyclopenta-2,4-dien-1-ide-1-yl)-1,1,2,2-tetramethyldisilanyl)-1H-inden-1-ide (0.950 g, 0.002 mol) was added with diethyl ether (10 mL). The reaction was stirred at room temperature for 2h. Volatiles were removed under a stream of nitrogen and then under high vacuum. The residue was extracted with dichloromethane (3×10 mL) and filtered over Celite. The combined dichloromethane extracts were concentrated under a stream of nitrogen and then under high vacuum to give an orange solid. The extract was washed with hexane (30 mL), dissolved in toluene (10 mL), and cooled to −35° C. The precipitate was collected and concentrated under high vacuum. The cold toluene extract was concentrated under high vacuum with heat (50° C.). The residue was dissolved in minimal toluene (2 mL) and cooled to −35° C. The precipitate was collected, combined with the previous precipitate from cold toluene, and concentrated under high vacuum to afford the product as an orange-yellow powder (0.338 g, 36%). $^1$H NMR (400 MHz, C$_6$D$_6$): δ 7.42 (dt, 1H, J=8.5, 0.8 Hz), 7.23 (dd, 1H, J=7.2, 0.7 Hz), 6.83 (dd, 1H, J=3.4, 0.9 Hz), 6.69 (dd, 1H, J=8.5, 7.3 Hz), 6.47 (d, 1H, J=3.4 Hz), 6.29 (dt, 1H, J=3.1, 2.0 Hz), 6.20 (dt, 1H, J=3.1, 2.0 Hz), 6.17 (td, 1H, J=3.0, 1.9 Hz), 6.13 (td, 1H, J=3.0, 1.8 Hz), 0.39 (s, 3H), 0.24 (s, 3H), 0.23 (s, 3H), 0.22 (s, 3H).

Synthesis of Tetramethyldisilylene cyclopentadienyl (4-bromo-indenyl) hafnium(IV) dichloride

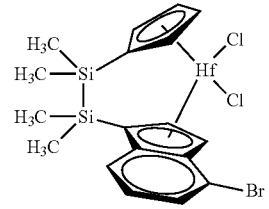

Tetramethyldisilylene cyclopentadienyl (4-bromo-indenyl) hafnium(IV) dichloride

To a precooled, stirring suspension of hafnium(IV) chloride (0.346 g, 0.001 mol, 1.02 eq) in diethyl ether (60 mL), lithium 4-bromo-1-(2-(cyclopenta-2,4-dien-1-ide-1-yl)-1,1,2,2-tetramethyldisilanyl)-1H-inden-1-ide (0.595 g, 0.001 mol) was added with diethyl ether (10 mL). The reaction was stirred at room temperature for 2h. Volatiles were removed under a stream of nitrogen and then under high vacuum. The residue was extracted with dichloromethane (3×10 mL) and filtered over Celite. The combined dichloromethane extracts were concentrated under a stream of nitrogen and then under high vacuum to give an off-white solid. The dichloromethane extracts were washed with hexane (30 mL), dissolved in toluene (10 mL) and cooled to −35° C. The precipitate was collected and concentrated under high vacuum to give the first fraction of product as an off-white solid (0.079 g). The cold toluene extract was concentrated under high vacuum with heat (50° C.). The residue was washed with minimal cold (−35° C.) toluene and concentrated under high vacuum to afford the second fraction of the product as an off-white solid (0.122 g; combined fractions 0.201 g, 30%). $^1$H NMR (400 MHz, C$_6$D$_6$): δ 7.42 (dt, 1H, J=8.5, 0.8 Hz), 7.23 (dd, 1H, J=7.3, 0.7 Hz), 6.72 (dd, 1H, J=3.4, 0.9 Hz), 6.68 (dd, 1H, J=8.5, 7.3 Hz), 6.41 (d, 1H, J=3.4 Hz), 6.21 (dt, 1H, J=3.1, 2.0 Hz), 6.10-6.06 (m, 2H), 6.04 (dt, 1H, J=3.1, 2.4 Hz), 0.40 (s, 3H), 0.25 (s, 3H), 0.23 (s, 3H), 0.23 (s, 3H).

Tetramethyldisilylene (3-n-butyl-cyclopentadienyl) (4-bromo-indenyl) zirconium(IV) dichloride

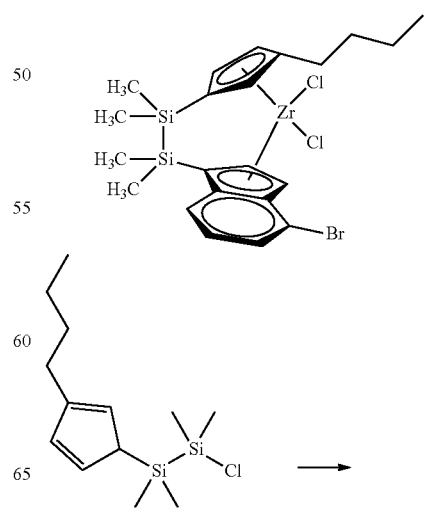

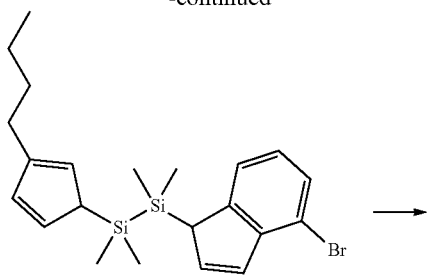

1-(4-Bromo-1H-inden-1-yl)-2-(3-butylcyclopenta-2,4-dien-1-yl)-1,1,2,2-tetramethyldisilane To a precooled, stirring solution of 1-chloro-1,1,2,2-tetramethyl-2-(4-phenyl-1,5,6,7-tetrahydro-s-indacen-1-yl)disilane (0.548 g, 1.88 mmol) in diethyl ether (20 mL), lithium 4-bromo-1H-inden-1-ide (0.506 g, 1.89 mmol, 1.01 eq) was added with diethyl ether (10 mL). The reaction was stirred at room temperature for 20h. Volatiles were removed under a stream of nitrogen and then under high vacuum. The residue was extracted with hexane (2×10 mL) and filtered over Celite. The combined hexane extracts were concentrated under a stream of nitrogen and then under high vacuum to afford the product as a light brown oil (0.793 g).

Lithium 4-bromo-1-(2-(3-butylcyclopenta-2,4-dien-1-ide-1-yl)-1,1,2,2-tetramethyldisilaneyl)-1H-inden-1-ide To a precooled, stirring solution of 4-bromo-1-(2-(3-butylcyclopenta-2,4-dien-1-ide-1-yl)-1,1,2,2-tetramethyldisilaneyl)-1H-inden-1-ide (0.793 g, 1.84 mmol) in diethyl ether (20 mL), n-butyllithium (2.5M in hexanes, 1.5 mL, 3.77 mmol, 2.05 eq) was added. The reaction was stirred at room temperature for 2h. Volatiles were removed under a stream of nitrogen and then under high vacuum. The residue was washed with hexane (10 mL, then 5 mL) and toluene (5 mL) and concentrated under high vacuum to afford the product as a dark orange solid, containing toluene (2 eq) (0.908 g).

Tetramethyldisilylene (3-n-butyl-cyclopentadienyl)(4-bromo-indenyl) zirconium(IV) dichloride To a precooled, stirring suspension of zirconium(IV) chloride (0.353 g, 1.52 mmol, 1.05 eq) in diethyl ether (15 mL), lithium 4-bromo-1-(2-(3-butylcyclopenta-2,4-dien-1-ide-1-yl)-1,1,2,2-tetramethyldisilaneyl)-1H-inden-1-ide (0.908 g, 1.45 mmol) was added with diethyl ether (20 mL). The reaction was stirred at room temperature for 17h. Volatiles were removed under a stream of nitrogen and then under high vacuum. The residue was extracted with dichloromethane (2×15 mL) and filtered over Celite. The combined dichloromethane extracts were concentrated under a stream of nitrogen and then under high vacuum. The dichloromethane extract was extracted with hexane (30 mL) and concentrated under a stream of nitrogen and then under high vacuum to give a yellow foam. The foam was dissolved in toluene (1 mL) and diluted with hexane (3 mL). The resulting suspension was cooled to −35° C. The cold toluene-hexane extract was collected and concentrated under a stream of nitrogen and then under high vacuum. Hexane (3 mL) was added to the residue, and the mixture was heated to 65° C. The mixture was filtered while hot, and the solution was allowed to cool to room temperature. The solution was then cooled further to −35° C. The precipitate was collected and concentrated under high vacuum to afford the product as a yellow solid (0.080 g, 9%, ratio of 1:1 isomers A and B). $^1$H NMR (400 MHz, CD$_2$Cl$_2$): δ 7.69 (dt, 1H, J=8.5, 0.8 Hz, isomer A, used for isomer ratio), 7.64 (dt, 1H, J=8.5, 0.8 Hz, isomer B, used for isomer ratio), 7.48 (dd, 1H, J=3.4, 0.7 Hz), 7.46 (dd, 1H, J=3.3, 0.7 Hz), 7.18-7.12 (m, 2H), 7.05-7.02 (m, 2H), 6.84-6.81 (m, 2H), 6.71 (dd, 1H, J=3.1, 2.3 Hz), 6.52 (t, 1H, J=2.2 Hz), 6.33 (dd, 1H, J=3.1, 2.3 Hz), 6.24 (t, 1H, J=2.1 Hz), 6.20 (dd, 1H, J=3.1, 2.0 Hz), 6.05 (dd, 1H, J=3.0, 2.1 Hz), 2.65-2.42 (m, 3H), 2.34-2.24 (m, 1H), 1.58-1.20 (m, 8H), 0.90 (t, 3H, J=7.3 Hz), 0.86 (t, 3H, J=7.2 Hz), 0.64 (s, 3H), 0.63 (s, 3H), 0.54 (s, 3H), 0.53 (s, 3H), 0.51 (s, 6H), 0.61 (s, 3H), 0.43 (s, 3H).

Synthesis of Tetramethyldisilylene (tetramethylcyclopentadienyl) indenyl zirconium(IV) dichloride

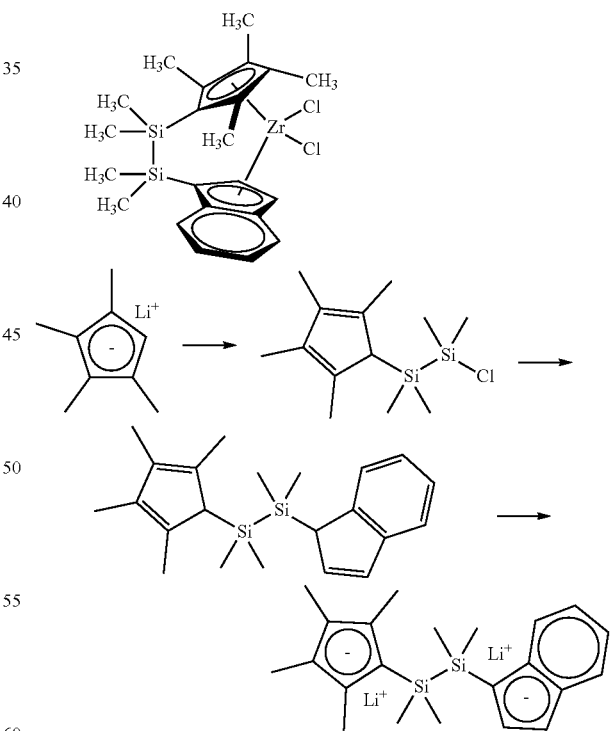

1-Chloro-1,1,2,2-tetramethyl-2-(2,3,4,5-tetramethyl-cyclopenta-2,4-dien-1-yl)disilane To a precooled, stirring solution of 1,2-dichloro-1,1,2,2-tetramethyldisilane (0.513 g, 0.003 mol, 1.02 eq) in tetrahydrofuran (20 mL), lithium tetramethylcyclopentadienide (0.345 g, 0.003 mol) was added with tetrahydrofuran (10 mL). The reaction was stirred at room temperature for 35 minutes. Volatiles were removed under a stream of nitrogen and then under high vacuum. The residue was extracted with hexane (2×20 mL) and filtered over Celite. The combined hexane extracts were concentrated under a stream of nitrogen and then under high vacuum to afford the product as a clear, colorless oil (0.650 g).

1-(1H-Inden-1-yl)-1,1,2,2-tetramethyl-2-(2,3,4,5-tetramethylcyclopenta-2,4-dien-1-yl)disilane To a precooled, stirring solution of 1-chloro-1,1,2,2-tetramethyl-2-(2,3,4,5-tetramethylcyclopenta-2,4-dien-1-yl)disilane (0.650 g, 0.002 mol) in diethyl ether (20 mL), lithium indenide (0.297 g, 0.002 mol, 1.02 eq) with diethyl ether (10 mL) was added. The reaction was stirred at room temperature for 21h. Then, additional lithium indenide (0.159 g, 0.001 mol, 0.55 eq) was added. The reaction was stirred for an additional 18h. Volatiles were removed under a stream of nitrogen and then under high vacuum. The residue was extracted with hexane (2×20 mL) and filtered over Celite. The combined hexane extracts were concentrated under a stream of nitrogen and then under high vacuum to afford the product as a pink solid (0.726 g).

Lithium 1-(1,1,2,2-tetramethyl-2-(2,3,4,5-tetramethylcyclopenta-2,4-dien-1-ide-1-yl)disilaneyl)-1H-inden-1-ide To a precooled, stirring solution of 1-(1H-inden-1-yl)-1,1,2,2-tetramethyl-2-(2,3,4,5-tetramethylcyclopenta-2,4-dien-1-yl)disilane (0.726 g, 0.002 mol) in diethyl ether (30 mL), n-butyllithium (2.5M in hexanes, 1.8 mL, 0.005 mol, 2.19 eq) was added. The reaction was stirred at room temperature for 70 minutes. Volatiles were removed under a stream of nitrogen and then under high vacuum. The residue was washed with hexane (20 mL) and concentrated under high vacuum to afford the product as a white solid with diethyl ether (0.28 eq) and hexane (0.39 eq) (0.726 g).

Tetramethyldisilylene (tetramethylcyclopentadienyl) indenyl zirconium(IV) dichloride To a precooled, stirring suspension of lithium 1-(1,1,2,2-tetramethyl-2-(2,3,4,5-tetramethylcyclopenta-2,4-dien-1-ide-1-yl)disilanyl)-1H-inden-1-ide (0.726 g, 0.002 mol) in diethyl ether (30 mL), zirconium(IV) chloride (0.416 g, 0.002 mol, 1.03 eq) was added with diethyl ether (10 mL). The reaction was stirred at room temperature for 4h. Volatiles were removed under a stream of nitrogen and then under high vacuum. The residue was extracted with dichloromethane and filtered over Celite. The dichloromethane extract was concentrated under a stream of nitrogen and then under high vacuum. The residue was washed with hexane (20 mL) and concentrated under high vacuum to afford the product as a pale yellow powder (0.075 g, 8%). $^1$H NMR (400 MHz, $CD_2Cl_2$): δ 7.75 (dt, 1H, J=8.4, 1.1 Hz), 7.50 (dq, 1H, J=8.6, 1.0 Hz), 7.31 (ddd, 1H, J=8.6, 6.7, 1.2 Hz), 7.19 (ddd, 1H, J=8.4, 6.7, 1.0 Hz), 6.73 (d, 1H, J=3.4 Hz), 6.50 (dd, 1H, J=3.4, 0.9 Hz), 2.32 (s, 3H), 2.07 (s, 3H), 1.95 (s, 3H), 1.83 (s, 3H), 0.74 (s, 3H), 0.71 (s, 3H), 0.50 (s, 3H), 0.47 (s, 3H).

Tetramethyldisilylene bis(4-(3',5'-di-tert-butylphenyl)-indenyl) zirconium dichloride (Metallocene F and L) were prepared as described in U.S. Publication No. 2017/0015686.

Tetramethyldisilylene (3-neopentyl-cyclopentadienyl) (4-phenyl-1,5,6,7-tetrahydro-s-indacenyl) zirconium dichloride

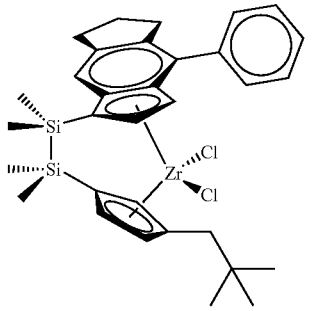

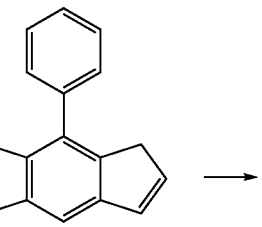

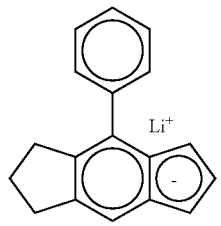

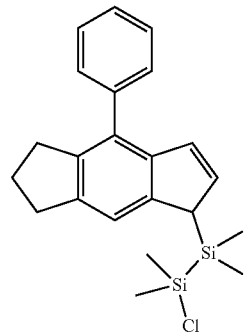

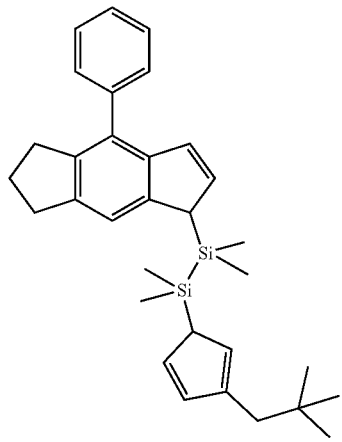

-continued

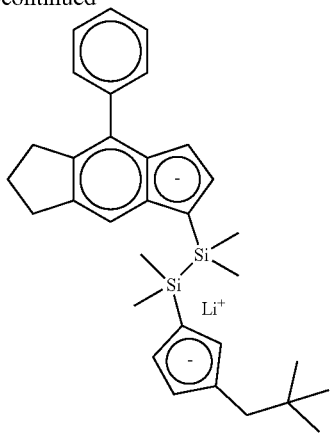

Lithium 4-phenyl-1,5,6,7-tetrahydro-s-indacenide

To a stirring solution of 4-phenyl-1,5,6,7-tetrahydro-s-indacene (2.507 g, 10.79 mmol) in diethyl ether (30 mL), n-butyllithium (4.4 mL, 2.5M in hexanes, 11.00 mmol, 1.02 eq) was added. The reaction was stirred at room temperature for 75 minutes. The reaction was then concentrated under a stream of nitrogen and then under high vacuum. The residue was washed with a mixture of diethyl ether (5 mL) and hexane (20 mL) and concentrated under high vacuum to afford the product as a pink solid, containing diethyl ether (0.06 eq) and hexane (0.02 eq) (2.370 g).

1-Chloro-1,1,2,2-tetramethyl-2-(4-phenyl-1,5,6,7-tetrahydro-s-indacen-1-yl)disilane To a stirring solution of 1,2-dichloro-1,1,2,2-tetramethyldisilane (1.886 g, 10.07 mmol, 1 eq) in diethyl ether (20 mL), a solution of 4-phenyl-1,5,6,7-tetrahydro-s-indacenide (2.370 g, 10.08 mmol) in diethyl ether (20 mL) was added dropwise. The reaction was stirred at room temperature overnight. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as a yellow oil (3.654 g).

1,1,2,2-Tetramethyl-1-(3-neopentylcyclopenta-2,4-dien-1-yl)-2-(4-phenyl-1,5,6,7-tetrahydro-s-indacen-1-yl)disilane To a stirring solution of 1-chloro-1,1,2,2-tetramethyl-2-(4-phenyl-1,5,6,7-tetrahydro-s-indacen-1-yl)disilane (2.632 g, 6.87 mmol) in diethyl ether (30 mL), lithium neopentyl-cyclopentadienide (0.978 g, 6.88 mmol, 1 eq) was added with diethyl ether (10 mL) and tetrahydrofuran (10 mL). The reaction was stirred at room temperature for 4.5h. The reaction was concentrated under a stream of nitrogen and then under high vacuum. The residue was extracted with pentane (2×20 mL) and filtered over Celite. The combined pentane extracts were concentrated under a stream of nitrogen and then under high vacuum to afford the product as a pale, orange oil, containing pentane (0.77 eq) and tetrahydrofuran (1.28 eq) (3.901 g).

Lithium 4-phenyl-1-(1,1,2,2-tetramethyl-2-(3-neopentylcyclopenta-2,4-dien-1-ide-1-yl)disilaneyl)-1,5,6,7-tetrahydro-s-indacen-1-ide To a stirring solution of 1,1,2,2-tetramethyl-1-(3-neopentylcyclopenta-2,4-dien-1-yl)-2-(4-phenyl-1,5,6,7-tetrahydro-s-indacen-1-yl)disilane (3.901 g, 6.185 mmol) in diethyl ether (20 mL), n-butyllithium (5.0 mL, 2.5M in hexanes, 12.50 mmol, 2.02 eq) was added. The reaction was stirred at room temperature for 15.5h. An additional amount of n-butyllithium (1.0 mL, 2.5M in hexanes, 2.5 mmol, 0.40 eq) was added. The reaction was stirred for an additional 16h. The reaction was filtered on a plastic, fritted funnel. The collected solid was washed with diethyl ether (5 mL). The solid was collected and concentrated under high vacuum to afford the product as a tan solid, containing diethyl ether (0.35 eq) and hexane (0.3 eq) (2.112 g).

Tetramethyldisilylene (3-neopentyl-cyclopentadienyl) (4-phenyl-1,5,6,7-tetrahydro-s-indacenyl) zirconium dichloride To a stirring suspension of lithium 4-phenyl-1-(1,1,2,2-tetramethyl-2-(3-neopentylcyclopenta-2,4-dien-1-ide-1-yl)disilaneyl)-1,5,6,7-tetrahydro-s-indacen-1-ide (2.112 g, 3.86 mmol) in diethyl ether (20 mL), zirconium(IV) chloride (0.900 g, 3.86 mmol, 1 eq) was added. The reaction was stirred at room temperature for 16h. The reaction was concentrated under a stream of nitrogen and then under high vacuum. The residue was extracted with dichloromethane (20 mL, then 10 mL) and filtered over Celite. The combined dichloromethane extracts were concentrated under a stream of nitrogen and then under high vacuum to give a dark brown foam. The foam was dissolved in dichloromethane (5 mL) and diluted with pentane (20 mL) and stirred at room temperature. The mixture was then allowed to settle, and the supernatant was collected. The supernatant dichloromethane-pentane mixture was cooled to −35° C., leading to precipitation. The precipitate was separated from the cold dichloromethane-pentane supernatant. The precipitated was extracted with hexane (2×10 mL), and the hexane extracts were concentrated under a stream of nitrogen and then under high vacuum to give the first fraction of product. The cold dichloromethane-pentane supernatant was concentrated under a stream of nitrogen and then under high vacuum. The concentrated cold dichloromethane-pentane extract was washed with hexane (2 mL) and concentrated under high vacuum to give the second fraction of product. The product fractions were combined to afford the product as a yellow foam (0.735 g, 29%, ratio of 1:4.8 isomers A and B). $^1$H NMR (400 MHz, CD$_2$Cl$_2$): δ 7.58 (s, 1H, isomer B, used for isomer ratio), 7.56 (s, 1H, isomer A, used for isomer ratio), 7.49-7.32 (m, 13H), 6.91 (m, 1H), 6.87 (d, 1H, J=3.5 Hz), 6.69 (d, 1H, J=3.3 Hz), 6.37 (s, 1H), 6.17 (m, 1H), 6.08 (s, 1H), 5.91 (s, 1H), 3.20-3.00 (m, 6H), 2.70-2.61 (m, 2H), 2.42 (d, 1H, J=13.6 Hz), 2.32 (d, 1H, J=13.6 Hz), 2.21 (d, 1H, J=13.7 Hz), 2.19-2.08 (m, 2H), 1.99-1.88 (m, 2H), 1.82 (d, 1H, J=13.4 Hz), 0.82-0.78 (s br sh, 18H), 0.66 (s, 3H), 0.64 (s, 3H), 0.57 (s, 3H), 0.54-0.51 (s br sh, 6H), 0.51 (s, 3H), 0.51 (s, 3H), 0.48 (s, 3H).

115

Tetramethyldisilylene (4-(o-biphenyl)-indenyl) (3-butyl-cyclopentadienyl) zirconium dichloride

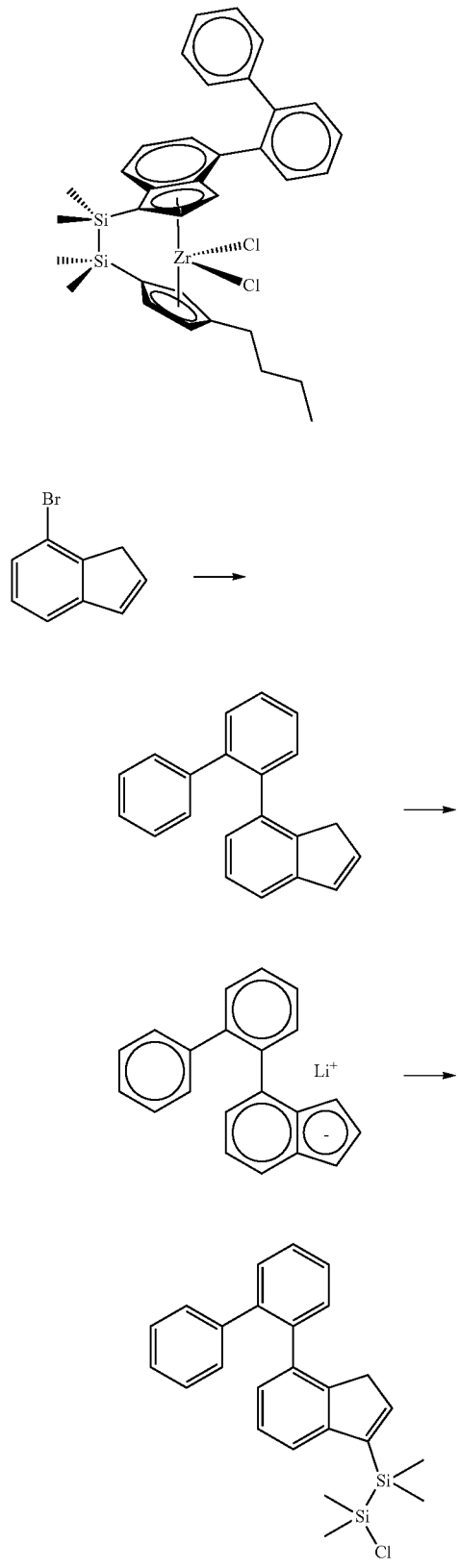

116

-continued

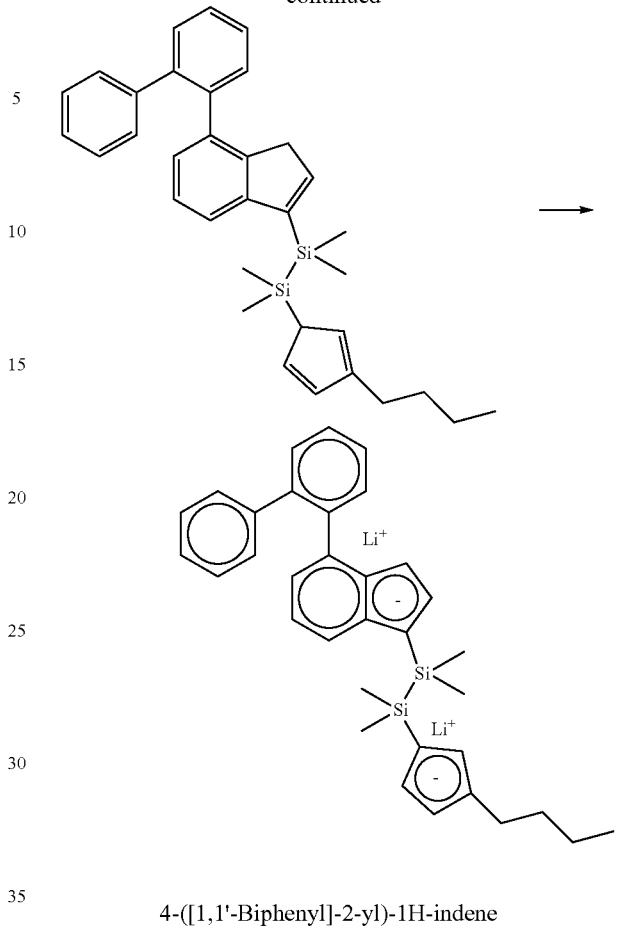

4-([1,1'-Biphenyl]-2-yl)-1H-indene

To a nitrogen-purged solution of 7-bromoindene (7.366 g, 37.76 mmol) in 1,4-dioxane (60 mL) and water (20 mL), 2-biphenylboronic acid (14.96 g, 75.55 mmol, 2.00 eq), potassium carbonate (16.17 g, 115.35 mmol, 3.05 eq), and trans-dichlorobis(triphenylphosphine)palladium(II) (1.394 g, 1.986 mmol, 0.05 eq) were added with additional water (10 mL). The reaction was stirred and heated to 80° C. for 6h. The reaction was allowed to cool to room temperature. The reaction was poured into water (200 mL) and extracted with ethyl acetate. The combined ethyl acetate extracts were washed with brine and dried over sodium sulfate. The mixture was filtered, and the filtrate was concentrated in vacuo to give a dark brown oil. The oil was purified via silica gel column chromatography to afford the product (5.383 g).

Lithium 4-([1,1'-biphenyl]-2-yl)-1H-inden-1-ide

To a stirring solution of 4-([1,1'-biphenyl]-2-yl)-1H-indene (5.383 g, 20.06 mmol) in diethyl ether (50 mL), n-butyllithium (8.1 mL, 2.5M in hexanes, 20.25 mmol, 1.01 eq) was added. The reaction was stirred at room temperature for 95 minutes. The reaction was concentrated under a stream of nitrogen and then under high vacuum. The residue was washed with hexane and concentrated under high vacuum to afford the product as a tan powder, containing diethyl ether (0.11 eq) and hexane (0.16 eq) (5.644 g).

1-(4-([1,1'-Biphenyl]-2-yl)-1H-inden-1-yl)-2-chloro-1,1,2,2-tetramethyldisilane To a stirring solution of 1,2-dichloro-1,1,2,2-tetramethyldisilane (0.691 g, 3.69 mmol, 1 eq) in diethyl ether (10 mL), a solution of lithium 4-([1,1'-biphenyl]-2-yl)-1H-inden-1-ide (1.094 g, 3.69 mmol) in diethyl ether (20 mL) was added. The reaction was stirred at room temperature for 100 minutes. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as an oil, containing hexane (0.13 eq) (1.550 g).

1-(4-([1,1'-Biphenyl]-2-yl)-1H-inden-1-yl)-2-(3-butylcyclopenta-2,4-dien-1-yl)-1,1,2,2-tetramethyldisilane To a stirring solution of 1-(4-([1,1'-biphenyl]-2-yl)-1H-inden-1-yl)-2-chloro-1,1,2,2-tetramethyldisilane (1.550 g, 3.60 mmol) in tetrahydrofuran (20 mL), a solution of lithium butylcyclopentadienide (0.460 g, 3.59 mmol, 1 eq) in tetrahydrofuran (20 mL) was added. The reaction was stirred at room temperature for 90 minutes. The reaction was concentrated under a stream of nitrogen and then under high vacuum. The residue was stirred in hexane (40 mL) at room temperature for 10 minutes and then cooled to −35° C. While cold, the mixture was filtered over Celite and extracted with additional hexane (5 mL). The combined hexane extracts were concentrated under a stream of nitrogen and then under high vacuum to afford the product as an amber oil, containing hexane (0.13 eq) (1.711 g).

Lithium 4-([1,1'-biphenyl]-2-yl)-1-(2-(3-butylcyclopenta-2,4-dien-1-ide-1-yl)-1,1,2,2-tetramethyldisilaneyl)-1H-inden-1-ide To a stirring solution of 1-(4-([1,1'-biphenyl]-2-yl)-1H-inden-1-yl)-2-(3-butylcyclopenta-2,4-dien-1-yl)-1,1,2,2-tetramethyldisilane (1.71 g, 3.31 mmol) in diethyl ether (20 mL), n-butyllithium (2.7 mL, 2.5M in hexanes, 6.75 mmol, 2.04 eq) was added. The reaction was stirred at room temperature for 15 minutes. The reaction was concentrated under a stream of nitrogen and then under high vacuum. The residue was washed with hexane (2×10 mL) and concentrated under high vacuum to afford the product as a light tan powder, containing diethyl ether (0.18 eq) and hexane (0.64 eq) (1.704 g).

Tetramethyldisilylene (4-(o-biphenyl)-indenyl) (3-butyl-cyclopentadienyl) zirconium dichloride To a stirring solution of lithium 4-([1,1'-biphenyl]-2-yl)-1-(2-(3-butylcyclopenta-2,4-dien-1-ide-1-yl)-1,1,2,2-tetramethyldisilaneyl)-1H-inden-1-ide (1.704 g, 2.91 mmol) in diethyl ether (30 mL), zirconium(IV) chloride (0.680 g, 2.92 mmol, 1 eq) was added with diethyl ether (30 mL). The reaction was stirred at room temperature for 15.5h. The reaction was concentrated under a stream of nitrogen and then under high vacuum. The residue was extracted with dichloromethane (2×20 mL) and filtered over Celite. The combined dichloromethane extracts were concentrated under a stream of nitrogen and then under high vacuum to give an orange-red foam. Hexane (10 mL) was added to the foam, and the mixture was stirred overnight. The resulting suspension was filtered over Celite. The hexane washed solid filtered onto Celite was extracted with dichloromethane. The dichloromethane extract was concentrated under a stream of nitrogen and then under high vacuum to afford a fraction of the product (0.962 g, 49%, 1:2 ratio of isomers A and B). (A small portion of the hexane washed dichloromethane extract can be dissolved in minimal dichloromethane and diluted with hexane (ten times the volume of dichloromethane used); in approximately three days, yellow crystals form, with >20:1 enrichment of isomer B over isomer A.) To the hexane extract, pentane was added, and the mixture was cooled to −35° C. The resulting precipitate was collected and concentrated under high vacuum to afford another fraction of the product (0.828 g, 42%, 5:1 ratio of isomers A and B). Mixing the two fractions generated the combined product as a 1.3:1 ratio of isomers A and B, respectively. $^1$H NMR (400 MHz, CD$_2$Cl$_2$): δ 7.91 (dd, 1H, J=7.6, 1.5 Hz, B), 7.89 (d, 1H, J=7.9 Hz, A), 7.57 (d, 1H, J=8.5 Hz, A), 7.51 (d, 1H, J=8.5 Hz, B), 7.43 (dd, 1H, J=7.6, 1.5 Hz, B), 7.42-7.23 (m, 5H, A), 7.33 (td, 1H, J=7.5, 1.6 Hz, B), 7.28 (td, 1H, J=7.4, 1.5 Hz, B), 7.25-7.18 (m, 3H, B), 7.12 (br t, 1H, J=7.7 Hz, B), 7.09-6.76 (m, 6H, A), 6.95-6.83 (m, 2H, B), 6.83-6.75 (m, 1H, B), 6.62 (s, 1H, A), 6.55 (br s, 1H, B), 6.35 (s, 1H, A), 6.33 (d, 1H, J=3.5 Hz, B), 6.24 (s, 1H, B), 6.21 (dd, 1H, J=3.1, 2.3 Hz, B), 6.11 (dd, 1H, J=3.1, 2.3 Hz, isomer A, used for isomer ratio), 6.03 (dd, 1H, J=3.1, 2.1 Hz, isomer B, used for isomer ratio), 5.93 (s, 1H, A), 2.72-2.60 (m, 1H each, A and B), 2.56-2.44 (m, 1H each, A and B), 1.46-1.31 (m, 2H each, A and B), 1.24-1.09 (m, 2H each, A and B), 0.79 (t, 3H, J=7.3 Hz, B), 0.76 (t, 3H, J=7.3 Hz, A), 0.36 (s, 3H, B), 0.34 (s, 3H, A), 0.33 (s, 3H, A), 0.31 (s, 3H, B), 0.28 (s, 3H, A), 0.25 (s, 3H, A), 0.22 (s, 3H, B), 0.21 (s, 3H, B).

Tetramethyldisilylene (3-butyl-cyclopentadienyl) (1,5,6,7-tetrahydro-s-indacenyl) zirconium dichloride

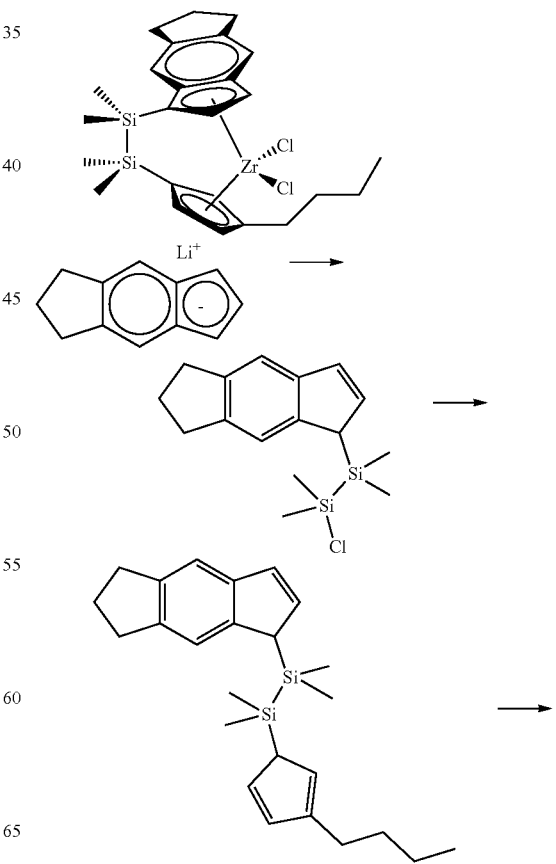

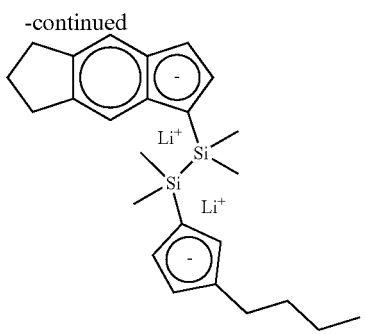

1-Chloro-1,1,2,2-tetramethyl-2-(1,5,6,7-tetrahydro-s-indacen-1-yl)disilane

To a precooled, stirring solution of 1,2-dichloro-1,1,2,2-tetramethyldisilane (2.826 g, 15.10 mmol, 1 eq) in diethyl ether (30 mL), a suspension of lithium 1,5,6,7-tetrahydro-s-indacenide (2.450 g, 15.11 mmol) in diethyl ether (40 mL) was added. The reaction was stirred at room temperature for 75 minutes. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as an orange oil (4.511 g).

1-(3-Butylcyclopenta-2,4-dien-1-yl)-1,1,2,2-tetramethyl-2-(1,5,6,7-tetrahydro-s-indacen-1-yl)disilane To a stirring solution of 1-chloro-1,1,2,2-tetramethyl-2-(1,5,6,7-tetrahydro-s-indacen-1-yl)disilane (4.511 g, 14.69 mmol) in tetrahydrofuran (40 mL), lithium butylcyclopentadienide (1.880 g, 14.67 mmol, 1 eq) was added with tetrahydrofuran (10 mL). The reaction was stirred at room temperature for 73 minutes. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as a red oil (4.291 g).

Lithium 1-(2-(3-butylcyclopenta-2,4-dien-1-ide-1-yl)-1,1,2,2-tetramethyldisilaneyl)-1,5,6,7-tetrahydro-s-indacen-1-ide To a stirring solution of 1-(3-butylcyclopenta-2,4-dien-1-yl)-1,1,2,2-tetramethyl-2-(1,5,6,7-tetrahydro-s-indacen-1-yl)disilane (4.291 g, 10.93 mmol) in diethyl ether (20 mL), n-butyllithium (8.8 mL, 2.5M in hexanes, 22.00 mmol, 2.01 eq) was added. The reaction was stirred at room temperature for 16h. The reaction was filtered on a plastic fritted funnel and washed with hexane (10 mL). The filtered solid was collected and concentrated under high vacuum to afford the product as a white solid, containing diethyl ether (0.15 eq) and hexane (0.05 eq) (4.060 g).

Tetramethyldisilylene (3-butyl-cyclopentadienyl) (1,5,6,7-tetrahydro-s-indacenyl) zirconium dichloride To a stirring suspension of zirconium(IV) chloride (2.284 g, 9.80 mmol, 1.02 eq) in diethyl ether (20 mL), a suspension of lithium 1-(2-(3-butylcyclopenta-2,4-dien-1-ide-1-yl)-1,1,2,2-tetramethyldisilaneyl)-1,5,6,7-tetrahydro-s-indacen-1-ide (4.060 g, 9.65 mmol) in diethyl ether (20 mL) was added. The reaction was stirred at room temperature for 2.5h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. The dichloromethane extract was stirred overnight in hexane (30 mL). The resulting suspension was filtered over Celite. The hexane extract was concentrated under a stream of nitrogen and then under high vacuum to give a yellow foam. The hexane extract was washed with cold hexane (2×10 mL) and concentrated under high vacuum to give a bright yellow solid. The solid was completely dissolved in minimal dichloromethane (1 mL), and hexane (5 mL) was added slowly to the solution. The mixture was cooled to −35° C. overnight. The resulting precipitate was collected and concentrated under high vacuum to afford a fraction of product as a bright yellow solid (1.239 g, 23%, ratio of 1:1.8 isomers A and B). The hexane washed dichloromethane extract was collected and extracted with hot hexane. The hot hexane extract was collected and concentrated under a stream of nitrogen and then under high vacuum. The hot hexane extract was dissolved in minimal dichloromethane (1 mL) and hexane (5 mL) was added. This mixture was cooled to −35° C. overnight. The resulting precipitate was collected and concentrated under a stream of nitrogen and then under high vacuum to afford another fraction of the product as a bright yellow solid (0.489 g, 9%, ratio of 1:5 isomers A and B). $^1$H NMR (400 MHz, CD$_2$Cl$_2$): δ 7.58 (s, 1H, isomer B, used for isomer ratio), 7.57 (s, 1H, isomer A, used for isomer ratio), 7.53-7.49 (m, 2H), 6.93 (d, 2H, J=3.4 Hz), 6.70 (dd, 1H, J=3.1, 2.3 Hz), 6.61 (dd, 1H, J=3.4, 0.9 Hz), 6.60-6.59 (m, 1H), 6.48 (t, 1H, J=2.2 Hz), 6.13 (dd, 1H, J=3.0, 2.1 Hz), 5.93 (dd, 1H, J=3.1, 2.3 Hz), 5.89 (t, 1H, J=2.2 Hz), 5.85 (dd, 1H, J=3.1, 2.0 Hz), 3.13-2.86 (m, 8H), 2.61-2.44 (m, 3H), 2.37-2.27 (m, 1H), 2.19-1.99 (m, 4H), 1.57-1.14 (m, 8H), 0.88 (t, 3H, J=7.3 Hz), 0.84 (t, 3H, J=7.1 Hz), 0.60 (s, 3H), 0.58 (s, 3H), 0.54 (s, 3H), 0.52 (s, 3H), 0.51 (s, 3H), 0.50 (s, 3H), 0.49 (s, 3H), 0.46 (s, 3H).

Tetramethyldisilylene (benz[e]inden-3-yl) (3-butyl-cyclopentadienyl) zirconium dichloride

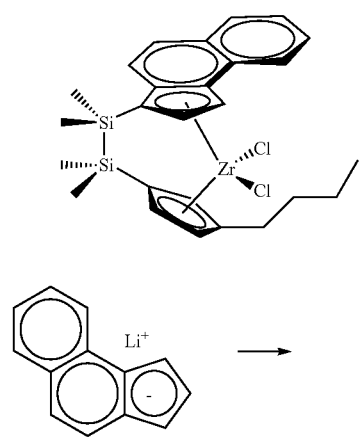

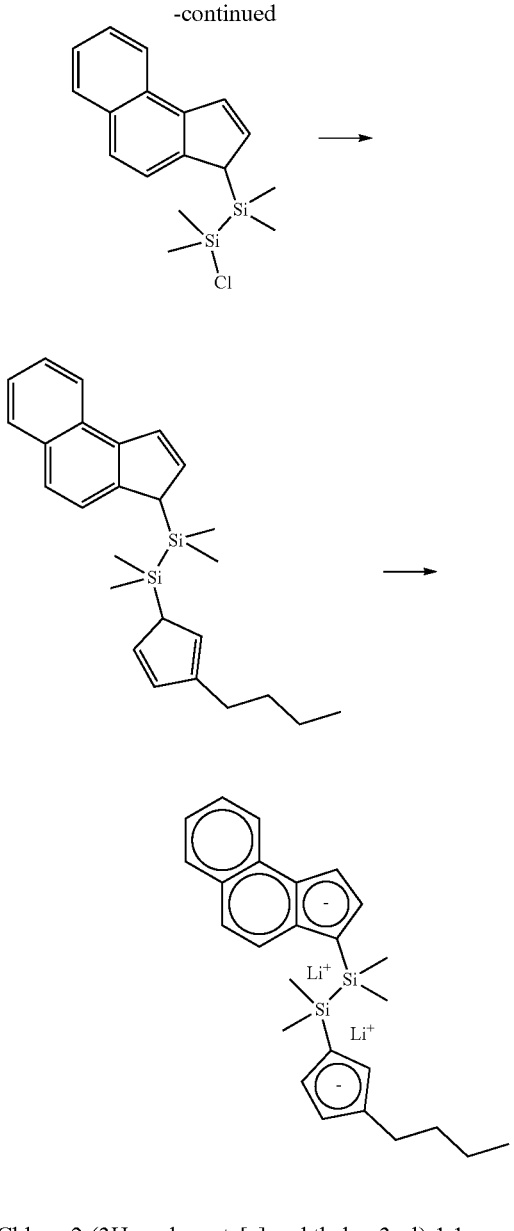

1-Chloro-2-(3H-cyclopenta[a]naphthalen-3-yl)-1,1,2,2-tetramethyldisilane

To a stirring solution of 1,2-dichloro-1,1,2,2-tetramethyldisilane (2.731 g, 14.59 mmol, 1.01 eq) in diethyl ether (30 mL), a suspension of lithium benz[e]indenide (2.542 g, 14.52 mmol) in diethyl ether (20 mL) was added slowly. The reaction was stirred at room temperature until complete. The reaction was concentrated under a stream of nitrogen and then under high vacuum. The residue was washed with hexane (3×10 mL) and then extracted with dichloromethane (3×20 mL) and filtered over Celite. The combined dichloromethane extracts were concentrated under a stream of nitrogen and then under high vacuum to afford the product as a white solid (2.884 g).

1-(3-Butylcyclopenta-2,4-dien-1-yl)-2-(3H-cyclopenta[a]naphthalen-3-yl)-1,1,2,2-tetramethyldisilane To a stirring solution of 1-chloro-2-(3H-cyclopenta[a]naphthalen-3-yl)-1,1,2,2-tetramethyldisilane (2.884 g, 9.10 mmol) in tetrahydrofuran (20 mL), a solution of lithium butylcyclopentadienide (1.162 g, 9.07 mmol, 1 eq) in tetrahydrofuran (20 mL) was added. The reaction was stirred at room temperature for 58 minutes. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as a red oil (3.565 g).

Lithium 3-(2-(3-butylcyclopenta-2,4-dien-1-ide-1-yl)-1,1,2,2-tetramethyldisilaneyl)-3H-cyclopenta[a]naphthalen-3-ide To a stirring solution of 1-(3-butylcyclopenta-2,4-dien-1-yl)-2-(3H-cyclopenta[a]naphthalen-3-yl)-1,1,2,2-tetramethyldisilane (3.565 g, 8.85 mmol) in diethyl ether (40 mL), n-butyllithium (7.1 mL, 2.5M in hexanes, 17.75 mmol, 2.01 eq) was added. The reaction was stirred at room temperature for 32 minutes. The reaction was filtered on a plastic fritted funnel. The filtered solid was washed with diethyl ether (2×10 mL). The solid was collected and concentrated under high vacuum to afford the product as a white solid, containing diethyl ether (0.07 eq) (2.876 g).

Tetramethyldisilylene (benz[e]inden-3-yl)(3-butyl-cyclopentadienyl) zirconium dichloride To a precooled, stirring suspension of lithium 3-(2-(3-butylcyclopenta-2,4-dien-1-ide-1-yl)-1,1,2,2-tetramethyldisilaneyl)-3H-cyclopenta[a]naphthalen-3-ide (2.876 g, 6.85 mmol) in diethyl ether (40 mL), zirconium(IV) chloride (1.616 g, 6.94 mmol, 1.01 eq) was added with diethyl ether (20 mL). The reaction was stirred at room temperature for 16h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum to give a yellow foam. Diethyl ether (5 mL) was added to the foam, and the mixture was stirred until the completion of solid precipitation. The suspension was filtered on a plastic fritted funnel, and the solids were washed with diethyl ether (3×5 mL). The solids were collected and concentrated under high vacuum to afford the product as a pale yellow solid (2.104 g, 54%, ratio of 1:2 isomers A and B). $^1$H NMR (400 MHz, CD$_2$Cl$_2$): δ 8.22-8.14 (m, 2H), 7.82 (ddd, 1H, J=7.8, 1.5, 0.7 Hz), 7.81 (dd, 1H, J=7.8, 1.4 Hz), 7.66-7.51 (m, 8H), 7.21-7.17 (m, 2H), 7.07 (d, 1H, J=3.4 Hz), 7.05 (d, 1H, J=3.4 Hz), 6.73 (dd, 1H, J=3.1, 2.3 Hz, isomer A, used for isomer ratio), 6.53 (t, 1H, J=2.2 Hz, isomer B, used for isomer ratio), 6.23 (dd, 1H, J=3.1, 2.3 Hz), 6.18 (dd, 1H, J=3.1, 2.0 Hz), 6.14-6.11 (m, 1H), 5.87 (dd, 1H, J=3.1, 2.0 Hz), 2.60-2.44 (m, 2H), 2.29-2.19 (m, 1H), 2.06-1.97 (m, 1H), 1.57-1.02 (m, 8H), 0.88 (t, 3H, J=7.3 Hz), 0.76 (t, 3H, J=7.2 Hz), 0.66 (s, 3H), 0.64 (s, 3H), 0.58 (s, 3H), 0.57 (s, 3H), 0.55 (s, 3H), 0.52 (s, 3H), 0.51 (s, 3H), 0.50 (s, 3H).

Tetramethyldisilylene (benz[e]inden-3-yl) (3-butyl-cyclopentadienyl) hafnium dimethyl

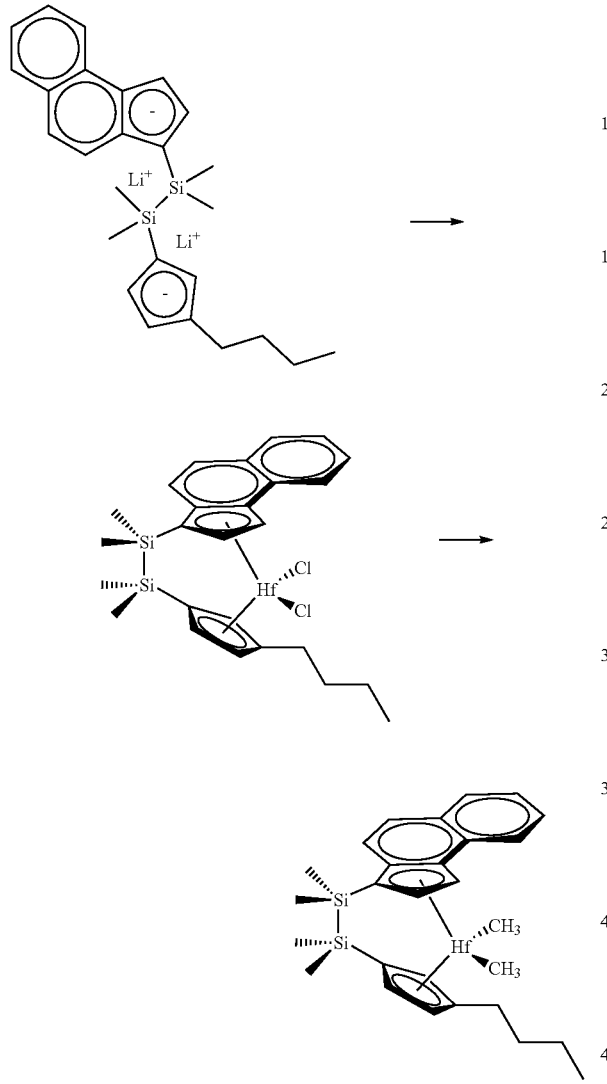

Tetramethyldisilylene (benz[e]inden-3-yl) (3-butyl-cyclopentadienyl) hafnium dichloride To a stirring suspension of hafnium(IV) chloride (1.639 g, 5.12 mmol, 1 eq) in diethyl ether (20 mL), a suspension of lithium 3-(2-(3-butylcyclopenta-2,4-dien-1-ide-1-yl)-1,1,2,2-tetramethyldisilaneyl)-3H-cyclopenta[a]naphthalen-3-ide (2.122 g, 5.12 mmol) in diethyl ether (40 mL) was added. The reaction was stirred at room temperature for 16h. The reaction was concentrated under a stream of nitrogen and then under high vacuum. The residue was extracted with dichloromethane (2×20 mL, then 10 mL) and filtered over Celite. The combined dichloromethane extracts were concentrated under a stream of nitrogen and then under high vacuum. The extract was washed with hexane and concentrated under high vacuum to afford the product as a white solid (2.675 g, 80%, ratio of 1:1.2 isomers A and B). $^1$H NMR (400 MHz, $CD_2Cl_2$): δ 8.18-8.13 (m, 2H), 7.83-7.78 (m, 2H), 7.67-7.49 (m, 8H), 7.12-7.06 (m, 2H), 7.02-6.96 (m, 2H), 6.60 (dd, 1H, J=3.1, 2.3 Hz), 6.41 (t, 1H, J=2.2 Hz), 6.14 (dd, 1H, J=3.1, 2.3 Hz, isomer B, used for isomer ratio), 6.08 (dd, 1H, J=3.1, 2.0 Hz), 6.04-5.99 (m, 1H, isomer A, used for isomer ratio), 5.75 (dd, 1H, J=3.1, 2.0 Hz), 2.66-2.48 (m, 2H), 2.33-2.23 (m, 1H), 2.08-1.98 (m, 1H), 1.57-1.01 (m, 8H), 0.89 (t, 3H, J=7.3 Hz), 0.76 (t, 3H, J=7.2 Hz), 0.66 (s, 3H), 0.64 (s, 3H), 0.58 (s, 3H), 0.57 (s, 3H), 0.54 (s, 3H), 0.52 (s, 3H), 0.51 (s, 3H), 0.50 (s, 3H).

Tetramethyldisilylene (benz[e]inden-3-yl) (3-butyl-cyclopentadienyl) hafnium dimethyl To a stirring suspension of tetramethyldisilylene (benz[e]inden-3-yl) (3-butyl-cyclopentadienyl) hafnium dichloride (2.765 g, 4.12 mmol) in diethyl ether (40 mL), methylmagnesium bromide (5.5 mL, 3.0M in diethyl ether, 16.50 mmol, 4.01 eq) was added. The reaction was stirred at room temperature for 17h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as a tan oil (2.400 g, 95%, ratio of 1:1 isomers A and B). $^1$H NMR (400 MHz, $C_6D_6$): δ 8.23-8.18 (m, 2H), 7.66-7.58 (m, 2H), 7.44-7.24 (m, 8H), 7.11-7.06 (m, 2H), 6.35 (d, 1H, J=3.3 Hz, isomer A, used for isomer ratio), 6.20 (d, 1H, J=3.4 Hz isomer B, used for isomer ratio), 5.95 (dd, 1H, J=3.0, 2.0 Hz), 5.88 (m, 2H), 5.82-5.75 (m, 2H), 5.62 (dd, 1H, J=3.0, 2.0 Hz), 2.53-2.27 (m, 3H), 2.16-2.06 (m, 1H), 1.55-1.02 (m, 8H), 0.84 (t, 3H, J=7.3 Hz), 0.74 (t, 3H, J=7.2 Hz), 0.42 (s, 3H), 0.40 (s, 3H), 0.38 (s, 3H), 0.36 (s, 3H), 0.34 (s, 3H), 0.34 (s, 3H), 0.28 (s, 3H), 0.27 (s, 3H), −0.26 (s, 3H), −0.27 (s, 3H), −1.02 (s, 3H), −1.10 (s, 3H).

Tetramethyldisilylene (benz[e]inden-3-yl) (3-neopentyl-cyclopentadienyl) zirconium dichloride

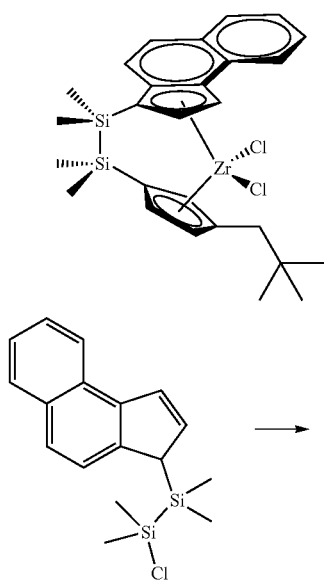

-continued

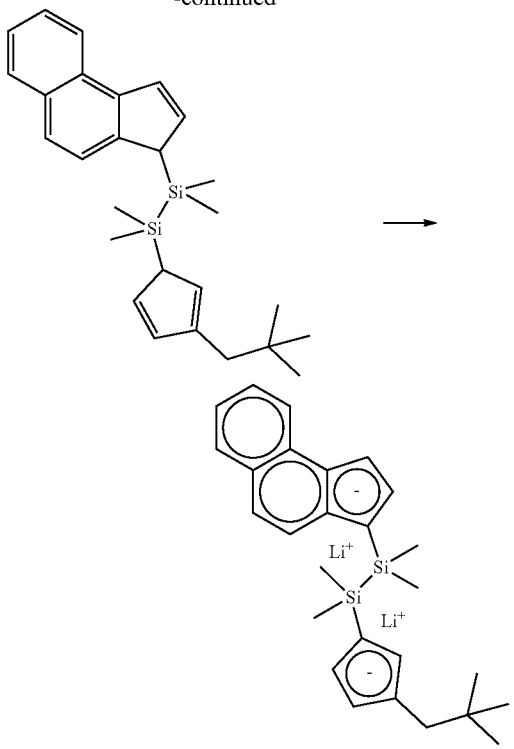

1-(3H-Cyclopenta[a]naphthalen-3-yl)-1,1,2,2-tetramethyl-2-(3-neopentylcyclopenta-2,4-dien-1-yl) disilane To a stirring solution of 1-chloro-2-(3H-cyclopenta[a] naphthalen-3-yl)-1,1,2,2-tetramethyldisilane (0.330 g, 1.04 mmol) in tetrahydrofuran (5 mL), a suspension of lithium neopentylcyclopentadienide (0.150 g, 1.06 mmol, 1.01 eq) in tetrahydrofuran (10 mL) was added. The reaction was stirred at room temperature for 22 minutes. The reaction was concentrated under a stream of nitrogen and then under high vacuum. The residue was extracted with hexane (3×5 mL) and filtered over Celite. The combined hexane extracts were concentrated under a stream of nitrogen and then under high vacuum to afford the product as a clear, colorless oil (0.417 g).

Lithium 3-(1,1,2,2-tetramethyl-2-(3-neopentylcyclopenta-2,4-dien-1-ide-1-yl)disilaneyl)-3H-cyclopenta [a]naphthalen-3-ide To a stirring solution of 1-(3H-cyclopenta[a]naphthalen-3-yl)-1,1,2,2-tetramethyl-2-(3-neopentylcyclopenta-2,4-dien-1-yl)disilane (0.417 g, 1.00 mmol) in diethyl ether (10 mL), n-butyllithium (0.8 mL, 2.5M in hexanes, 2.00 mmol, 2 eq) was added. The reaction was stirred at room temperature for 15 h. The reaction was filtered on a plastic, fritted funnel. The filtered solid was washed with diethyl ether (3×5 mL). The solid was collected and concentrated under high vacuum to afford the product as a white solid, containing diethyl ether (0.08 eq) (0.282 g).

Tetramethyldisilylene (benz[e]inden-3-yl) (3-neopentyl-cyclopentadienyl) zirconium dichloride To a stirring suspension of lithium 3-(1,1,2,2-tetramethyl-2-(3-neopentylcyclopenta-2,4-dien-1-ide-1-yl)disilaneyl)- 3H-cyclopenta[a]naphthalen-3-ide (0.146 g, 0.34 mmol) in diethyl ether (10 mL), zirconium(IV) chloride (0.080 g, 0.34 mmol, 1.02 eq) was added with diethyl ether (5 mL). The reaction was stirred at room temperature for 5h. The reaction was concentrated under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to give a light brown solid. The solid was washed with hexane (3×1 mL) and concentrated under high vacuum to afford the product as an off-white solid (0.090 g, 46%, ratio of 1:1.8 isomers A and B). $^1$H NMR (400 MHz, CD$_2$Cl$_2$): δ 8.20-8.15 (m, 2H), 7.84-7.79 (m, 2H), 7.69-7.51 (m, 8H), 7.22-7.17 (m, 2H), 7.07 (d, 1H, J=3.4 Hz), 7.06 (d, 1H, J=3.4 Hz), 6.76-6.72 (m, 1H), 6.47 (t, 1H, J=2.2 Hz), 6.18 (dd, 1H, J=3.1, 2.0 Hz), 6.16 (dd, 1H, J=3.0, 2.4 Hz), 6.11 (t, 1H, J=2.2 Hz), 5.80 (dd, 1H, J=3.1, 2.0 Hz), 2.46 (d, 1H, J=13.6 Hz, isomer A, used for isomer ratio), 2.29 (d, 1H, J=13.6 Hz), 2.16 (d, 1H, J=13.7 Hz isomer B, used for isomer ratio), 1.62 (d, 1H, J=13.6 Hz), 0.81 (s, 9H), 0.73 (s, 9H), 0.67 (s, 3H), 0.64 (s, 3H), 0.58 (s, 3H), 0.57 (s, 3H), 0.57 (s, 3H), 0.55 (s, 3H), 0.50 (s, 3H), 0.49 (s, 3H).

Tetramethyldisilylene (benz[e]inden-3-yl) (3-neopentyl-cyclopentadienyl) hafnium dimethyl

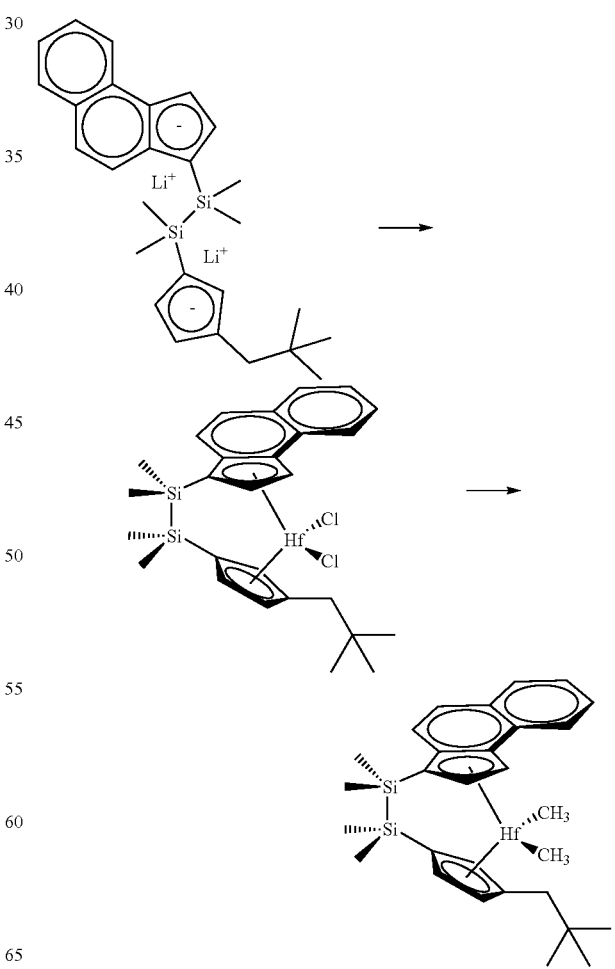

Tetramethyldisilylene (benz[e]inden-3-yl) (3-neopentyl-cyclopentadienyl) hafnium dichloride To a stirring suspension of lithium 3-(1,1,2,2-tetramethyl-2-(3-neopentylcyclopenta-2,4-dien-1-ide-1-yl)disilaneyl)-3H-cyclopenta[a]naphthalen-3-ide (0.126 g, 0.29 mmol) in diethyl ether (10 mL), hafnium(IV) chloride (0.097 g, 0.30 mmol, 1.04 eq) was added with diethyl ether (5 mL). The reaction was stirred at room temperature for 5h. The reaction was concentrated under a stream of nitrogen and then under high vacuum. The residue was extracted with dichloromethane (10 mL, then 5 mL) and filtered over Celite. The combined dichloromethane extracts were concentrated under a stream of nitrogen and then under high vacuum to afford the product (0.168 g, 87%, ratio of 1:1.4 isomers A and B). $^1$H NMR (400 MHz, CD$_2$Cl$_2$): δ 8.18-8.11 (m, 2H), 7.83-7.78 (m, 2H), 7.68-7.50 (m, 8H), 7.10-7.07 (m, 2H), 7.01-6.97 (m, 2H), 6.61 (dd, 1H, J=3.1, 2.3 Hz, isomer A, used for isomer ratio), 6.35 (t, 1H, J=2.2 Hz, isomer B, used for isomer ratio), 6.09-6.05 (m, 2H), 5.99 (t, 1H, J=2.2 Hz), 5.69 (dd, 1H, J=3.1, 2.0 Hz), 2.49 (d, 1H, J=13.6 Hz), 2.31 (d, 1H, J=13.6 Hz), 2.17 (d, 1H, J=13.7 Hz), 1.61 (d, 1H, J=13.7 Hz), 0.81 (s, 9H), 0.72 (s, 9H), 0.67 (s, 3H), 0.63 (s, 3H), 0.57 (s, 3H), 0.56 (s, 3H), 0.56 (s, 3H), 0.54 (s, 3H), 0.49 (s, 3H), 0.48 (s, 3H).

Tetramethyldisilylene (benz[e]inden-3-yl) (3-neopentyl-cyclopentadienyl) hafnium dimethyl To a stirring solution of tetramethyldisilylene (benz[e]inden-3-yl) (3-neopentyl-cyclopentadienyl) hafnium dichloride (0.168 g, 0.25 mmol) in toluene (10 mL), methylmagnesium bromide (0.42 mL, 3.0M in diethyl ether, 1.26 mmol, 4.98 eq) was added. The reaction was stirred and heated to 65° C. for 14h. The reaction was concentrated under a stream of nitrogen at 65° C. The reaction was then concentrated under high vacuum. The residue was extracted with hot hexane (2×10 mL) and filtered over Celite. The combined hot hexane extracts were concentrated under a stream of nitrogen and then under high vacuum to afford the product as a white solid (0.127 g, 80%, ratio of 1:1.6 isomers A and B). $^1$H NMR (400 MHz, C$_6$D$_6$): δ 8.24-8.19 (m, 2H), 7.64-7.59 (m, 2H), 7.42-7.25 (m, 8H), 7.11-7.08 (m, 2H), 6.36 (d, 1H, J=3.3 Hz, isomer B, used for isomer ratio), 6.19 (d, 1H, J=3.4 Hz, isomer A, used for isomer ratio), 5.98-5.95 (m, 1H), 5.91-5.87 (m, 2H), 5.83 (t, 1H, J=2.1 Hz), 5.78-5.75 (m, 1H), 5.58 (dd, 1H, J=2.9, 2.0 Hz), 2.43 (d, 1H, J=13.5 Hz), 2.26 (d, 2H, J=13.6 Hz), 1.84 (d, 1H, J=13.5 Hz), 0.88 (s, 9H), 0.82 (s, 9H), 0.43 (s, 3H), 0.40 (s, 3H), 0.38 (s, 3H), 0.36 (s, 3H), 0.35 (s, 3H), 0.34 (s, 3H), 0.29 (s, 3H), 0.28 (s, 3H), -0.25 (s, 3H), -0.25 (s, 3H), -0.99 (s, 3H), -1.09 (s, 3H).

Tetramethyldisilylene (benz[e]inden-3-yl) (3-(trimethylsilylmethyl)-cyclopentadienyl) zirconium dichloride

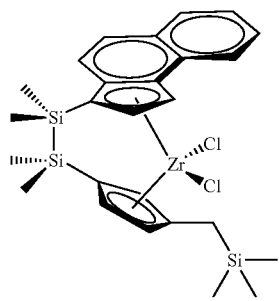

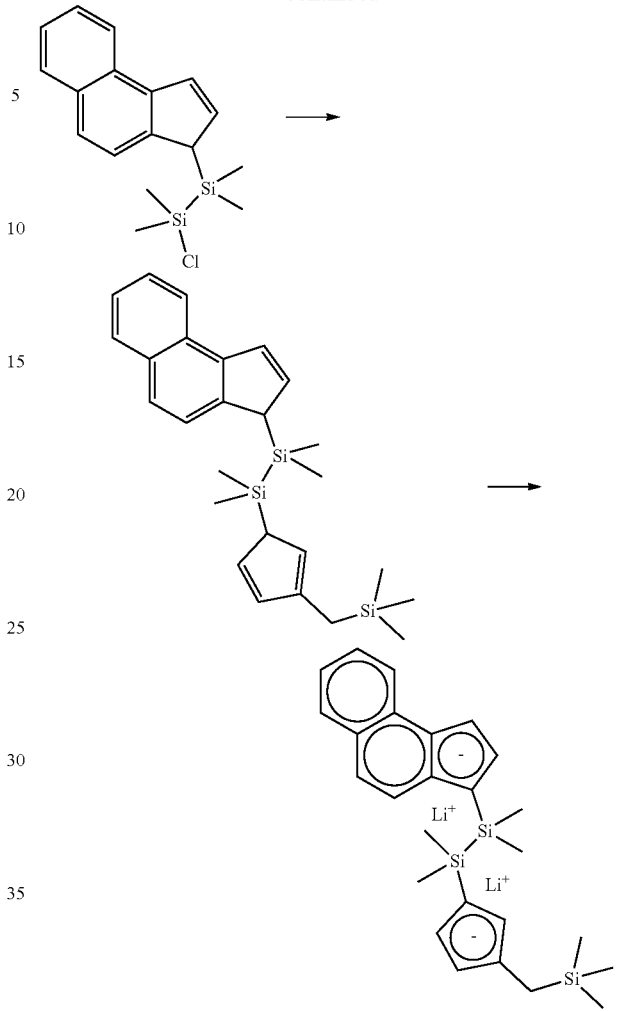

1-(3H-Cyclopenta[a]naphthalen-3-yl)-1,1,2,2-tetramethyl-2-(3-((trimethylsilyl)methyl)-cyclopenta-2,4-dien-1-yl)disilane To a stirring solution of 1-chloro-2-(3H-cyclopenta[a]naphthalen-3-yl)-1,1,2,2-tetramethyldisilane (3.109 g, 9.81 mmol) in tetrahydrofuran (40 mL), a solution of lithium (trimethylsilyl)methylcyclopentadienide (1.554 g, 9.82 mmol, 1 eq) in tetrahydrofuran (20 mL) was added. The reaction was stirred at room temperature for 19 minutes. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as an amber oil, containing hexane (0.12 eq) (4.621 g).

Lithium 3-(1,1,2,2-tetramethyl-2-(3-((trimethylsilyl)methyl)cyclopenta-2,4-dien-1-ide-1-yl)disilaneyl)-3H-cyclopenta[a]naphthalen-3-ide To a stirring solution of 1-(3H-cyclopenta[a]naphthalen-3-yl)-1,1,2,2-tetramethyl-2-(3-((trimethylsilyl)methyl)cyclopenta-2,4-dien-1-yl)disilane (4.621 g, 10.68 mmol) in diethyl ether (40 mL), n-butyllithium (8.6 mL, 2.5M in hexanes, 21.50 mmol, 2.01 eq) was added. The reaction was stirred at room temperature for 14h. The reaction was filtered on a plastic fritted funnel. The filtered solid was washed with diethyl ether (2×10 mL). The solid was collected and concentrated under high vacuum to afford the product as a white powder, containing diethyl ether (0.11 eq) (3.636 g).

Tetramethyldisilylene (benz[e]inden-3-yl) (3-(trimethylsilylmethyl)-cyclopentadienyl) zirconium dichloride To a precooled, stirring solution of lithium 3-(1,1,2,2-tetramethyl-2-(3-((trimethylsilyl)methyl)cyclopenta-2,4-dien-1-ide-1-yl)disilaneyl)-3H-cyclopenta[a]naphthalen-3-ide (1.776 g, 3.92 mmol) in diethyl ether (60 mL), zirconium (IV) chloride (0.917 g, 3.94 mmol, 1 eq) was added with diethyl ether (20 mL). The reaction was stirred at room temperature for 3h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum to give a yellow solid. Hexane (20 mL) was added to the yellow solid, and the mixture was stirred. The resulting suspension was filtered on a plastic fritted funnel. The solid was washed with additional hexane (2×2 mL). The solid was collected and concentrated under high vacuum to afford the product as a pale yellow powder (1.846 g, 79%, ratio of 1:1.9 isomers A and B). $^1$H NMR (400 MHz, CD$_2$Cl$_2$): δ 8.22-8.15 (m, 2H), 7.85-7.79 (m, 2H), 7.67-7.50 (m, 8H), 7.20 (dd, 1H, J=3.4, 0.6 Hz), 7.18 (dd, 1H, J=3.4, 0.8 Hz), 7.07 (d, 1H, J=3.4 Hz), 7.04 (d, 1H, J=3.4 Hz), 6.70-6.68 (m, 1H), 6.30 (t, 1H, J=2.2 Hz), 6.16 (dd, 1H, J=3.0, 2.4 Hz), 6.04 (dd, 1H, J=3.0, 2.1 Hz, isomer A, used for isomer ratio), 5.93 (t, 1H, J=2.2 Hz), 5.69 (dd, 1H, J=3.0, 2.1 Hz, isomer B, used for isomer ratio), 2.13 (d, 1H, J=13.9 Hz), 1.91 (d, 1H, J=13.9 Hz), 1.80 (d, 1H, J=14.0 Hz), 1.31 (d, 1H, J=14.0 Hz), 0.67 (s, 3H), 0.64 (s, 3H), 0.58 (s, 3H), 0.56 (s, 3H), 0.56 (s, 3H), 0.54 (s, 3H), 0.48 (s, 3H), 0.48 (s, 3H), −0.08 (s, 9H), −0.13 (s, 9H).

Tetramethyldisilylene (benz[e]inden-3-yl) (3-(trimethylsilylmethyl)-cyclopentadienyl) hafnium dimethyl

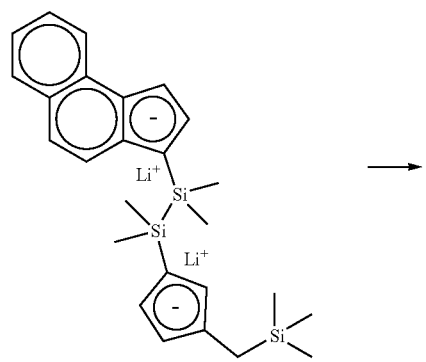

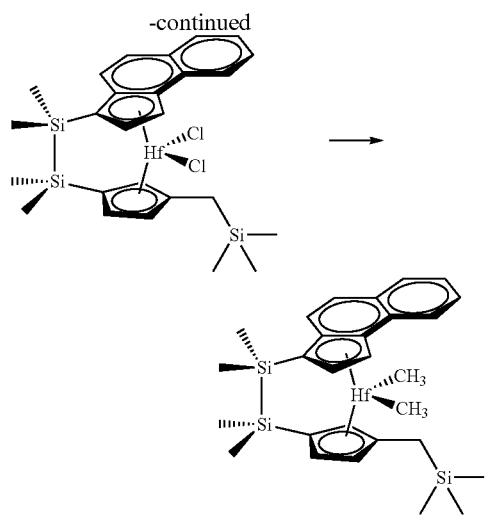

Tetramethyldisilylene (benz[e]inden-3-yl) (3-(trimethylsilylmethyl)-cyclopentadienyl) hafnium dichloride To a precooled, stirring suspension of lithium 3-(1,1,2,2-tetramethyl-2-(3-((trimethylsilyl)methyl)cyclopenta-2,4-dien-1-ide-1-yl)disilaneyl)-3H-cyclopenta[a]naphthalen-3-ide (1.848 g, 4.08 mmol) in diethyl ether (60 mL), hafnium (IV) chloride (1.310 g, 4.09 mmol, 1 eq) was added with diethyl ether (20 mL). The reaction was stirred at room temperature for 3h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum to give a white solid. Hexane (20 mL) was added to the white solid, and the mixture was stirred. The resulting suspension was filtered on a plastic fritted funnel. The filtered solid was washed with additional hexane (2×5 mL). The solid was collected and concentrated under high vacuum to afford the product as a white powder (1.828 g, 65%, ratio of 1:1.2 isomers A and B). $^1$H NMR (400 MHz, CD$_2$Cl$_2$): δ 8.18-8.12 (m, 2H), 7.84-7.77 (m, 2H), 7.65-7.48 (m, 8H), 7.09 (dd, 1H, J=3.4, 0.7 Hz), 7.07 (dd, 1H, J=3.4, 0.8 Hz), 6.99-6.96 (m, 2H), 7.59-7.54 (m, 1H), 6.17 (t, 1H, J=2.2 Hz), 6.09-6.04 (m, 1H, isomer B, used for isomer ratio), 5.93 (dd, 1H, J=3.0, 2.1 Hz, isomer A, used for isomer ratio), 5.80 (t, 1H, J=2.2 Hz), 5.57 (dd, 1H, J=3.0, 2.0 Hz), 2.17 (d, 1H, J=13.9 Hz), 1.93 (d, 1H, J=14.0 Hz), 1.82 (d, 1H, J=14.1 Hz), 1.30 (d, 1H, J=14.2 Hz), 0.66 (s, 3H), 0.63 (s, 3H), 0.57 (s, 3H), 0.55 (s, 3H), 0.54 (s, 3H), 0.53 (s, 3H), 0.48 (s, 3H), 0.47 (s, 3H), −0.08 (s, 9H), −0.14 (s, 9H).

Tetramethyldisilylene (benz[e]inden-3-yl) (3-(trimethylsilylmethyl)-cyclopentadienyl) hafnium dimethyl To a stirring solution of tetramethyldisilylene (benz[e]inden-3-yl) (3-(trimethylsilylmethyl)-cyclopentadienyl) hafnium dichloride (1.828 g, 2.69 mmol) in toluene (30 mL), methylmagnesium bromide (4.5 mL, 3.0M in diethyl ether, 13.50 mmol, 5.02 eq) was added. The reaction was stirred and heated to 65° C. for 14h. The reaction was allowed to cool to room temperature. The reaction was then concentrated under high vacuum. The residue was extracted with hot hexane (50 mL, then 2×20 mL) and filtered over Celite. The combined hot hexane extracts were concentrated under a stream of nitrogen and then under high vacuum to afford the product as a white powder (1.572 g, 91%, ratio of 1:1.2 isomers A and B). $^1$H NMR (400 MHz, $C_6D_6$): δ 8.27-8.22 (m, 2H), 7.65-7.60 (m, 2H), 7.43-7.24 (m, 8H), 7.15-7.14 (m, 1H), 7.11 (d, 1H, J=3.4 Hz), 6.41 (d, 1H, J=3.4 Hz, isomer B, used for isomer ratio), 6.15 (d, 1H, J=3.3 Hz, isomer A, used for isomer ratio), 5.85-5.81 (m, 2H), 5.73 (t, 1H, J=2.2 Hz), 5.71-5.69 (m, 1H), 5.68 (t, 1H, J=2.1 Hz), 5.44 (dd, 1H, J=2.9, 2.0 Hz), 1.99 (d, 1H, J=13.9 Hz), 1.85 (d, 1H, J=14.0 Hz), 1.80 (d, 1H, J=13.9 Hz), 1.49 (d, 1H, J=14.0 Hz), 0.43 (s, 3H), 0.40 (s, 3H), 0.39 (s, 3H), 0.36 (s, 3H), 0.35 (s, 3H), 0.34 (s, 3H), 0.29 (s, 3H), 0.26 (s, 3H), −0.06 (s, 9H), −0.09 (s, 9H), −0.20 (s, 3H), −0.24 (s, 3H), −0.96 (s, 3H), −1.09 (s, 3H).

Tetramethyldisilylene (3-butyl-cyclopentadienyl) (indenyl) zirconium dichloride

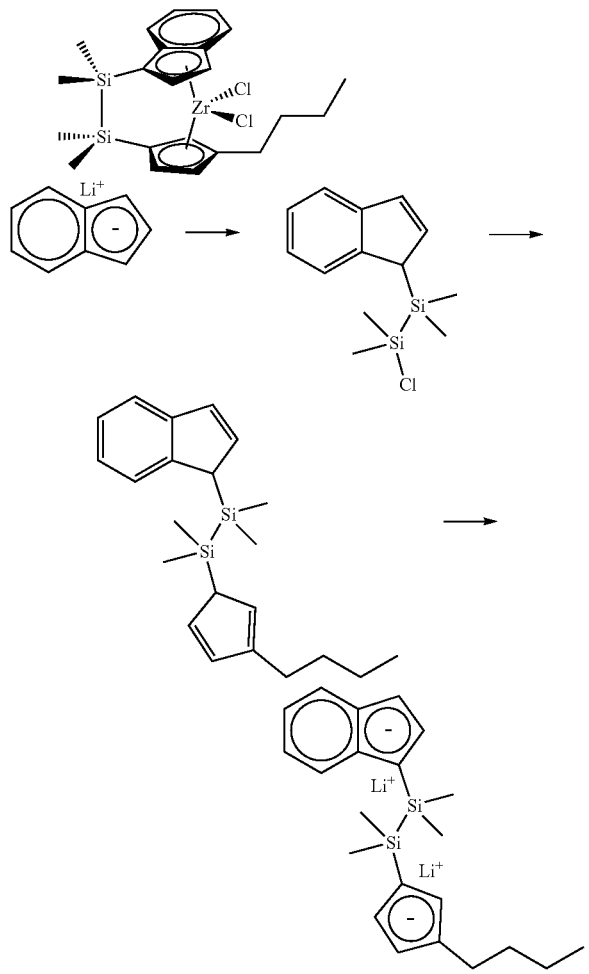

1-Chloro-2-(1H-inden-1-yl)-1,1,2,2-tetramethyldisilane

To a precooled, stirring solution of 1,2-dichloro-1,1,2,2-tetramethyldisilane (3.560 g, 19.02 mmol, 1 eq) in diethyl ether (40 mL), a solution of lithium indenide (2.328 g, 19.07 mmol) in diethyl ether (20 mL) was added. The reaction was stirred at room temperature for 2h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as an orange oil (3.038 g).

1-(3-Butylcyclopenta-2,4-dien-1-yl)-2-(1H-inden-1-yl)-1,1,2,2-tetramethyldisilane To a stirring solution of 1-chloro-2-(1H-inden-1-yl)-, 1,2,2-tetramethyldisilane (3.038 g, 11.38 mmol) in tetrahydrofuran (20 mL), a solution of lithium butylcyclopentadienide (1.489 g, 11.62 mmol, 1.02 eq) in tetrahydrofuran (20 mL) was added. The reaction was stirred at room temperature 4h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product (3.903 g).

Lithium 1-(2-(3-butylcyclopenta-2,4-dien-1-ide-1-yl)-1,1,2,2-tetramethyldisilaneyl)-1H-inden-1-ide To a stirring solution of 1-(3-butylcyclopenta-2,4-dien-1-yl)-2-(1H-inden-1-yl)-1,1,2,2-tetramethyldisilane (3.903 g, 11.07 mmol) in diethyl ether (80 mL), n-butyllithium (8.9 mL, 2.5M in hexanes, 22.25 mmol, 2.01 eq) was added. The reaction was stirred at room temperature for 15 h. The reaction was concentrated under a stream of nitrogen and then under high vacuum. The residue was washed with hexane (20 mL) and concentrated under high vacuum to afford the product as a light amber foam, containing hexane (0.59 eq) (4.245 g).

Tetramethyldisilylene (3-butyl-cyclopentadienyl) (indenyl) zirconium dichloride

To a stirring suspension of zirconium(IV) chloride (2.382 g, 10.22 mmol, 0.99 eq) in diethyl ether (80 mL), a solution of lithium 1-(2-(3-butylcyclopenta-2,4-dien-1-ide-1-yl)-1,1,2,2-tetramethyldisilaneyl)-1H-inden-1-ide (4.245 g, 10.23 mmol) in diethyl ether (30 mL) was added. The reaction was stirred at room temperature for 21h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum to give a red oil. Hexane (20 mL) was added to the oil, and the mixture was stirred for 2.5 days. The resulting suspension was filtered on a plastic fritted funnel. The solid was washed further with hexane and concentrated under high vacuum to afford the product as a yellow solid (0.891 g, 17%, ratio of 11.9:1 isomers A and B). $^1$H NMR (400 MHz, $CD_2Cl_2$): δ 7.80 (dd, 1H, J=8.5, 1.0 Hz, A), 7.76-7.71 (m, 1H A, 2H B), 7.38-7.32 (m, 1H each A and B), 7.27-7.21 (m, 1H each A and B), 7.04 (d, 1H, J=3.4 Hz, A), 7.02 (d, 1H, J=3.4 Hz, B), 6.72-6.69 (m, 1H each A and B), 6.68 (dd, 1H, J=3.4, 0.9 Hz, B), 6.51 (t, 1H, J=2.2 Hz, A), 6.18-6.15 (m, 1H, isomer B, used for isomer ratio), 6.02-5.99 (m, 1H each A and B), 5.88-5.84 (m, 1H, isomer A, used for isomer ratio), 2.62-2.44 (m, 2H, A), 2.43-2.32 (m, 1H, B), 2.18-2.08 (m, 1H, B), 1.57-1.14 (m, 4H each A and B), 0.88 (t, 3H, J=7.3 Hz, A), 0.84 (t, 3H, J=7.2 Hz, B), 0.63 (s, 3H, B), 0.60 (s, 3H, A), 0.55 (s, 3H, A), 0.53 (s, 3H, A), 0.52 (s, 3H, B), 0.51 (s, 3H, B), 0.50 (s, 3H, B), 0.49 (s, 3H, A).

Tetramethyldisilylene (3-butyl-cyclopentadienyl) (4-phenyl-indenyl) zirconium dichloride

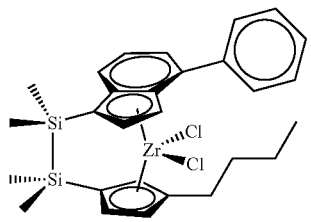

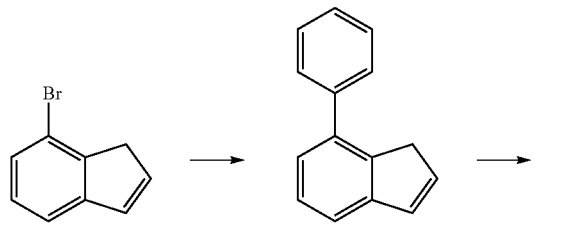

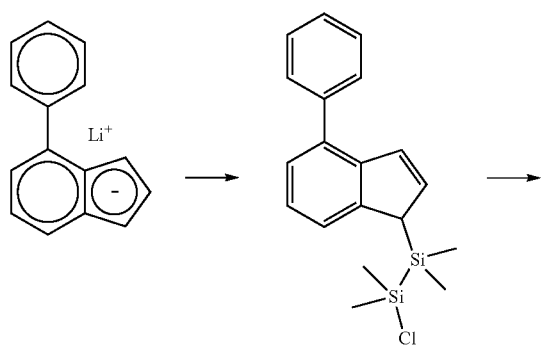

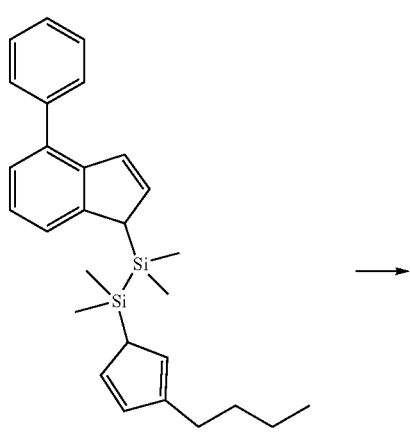

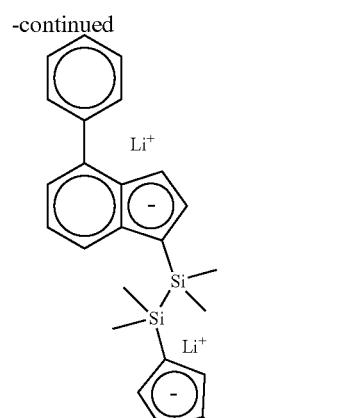

7-Phenylindene

To a solution of 7-bromoindene (2.009 g, 10.30 mmol) and phenylboronic acid (1.490 g, 12.22 mmol, 1.19 eq) in tetrahydrofuran (10 mL), potassium carbonate (2.950 g, 21.04 mmol, 2.04 eq) was added. Then a solution of 1,3,5,7-tetramethyl-6-phenyl-2,4,8-trioxa-6-phosphaadamantane (0.140 g, 0.48 mmol, 0.05 eq) in tetrahydrofuran (5 mL) was added. Then a solution of bis(dibenzylideneacetone)palladium (0.091 g, 0.16 mmol, 0.02 eq) in tetrahydrofuran (5 mL) was added. Then water (4 mL) was added. The reaction vessel was sealed. The reaction was stirred and heated to 75° C. in a sealed vessel for 15 h. The reaction was allowed to cool to room temperature. The reaction was then concentrated in vacuo. The residue underwent aqueous extraction with hexane (3×50 mL). The combined hexane extracts were washed with saturated, aqueous potassium carbonate (100 mL) and then water (50 mL). The washed hexane extracts were dried with anhydrous magnesium sulfate and filtered. The dried filtrate was concentrated in vacuo. The crude material was purified by silica gel column chromatography with isohexane eluent to afford the product as a clear, colorless oil (1.281 g).

Lithium 4-phenylindenide

To a stirring solution of 7-phenylindene (1.281 g, 6.66 mmol) in diethyl ether (40 mL), n-butyllithium (2.7 mL, 2.5M in hexanes, 6.74 mmol, 1.01 eq) was added. The reaction was stirred at room temperature overnight. The reaction was filtered on a plastic fritted funnel. The filtered solid was washed with hexane (2×10 mL) and diethyl ether (2×5 mL). The solid was collected and concentrated under high vacuum to afford the product as an off-white solid (0.799 g).

1-Chloro-1,1,2,2-tetramethyl-2-(4-phenyl-1H-inden-1-yl)disilane

To a precooled, stirring solution of 1,2-dichloro-1,1,2,2-tetramethyldisilane (0.772 g, 4.12 mmol, 1.02 eq) in diethyl ether (60 mL), a suspension of lithium 4-phenylindenide (0.799 g, 4.03 mmol) in diethyl ether (20 mL) was added. The reaction was stirred at room temperature for 2h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as a white solid (1.320 g).

1-(3-Butylcyclopenta-2,4-dien-1-yl)-1,1,2,2-tetramethyl-2-(4-phenyl-1H-inden-1-yl)disilane To a stirring solution of 1-chloro-1,1,2,2-tetramethyl-2-(4-phenyl-1H-inden-1-yl)disilane (1.320 g, 3.85 mmol) in tetrahydrofuran (40 mL), a solution of lithium cyclopentadienide (0.508 g, 3.96 mmol, 1.03 eq) in tetrahydrofuran (10 mL) was added. The reaction was stirred at room temperature for 47 minutes. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product as a red oil (1.590 g).

Lithium 1-(2-(3-butylcyclopenta-2,4-dien-1-ide-1-yl)-1,1,2,2-tetramethyldisilaneyl)-4-phenyl-1H-inden-1-ide To a stirring solution of 1-(3-butylcyclopenta-2,4-dien-1-yl)-1,1,2,2-tetramethyl-2-(4-phenyl-1H-inden-1-yl)disilane (1.590 g, 3.71 mmol) in diethyl ether (40 mL), n-butyl-lithium (3.0 mL, 2.5M in hexanes, 7.50 mmol, 2.02 eq) was added. The reaction was stirred at room temperature for 4h. The reaction was concentrated under a stream of nitrogen and then under high vacuum to afford the product as a tan foam, containing diethyl ether (0.16 eq) and hexane (0.39 eq) (1.749 g).

Tetramethyldisilylene (3-butyl-cyclopentadienyl) (4-phenyl-indenyl) zirconium dichloride To a stirring suspension of zirconium(IV) chloride (0.901 g, 3.87 mmol, 1 eq) in diethyl ether (60 mL), a solution of lithium 1-(2-(3-butylcyclopenta-2,4-dien-1-ide-1-yl)-1,1,2,2-tetramethyldisilaneyl)-4-phenyl-1H-inden-1-ide (1.749 g, 3.87 mmol) in diethyl ether (40 mL) was added. The reaction was stirred at room temperature for 19.5h. The reaction was concentrated under a stream of nitrogen and then under high vacuum. The residue was extracted with dichloromethane (2×20 mL) and filtered over Celite. The combined dichloromethane extracts were concentrated under a stream of nitrogen and then under high vacuum to give a brown foam. Hexane (10 mL) was added to the foam, and the mixture was stirred for 1 h. The resulting orange suspension was filtered on a plastic, fritted funnel. The filtered solid was washed with additional hexane (2×5 mL). The solid was collected and concentrated under high vacuum to afford the product as a dark yellow solid (1.115 g, 48%, ratio of 1:2.5 isomers A and B). $^1$H NMR (400 MHz, CD$_2$Cl$_2$): δ 7.77-7.70 (m, 2H), 7.66-7.61 (m, 4H), 7.48-7.42 (m, 4H), 7.42-7.35 (m, 4H), 7.29-7.25 (m, 2H), 7.05-6.95 (m, 4H), 6.68 (dd, 1H, J=3.1, 2.3 Hz), 6.47 (t, 1H, J=2.2 Hz, isomer B, used for isomer ratio), 6.25 (dd, 1H, J=3.1, 2.3 Hz), 6.15 (t, 1H, J=2.2 Hz), 6.08 (dd, 1H, J=3.0, 2.1 Hz, isomer A, used for isomer ratio), 5.94 (dd, 1H, J=3.1, 2.0 Hz), 2.55-2.34 (m, 3H), 2.26-2.17 (m, 1H), 1.54-1.21 (m, 8H), 0.91-0.83 (m, 6H), 0.67 (s, 3H), 0.67 (s, 3H), 0.55 (s, 3H), 0.54 (s, 3H), 0.54 (s, 3H), 0.53 (s, 3H), 0.52 (s, 3H), 0.50 (s, 3H).

Tetramethyldisilylene (3-butyl-cyclopentadienyl) (4-(o-tolyl)-indenyl) zirconium dichloride

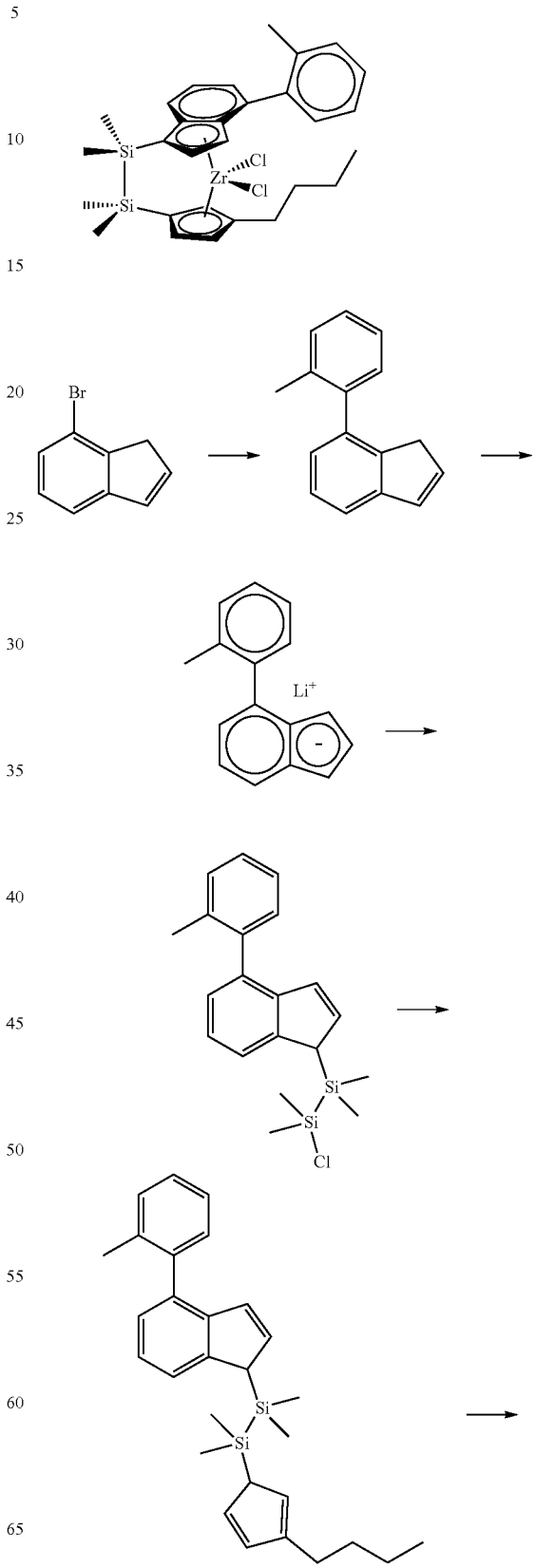

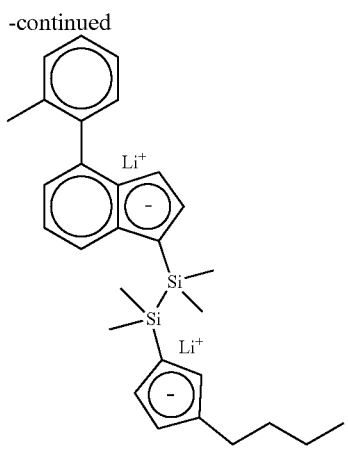

7-(o-tolyl)-indene

To a solution of 7-bromoindene (4.182 g, 21.44 mmol) and o-tolylboronic acid (3.496 g, 25.71 mmol, 1.20 eq) in tetrahydrofuran (20 mL), potassium carbonate (6.633 g, 47.30 mmol, 2.21 eq) was added. Then a solution of 1,3,5,7-tetramethyl-6-phenyl-2,4,8-trioxa-6-phosphaadamantane (0.188 g, 0.64 mmol, 0.03 eq) and bis(dibenzylideneacetone)palladium (0.124 g, 0.22 mmol, 0.01 eq) in tetrahydrofuran (20 mL) was added. Then water (8 mL) was added. The reaction vessel was sealed. The reaction was stirred and heated to 75° C. in a sealed vessel for 15 h. The reaction was allowed to cool to room temperature. The reaction was then concentrated in vacuo. The residue underwent aqueous extraction with hexane (4×50 mL). The combined hexane extracts were washed with saturated, aqueous potassium carbonate (100 mL) and then brine (100 mL). The washed hexane extracts were dried with anhydrous magnesium sulfate and filtered. The dried filtrate was concentrated in vacuo. The crude material was purified by silica gel column chromatography with isohexane eluent to afford the product as a clear, colorless oil which may begin to solidify around room temperature (2.544 g).

Lithium 4-(o-tolyl)-indenide

To a precooled, stirring solution of 7-(o-tolyl)-indene (2.544 g, 12.33 mmol) in diethyl ether (40 mL), n-butyllithium (5.0 mL, 2.5M in hexanes, 12.50 mmol, 1.01 eq) was added. The reaction was stirred at room temperature for 15 h. The reaction was concentrated under a stream of nitrogen and then under high vacuum. The residue was washed with hexane (40 mL) and filtered on a plastic fritted funnel. The filtered solid was collected and concentrated under high vacuum to afford the product as a light orange powder, containing diethyl ether (0.06 eq) and hexane (0.16 eq) (2.796 g).

1-Chloro-1,1,2,2-tetramethyl-2-(4-(o-tolyl)-1H-inden-1-yl)disilane

To a precooled, stirring solution of 1,2-dichloro-1,1,2,2-tetramethyldisilane (1.941 g, 10.37 mmol, 1.5 eq) in diethyl ether (60 mL), a solution of lithium 4-(o-tolyl)-indenide (1.592 g, 6.91 mmol) in diethyl ether (30 mL) was added. The reaction was stirred at room temperature for 1 h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum at 70° C. to afford the product as a clear, colorless oil (2.361 g).

1-(3-Butylcyclopenta-2,4-dien-1-yl)-1,1,2,2-tetramethyl-2-(4-(o-tolyl)-1H-inden-1-yl)disilane To a stirring solution of 1-chloro-1,1,2,2-tetramethyl-2-(4-(o-tolyl)-1H-inden-1-yl)disilane (2.361, 6.61 mmol) in tetrahydrofuran (20 mL), a solution of lithium butylcyclopentadienide (0.848 g, 6.62 mmol, 1 eq) in tetrahydrofuran (20 mL) was added. The reaction was stirred at room temperature for 33 minutes. The reaction was concentrated under a stream of nitrogen and then under high vacuum. The residue was extracted with hexane (4×20 mL) and filtered over Celite. The combined hexane extracts were concentrated under a stream of nitrogen and then under high vacuum to afford the product as a light amber oil, containing hexane (0.26 eq) (3.102 g).

Lithium 1-(2-(3-butylcyclopenta-2,4-dien-1-ide-1-yl)-1,1,2,2-tetramethyldisilaneyl)-4-(o-tolyl)-1H-inden-1-ide To a precooled, stirring solution of 1-(3-butylcyclopenta-2,4-dien-1-yl)-1,1,2,2-tetramethyl-2-(4-(o-tolyl)-1H-inden-1-yl)disilane (3.102 g, 6.67 mmol) in diethyl ether (50 mL), n-butyllithium (5.4 mL, 2.5M in hexanes, 13.50 mmol, 2.02 eq) was added. The reaction was stirred at room temperature for 22 minutes. The reaction was concentrated under a stream of nitrogen and then under high vacuum to afford the product as a tan solid, containing hexane (0.58 eq) (3.372 g).

Tetramethyldisilylene (3-butyl-cyclopentadienyl) (4-(o-tolyl)-indenyl) zirconium dichloride To a precooled, stirring suspension of zirconium(IV) chloride (1.555 g, 6.67 mmol, 1 eq) in diethyl ether (60 mL), a solution of lithium 1-(2-(3-butylcyclopenta-2,4-dien-1-ide-1-yl)-1,1,2,2-tetramethyldisilaneyl)-4-(o-tolyl)-1H-inden-1-ide (3.372 g, 6.68 mmol) in diethyl ether (40 mL) was added. The reaction was stirred at room temperature for 3h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. Hexane (20 mL) was added to the residue, and the mixture was stirred overnight. The resulting yellow suspension was filtered on a plastic, fritted funnel. The solid was collected and concentrated under high vacuum. The solid was extracted with toluene (30 mL) and filtered over Celite. The toluene extract was concentrated under high vacuum. The residue was washed with additional hexane and concentrated under high vacuum to afford a fraction of the product as a yellow powder (1.601 g, 39%, ratio of 1:6.7 isomers A and B). $^1$H NMR (400 MHz, $CD_2Cl_2$): δ 7.71 (d, 1H, J=8.6 Hz), 7.67 (d, 1H, J=8.8 Hz), 7.41-7.11 (m, 14H), 7.00-6.94 (m, 2H), 6.65 (dd, 1H, J=3.1, 2.3 Hz), 6.46 (t, 1H, J=2.2 Hz), 6.28 (br s, 1H), 6.21 (br s, 1H), 6.09 (dd, 1H, J=3.0, 2.1 Hz, isomer A, used for isomer ratio), 5.95 (t, 1H, J=2.6 Hz, isomer B, used for isomer ratio), 2.60-1.85 (br m, 10H), 1.55-1.20 (m, 8H), 0.92-0.82 (m, 6H), 0.66 (s, 3H), 0.65 (s, 3H), 0.59 (s, 3H), 0.58 (s, 3H), 0.55 (s, 3H), 0.52 (s, 3H), 0.51 (s, 3H), 0.48 (s, 3H).

Tetramethyldisilylene (3-neopentyl-cyclopentadienyl) (1,5,6,7-tetrahydro-s-indacenyl) zirconium dichloride

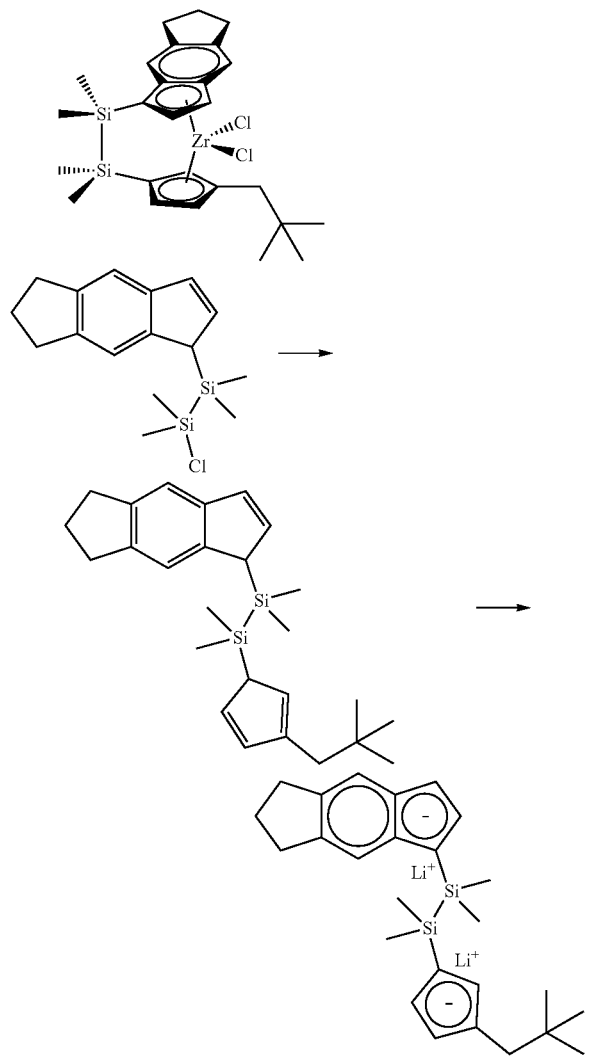

1,1,2,2-Tetramethyl-1-(3-neopentylcyclopenta-2,4-dien-1-yl)-2-(1,5,6,7-tetrahydro-s-indacen-1-yl)disilane To a stirring solution of 1-chloro-1,1,2,2-tetramethyl-2-(1,5,6,7-tetrahydro-s-indacen-1-yl)disilane (0.325 g, 1.06 mmol) in diethyl ether (30 mL), lithium neopentylcyclopentadienide (0.151 g, 1.06 mmol, 1 eq) was added with diethyl ether (10 mL) and tetrahydrofuran (1 mL). The reaction was stirred at room temperature for 3.5h. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as an orange oil, containing hexane (0.15 eq) (0.438 g).

Lithium 1-(1,1,2,2-tetramethyl-2-(3-neopentylcyclopenta-2,4-dien-1-ide-1-yl)disilaneyl)-1,5,6,7-tetrahydro-s-indacen-1-ide To a stirring solution of 1,1,2,2-tetramethyl-1-(3-neopentylcyclopenta-2,4-dien-1-yl)-2-(1,5,6,7-tetrahydro-s-indacen-1-yl)disilane (0.438 g, 1.08 mmol) in diethyl ether (20 mL), n-butyllithium (0.9 mL, 2.5M in hexanes, 2.25 mmol, 2.09 eq) was added. The reaction was stirred at room temperature for 21 minutes. The reaction was concentrated under a stream of nitrogen and then under high vacuum. The residue was washed with hexane and concentrated under high vacuum to afford the product as an off-white solid (0.400 g).

Tetramethyldisilylene (3-neopentyl-cyclopentadienyl) (1,5,6,7-tetrahydro-s-indacenyl) zirconium dichloride To a stirring suspension of zirconium(IV) chloride (0.223 g, 0.96 mmol, 1 eq) in diethyl ether (10 mL), a suspension of lithium 1-(1,1,2,2-tetramethyl-2-(3-neopentylcyclopenta-2,4-dien-1-ide-1-yl)disilaneyl)-1,5,6,7-tetrahydro-s-indacen-1-ide (0.400 g, 0.96 mmol) in diethyl ether (10 mL) was added. The reaction was stirred at room temperature for 14.5h. The reaction was concentrated under a stream of nitrogen and then under high vacuum. The residue was extracted with dichloromethane (20 mL) and filtered over Celite. The dichloromethane extract was concentrated under a stream of nitrogen and then under high vacuum. The residue was washed with hexane and concentrated under high vacuum to afford the product as a yellow solid (0.273 g, 50%, ratio of 1:1.2 isomers A and B). $^1$H NMR (400 MHz, CD$_2$Cl$_2$): δ 7.63 (s, 3H), 7.58 (s, 3H), 7.51 (s, 3H), 7.50 (s, 3H), 6.94 (t, 2H, J=3.3 Hz), 6.76-6.72 (m, 1H), 6.62 (dd, 1H, J=3.4, 0.9 Hz), 6.60 (dd, 1H, J=3.4, 0.9 Hz), 6.42 (t, 1H, J=2.2 Hz, isomer A, used for isomer ratio), 6.13 (dd, 1H, J=3.1, 2.0 Hz, isomer B, used for isomer ratio), 5.87 (t, 1H, J=2.2 Hz), 5.84 (dd, 1H, J=3.1, 2.3 Hz), 5.80 (dd, 1H, J=3.1, 2.0 Hz), 3.16-2.89 (m, 8H), 2.48 (d, 1H, J=13.6 Hz), 2.30 (d, 1H, J=13.5 Hz), 2.25 (d, 1H, J=13.5 Hz), 2.19-2.01 (m, 4H), 1.59 (d, 1H, J=13.5 Hz), 0.82 (s, 9H), 0.76 (s, 9H), 0.62 (s, 3H), 0.58 (s, 3H), 0.57 (s, 3H), 0.52 (s, 3H), 0.51 (s, 3H), 0.50 (s, 3H), 0.50 (s, 3H), 0.46 (s, 3H).

Tetramethyldisilylene (cyclopentadienyl) (1,5,6,7-tetrahydro-s-indacenyl) zirconium dichloride

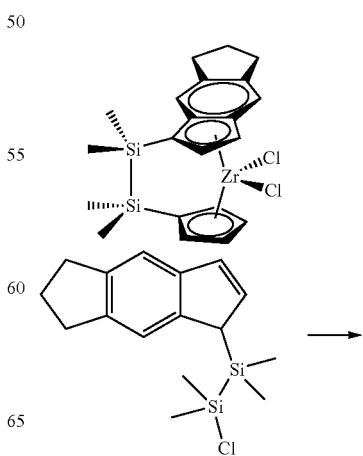

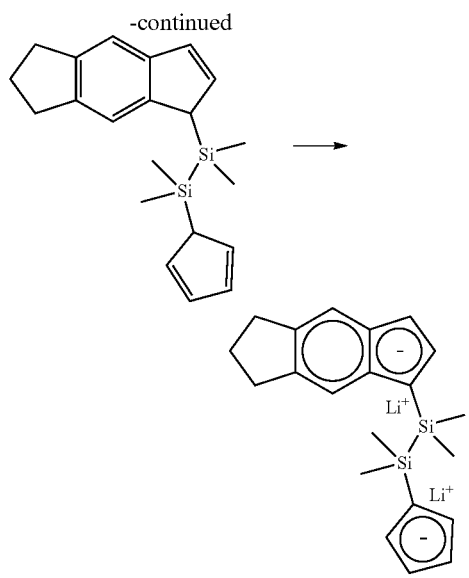

1-(Cyclopenta-2,4-dien-1-yl)-1,1,2,2-tetramethyl-2-(1,5,6,7-tetrahydro-s-indacen-1-yl)disilane To a stirring solution of 1-chloro-1,1,2,2-tetramethyl-2-(1,5,6,7-tetrahydro-s-indacen-1-yl)disilane (1.844 g, 6.01 mmol) in tetrahydrofuran (20 mL), a solution of lithium cyclopentadienide (0.433 g, 6.01 mmol, 1 eq) in tetrahydrofuran (20 mL) was added. The reaction was stirred at room temperature for 1 h. Then, additional cyclopentadienide (0.200 g, 0.28 mmol, 0.46 eq) was added. The reaction was stirred for an additional 15 h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product (1.493 g).

Lithium 1-(2-(cyclopenta-2,4-dien-1-ide-1-yl)-1,1,2,2-tetramethyldisilaneyl)-1,5,6,7-tetrahydro-s-indacen-1-ide To a precooled, stirring solution of 1-(cyclopenta-2,4-dien-1-yl)-1,1,2,2-tetramethyl-2-(1,5,6,7-tetrahydro-s-indacen-1-yl)disilane (1.493 g, 4.44 mmol) in diethyl ether (40 mL), n-butyllithium (3.6 mL, 2.5M in hexanes, 9.00 mmol, 2.03 eq) was added. The reaction was stirred at room temperature for approximately 1 h. The reaction was cooled to −35° C. The reaction was then filtered, while cold, on a plastic fritted funnel. The filtered solid was collected and concentrated under high vacuum to afford the product (1.209 g).

Tetramethyldisilylene (cyclopentadienyl) (1,5,6,7-tetrahydro-s-indacenyl) zirconium dichloride To a precooled, stirring suspension of lithium 1-(2-(cyclopenta-2,4-dien-1-ide-1-yl)-1,1,2,2-tetramethyldisilaneyl)-1,5,6,7-tetrahydro-s-indacen-1-ide (1.209 g, 3.47 mmol) in diethyl ether (40 mL), zirconium(IV) chloride (0.808 g, 3.47 mmol, 1 eq) was added with diethyl ether (20 mL). The reaction was stirred at room temperature for 18h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. The dichloromethane extract was further extracted with hexane. The hexane extract was concentrated under a stream of nitrogen and then under high vacuum. The hexane extract was washed with cold hexane and concentrated under high vacuum to afford the product as a yellow solid (0.091 g, 5%).
$^1$H NMR (400 MHz, CD$_2$Cl$_2$): δ 7.52 (s, 2H), 6.92 (d, 1H, J=3.4 Hz), 6.77 (dt, 1H, J=3.1, 2.0 Hz), 6.61 (dd, 1H, J=3.4, 0.7 Hz), 6.39 (td, 1H, J=3.0, 1.9 Hz), 6.21 (dt, 1H, J=3.1, 2.0 Hz), 6.15 (td, 1H, J=3.0, 1.9 Hz), 3.14-2.86 (m, 4H), 2.21-2.00 (m, 2H), 0.61 (s, 3H), 0.53 (s, 3H), 0.52 (s, 3H), 0.52 (s, 3H).

Tetramethyldisilylene (3-methyl-cyclopentadienyl) (1,5,6,7-tetrahydro-s-indacenyl) zirconium dichloride

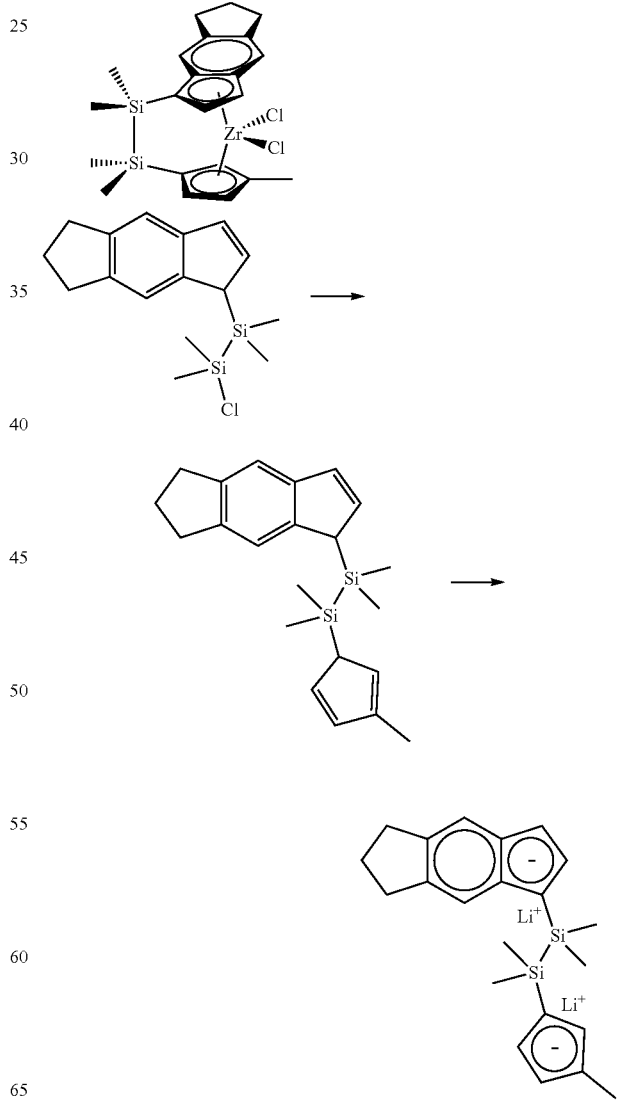

1,1,2,2-Tetramethyl-1-(3-methylcyclopenta-2,4-dien-1-yl)-2-(1,5,6,7-tetrahydro-s-indacen-1-yl)disilane To a precooled, stirring solution of 1-chloro-1,1,2,2-tetramethyl-2-(1,5,6,7-tetrahydro-s-indacen-1-yl)disilane (1.441 g, 4.69 mmol) in tetrahydrofuran (20 mL), a solution of lithium methylcyclopentadienide (0.404 g, 4.69 mmol, 1 eq) in tetrahydrofuran (20 mL) was added. The reaction was stirred at room temperature for 4h. The reaction was concentrated under a stream of nitrogen and then under high vacuum. The residue was extracted with hexane (3×20 mL) and filtered over Celite. The combined hexane extracts were concentrated under a stream of nitrogen and then under high vacuum to afford the product (1.089 g).

Lithium 1-(1,1,2,2-tetramethyl-2-(3-methylcyclopenta-2,4-dien-1-ide-1-yl)disilaneyl)-1,5,6,7-tetrahydro-s-indacen-1-ide To a precooled, stirring solution of 1,1,2,2-tetramethyl-1-(3-methylcyclopenta-2,4-dien-1-yl)-2-(1,5,6,7-tetrahydro-s-indacen-1-yl)disilane (1.089 g, 3.11 mmol) in diethyl ether (40 mL), n-butyllithium (2.5 mL, 2.5M in hexanes, 6.25 mmol, 2.01 eq) was added. The reaction was stirred at room temperature for 34 minutes. The reaction was cooled to −35° C. The reaction was then filtered, while cold, on a plastic fritted funnel. The filtered solid was collected and concentrated under high vacuum to afford the product as a white solid (0.771 g).

Tetramethyldisilylene (3-methyl-cyclopentadienyl) (1,5,6,7-tetrahydro-s-indacenyl) zirconium dichloride To a precooled, stirring solution of lithium 1-(1,1,2,2-tetramethyl-2-(3-methylcyclopenta-2,4-dien-1-ide-1-yl)disilaneyl)-1,5,6,7-tetrahydro-s-indacen-1-ide (0.771 g, 2.13 mmol) in diethyl ether (40 mL), zirconium(IV) chloride (0.496 g, 2.13 mmol, 1 eq) was added. The reaction was stirred at room temperature for 15 h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. The dichloromethane extract was washed with hexane. The residue was extracted with diethyl ether. Hexane was added to the extract, and the mixture was cooled to −35° C. The precipitated solid was collected and concentrated under high vacuum to afford the product as a yellow solid (0.285 g, 26%, ratio of 1:1 isomers A and B; contains minor amounts of unknown impurity). $^1$H NMR (400 MHz, CD$_2$Cl$_2$): δ 7.60 (s, 1H), 7.55 (s, 1H), 7.54-7.50 (m, 2H), 6.93 (d, 1H, J=3.4 Hz), 6.92 (d, 1H, J=3.4 Hz), 6.69 (dd, 1H, J=3.1, 2.3 Hz), 6.63 (dd, 1H, J=3.4, 0.9 Hz, isomer A, used for isomer ratio), 6.60 (dd, 1H, J=3.4, 0.9 Hz isomer B, used for isomer ratio), 6.47-6.43 (m, 1H), 6.14 (ddd, 1H, J=3.1, 2.0, 0.6 Hz), 5.93 (td, 1H, J=2.2, 0.6 Hz), 5.87 (dd, 1H, J=3.1, 2.3 Hz), 5.83 (ddd, 1H, J=3.1, 2.0, 0.5 Hz), 3.14-2.85 (m, 8H), 2.15 (s, 3H), 2.14-2.01 (m, 4H), 1.86 (s, 3H), 0.62 (s, 3H), 0.58 (s, 3H), 0.55 (s, 3H), 0.52 (s, 3H), 0.50 (s, 3H), 0.49 (s, 3H), 0.49 (s, 3H), 0.46 (s, 3H).

Tetramethyldisilylene (3-propyl-cyclopentadienyl) (1,5,6,7-tetrahydro-s-indacenyl) zirconium dichloride

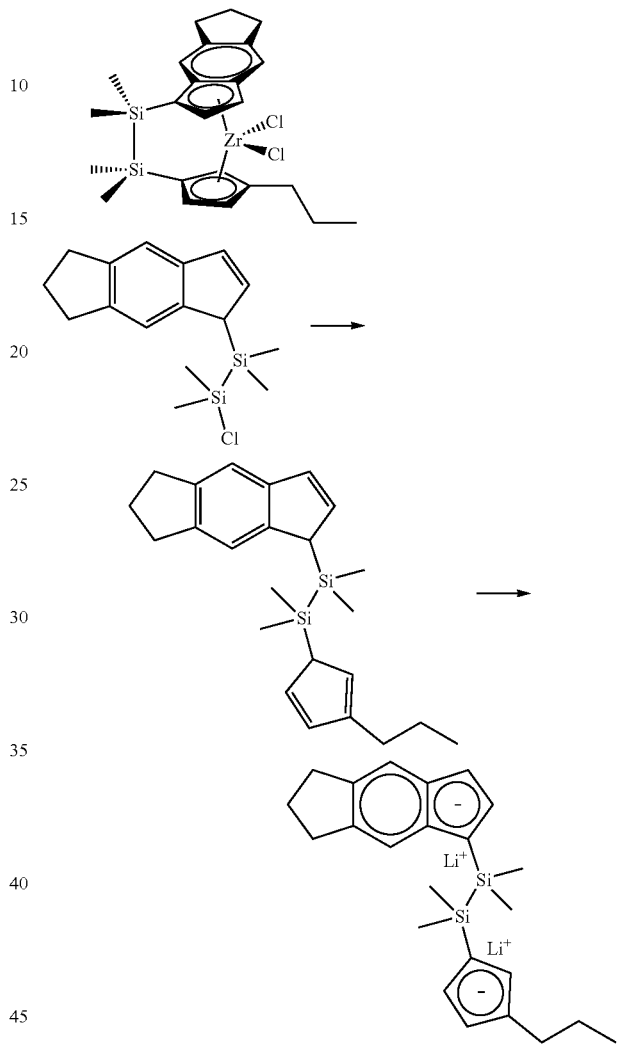

1,1,2,2-Tetramethyl-1-(3-propylcyclopenta-2,4-dien-1-yl)-2-(1,5,6,7-tetrahydro-s-indacen-1-yl)disilane To a precooled, stirring solution of 1-chloro-1,1,2,2-tetramethyl-2-(1,5,6,7-tetrahydro-s-indacen-1-yl)disilane (0.808 g, 2.63 mmol) in diethyl ether (40 mL), a suspension of lithium propylcyclopentadienide (0.297 g, 2.60 mmol, 0.99 eq) in diethyl ether (40 mL) was added. The reaction was stirred at room temperature for 2h. Then, tetrahydrofuran (20 mL) was added. The reaction was stirred for an additional 104 minutes. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as an orange oil, containing diethyl ether (0.01 eq) and hexane (0.04 eq) (1.010 g).

Lithium 1-(1,1,2,2-tetramethyl-2-(3-propylcyclo-penta-2,4-dien-1-ide-1-yl)disilaneyl)-1,5,6,7-tetra-hydro-s-indacen-1-ide To a precooled, stirring solution of 1,1,2,2-tetramethyl-1-(3-propylcyclopenta-2,4-dien-1-yl)-2-(1,5,6,7-tetrahydro-s-indacen-1-yl)disilane (1.010 g, 2.67 mmol) in diethyl ether (20 mL), n-butyllithium (2.2 mL, 2.5M in hexanes, 5.50 mmol, 2.06 eq) was added. The reaction was stirred at room temperature for 44 minutes. The reaction was concentrated under a stream of nitrogen and then under high vacuum. The residue was washed with hexane (10 mL) and concentrated under high vacuum to afford the product as an off-white solid, containing diethyl ether (0.04 eq) and hexane (0.19 eq) (1.104 g).

Tetramethyldisilylene (3-propyl-cyclopentadienyl) (1,5,6,7-tetrahydro-s-indacenyl) zirconium dichloride To a precooled, stirring solution of lithium 1-(1,1,2,2-tetramethyl-2-(3-propylcyclopenta-2,4-dien-1-ide-1-yl)disilaneyl)-1,5,6,7-tetrahydro-s-indacen-1-ide (1.104 g, 2.70 mmol) in diethyl ether (30 mL), zirconium(IV) chloride (0.625 g, 2.68 mmol, 1 eq) was added with diethyl ether (10 mL). The reaction was stirred at room temperature for 14h. The reaction was concentrated under a stream of nitrogen and then under high vacuum. The residue was extracted with dichloromethane (2×10 mL) and filtered over Celite. The combined dichloromethane extracts were concentrated under a stream of nitrogen and then under high vacuum to give a yellow foam. Dichloromethane (5 mL) was added to the foam to dissolve the material. Then, hexane (5 mL) was added and the material was mixed. The mixture was allowed to settle for one hour. An oily solid precipitated. The supernatant was filtered over Celite. The filtrate was collected and concentrated under a stream of nitrogen and then under high vacuum. The residue was extracted with hexane and filtered over Celite. The hexane extract was concentrated under a stream of nitrogen and then under high vacuum. The residue was washed with minimal hexane and concentrated under high vacuum to afford the product as a yellow solid (0.109 g, 7%, ratio of 3.2:1 isomers A and B).
$^1$H NMR (400 MHz, CD$_2$Cl$_2$): δ 7.59 (s, 1H), 7.57 (s, 1H), 7.51 (s, 2H), 6.95-6.91 (m, 2H), 6.71 (dd, 1H, J=3.1, 2.3 Hz), 6.61 (dd, 1H, J=3.4, 0.9 Hz), 6.60 (dd, 1H, J=3.4, 0.9 Hz), 6.48 (t, 1H, J=2.2 Hz), 6.15-6.11 (m, 1H), 5.93 (dd, 1H, J=3.1, 2.3 Hz, isomer A, used for isomer ratio), 5.89 (dd, 1H, J=2.2 Hz, isomer B, used for isomer ratio), 5.85 (dd, 1H, J=3.1, 2.0 Hz), 3.14-2.85 (m, 8H), 2.59-2.42 (m, 3H), 2.35-2.25 (m, 1H), 2.20-1.97 (m, 4H), 1.61-1.10 (m, 4H), 0.89 (t, 3H, J=7.3 Hz), 0.81 (t, 3H, J=7.3 Hz), 0.60 (s, 3H), 0.58 (s, 3H), 0.55 (s, 3H), 0.52 (s, 3H), 0.51 (s, 3H), 0.50 (s, 3H), 0.49 (s, 3H), 0.46 (s, 3H).

Tetramethyldisilylene (cyclopentadienyl) (indenyl) zirconium dichloride

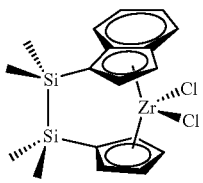

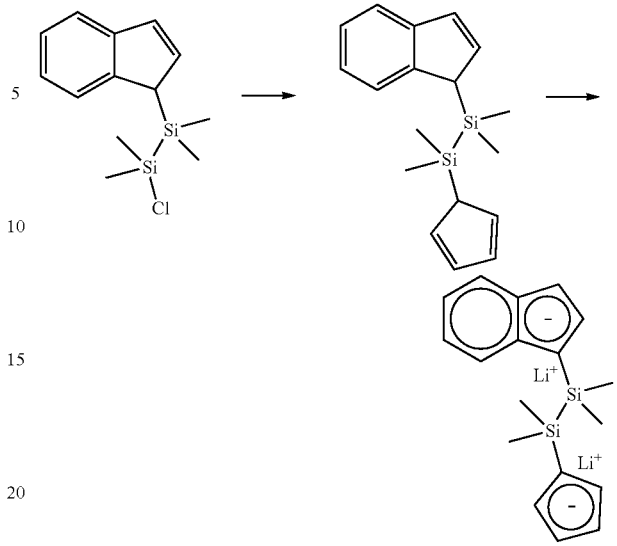

1-(Cyclopenta-2,4-dien-1-yl)-2-(1H-inden-1-yl)-1,1,2,2-tetramethyldisilane

To a precooled, stirring solution of 1-chloro-2-(1H-inden-1-yl)-1,1,2,2-tetramethyldisilane (3.873 g, 14.51 mmol) in tetrahydrofuran (20 mL), a solution of lithium cyclopentadienide (1.045, 14.51 mmol, 1 eq) in tetrahydrofuran (20 mL) was added. The reaction was stirred at room temperature for 40 minutes. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as a light amber oil (4.217 g).

Lithium 1-(2-(cyclopenta-2,4-dien-1-ide-1-yl)-1,1,2,2-tetramethyldisilaneyl)-1H-inden-1-ide To a precooled, stirring solution of 1-(cyclopenta-2,4-dien-1-yl)-2-(1H-inden-1-yl)-1,1,2,2-tetramethyldisilane (4.217 g, 14.22 mmol) in diethyl ether (30 mL), n-butyllithium (11.4 mL, 2.5M in hexanes, 28.5 mmol, 2 eq) was added. The reaction was stirred at room temperature for 14.5h. The reaction was concentrated under a stream of nitrogen and then under high vacuum. The residue was washed with hexane (2×20 mL) and filtered on a plastic fritted funnel. The filtered solid was collected and concentrated under high vacuum to afford the product as a tan solid, containing diethyl ether (0.07 eq) and hexane (0.11 eq) (4.424 g).

Tetramethyldisilylene (cyclopentadienyl) (indenyl) zirconium dichloride

To a precooled, stirring solution of lithium 1-(2-(cyclopenta-2,4-dien-1-ide-1-yl)-1,1,2,2-tetramethyldisilaneyl)-1H-inden-1-ide (2.637 g, 8.16 mmol) in diethyl ether (30 mL), zirconium(IV) chloride (1.902 g, 8.16 mmol, 1 eq) was added with diethyl ether (20 mL). The reaction was stirred at room temperature for 2.5h. The reaction was concentrated under a stream of nitrogen and then under high vacuum. The residue was extracted with dichloromethane (3×20 mL) and filtered over Celite. The combined dichloromethane extracts were concentrated under a stream of nitrogen and then under high vacuum. The residue was washed with hexane (20 mL) and extracted with toluene. The toluene extract was concentrated under high vacuum. The residue was then extracted with hot hexane (2×20 mL) and filtered over Celite while hot. The combined hot hexane extracts were concentrated under a stream of nitrogen and then under high vacuum. The hot hexane extracts were washed with hexane (2×10 mL) and concentrated under high vacuum to afford the product as a yellow solid (0.307 g, 8%). $^1$H NMR (400 MHz, CD$_2$Cl$_2$): δ 7.78-7.72 (m, 2H), 7.36 (ddd, 1H, J=8.8, 6.7, 1.1 Hz), 7.26 (ddd, 1H, J=8.5, 6.7, 1.0 Hz), 7.03 (d, 1H, J=3.4 Hz), 6.80 (dt, 1H, J=3.1, 2.0 Hz), 6.71 (dd, 1H, J=3.4, 0.9 Hz), 6.41 (td, 1H, J=3.0, 1.9 Hz), 6.27 (dt, 1H, J=3.1, 2.1 Hz), 6.14 (td, 1H, J=3.0, 1.9 Hz), 0.63 (s, 3H), 0.54 (s, 3H), 0.54 (s, 3H), 0.53 (s, 3H).

Tetramethyldisilylene (cyclopentadienyl) (4-naphthyl-indenyl) zirconium dichloride

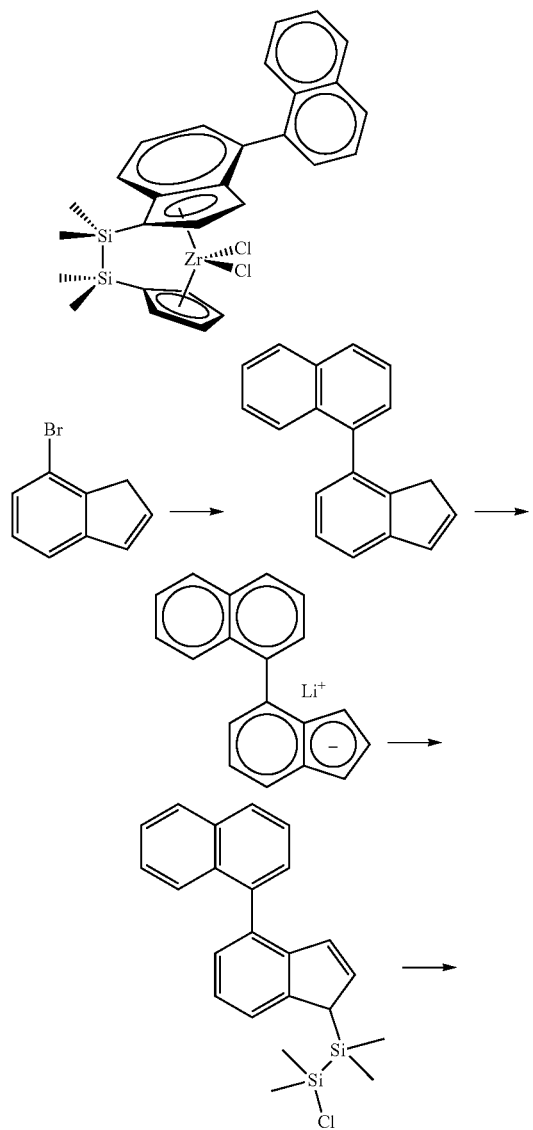

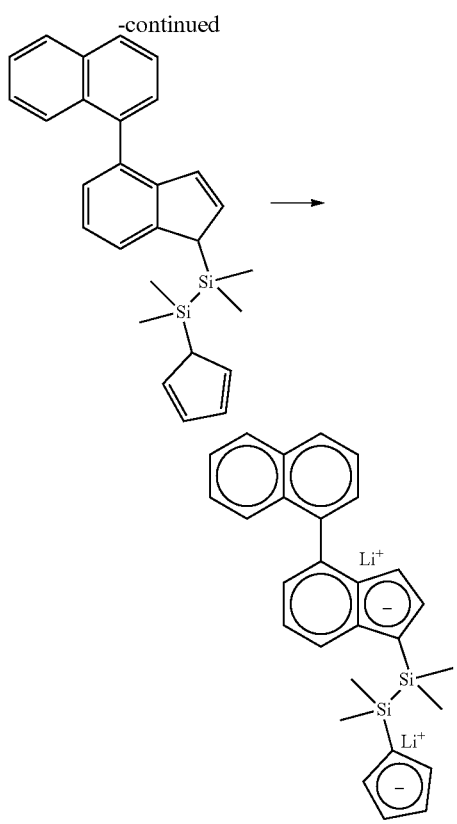

7-(1-Naphthyl)-indene

To a solution of 7-bromoindene (3.202 g, 16.42 mmol) and naphthalene-1-boronic acid (3.393 g, 19.73 mmol, 1.20 eq) in tetrahydrofuran (20 mL), potassium carbonate (5.192 g, 37.03 mmol, 2.26 eq) was added. Then a solution of 1,3,5,7-tetramethyl-6-phenyl-2,4,8-trioxa-6-phosphaadamantane (0.200 g, 0.68 mmol, 0.04 eq) and bis(dibenzylideneacetone)palladium (0.134 g, 0.23 mmol, 0.01 eq) in tetrahydrofuran (20 mL) was added. Then water (8 mL) was added. The reaction vessel was sealed. The reaction was stirred and heated to 75° C. in a sealed vessel for 18.5h. The reaction was allowed to cool to room temperature. The reaction was then concentrated in vacuo. The residue underwent aqueous extraction with pentane (3×50 mL). The combined pentane extracts were washed with saturated, aqueous potassium carbonate (50 mL). The washed pentane extracts were dried with anhydrous magnesium sulfate and filtered. The dried filtrate was concentrated in vacuo. The crude material was purified by silica gel column chromatography with isohexane eluent to give a black solid. The solid was washed with minimal hexane and concentrated under high vacuum to afford the product as a tan solid (2.795 g).

Lithium 4-(1-naphthyl)-indenide

To a precooled, stirring solution of 7-(1-naphthyl)-indene (2.795 g, 11.53 mmol) in diethyl ether (40 mL), n-butyllithium (4.7 mL, 2.5M in hexanes, 11.75 mmol, 1.02 eq) was added. The reaction was stirred at room temperature for 1.5h. The reaction was filtered over Celite, and the filtered solid was washed with diethyl ether. The filtered solid was then extracted with tetrahydrofuran. The tetrahydrofuran extract was concentrated under a stream of nitrogen and then under high vacuum. The residue was washed with hexane (15 mL) and then concentrated under high vacuum to afford the product as a yellow foam, containing tetrahydrofuran (0.14 eq) (2.109 g).

1-Chloro-1,1,2,2-tetramethyl-2-(4-(naphthalen-1-yl)-1H-inden-1-yl)disilane

To a precooled, stirring solution of 1,2-dichloro-1,1,2,2-tetramethyldisilane (3.232 g, 17.26 mmol, 2.12 eq) in diethyl ether (90 mL), a suspension of lithium 4-naphthyl-indenide (2.109 g, 8.16 mmol) in diethyl ether (60 mL) was added. The reaction was stirred at room temperature for 15 h. The reaction was concentrated under a stream of nitrogen and then under high vacuum. The residue was extracted with hexane (2×20 mL) and filtered over Celite. The combined hexane extracts were concentrated under a stream of nitrogen and then under high vacuum at 75° C. to afford the product as a light amber oil (2.872 g).

1-(Cyclopenta-2,4-dien-1-yl)-1,1,2,2-tetramethyl-2-(4-(naphthalen-1-yl)-1H-inden-1-yl)disilane To a stirring solution of lithium cyclopentadienide (0.263 g, 3.65 mmol, 1 eq) in tetrahydrofuran (20 mL), a solution of 1-chloro-1,1,2,2-tetramethyl-2-(4-(naphthalen-1-yl)-1H-inden-1-yl)disilane (1.436 g, 3.65 mmol) in diethyl ether (10 mL) was added. The reaction was stirred at room temperature for 3h. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as an amber oil (1.477 g).

Lithium 1-(2-(cyclopenta-2,4-dien-1-ide-1-yl)-1,1,2,2-tetramethyldisilaneyl)-4-(naphthalen-1-yl)-1H-inden-1-ide To a precooled, stirring solution of 1-(cyclopenta-2,4-dien-1-yl)-1,1,2,2-tetramethyl-2-(4-(naphthalen-1-yl)-1H-inden-1-yl)disilane (1.477 g, 3.49 mmol) in diethyl ether (20 mL), n-butyllithium (2.8 mL, 2.5M in hexanes, 7.00 mmol, 2 eq) was added. The reaction was stirred at room temperature overnight. The reaction was concentrated under a stream of nitrogen and then under high vacuum. The residue was washed with hexane (20 mL) and filtered on a plastic, fritted funnel. The filtered solid was collected and concentrated under high vacuum to afford the product as an off-white solid, containing diethyl ether (0.25 eq) and hexane (0.07 eq) (1.482 g).

Tetramethyldisilylene (cyclopentadienyl) (4-naphthyl-indenyl) zirconium dichloride To a precooled, stirring suspension of lithium 1-(2-(cyclopenta-2,4-dien-1-ide-1-yl)-1,1,2,2-tetramethyldisilaneyl)-4-(naphthalen-1-yl)-1H-inden-1-ide (1.482 g, 3.41 mmol) in diethyl ether (20 mL), zirconium(IV) chloride (0.795 g, 3.41 mmol, 1 eq) was added with diethyl ether (20 mL). The reaction was stirred at room temperature for 15.5h. The reaction was concentrated under a stream of nitrogen and then under high vacuum. The residue was extracted with dichloromethane (2×20 mL) and filtered over Celite. The combined dichloromethane extracts were concentrated under a stream of nitrogen and then under high vacuum to give an orange foam. The residue was stirred in hexane (20 mL) for approximately 1 h. The resulting suspension was filtered on a plastic fritted funnel. The hexane extract was collected and concentrated under a stream of nitrogen and then under high vacuum to afford a fraction of the product as a yellow solid (0.225 g, 11%, ratio of 1:1.5 isomers). The hexane washed filtered solid was collected and concentrated under high vacuum to give a yellow solid. The hexane washed dichloromethane extract was further extracted with hot hexane (2×20 mL) and filtered over Celite while hot. The combined hot hexane extracts were concentrated under a stream of nitrogen and then under high vacuum. The hot hexane extract was washed with hexane (20 mL) and concentrated under high vacuum to afford a fraction of the product as a yellow solid (0.216 g, 10%, ratio of 1:1.6 isomers A and B). $^1$H NMR (400 MHz, CD$_2$Cl$_2$): δ 8.09 (dd, 1H, J=8.5, 1.1 Hz), 7.98-7.26 (m, 19H), 7.03 (d, 1H, J=3.5 Hz), 6.95 (dd, 1H, J=3.5, 0.9 Hz, isomer A, used for isomer ratio), 6.89 (d, 1H, J=3.4 Hz), 6.75 (dt, 1H, J=3.1, 2.0 Hz), 6.70 (dt, 1H, J=3.1, 2.0 Hz, isomer B, used for isomer ratio), 6.57-6.52 (m, 2H), 6.35-6.25 (m, 5H), 0.72 (s, 3H), 0.70 (s, 3H), 0.62 (s, 3H), 0.60 (s, 3H), 0.57 (s, 3H), 0.56 (s, 3H), 0.54 (s, 3H), 0.52 (s, 3H).

Tetramethyldisilylene (3-butyl-cyclopentadienyl) (4-naphthyl-indenyl) zirconium dichloride

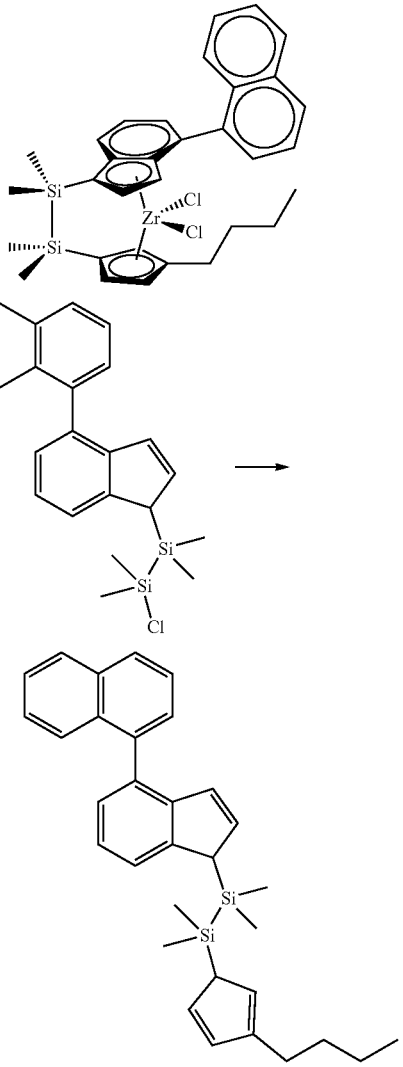

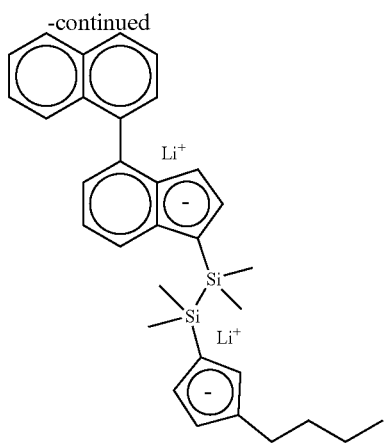

1-(3-Butylcyclopenta-2,4-dien-1-yl)-1,1,2,2-tetramethyl-2-(4-(naphthalen-1-yl)-1H-inden-1-yl)disilane To a stirring solution of 1-chloro-1,1,2,2-tetramethyl-2-(4-(naphthalen-1-yl)-1H-inden-1-yl)disilane (1.436 g, 3.65 mmol) in diethyl ether (30 mL), lithium butylcyclopentadienide (0.468 g, 3.65 mmol, 1 eq) was added with tetrahydrofuran (20 mL). The reaction was stirred for 1.5h. Then the reaction was concentrated to approximately half its original volume. The reaction was stirred for an additional 1.5h. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as a light amber oil (1.521 g).

Lithium 1-(2-(3-butylcyclopenta-2,4-dien-1-ide-1-yl)-1,1,2,2-tetramethyldisilaneyl)-4-(naphthalen-1-yl)-1H-inden-1-ide To a precooled, stirring solution of 1-(3-butylcyclopenta-2,4-dien-1-yl)-1,1,2,2-tetramethyl-2-(4-(naphthalen-1-yl)-1H-inden-1-yl)disilane (1.521 g, 3.18 mmol) in diethyl ether (20 mL), n-butyllithium (2.6 mL, 2.5M in hexanes, 6.50 mmol, 2.05 eq) was added. The reaction was stirred at room temperature for 16h. The reaction was concentrated under a stream of nitrogen and then under high vacuum. The residue was washed with hexane (20 mL) and concentrated under high vacuum to afford the product as a dark red-purple solid, containing diethyl ether (0.02 eq) and hexane (0.58 eq) (1.645 g).

Tetramethyldisilylene (3-butyl-cyclopentadienyl) (4-naphthyl-indenyl) zirconium dichloride To a precooled, stirring solution of lithium 1-(2-(3-butyl-cyclopenta-2,4-dien-1-ide-1-yl)-1,1,2,2-tetramethyldisilaneyl)-4-(naphthalen-1-yl)-1H-inden-1-ide (1.645 g, 3.35 mmol) in diethyl ether (20 mL), zirconium(IV) chloride (0.781 g, 3.35 mmol, 1 eq) was added with diethyl ether (20 mL). The reaction was stirred at room temperature for 16.5h. The reaction was concentrated under a stream of nitrogen and then under high vacuum. The residue was extracted with dichloromethane (2×20 mL) and filtered over Celite. The combined dichloromethane extracts were concentrated under a stream of nitrogen and then under high vacuum to give an orange foam. The orange foam was stirred in hexane (20 mL) for approximately 1 h. The resulting yellow suspension was filtered on a plastic fritted funnel. The solid was collected and concentrated under high vacuum to give a yellow solid. The yellow solid was extracted with hot hexane. The hot hexane extract was concentrated under a stream of nitrogen and then under high vacuum. The hot hexane extract was extracted with hexane cooled to −35° C. The cold hexane extract was allowed to slowly evaporate, generating solids. The solids were collected and concentrated under high vacuum to afford the product as a yellow solid (0.015 g, 1%, ratio of ~1:2:8:12 isomers A, B, C, and D). $^1$H NMR (400 MHz, $CD_2Cl_2$): δ 8.17-8.12 (m, 1H), 8.12-8.07 (m, 1H), 7.96-7.26 (m, 38H), 7.05-7.02 (m, 2H), 6.93 (dd, 1H, J=3.5, 0.9 Hz), 6.91-6.87 (m, 3H), 6.66-6.63 (m, 1H, isomer A, used for isomer ratio), 6.62-6.60 (m, 1H, isomer B, used for isomer ratio), 6.45 (t, 1H, J=2.2 Hz, isomer C, used for isomer ratio), 6.42 (t, 1H, J=2.2 Hz, isomer D, used for isomer ratio), 6.39-6.34 (m, 3H), 6.27 (dd, 1H, J=3.4, 0.9 Hz), 6.26-6.22 (m, 2H), 6.07-6.04 (m, 1H), 6.03-6.01 (m, 1H), 6.01-5.98 (m, 2H), 2.52-2.26 (m, 8H), 1.52-1.18 (m, 16H), 0.85-0.80 (m, 12H), 0.72-0.47 (m, 48H).

Tetramethyldisilylene (1,5,6,7-tetrahydro-s-indacenyl) (3-(trimethylsilyl)methyl-cyclopentadienyl) zirconium dichloride

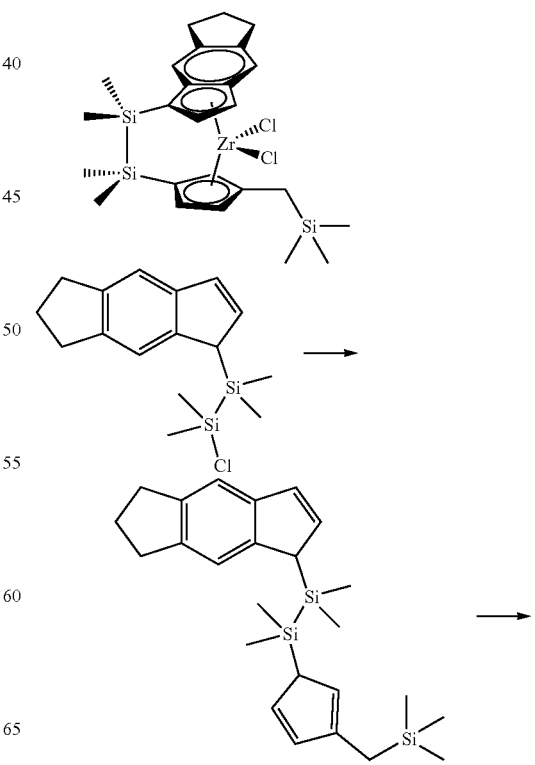

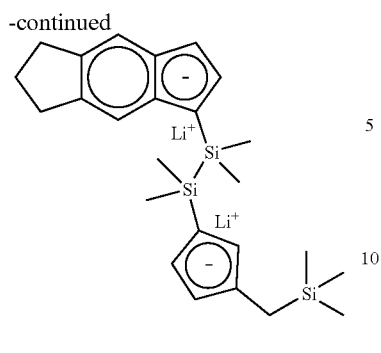

1,1,2,2-Tetramethyl-1-(1,5,6,7-tetrahydro-s-indacen-1-yl)-2-(3-((trimethylsilyl)methyl)cyclopenta-2,4-dien-1-yl)disilane To a precooled, stirring solution of 1-chloro-1,1,2,2-tetramethyl-2-(1,5,6,7-tetrahydro-s-indacen-1-yl)disilane (1.297 g, 4.23 mmol) in tetrahydrofuran (20 mL), a solution of lithium (trimethylsilyl)methylcyclopentadienide (0.669 g, 4.23 mmol, 1 eq) in tetrahydrofuran (15 mL) was added. The reaction was stirred at room temperature for 3h. The reaction was concentrated under a stream of nitrogen and then under high vacuum. The residue was extracted with hexane (2×20 mL) and filtered over Celite. The combined hexane extracts were concentrated under a stream of nitrogen and then under high vacuum to afford the product as a light amber oil (1.671 g).

Lithium 1-(1,1,2,2-tetramethyl-2-(3-((trimethylsilyl)methyl)cyclopenta-2,4-dien-1-ide-1-yl)disilaneyl)-1,5,6,7-tetrahydro-s-indacen-1-ide To a precooled, stirring solution of 1,1,2,2-tetramethyl-1-(1,5,6,7-tetrahydro-s-indacen-1-yl)-2-(3-((trimethylsilyl)methyl)cyclopenta-2,4-dien-1-yl)disilane (1.671 g, 3.95 mmol) in diethyl ether (20 mL), n-butyllithium (3.2 mL, 2.5M in hexanes, 8.00 mmol, 2.02 eq) was added. The reaction was stirred at room temperature for 14h. The reaction was concentrated under a stream of nitrogen and then under high vacuum. The residue was washed with hexane (20 mL) and filtered on a plastic fritted funnel. The solid was collected and concentrated under high vacuum to afford the product as a white powder, containing diethyl ether (0.06 eq) and hexane (0.07 eq) (1.672 g).

Tetramethyldisilylene (1,5,6,7-tetrahydro-s-indacenyl) (3-(trimethylsilyl)methyl-cyclopentadienyl) zirconium dichloride To a precooled, stirring suspension of lithium 1-(1,1,2,2-tetramethyl-2-(3-((trimethylsilyl)methyl)cyclopenta-2,4-dien-1-ide-1-yl)disilaneyl)-1,5,6,7-tetrahydro-s-indacen-1-ide (0.882 g, 1.98 mmol) in diethyl ether (20 mL), zirconium (IV) chloride (0.462 g, 1.98 mmol, 1 eq) was added with diethyl ether (20 mL). The reaction was stirred at room temperature for 18.5h. The reaction was concentrated under a stream of nitrogen and then under high vacuum. The residue was extracted with dichloromethane (3×10 mL) and filtered over Celite. The combined dichloromethane extracts were concentrated under a stream of nitrogen and then under high vacuum to afford the product as a yellow solid (1.070 g, 92%, ratio of 1:1.2 isomers A and B). $^1$H NMR (400 MHz, CD$_2$Cl$_2$): δ 7.62-7.59 (m, 1H), 7.59-7.56 (m, 1H), 7.54-7.48 (m, 2H), 6.95-6.91 (m, 2H), 6.68 (dd, 1H, J=3.0, 2.4 Hz), 6.62 (dd, 1H, J=3.4, 0.9 Hz), 6.59 (dd, 1H, J=3.4, 0.9 Hz), 6.24 (t, 1H, J=2.2 Hz), 5.99 (dd, 1H, J=3.0, 2.1 Hz, isomer A, used for isomer ratio), 5.85 (dd, 1H, J=3.0, 2.4 Hz, isomer B, used for isomer ratio), 5.69 (t, 1H, J=2.2 Hz), 5.67 (dd, 1H, J=3.0, 2.1 Hz), 3.14-2.87 (m, 8H), 2.20-1.99 (m, 5H), 1.93-1.86 (m, 2H), 1.29 (d, 1H, J=14.0 Hz), 0.62 (s, 3H), 0.57 (s, 3H), 0.56 (s, 3H), 0.51 (s, 3H), 0.50 (s, 3H), 0.49 (s, 3H), 0.48 (s, 3H), 0.45 (s, 3H), −0.07 (s, 9H), −0.11 (s, 9H).

Tetramethyldisilylene (1,5,6,7-tetrahydro-s-indacenyl) (3-(trimethylsilyl)methyl-cyclopentadienyl) hafnium dimethyl

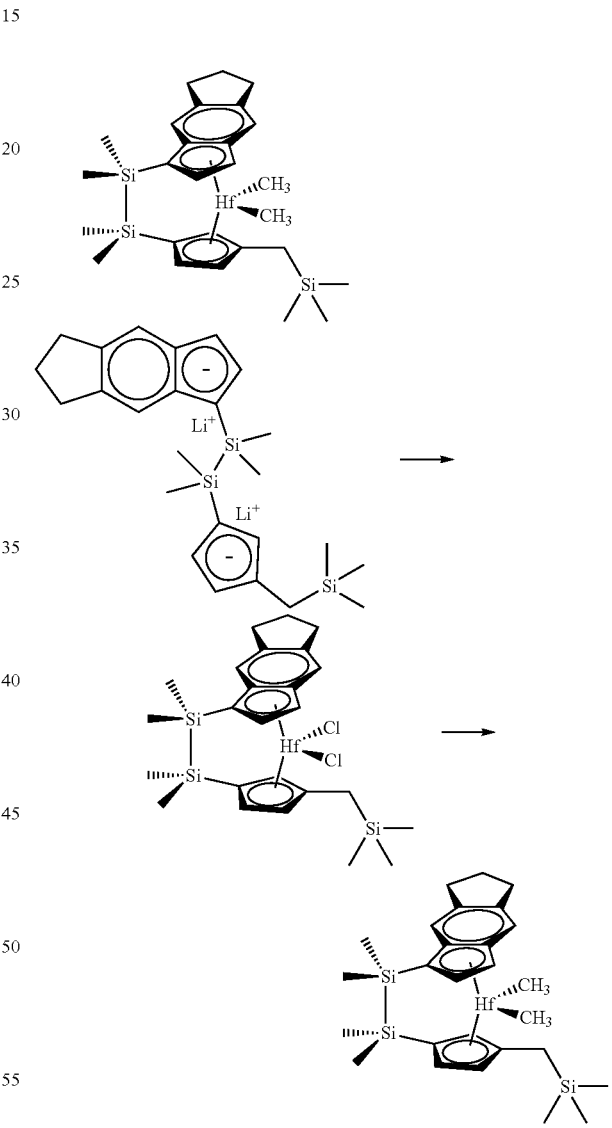

Tetramethyldisilylene (1,5,6,7-tetrahydro-s-indacenyl) (3-(trimethylsilyl)methyl-cyclopentadienyl) hafnium dichloride To a precooled, stirring suspension of hafnium(IV) chloride (0.574 g, 1.79 mmol, 1 eq) in diethyl ether (20 mL), a suspension of lithium 1-(1,1,2,2-tetramethyl-2-(3-((trimethylsilyl)methyl)cyclopenta-2,4-dien-1-ide-1-yl)disilaneyl)-1, 5,6,7-tetrahydro-s-indacen-1-ide (0.797 g, 1.79 mmol) in diethyl ether (20 mL) was added. The reaction was stirred at room temperature for 20h. The reaction was concentrated under a stream of nitrogen and then under high vacuum. The residue was extracted with dichloromethane (3×10 mL) and filtered over Celite. The combined dichloromethane extracts were concentrated under a stream of nitrogen and then under high vacuum. The extract was washed with hexane (20 mL) and filtered on a plastic fritted funnel. The filtered solid was collected and concentrated under high vacuum to afford the product as an off-white solid (0.480 g, 39%, ratio of 1:1.1 isomers A and B). $^1$H NMR (400 MHz, CD$_2$Cl$_2$): δ 7.59-7.54 (m, 2H), 7.49-7.46 (m, 2H), 6.87-6.84 (m, 2H), 6.56-6.53 (m, 1H), 6.50 (dd, 1H, J=3.4, 0.9 Hz, isomer A, used for isomer ratio), 6.46 (dd, 1H, J=3.4, 0.9 Hz, isomer B, used for isomer ratio), 6.11 (t, 1H, J=2.2 Hz), 5.88 (dd, 1H, J=3.0, 2.1 Hz), 5.74-5.71 (m, 1H), 5.56 (t, 1H, J=2.2 Hz), 5.54 (dd, 1H, J=2.9, 2.2 Hz), 3.17-2.86 (m, 8H), 2.17 (d, 1H, J=14.1 Hz), 2.14-2.00 (m, 5H), 1.97-1.89 (m, 2H), 1.31 (d, 1H, J=14.0 Hz), 0.61 (s, 3H), 0.57 (s, 3H), 0.54 (s, 3H), 0.50 (s, 3H), 0.49 (s, 3H), 0.48 (s, 3H), 0.47 (s, 3H), 0.44 (s, 3H), −0.08 (s, 9H), −0.12 (s, 9H).

Tetramethyldisilylene (1,5,6,7-tetrahydro-s-indacenyl) (3-(trimethylsilyl)methyl-cyclopentadienyl) hafnium dimethyl To a stirring solution of tetramethyldisilylene (1,5,6,7-tetrahydro-s-indacenyl) (3-(trimethylsilyl)methyl-cyclopentadienyl) hafnium dichloride (0.480 g, 0.72 mmol) in diethyl ether (20 mL), methylmagnesium bromide (1.2 mL, 3.0M in diethyl ether, 3.6 mmol, 5.03 eq) was added. The reaction was stirred at room temperature overnight. The reaction was concentrated under a stream of nitrogen and then under high vacuum. The residue was extracted with hexane (2×10 mL) and filtered over Celite. The combined hexane extracts were concentrated under a stream of nitrogen and then under high vacuum. The residue was washed with cold hexane and concentrated under high vacuum to afford the product as a white solid (0.256 g, 56%, ratio of 1:2.5 isomers A and B). $^1$H NMR (400 MHz, C$_6$D$_6$): δ 7.57-7.53 (m, 2H), 7.47-7.43 (m, 2H), 6.62 (dd, 1H, J=3.3, 0.8 Hz isomer A, used for isomer ratio), 6.58 (dd, 1H, J=3.4, 0.9 Hz, isomer B, used for isomer ratio), 6.28 (d, 1H, J=3.4 Hz), 6.12 (d, 1H, J=3.4 Hz), 5.87-5.79 (m, 3H), 5.73-5.66 (m, 2H), 5.63 (t, 1H, J=2.1 Hz), 2.98-2.69 (m, 8H), 2.06 (d, 1H, J=14.0 Hz), 2.01 (d, 1H, J=14.0 Hz), 1.93-1.80 (m, 4H), 1.76 (d, 1H, J=14.0 Hz), 1.66 (d, 1H, J=13.9 Hz), 0.48 (s, 3H), 0.46 (s, 3H), 0.39 (s, 3H), 0.37 (s, 3H), 0.36 (s, 6H), 0.30 (s, 3H), 0.27 (s, 3H), −0.02 (s, 9H), −0.04 (s, 9H), −0.14-−0.17 (m, 6H), −0.87 (s, 3H), −0.92 (s, 3H).

General Supportation Procedure

Supportation of A, B, D to L, 1 to 22.

Methylalumoxane treated silica (SMAO-ES70-875C) prepared as follows: SMAO-ES70-875: Methylalumoxane treated silica was prepared in a manner similar to the following:

In a 4 L stirred vessel in a drybox methylalumoxane (MAO, 30 wt % in toluene, approx. 1000 grams) is added along with approx. 2000 g of toluene. This solution is then stirred at 60 RPM for 5 minutes. Next, approx. 800 grams of ES-70-875 silica is added to the vessel. This slurry is then heated at 100° C. and stirred at 120 RPM for 3 hours. The temperature is then reduced to 25° C. and cooled to temperature over 2 hours. Once cooled, the vessel is set to 8 RPM and placed under vacuum for 72 hours. After emptying the vessel and sieving the supported MAO, approximately 1100 g of supported MAO will be collected.

ES-70-875 silica is ES70™ silica (PQ Corporation, Conshohocken, Pa.) that has been calcined at approx. 875° C. Specifically, the ES70™ silica is calcined at 880° C. for four hours after being ramped to 880° C. according to the following ramp rates:

| ° C. | ° C./h | ° C. |
|---|---|---|
| ambient | 100 | 200 |
| 200 | 50 | 300 |
| 300 | 133 | 400 |
| 400 | 200 | 800 |
| 800 | 50 | 880 |

For each sample, the desired amount of catalyst (40 mol catalyst/g SMAO) was transferred to a 20 mL glass vial. Then, toluene (about 3 g) was added. Finally, SMAO (0.5 g) was added. The contents of the vial were mixed (60-90 minutes) on a shaker. The contents of the vial were allowed to settle. The supernatant was decanted into solvent waste. If necessary, the remnants of each vial were stored in a freezer (−35° C.) until needed.

The vials were uncapped and loaded into the sample trays in a SpeedVac. The SpeedVac was set to run at 45° C. for 45 min at 0.1 vacuum setting and run for 2-3. Once complete, the vials were removed, and the powder contents of each vial were poured into a separate pre-weighed 4 mL vial. The vials were capped, sealed with electrical tape, and stored in the dry box freezer for future use.

Supported C (comparative) was a DAVISON 948 supported catalyst made in a manner analogous to that described in U.S. Pat. No. 6,180,736 using the (1-Me-3-nBuCp)$_2$ZrCl$_2$ metallocene.

General Procedure for High Throughput Ethylene/1-hexene Polymerization and Polymer Characterization (Tables 2, 6 and 7)

Unless stated otherwise ethylene homopolymerization and ethylene-hexene copolymerizations are carried out in a parallel pressure reactor, as generally described in U.S. Pat. Nos. 6,306,658; 6,455,316; WO 00/09255; and Murphy et al., J. Am. Chem. Soc., 2003, Vol. 125, pp. 4306-4317, each of which is incorporated by reference herein in its entirety. Although specific quantities, temperatures, solvents, reactants, reactants ratios, pressures, and other variables may need to be adjusted from one reaction to the next, the following describes a typical polymerization performed in a parallel, pressure reactor.

Runs in Tables 2 and 6 are carried out in a unit whose reactor has a total volume of 23 mL while running internally. Runs in Table 7 are carried out in another unit whose reactor has a total volume of 22 mL while running internally.

Preparation of catalyst slurry for high throughput run:

In a dry box, 45 mg of supported catalyst is weighed into a 20 mL glass vial. 15 mL of toluene is added to the vial to make a slurry that contained 3 mg supported catalyst/mL slurry. The resulting mixture is vortexed prior to injection.

Starting material preparations:

Solvents, polymerization grade toluene and isohexane are supplied by ExxonMobil Chemical Company and thoroughly dried and degassed prior to use. Polymerization grade ethylene is used and further purified by passing it through a series of columns: 500 cc Oxyclear cylinder from Labclear (Oakland, Calif.) followed by a 500 cc column packed with dried 3A mole sieves purchased from Aldrich Chemical Company, and a 500 cc column packed with dried 5A mole sieves purchased from Aldrich Chemical Company.

TnOAl (tri-n-octylaluminum, neat) is used as a 2 mmol/L solution in toluene.

Polymerizations are conducted in an inert atmosphere ($N_2$) drybox using autoclaves equipped with an external heater for temperature control, glass inserts (internal volume of reactor=22.5 mL), septum inlets, regulated supply of nitrogen, ethylene and hexene, and equipped with disposable PEEK mechanical stirrers (800 RPM). The autoclaves are prepared by purging with dry nitrogen prior to use.

Ethylene/1-hexene Copolymerization

The reactor is prepared as described above, and then purged with ethylene. Isohexane, 1-hexene and TnOAl are added via syringe at room temperature and atmospheric pressure. The reactor is then brought to process temperature (85° C.) and charged with ethylene to process pressure (130 psig=896 kPa) while stirring at 800 RPM. The transition metal compound "TMC" (100 µL of a 3 mg/mL toluene slurry, unless indicated otherwise) is added via syringe with the reactor at process conditions. TnOAl is used as 200 µL of a 20 mmol/L in isohexane solution. Amounts of reagents not specified above are given in Table 1. No other reagent is used. Ethylene is allowed to enter (through the use of computer controlled solenoid valves) the autoclaves during polymerization to maintain reactor gauge pressure (+/−2 psig). Reactor temperature is monitored and typically maintained within +/−1° C. Polymerizations are halted by addition of approximately 50 psi O2/Ar (5 mol % O2) gas mixture to the autoclaves for approximately 30 seconds. The polymerizations are quenched after a predetermined cumulative amount of ethylene had been added or for a maximum of 45 minutes polymerization time. In addition to the quench time for each run, the reactors are cooled and vented. The polymer is isolated after the solvent is removed in-vacuo. Yields reported include total weight of polymer and residual catalyst. The resultant polymer is analyzed by Rapid GPC to determine the molecular weight and by DSC to determine the melting point.

To determine various molecular weight related values of the high throughput samples by GPC, high temperature size exclusion chromatography was performed using an automated "Rapid GPC" system. This apparatus has a series of three 30 cm×7.5 mm linear columns, each containing PLgel 10 um, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using a Polymer Char IR4 detector. The molecular weights presented are relative to linear polystyrene standards and are uncorrected.

The amount of hexene incorporated in the polymers (wt %) was estimated by rapid FT-IR spectroscopy on a Bruker Vertex 70 IR in reflection mode. Samples were prepared in a thin film format by evaporative deposition techniques. Weight percent hexene was obtained from the ratio of peak heights in the ranges of 1377-1382 $cm^{-1}$ to 4300-4340 $cm^{-1}$. This method was calibrated using a set of ethylene hexene copolymers with a range of known wt % hexene content.

Differential Scanning Calorimetry (DSC) measurements were performed on a TA-Q200 instrument to determine the melting point of the polymers. Samples were pre-annealed at 220° C. for 15 minutes and then allowed to cool to room temperature overnight. The samples were then heated to 220° C. at a rate of 100° C./minutes and then cooled at a rate of 50° C./min. Melting points were collected during the heating period.

General Procedure-1 for Polymerization in Gas Phase Autoclave Reactor (Table 3)

A 2 Liter Autoclave reactor (Parker Autoclave Engineers Research Systems) is heated to 105° C. under a continuous purge of anhydrous nitrogen gas (~2-5 SLPM) for 60 minutes to reduce residual oxygen and moisture. Anhydrous sodium chloride, 50-400 g (Fisher, oven-dried 48 hr at 180° C., stored under inert atmosphere in glovebox), is loaded into a 0.5 L Whitey cylinder and charged to the reactor with nitrogen pressure. Reactor is maintained at 105° C. with continued nitrogen purge for 30 minutes. A solid scavenger (5.0 g, SMAO-ES70-875) is loaded to a Whitey sample cylinder and added to the reactor with nitrogen charge. Nitrogen purge is discontinued and the reactor maintained at 105° C. and 70 psig $N_2$ as impeller rotates the bed for 30 min (100-200 RPM). The reactor is adjusted to desired reactor temperature (60° C.-100° C.) and the nitrogen pressure reduced to ca. 20 psig. Comonomer (1-4 mL of 1-butene, 1-hexene, or 1-octene) is charged into the reactor from a syringe pump (Teledyne Isco), followed with 50-500 mL of 10% hydrogen gas (nitrogen balance). Reactor is subsequently pressurized with ethylene monomer to a total pressure of 240 psig. Quantities of comonomer and hydrogen are monitored by gas chromatography and adjusted to desired gas phase ratios of comonomer/ethylene and hydrogen/ethylene.

Solid Catalyst (5.0-100.0 mg, MAO-silica support) is loaded into a small injection tube under inert atmosphere nitrogen in a glovebox. The catalyst injection tube is attached to the reactor and catalyst is quickly charged into reactor with high pressure nitrogen (300-350 psig), and polymerization is monitored for the desired reaction time (30-300 min). The comonomer and hydrogen are continuously added with mass flow controllers to maintain specific concentrations during the polymerization, as measured by GC. Ethylene monomer is continuously added, maintaining a constant total reactor pressure of 300-350 psig (constant $C_2$ partial pressure of 200-220 psig). After the desired reaction time (1 h), the reactor is vented and cooled to ambient pressure and temperature. The reaction product is collected, dried 60-90 min under nitrogen purge, and weighed for crude yield. The product is transferred to a standard 2 L beaker and washed with 3×2000 mL of distilled water with rapid magnetic stirring to remove sodium chloride and residual silica. Polymer is collected by filtration and oven dried under vacuum at 40° C. for 12 hr, then weight is measured for final isolated yield. Polymer is analyzed by thermogravimetric analysis to ensure ≤1 wt % residual inorganic material, then is subsequently characterized by standard ASTM methods for density and molecular weight behavior.

General Procedure-2 for Polymerization in Gas Phase Autoclave Reactor (Tables 8 and 10)

A 2 Liter Autoclave reactor (Parker Autoclave Engineers Research Systems) is filled with 200-400 grams of granular NaCl. The salt is agitated (100-200 RPM of impeller rotation speed) and heated to a temperature above 100° C. under a continuous purge of house nitrogen gas for 60 minutes. This reduces the residual oxygen and moisture within the reactor and salt bed. A solid scavenger (for Table 8: 4.0-6.0 g, SMAO-ES70-875; for Table 10: 4.0-6.0 g, ~7-17 wt % TiBAl supported on ES70 that has been calcined at 100° C.) is loaded into a Whitey sample cylinder and added to the reactor with nitrogen charge. The reactor is adjusted to the desired reactor temperature (50° C.-100° C.) and ambient pressure. The desired amount of 25% hydrogen gas (nitrogen balance) is loaded into the reactor using a Brooks Mass Flow Controller. Then, a specified amount of Iso-pentane is added using a Whitey sample cylinder and injected with high pressure nitrogen. Using a ratio control, the Comonomer (1-butene, 1-hexene, or 1-octene) is pushed into the reactor from a syringe pump (Teledyne Isco) while ethylene is filling the reactor to a total pressure of about 240 psig. Supported catalyst is loaded into a small injection tube under inert atmosphere nitrogen in a glovebox. The catalyst injection tube is attached to the reactor and catalyst is quickly charged into reactor with high pressure nitrogen up to 300-350 psig, and polymerization is monitored for the desired reaction time (30-90 min). Ethylene monomer is continuously added, maintaining a constant total reactor pressure of 300-350 psig. Nitrogen is continuously injected to maintain a constant ethylene partial pressure. The comonomer and hydrogen are continuously added and adjusted to maintain desired gas phase ratios of comonomer/ethylene and hydrogen/ethylene, as monitored by gas chromatography. After the desired reaction time, the reactor is vented and cooled to ambient pressure and temperature. The reaction product is collected and weighed for an approximate yield. The product is transferred to a standard 4 L beaker with 2000 mL of distilled water and soap. The solution is rapidly agitated using a magnetic stirring plate and stir bar for the desired time. The solution is then transferred to a separator funnel and then allowed to settle. The heavy particles that have fallen to the bottom of the solution are washed out. The polymer is washed until the remaining water is clear of particles. The polymer is collected by filtration flask, oven dried at 100° C. overnight, and then weight is measured for final isolated yield.

Room Temperature (RT) is 23° C. unless otherwise indicated.

Products were characterized as follows:

$^1$H NMR $^1$H NMR data was collected at room temperature in a 5 mm probe using a Varian spectrometer with a $^1$H frequency of at least 400 MHz. Data was recorded using a maximum pulse width of 45°, 8 sec between pulses and signal averaging 120 transients.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 m Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10 M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{ps}=0.67$ and $K_{PS}=0.000175$ while a and K are for other materials as calculated and published in literature (Sun, T. et al. *Macromolecules* 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, a is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3$/1000TC) as a function of molecular weight. The short-chain branch (SCB) content per 1000TC (SCB/1000TC) is then computed as a function of molecular weight by applying a chain-end correction to the CH$_3$/1000TC function, assuming each chain to be linear and terminated by a methyl group at each end. The weight % comonomer is then obtained from the following expression in which f is 0.3, 0.4, 0.6, 0.8, and so on for C$_3$, C$_4$, C$_6$, C$_8$, and so on co-monomers, respectively.

$$w2 = f * SCB/1000TC$$

The bulk composition of the polymer from the GPC-IR and GPC-4D analyses is obtained by considering the entire signals of the CH$_3$ and CH$_2$ channels between the integration limits of the concentration chromatogram. First, the following ratio is obtained.

$$\text{Bulk IR ratio} = \frac{\text{Area of CH}_3 \text{ signal within integration limits}}{\text{Area of CH}_2 \text{ signal within integration limits}}$$

Then the same calibration of the CH$_3$ and CH$_2$ signal ratio, as mentioned previously in obtaining the CH3/1000TC as a function of molecular weight, is applied to obtain the bulk CH3/1000TC. A bulk methyl chain ends per 1000TC (bulk CH3 end/1000TC) is obtained by weight-averaging the chain-end correction over the molecular-weight range. Then $$w2b = f * \text{bulk CH3}/1000TC$$

$$\text{bulk } SCB/1000TC = \text{bulk CH3}/1000TC - \text{bulk}\frac{CH3end}{1000TC}$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972).

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_V^\alpha},$$

where $M_V$ is the viscosity-average molecular weight based on molecular weights determined by LS analysis and the K and a are for the reference linear polymer, which are, for purposes of the present disclosure, α=0.695 and K=0.000579 for linear ethylene polymers, α=0.705 and K=0.0002288 for linear propylene polymers, α=0.695 and K=0.000181 for linear butene polymers, a is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and a is 0.695 and K is 0.000579*(1−0.0077*w2b) for ethylene-octene copolymer where w2b is a bulk weight percent of octene comonomer. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

All molecular weights are weight average unless otherwise noted. All molecular weights are reported in g/mol unless otherwise noted.

C6 wt % is determined by $^1$H NMR.

Methyl groups per 1000 carbons (CH$_3$/1000 Carbons) is determined by $^1$H NMR.

Melt Index (MI, also referred to as 12) is measured according to ASTM D$_{1238}$ at 190° C., under a load of 2.16 kg unless otherwise noted. The units for MI are g/10 min or dg/min.

High Load Melt Index (HLMI, also referred to as I21) is the melt flow rate measured according to ASTM D-1238 at 190° C., under a load of 21.6 kg. The units for HLMI are g/10 min or dg/min.

Melt Index Ratio (MIR) is the ratio of the high load melt index to the melt index, or I21/I2.

Temperature Rising Elution Fractionation (TREF)

Temperature Rising Elution Fractionation (TREF) analysis was done using a Crystallization Elution Fractionation (CEF) instrument from Polymer Char, S. A., Valencia, Spain. The principles of CEF analysis and a general description of the particular apparatus used are given in the article Monrabal, B. et al. Crystallization Elution Fractionation. A New Separation Process for Polyolefin Resins. *Macromol. Symp.* 2007, 257, 71. In particular, a process conforming to the "TREF separation process" shown in this article, in which $F_c=0$, was used. Pertinent details of the analysis method and features of the apparatus used are as follows.

The solvent used for preparing the sample solution and for elution was 1,2-Dichlorobenzene (ODCB) filtered using a 0.1-µm Teflon filter (Millipore). The sample (6-16 mg) to be analyzed was dissolved in 8 ml of ODCB metered at ambient temperature by stirring (Medium setting) at 150° C. for 90 min. A small volume of the polymer solution was first filtered by an inline filter (stainless steel, 10 µm), which is back-flushed after every filtration. The filtrate was then used to completely fill a 200-µl injection-valve loop. The volume in the loop was then introduced near the center of the CEF column (15-cm long SS tubing, ⅜" o.d., 7.8 mm i.d.) packed with an inert support (SS balls) at 140° C., and the column temperature was stabilized at 125° C. for 20 min.

The sample volume was then allowed to crystallize in the column by reducing the temperature to 0° C. at a cooling rate of 1° C./min. The column was kept at 0° C. for 10 min before injecting the ODCB flow (1 ml/min) into the column for 10 min to elute and measure the polymer that did not crystallize (soluble fraction). The wide-band channel of the infrared detector used (Polymer Char IR5) generates an absorbance signal that is proportional to the concentration of polymer in the eluting flow. A complete TREF curve was then generated by increasing the temperature of the column from 0 to 140° C. at a rate of 2° C./min while maintaining the ODCB flow at 1 ml/min to elute and measure the concentration of the dissolving polymer.

The breadth of the composition distribution is characterized by the $T_{75}$-$T_{25}$ value. A TREF curve is produced as described above. Then the temperature at which 75% of the polymer is eluted is subtracted from the temperature at which 25% of the polymer is eluted, as determined by the integration of the area under the TREF curve. The T75-T25 value represents the difference. The closer these temperatures comes together, the narrower the composition distribution.

CFC Procedure

Cross-fractionation chromatography (CFC) analysis was done using a CFC-2 instrument from Polymer Char, S. A., Valencia, Spain. The principles of CFC analysis and a general description of the particular apparatus used are given in the article Ortin, A.; Monrabal, B.; Sancho-Tello, *J. Macromol. Symp.* 2007, 257, 13. FIG. 1 of the article is an appropriate schematic of the particular apparatus used. Pertinent details of the analysis method and features of the apparatus used are as follows.

The solvent used for preparing the sample solution and for elution was 1,2-Dichlorobenzene (ODCB) which was stabilized by dissolving 2 g of 2,6-bis(1,1-dimethylethyl)-4-methylphenol (butylated hydroxytoluene) in a 4-L bottle of fresh solvent at ambient temperature. The sample to be analyzed (25-125 mg) was dissolved in the solvent (25 ml metered at ambient temperature) by stirring (200 rpm) at 150° C. for 75 min. A small volume (0.5 ml) of the solution was introduced into a TREF column (stainless steel; o.d., ⅜"; length, 15 cm; packing, non-porous stainless steel micro-balls) at 150° C., and the column temperature was stabilized for 30 min at a temperature (120-125° C.) approximately 20° C. higher than the highest-temperature fraction for which the GPC analysis was included in obtaining the final bivariate distribution. The sample volume was then allowed to crystallize in the column by reducing the temperature to an appropriate low temperature (30, 0, or −15° C.) at a cooling rate of 0.2° C./min. The low temperature was held for 10 min before injecting the solvent flow (1 ml/min) into the TREF column to elute the soluble fraction (SF) into the GPC columns (3×PLgel 10 m Mixed-B 300×7.5 mm, Agilent Technologies, Inc.); the GPC oven was held at high temperature (140° C.). The SF was eluted for 5 min from the TREF column and then the injection valve was put in the "load" position for 40 min to completely elute all of the SF through the GPC columns (standard GPC injections). All subsequent higher-temperature fractions were analyzed using overlapped GPC injections wherein at each temperature step the polymer was allowed to dissolve for at least 16 min and then eluted from the TREF column into the GPC column for 3 min. The IR4 (Polymer Char) infrared detector was used to generate an absorbance signal that is proportional to the concentration of polymer in the eluting flow.

The universal calibration method was used for determining the molecular weight distribution (MWD) and molecular-weight averages ($M_n$, $M_w$, etc.) of eluting polymer fractions. Thirteen narrow molecular-weight distribution polystyrene standards (obtained from Agilent Technologies, Inc.) within the range of 1.5-8200 kg/mol were used to generate a universal calibration curve. Mark-Houwink parameters were obtained from Appendix I of Mori, S.; Barth, H. G. *Size Exclusion Chromatography*; Springer, 1999. For polystyrene K=1.38×10⁻ dl/g and α=0.7; and for polyethylene K=5.05×10⁻ dl/g and α=0.693 were used. For a polymer fraction, which eluted at a temperature step, that has a weight fraction (weight % recovery) of less than 0.5%, the MWD and the molecular-weight averages were not computed; additionally, such polymer fractions were not included in computing the MWD and the molecular-weight averages of aggregates of fractions.

Table 1 shows Catalysts A through L. Catalysts C, D, E, F and L are used as comparative metallocene catalysts.

TABLE 1

Catalysts A through L

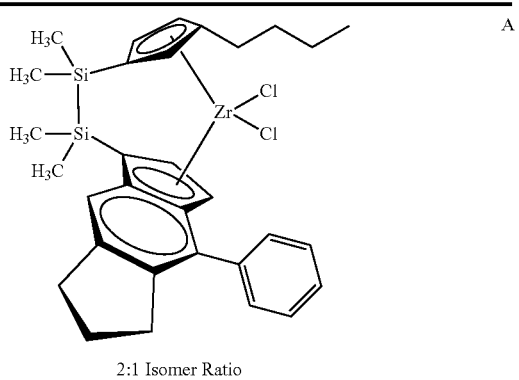

2:1 Isomer Ratio

TABLE 1-continued
Catalysts A through L
B
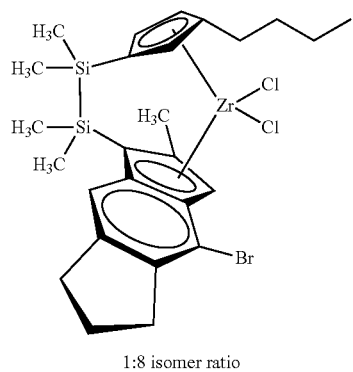
1:8 isomer ratio
C
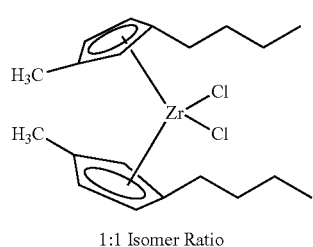
1:1 Isomer Ratio
D
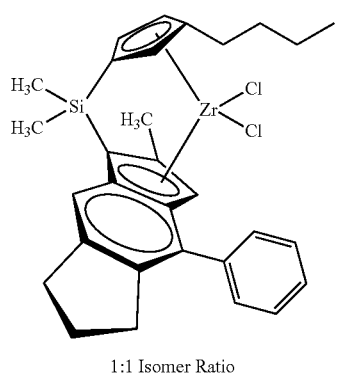
1:1 Isomer Ratio
E
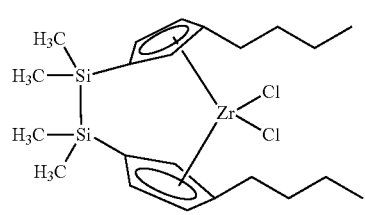
4:1 Isomer Ratio
TABLE 1-continued
Catalysts A through L
F
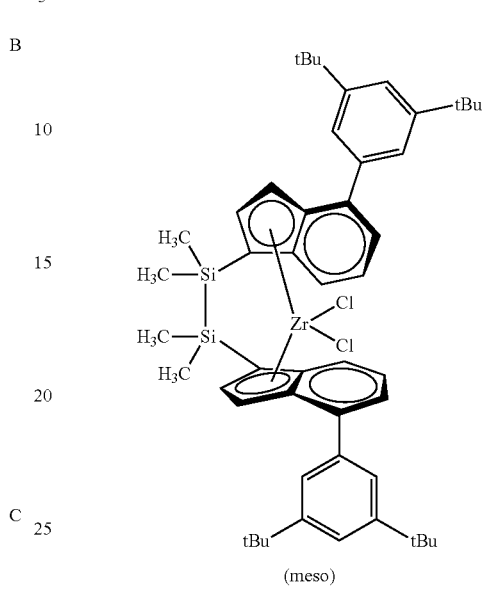
(meso)
G
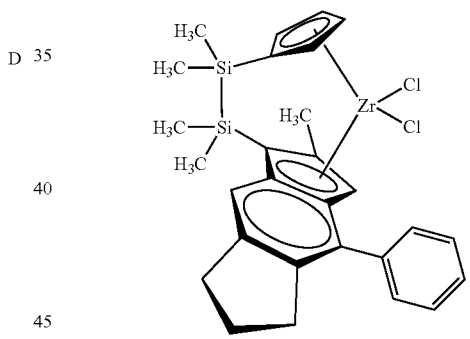
H
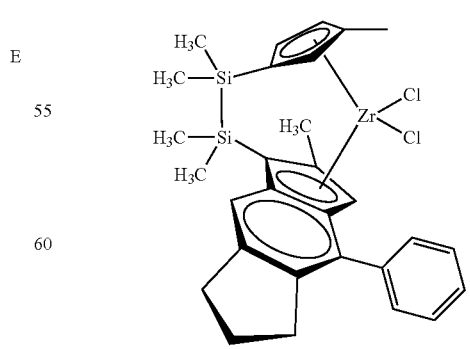
1:1 Isomer Ratio

TABLE 1-continued

Catalysts A through L

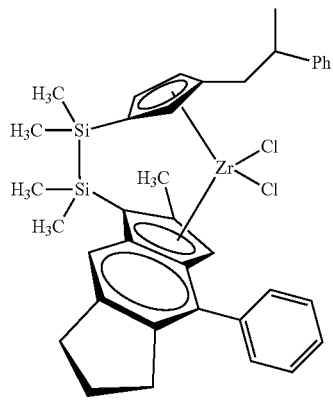

I 1.0:1.3:1.7:1.9 Isomer Ratio

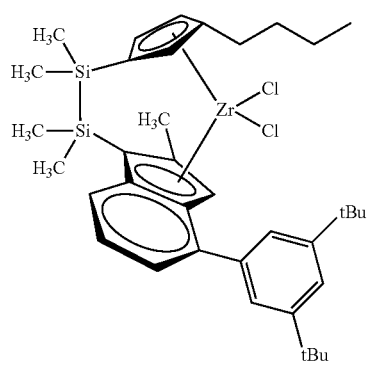

J

1:1 Isomer Ratio

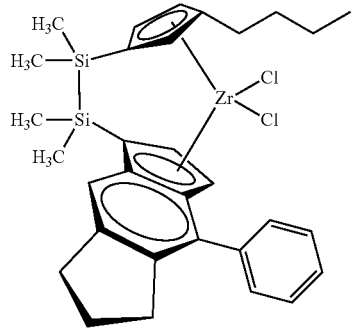

K

1:1.4 Isomer Ratio

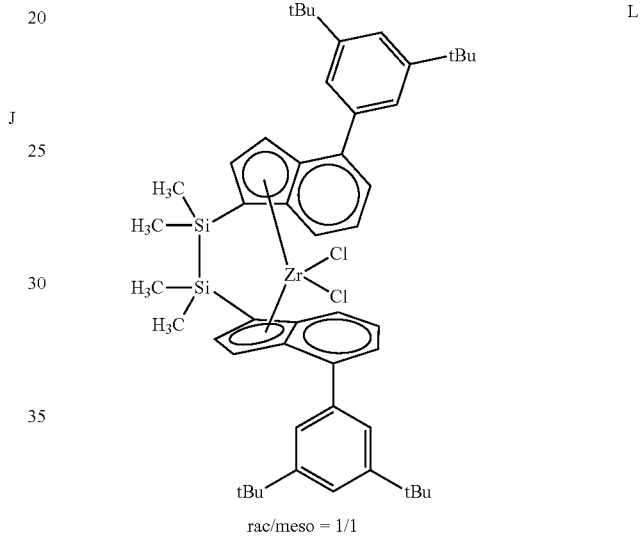

L rac/meso = 1/1

TABLE 2

Ethylene Polymerization and Ethylene 1-Hexene Copolymerization Using Supported Catalysts.
Conditions: 0.3 mg catalysts, isohexane solvent, total volume = 5 mL, $T_p$ = 85° C. , 130 psi C2.

| Cat. | C6 (µL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| A | 0 | 0.0 | 951208 | 252483 | 3.8 | 135.7 | 2700 | 0.0357 | 159 |
| A | 60 | 1.7 | 839524 | 211880 | 4.0 | 126.9 | 2701 | 0.0867 | 386 |
| A | 60 | 1.6 | 875516 | 229668 | 3.8 | 126.8 | 1952 | 0.065 | 400 |
| A | 180 | 4.9 | 837461 | 197316 | 4.2 | 122.6 | 1690 | 0.0917 | 653 |
| A | 180 | 5.2 | 854439 | 197838 | 4.3 | 122.1 | 2350 | 0.0954 | 488 |
| A | 240 | 7.4 | 779579 | 182161 | 4.3 | 120.3 | 1169 | 0.0384 | 395 |
| B | 0 | 0.0 | 1099686 | 296414 | 3.7 | 135.3 | 2701 | 0.0308 | 137 |
| B | 60 | 1.7 | 758440 | 227130 | 3.3 | 125.1 | 2701 | 0.0535 | 238 |
| B | 60 | 1.9 | 787954 | 214671 | 3.7 | 125.2 | 2701 | 0.0555 | 247 |
| B | 180 | 5.6 | 680082 | 215031 | 3.2 | 119.0 | 2700 | 0.0832 | 370 |
| B | 180 | 6.0 | 745574 | 229757 | 3.2 | 118.5 | 2700 | 0.0608 | 271 |
| B | 240 | 7.1 | 662216 | 227702 | 2.9 | 117.3 | 2701 | 0.0776 | 346 |
| C | 0 | 0.0 | 595381 | 264421 | 2.3 | 136.4 | 2498 | 0.0887 | 427 |
| C | 60 | 2.1 | 482338 | 223939 | 2.2 | 125.4 | 1386 | 0.0928 | 805 |
| C | 60 | 2.4 | 462870 | 218017 | 2.1 | 125.6 | 1332 | 0.0905 | 817 |
| C | 180 | 5.6 | 505142 | 252255 | 2.0 | 117.9 | 1001 | 0.0963 | 1157 |
| C | 180 | 5.7 | 546395 | 289367 | 1.9 | 117.9 | 927 | 0.0975 | 1265 |

TABLE 2-continued

Ethylene Polymerization and Ethylene 1-Hexene Copolymerization Using Supported Catalysts.
Conditions: 0.3 mg catalysts, isohexane solvent, total volume = 5 mL, $T_p$ = 85° C., 130 psi C2.

| Cat. | C6 (µL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| C | 240 | 6.8 | 588707 | 305332 | 1.9 | 115.8 | 871 | 0.0961 | 1327 |
| D | 0 | 0.0 | 310388 | 131020 | 2.4 | 134.5 | 1071 | 0.0925 | 1039 |
| D | 60 | 4.5 | 287548 | 117804 | 2.4 | 120.3 | 254 | 0.0932 | 4407 |
| D | 60 | 4.0 | 293105 | 133906 | 2.2 | 120.1 | 239 | 0.1066 | 5354 |
| D | 180 | 9.3 | 240851 | 91675 | 2.6 | 112.6 | 369 | 0.0997 | 3251 |
| D | 180 | 9.5 | 253832 | 95242 | 2.7 | 112.7 | 311 | 0.1066 | 4127 |
| D | 240 | 10.5 | 238662 | 90708 | 2.6 | 112.2 | 651 | 0.1006 | 1859 |
| E | 0 | 0.0 | 731028 | 324702 | 2.3 | 136.2 | 804 | 0.0857 | 1282 |
| E | 60 | 2.0 | 688610 | 275394 | 2.5 | 124.5 | 614 | 0.0912 | 1785 |
| E | 60 | 1.6 | 625363 | 281296 | 2.2 | 124.2 | 639 | 0.0946 | 1781 |
| E | 180 | 3.3 | 834890 | 401967 | 2.1 | 118.9 | 305 | 0.1008 | 3980 |
| E | 0 | 0.0 | 465732 | 119522 | 3.9 | 135.5 | 1223 | 0.0888 | 873 |
| F | 60 | 1.5 | 438339 | 128811 | 3.4 | 128.8 | 685 | 0.0948 | 1665 |
| F | 60 | 1.3 | 463777 | 111954 | 4.1 | 128.7 | 650 | 0.0879 | 1627 |
| F | 180 | 3.3 | 505753 | 170793 | 3.0 | 124.4 | 299 | 0.1033 | 4160 |
| F | 180 | 3.5 | 531938 | 141944 | 3.7 | 124.4 | 334 | 0.1032 | 3717 |
| F | 240 | 4.3 | 603026 | 188961 | 3.2 | 123.1 | 254 | 0.1042 | 4931 |
| G | 0 | 0.0 | 617248 | 241995 | 2.6 | 135.1 | 2462 | 0.081 | 396 |
| G | 60 | 2.4 | 471608 | 182320 | 2.6 | 123.3 | 1920 | 0.0906 | 568 |
| G | 180 | 7.8 | 382917 | 178399 | 2.1 | 114.3 | 1232 | 0.0831 | 811 |
| G | 240 | 8.7 | 388829 | 186820 | 2.1 | 112.3 | 1416 | 0.0901 | 765 |
| G | 300 | 12.9 | 360686 | 166701 | 2.2 | 109.2 | 2671 | 0.0979 | 441 |
| G | 360 | 13.0 | 374721 | 165922 | 2.3 | 109.2 | 2632 | 0.0815 | 372 |
| H | 0 | 0.0 | 842544 | 306389 | 2.7 | 135.6 | 2701 | 0.0653 | 291 |
| H | 60 | 2.0 | 603969 | 247992 | 2.4 | 123.9 | 2702 | 0.0707 | 315 |
| H | 180 | 6.3 | 728771 | 192821 | 3.8 | 117.4 | 1808 | 0.0683 | 454 |
| H | 240 | 8.1 | 485543 | 170739 | 2.8 | 116.0 | 2700 | 0.0676 | 301 |
| H | 300 | 9.9 | 509992 | 137327 | 3.7 | 114.7 | 2700 | 0.0692 | 308 |
| H | 360 | 11.6 | 405891 | 60110 | 6.8 | 112.7 | 2700 | 0.0661 | 294 |
| I | 0 | 0.0 | 634042 | 142078 | 4.5 | 135.7 | 2556 | 0.0895 | 421 |
| I | 60 | 1.9 | 661454 | 165213 | 4.0 | 126.9 | 1343 | 0.0922 | 825 |
| I | 120 | 3.4 | 737675 | 166240 | 4.4 | 124.3 | 1035 | 0.0857 | 996 |
| I | 150 | 4.5 | 706109 | 168111 | 4.2 | 123.9 | 933 | 0.0895 | 1154 |
| I | 180 | 4.9 | 683746 | 149212 | 4.6 | 123.0 | 1064 | 0.0958 | 1082 |
| I | 210 | 6.0 | 698014 | 174023 | 4.0 | 122.4 | 1180 | 0.0929 | 946 |
| J | 0 | 0.0 | 661520 | 226924 | 2.9 | 135.5 | 2701 | 0.0666 | 296 |
| J | 60 | 1.4 | 776904 | 333915 | 2.3 | 126.7 | 2700 | 0.082 | 365 |
| J | 180 | 4.6 | 799502 | 268038 | 3.0 | 121.2 | 1818 | 0.067 | 443 |
| J | 240 | 5.4 | 936944 | 257941 | 3.6 | 120.5 | 2590 | 0.0855 | 397 |
| J | 300 | 6.7 | 851848 | 236952 | 3.6 | 118.9 | 2700 | 0.0627 | 279 |
| J | 360 | 8.7 | 696298 | 213828 | 3.3 | 118.6 | 2701 | 0.0677 | 301 |
| K | 0 | 0.0 | 564384 | 203753 | 2.8 | 135.9 | 1632 | 0.0921 | 679 |
| K | 60 | 1.5 | 576925 | 188942 | 3.1 | 127.0 | 1218 | 0.0961 | 949 |
| K | 180 | 3.7 | 523800 | 192395 | 2.7 | 121.2 | 721 | 0.0822 | 1370 |
| K | 240 | 5.6 | 555639 | 195676 | 2.8 | 120.2 | 837 | 0.0962 | 1383 |
| K | 300 | 6.7 | 503520 | 212827 | 2.4 | 119.0 | 907 | 0.0984 | 1305 |
| K | 360 | 7.5 | 492360 | 203753 | 2.4 | 118.0 | 1073 | 0.1009 | 1131 |
| L | 0 | 0 | 625789 | 150440 | 4.2 | 135.6 | 1086 | 0.0872 | 966 |
| L | 60 | 1.9 | 512961 | 145033 | 3.5 | 129.5 | 596 | 0.0886 | 1786 |
| L | 180 | 5.6 | 507771 | 147114 | 3.5 | 127.3 | 1715 | 0.0879 | 616 |

Table 2 shows ethylene polymerization and ethylene 1-hexene copolymerization using supported catalysts A through L. For purposes described herein Catalysts C, D, E, F, and L are used as comparative metallocene catalysts. Metallocenes A, B, and D-L were supported on silica ES70 under similar conditions and were tested in HTPT EH slurry polymerizations. Metallocene C was supported on DAVISON 948 in a manner analogous to that described in U.S. Pat. No. 6,180,736.

As shown in Table 2 and further illustrated in FIG. 1, metallocenes A and B yielded polyethylene with broader MWD in comparison to catalyst C. Either substitution of the $Si_2Me_4$ bridging group in catalyst A with a $SiMe_2$ group in catalyst D, or altering the 4-substituted indenyl in catalyst A to another n-BuCp fragment E, led to polyethylene compositions with narrower MWD under similar polymerization conditions.

Figure 2:
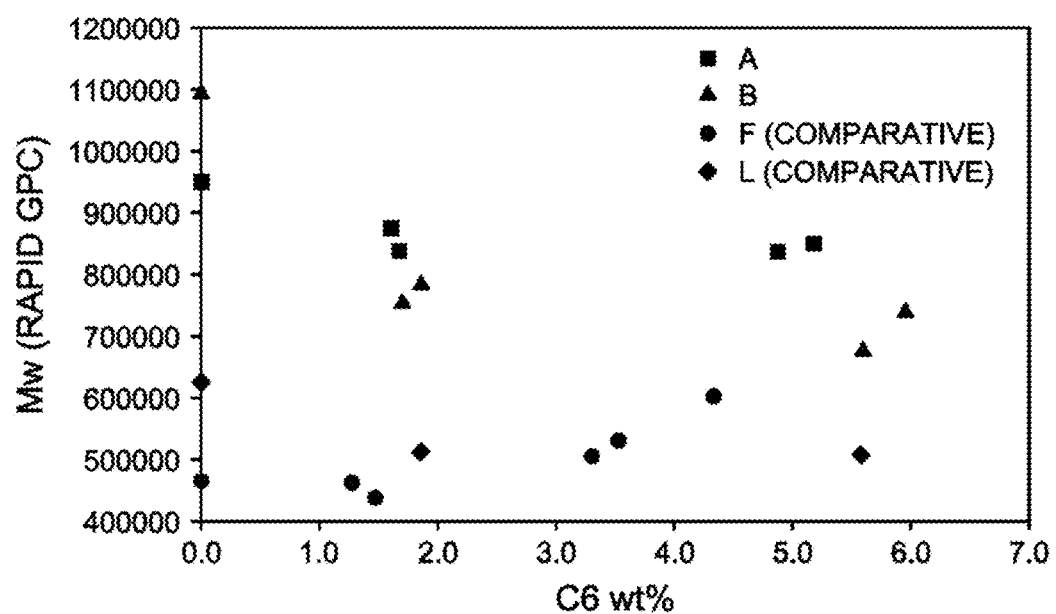
FIG. 2 is a representative plot of Mw versus 1-hexene incorporation ($C_6$ wt %) for catalyst A and B in comparison to catalyst F and L in Table 1.

In addition, and as illustrated in FIG. 2, at similar C6 wt % incorporation conditions, the polyethylene and ethylene hexene copolymers produced using catalysts A or B show increased MW capabilities as compared to polymers produced using catalyst F and L.

TABLE 3

Ethylene-Hexene Copolymerization in Gas Phase
Autoclave Reactor at 85° C. using supported A, B and K.

| Ex. | Cat. | Condition | Cat. (mg) | Yield (g) | Activity (g/g · h) | $C_6$ (wt. %) (GPC4D) | Mw (g/mol) | Mw/Mn | $g'_{vis}$ | $T_{75}$-$T_{25}$ (° C.) |
|---|---|---|---|---|---|---|---|---|---|---|
| 3-1 | A | 5 H2/C2 (ppm/mol); 0.02 C6/C2 (mol/mol) | 44.8 | 31.7 | 708 | 9.7 | 78734 | 7.9 | 1.0 | 35.5 |
| 3-2 | B | 5 H2/C2 (ppm/mol); 0.025 C6/C2 (mol/mol) | 72.3 | 35.6 | 490 | 8.1 | 78117 | 6.7 | 1.0 | 26.8 |
| 3-3 | K | 2.5 H2/C2 (ppnVmol); 0.02 C6/C2 (mol/mol) | 35.6 | 75.8 | 2129 | 8.2 | 109075 | 4.0 | 1.0 | 25.2 |

TABLE 4

$^1$H NMR Characterization of Polyethylenes Produced in Examples 3-1, 3-2 and 3-3.

| Ex. | Cat. | Methyl/ 1000C | Vinylenes/ 1000C | Trisubstituted olefins/ 1000C | Vinyls/ 1000C | Vinylidenes/ 1000C | total unsaturation/ 1000C |
|---|---|---|---|---|---|---|---|
| 3-1 | A | 17.5 | 0.05 | 0 | 0.02 | 0.02 | 0.09 |
| 3-2 | B | 15.2 | 0.05 | 0.01 | 0.02 | 0.01 | 0.09 |
| 3-3 | K | 14.5 | 0.28 | 0.28 | 0.08 | 0 | 0.64 |

Figure 3A:
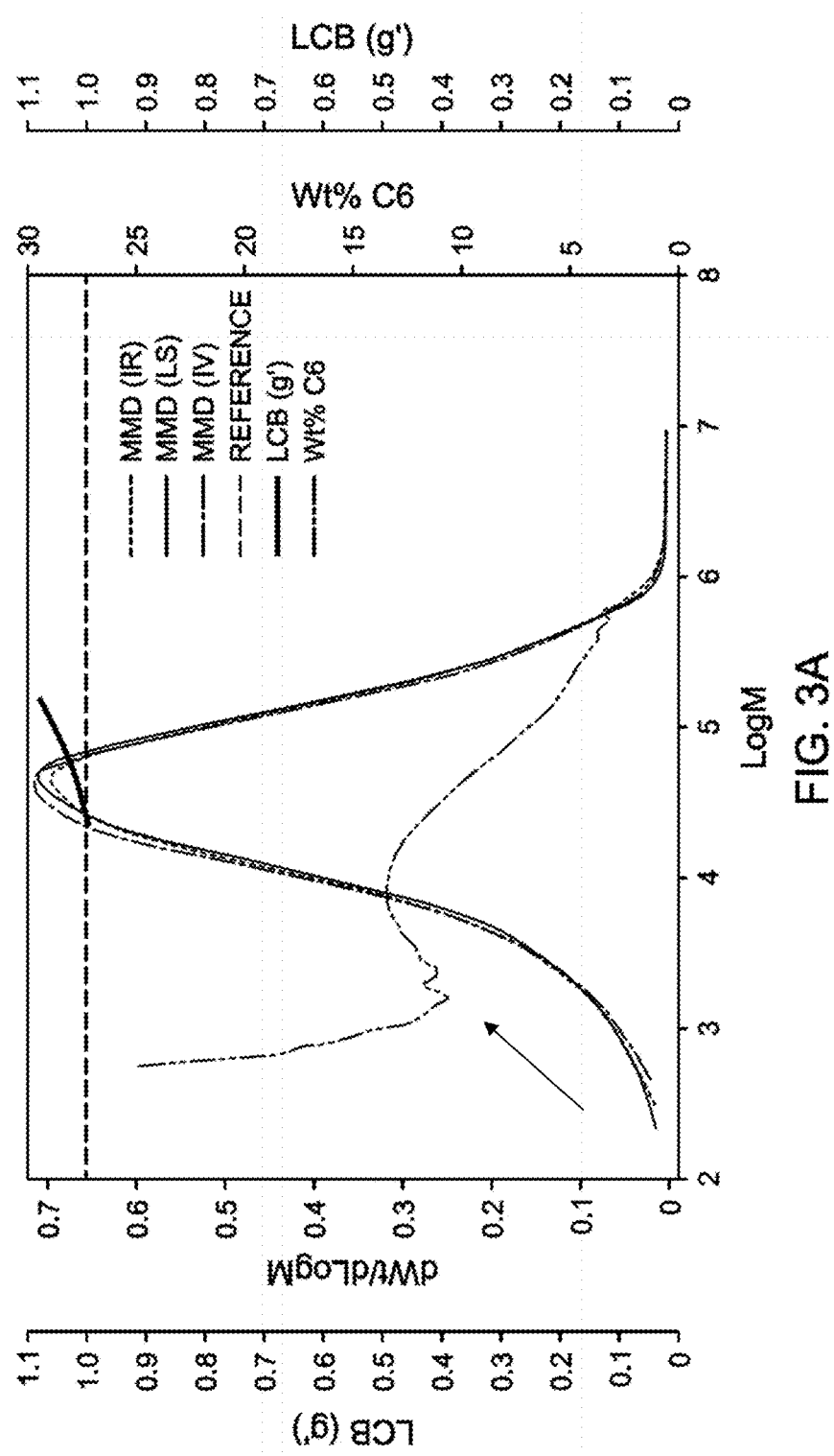
FIG. 3A is a representative plot of dWt/d Log M versus Log M and a plot of 1-hexene incorporation (C$_6$ wt %) versus Log M of a polymer made by catalyst A.
Figure 3B:
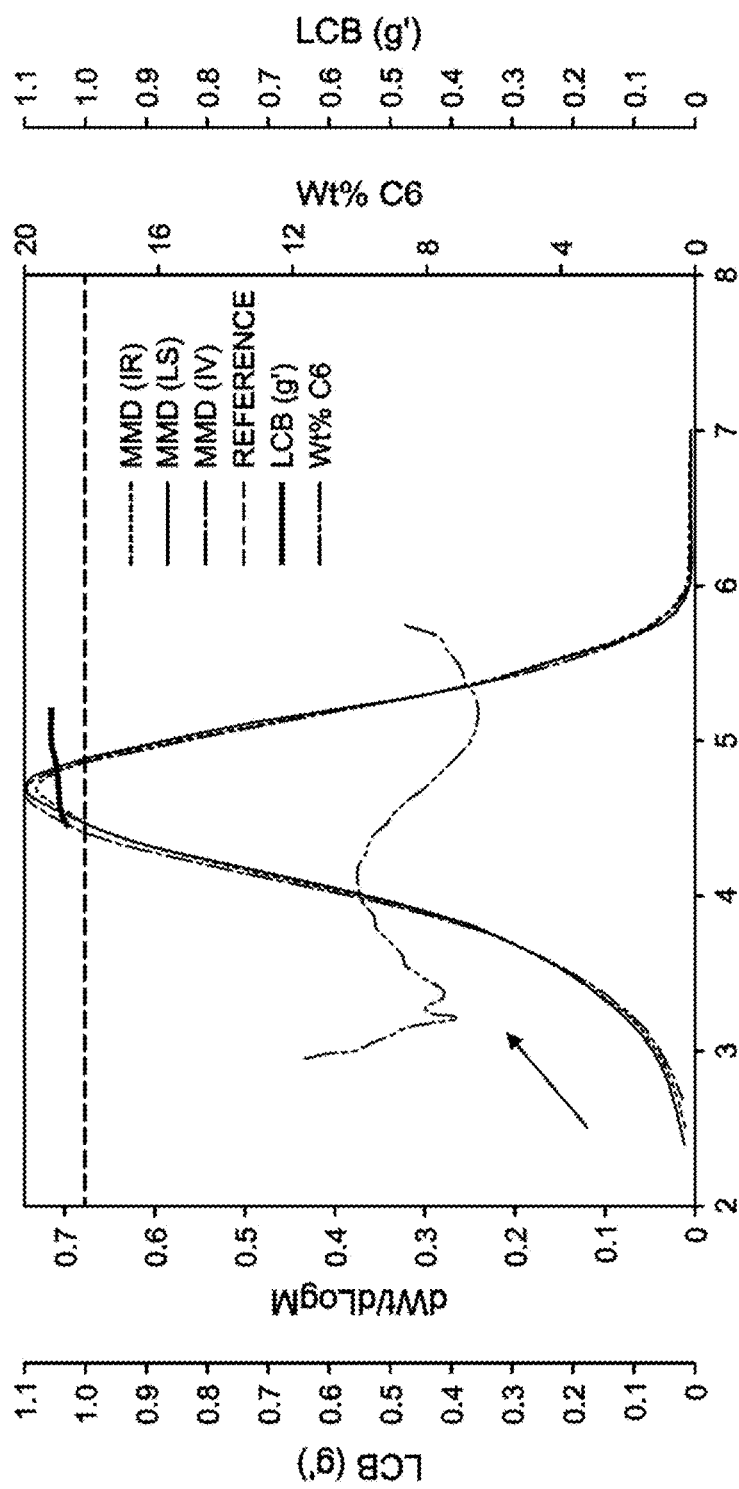
FIG. 3B is a representative plot of dWt/d Log M versus Log M and a plot of 1-hexene incorporation (C$_6$ wt %) versus Log M of a polymer made by catalyst B.
Figure 3C:
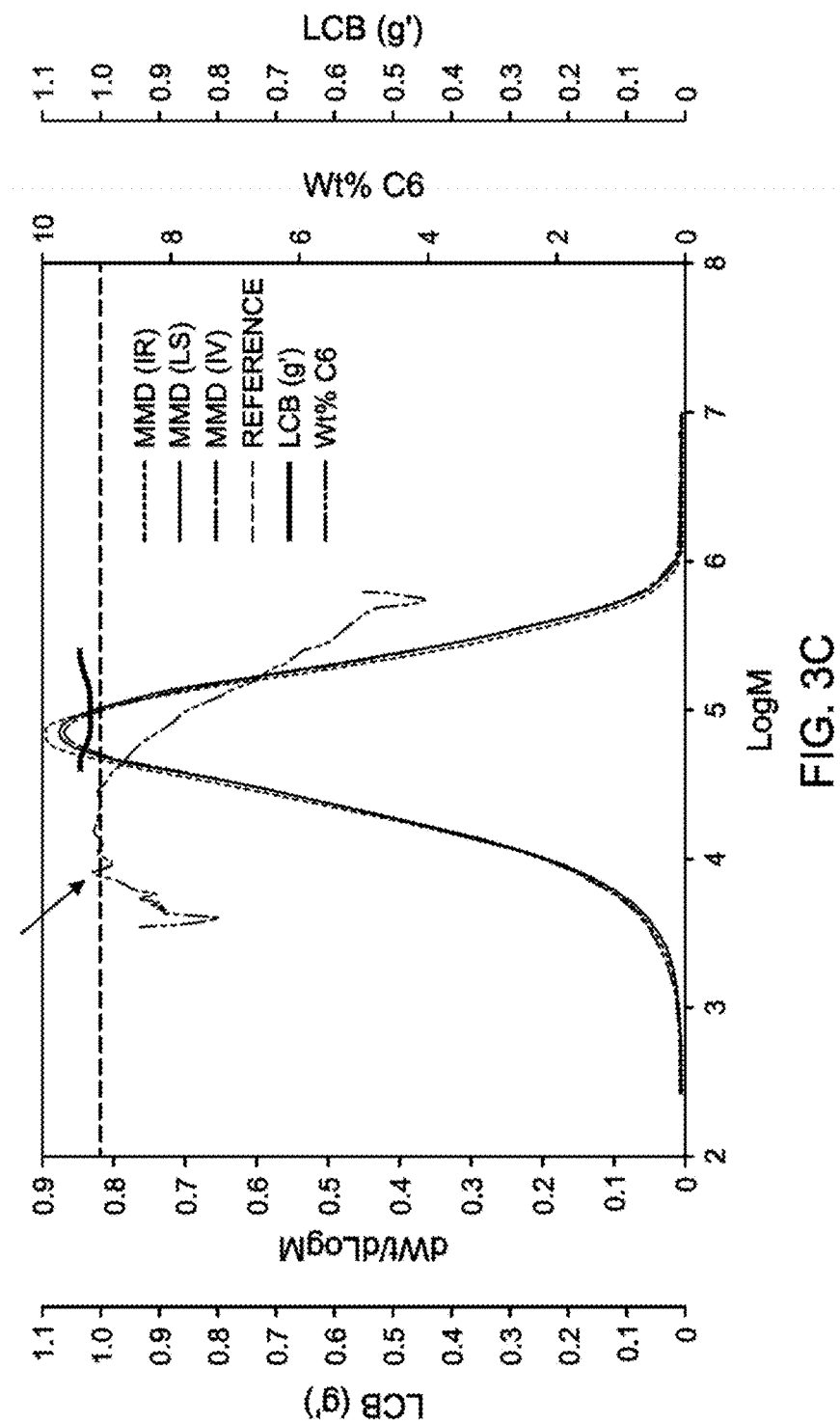
FIG. 3C is a representative plot of dWt/d Log M versus Log M and a plot of 1-hexene incorporation (C$_6$ wt %) versus Log M of a polymer made by catalyst K.
Figure 3D:
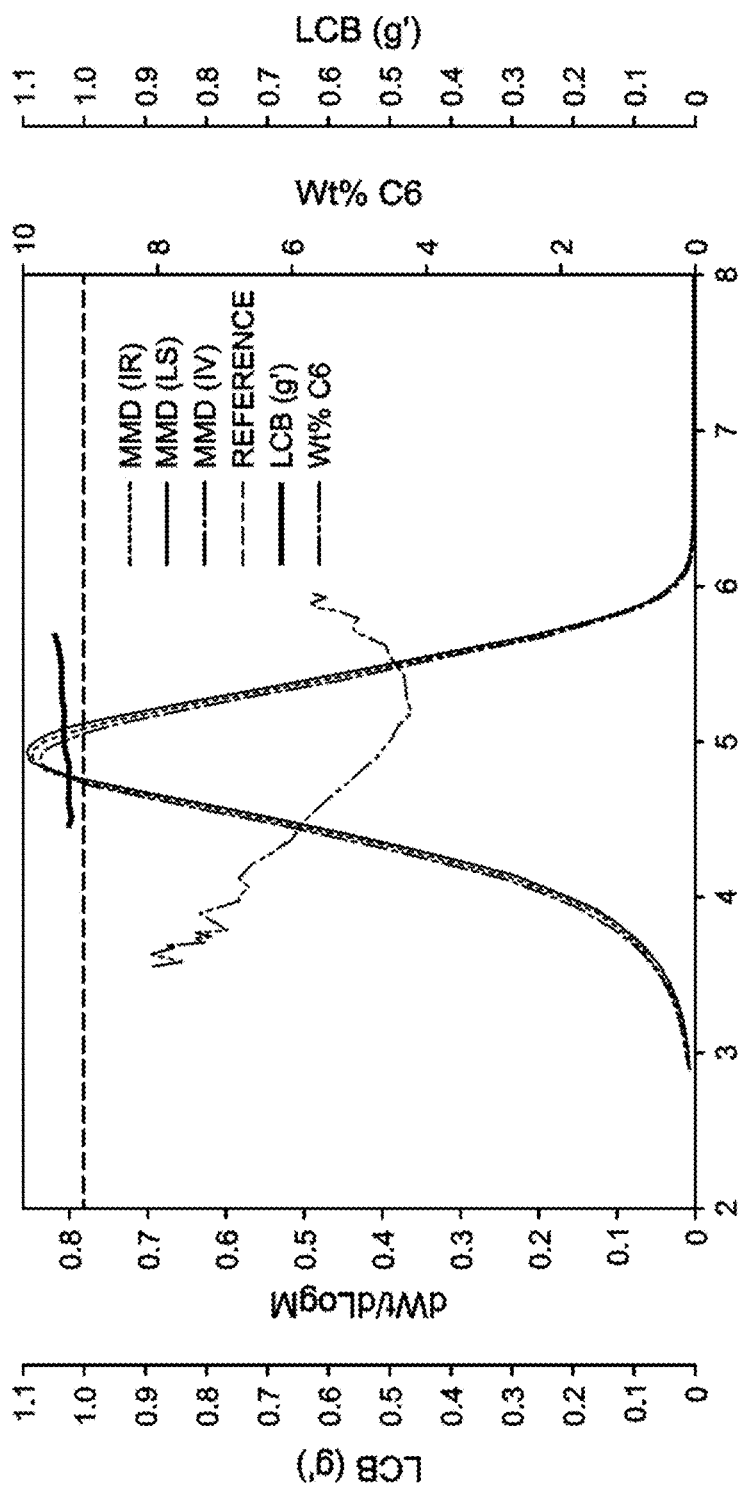
FIG. 3D is a representative plot of dWt/d Log M versus Log M and a plot of 1-hexene incorporation (C$_6$ wt %) versus Log M of a polymer made by catalyst 5.
Figure 3E:
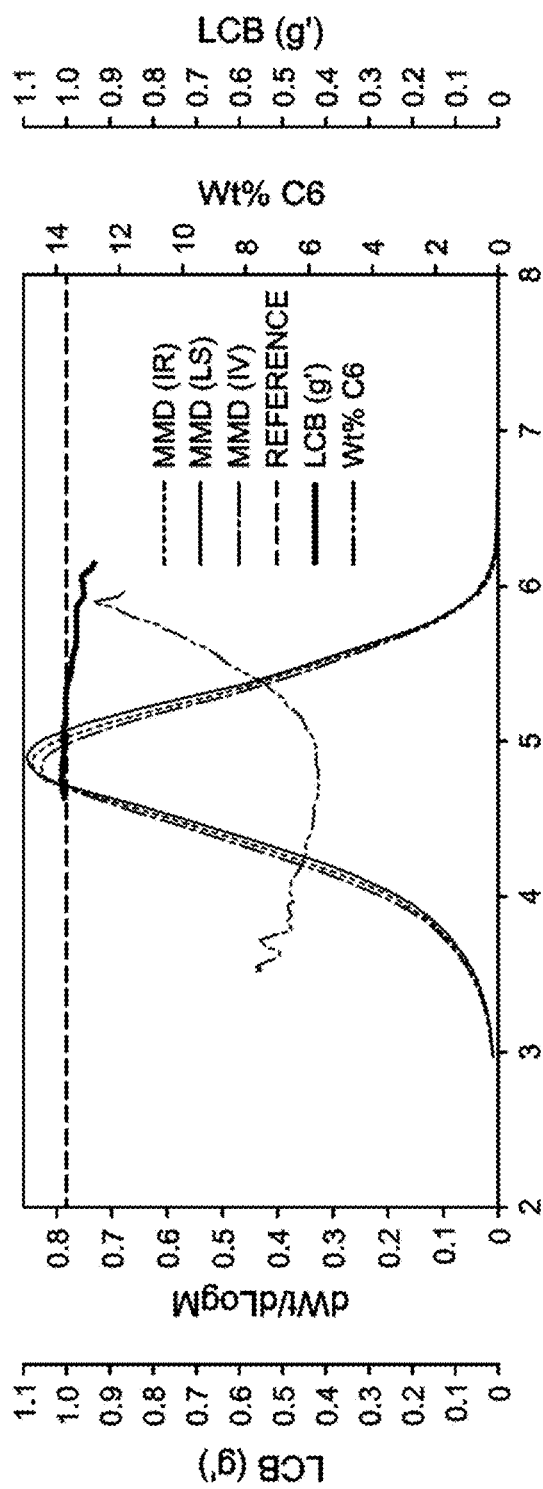
FIG. 3E is a representative plot of dWt/d Log M versus Log M and a plot of 1-hexene incorporation (C$_6$ wt %) versus Log M of a polymer made by catalyst 5A.
Figure 3G:
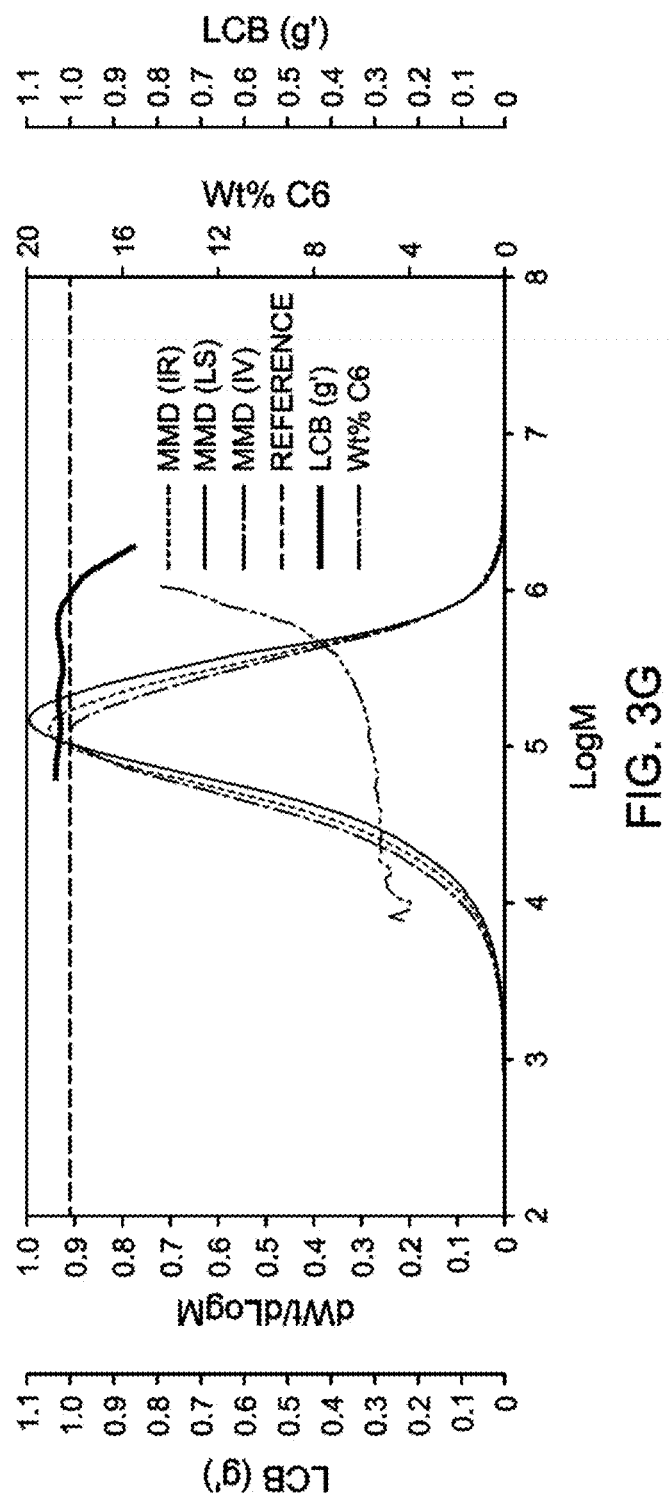
FIG. 3G is a representative plot of dWt/d Log M versus Log M and a plot of 1-hexene incorporation (C$_6$ wt %) versus Log M of a polymer made by catalyst 6 (Ex. 8-4).
Figure 3H:
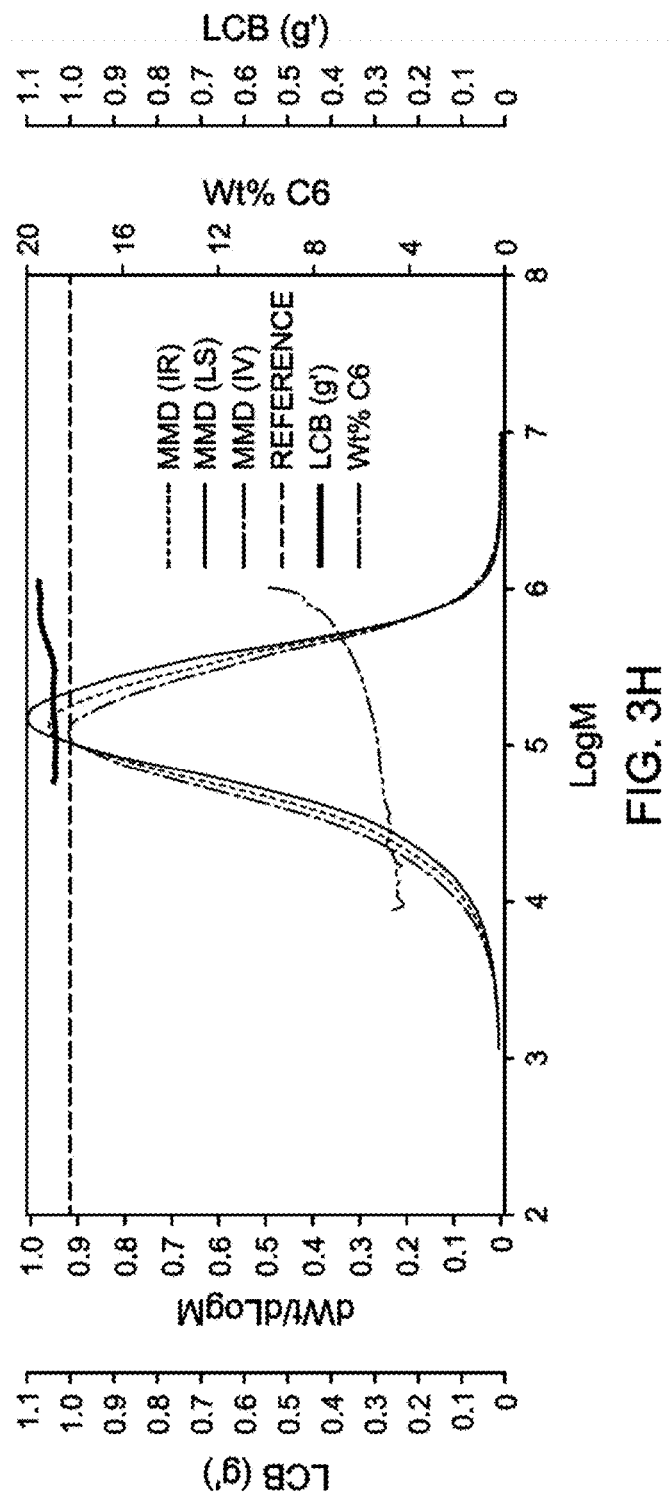
FIG. 3H is a representative plot of dWt/d Log M versus Log M and a plot of 1-hexene incorporation (C$_6$ wt %) versus Log M of a polymer made by catalyst 6 (Ex. 8-5).
Figure 3I:
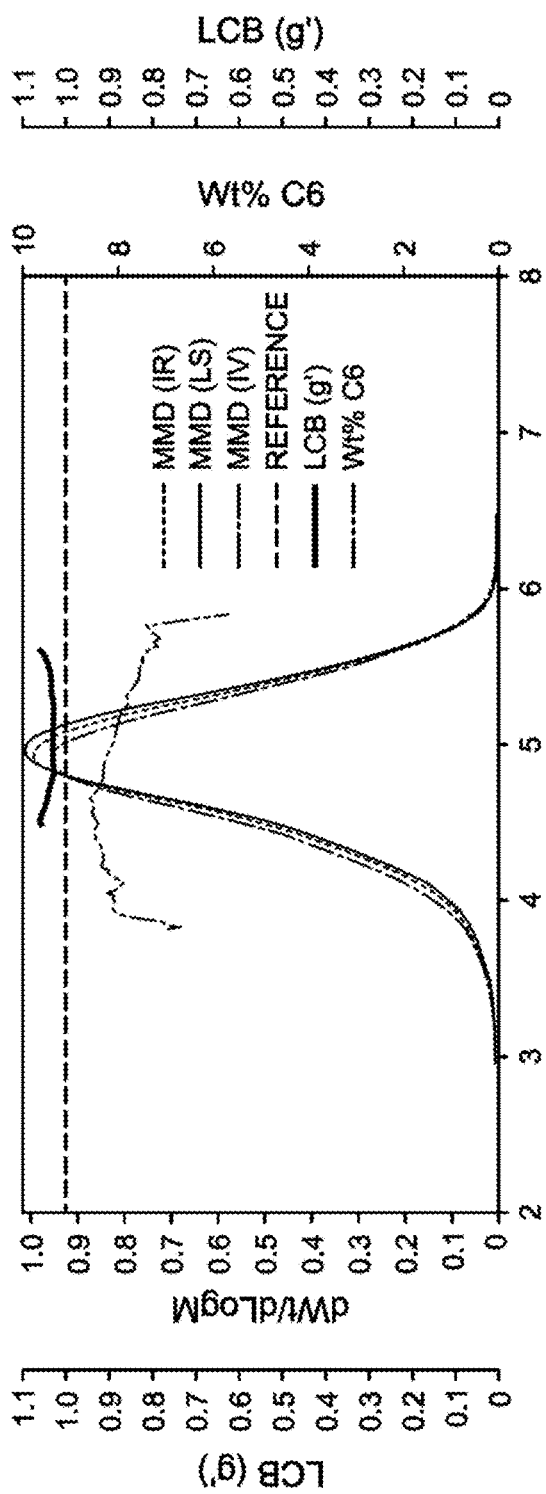
FIG. 3I is a representative plot of dWt/d Log M versus Log M and a plot of 1-hexene incorporation (C$_6$ wt %) versus Log M of a polymer made by catalyst 17.
Figure 3J:
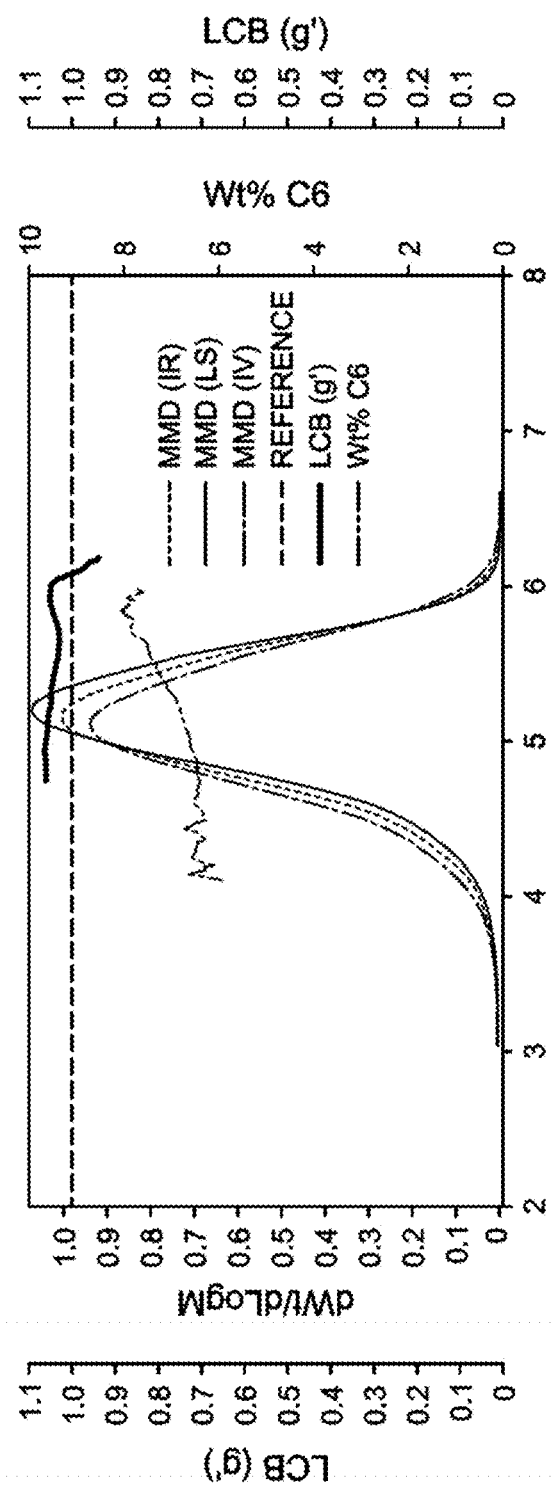
FIG. 3J is a representative plot of dWt/d Log M versus Log M and a plot of 1-hexene incorporation (C$_6$ wt %) versus Log M of a polymer made by catalyst 19.
Figure 3K:
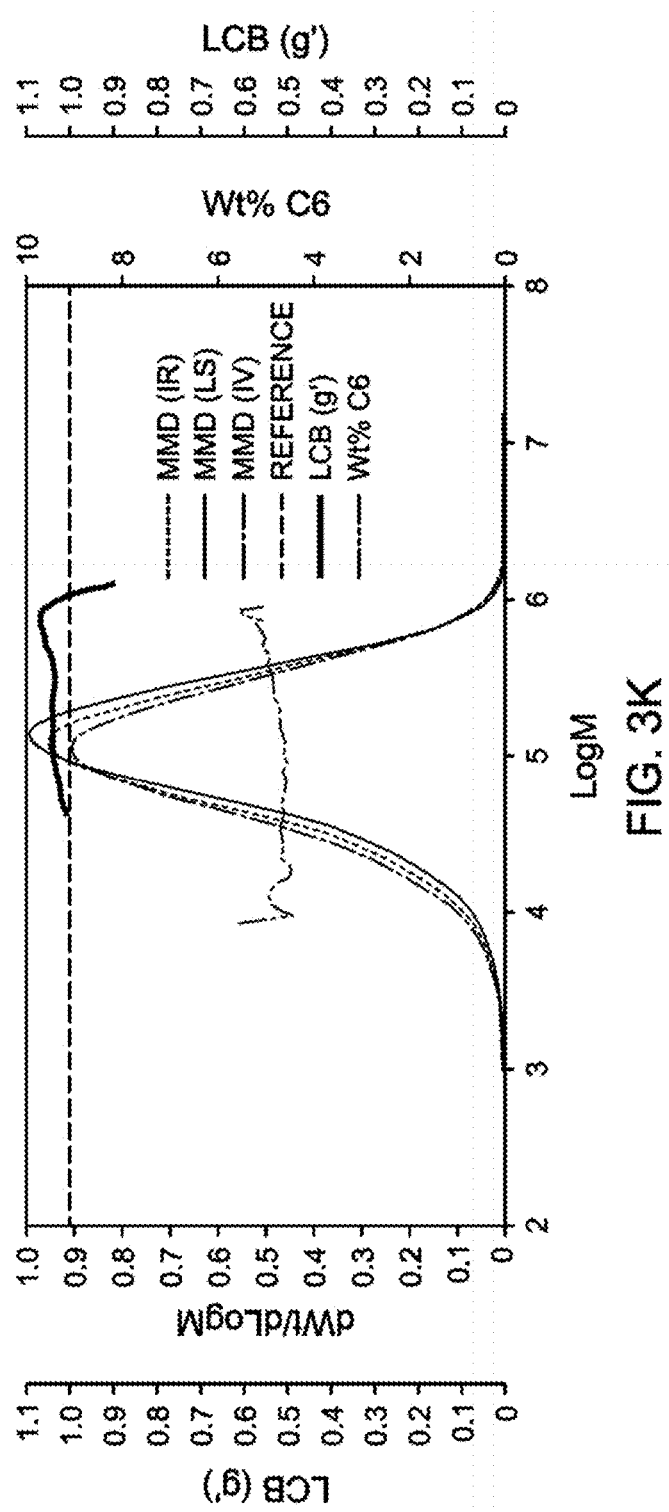
FIG. 3K is a representative plot of dWt/d Log M versus Log M and a plot of 1-hexene incorporation (C$_6$ wt %) versus Log M of a polymer made by catalyst 21.
Figure 3L:
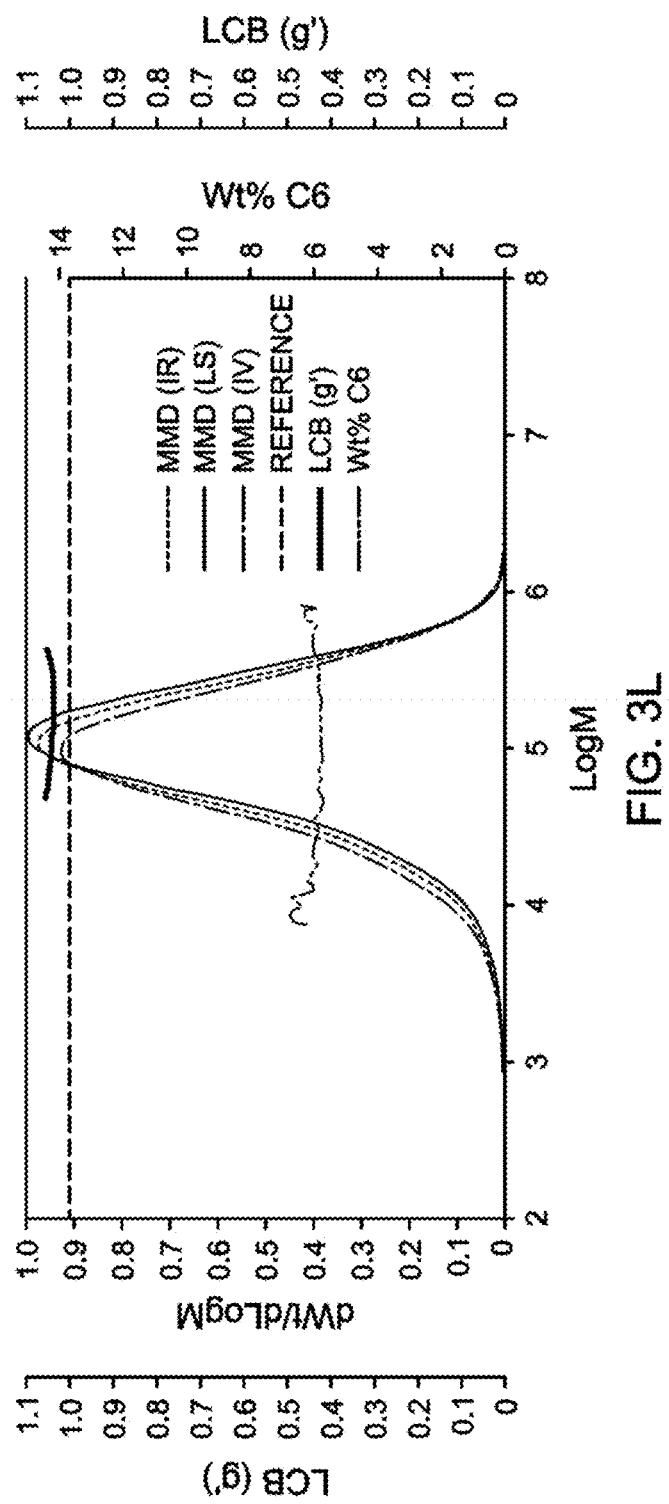
FIG. 3L is a representative plot of dWt/d Log M versus Log M and a plot of 1-hexene incorporation (C$_6$ wt %) versus Log M of a polymer made by catalyst 15.
Figure 3M:
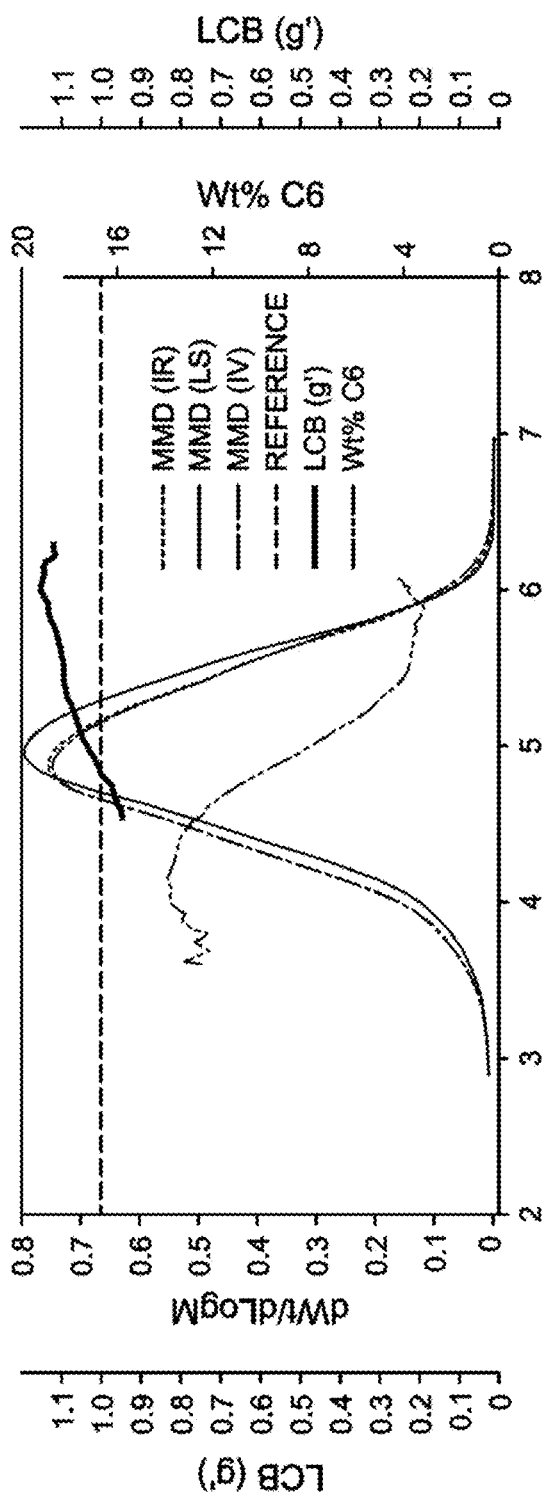
FIG. 3M is a representative plot of dWt/d Log M versus Log M and a plot of 1-hexene incorporation (C$_6$ wt %) versus Log M of a polymer made by catalyst I.
Figure 3N:
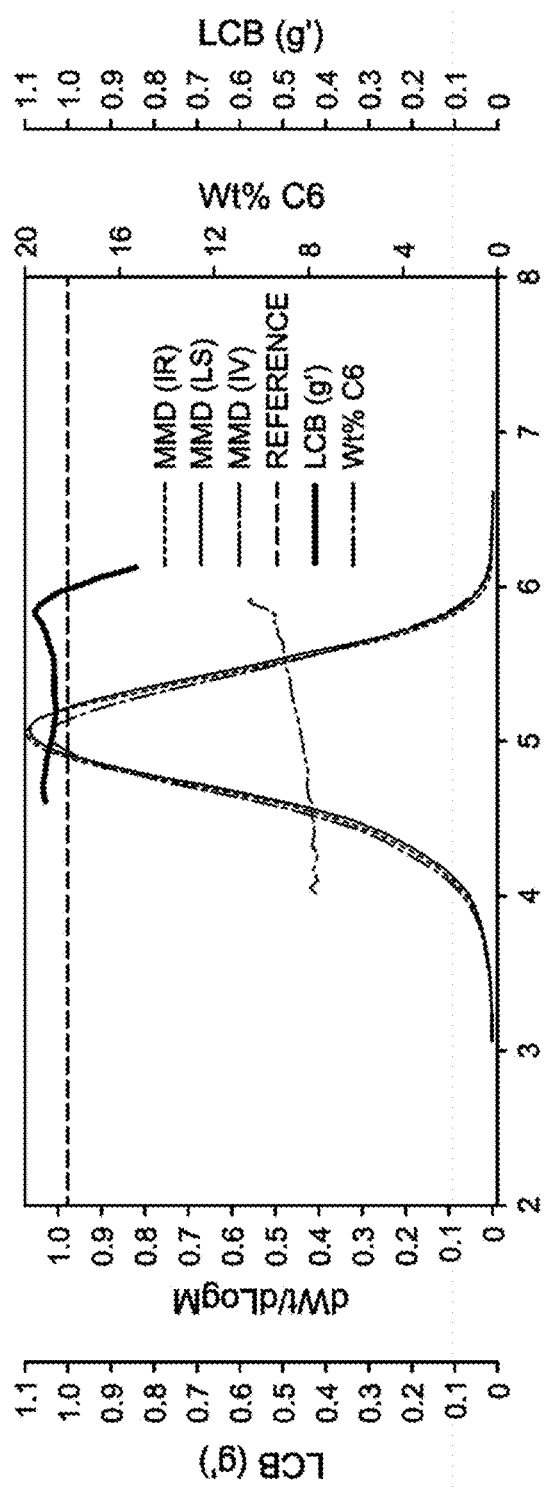
FIG. 3N is a representative plot of dWt/d Log M versus Log M and a plot of 1-hexene incorporation (C$_6$ wt %) versus Log M of a polymer made by catalyst 1.
Figure 4:
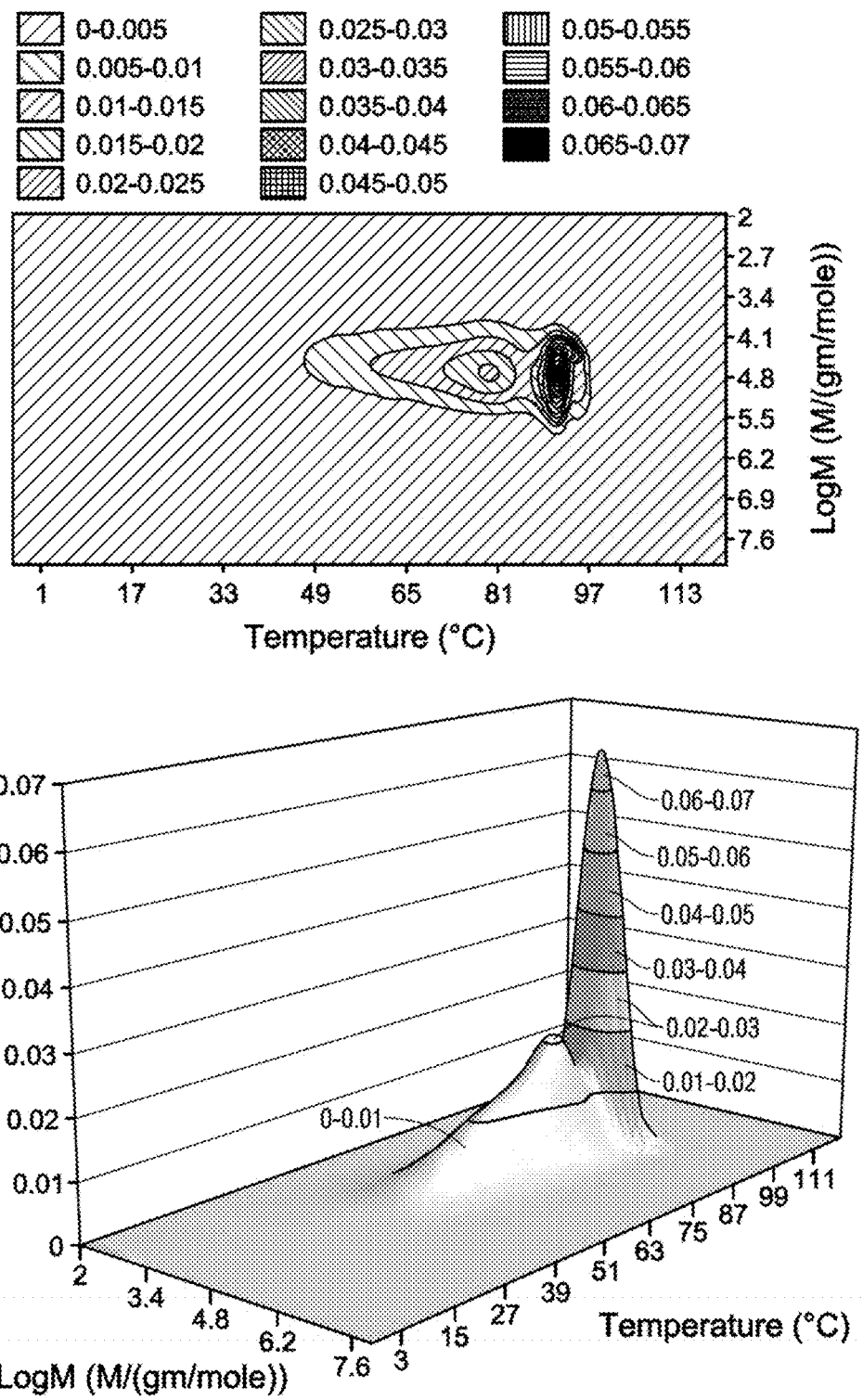
FIG. 4 are plots of CFC data for the polyethylene prepared according to Ex. 3-3 using K.
Figure 5:
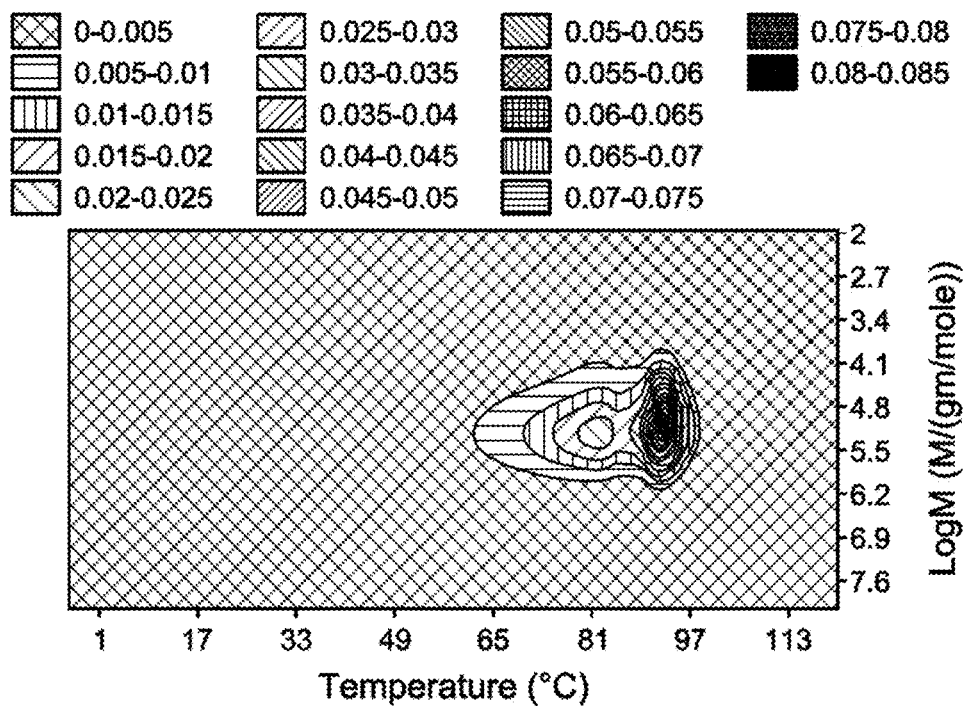
FIG. 5 are plots of CFC data for the polyethylene prepared according to Ex. 8-4 using 6.
Figure 5:
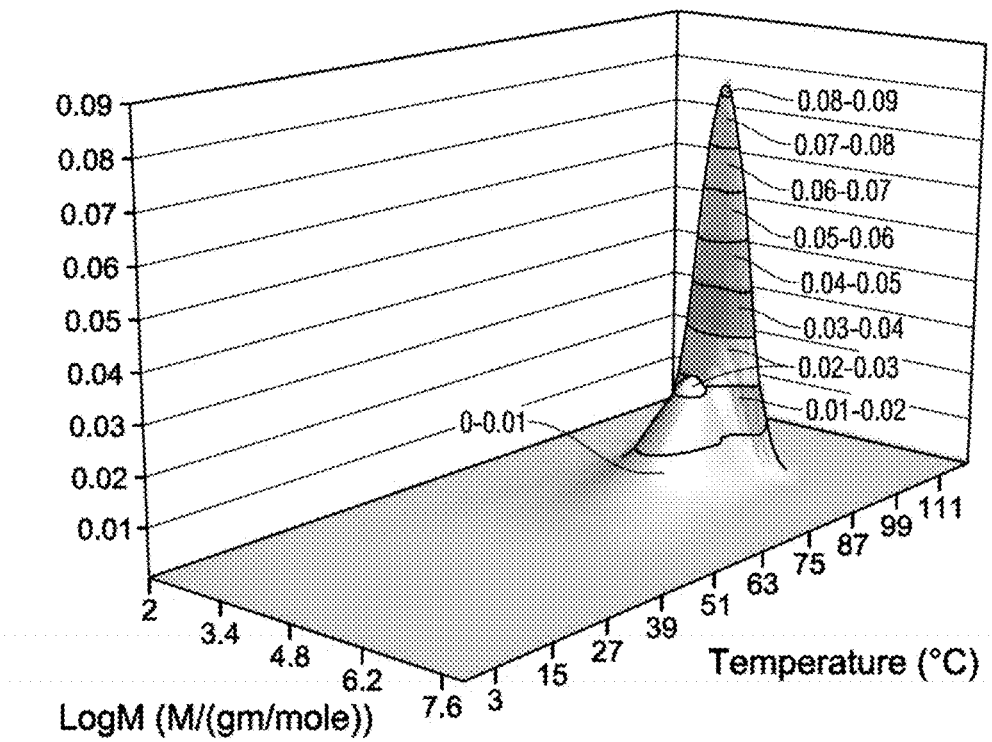
Figure 6:
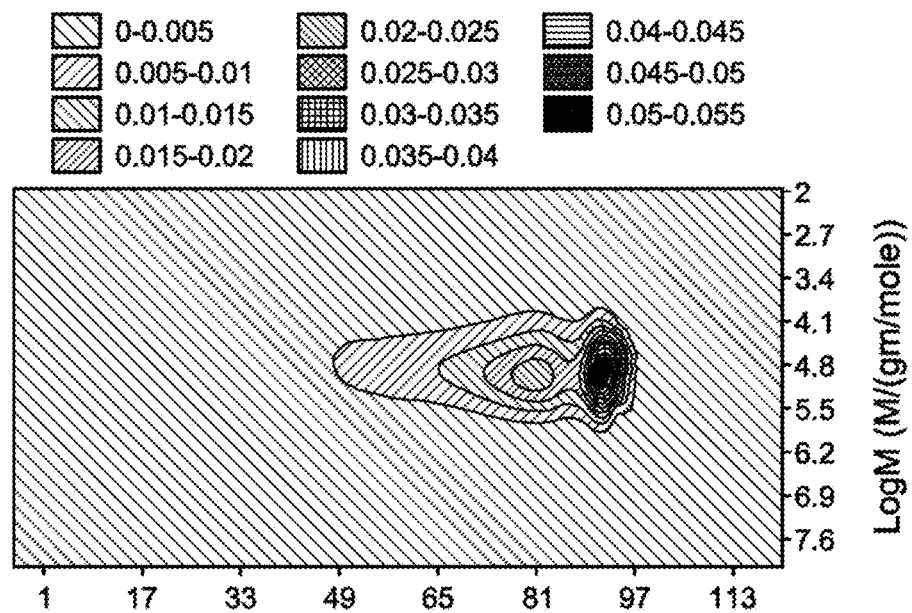
FIG. 6 are plots of CFC data for the polyethylene prepared according to Ex. 10-1 using 17.
Figure 6:
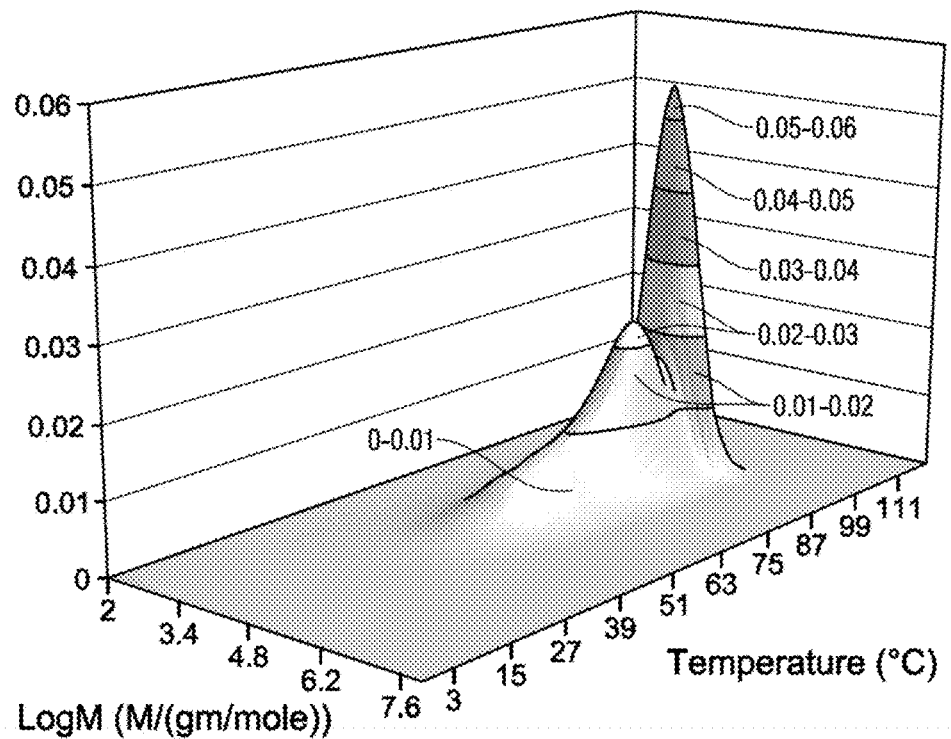
Figure 7:
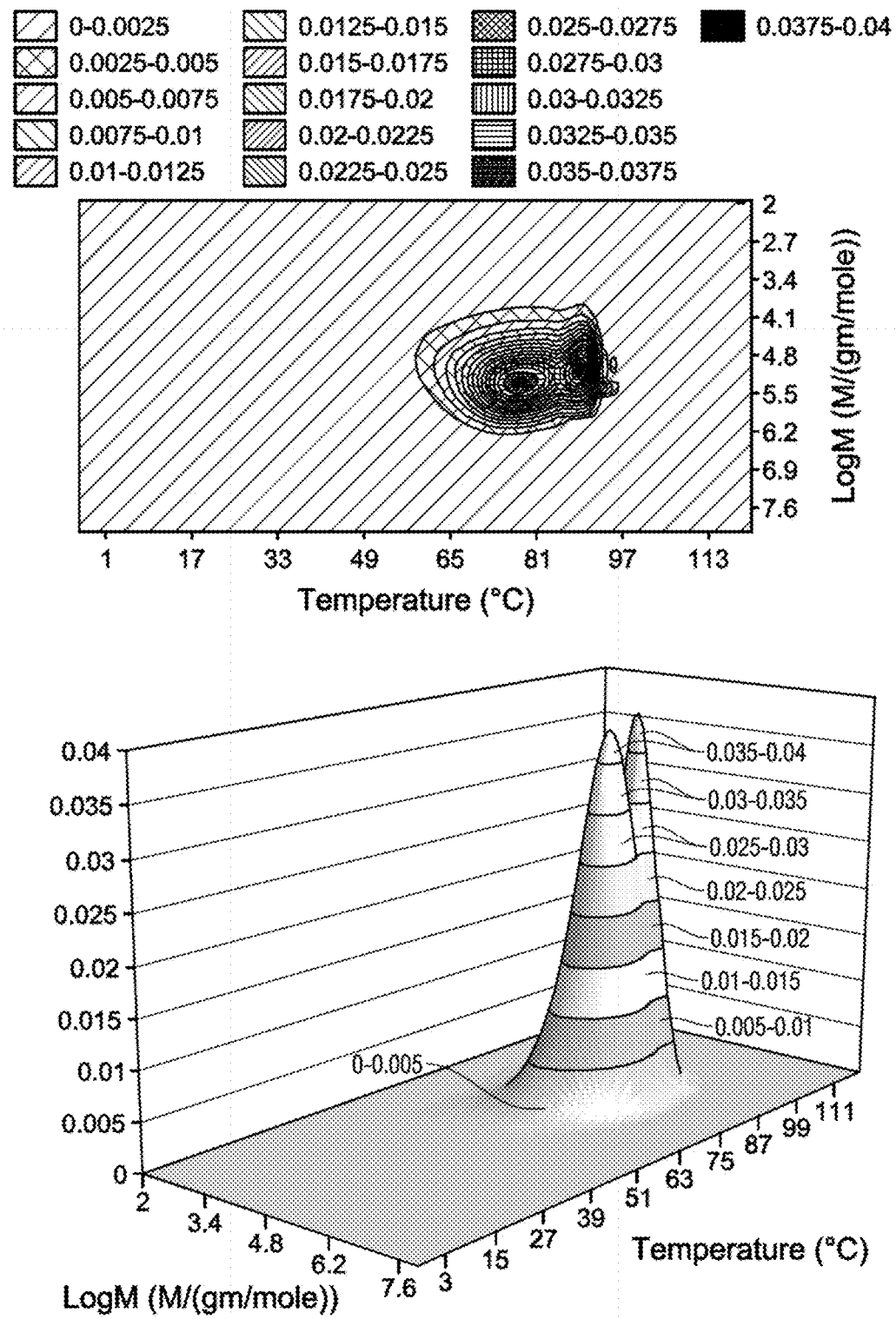
FIG. 7 are plots of CFC data for the polyethylene prepared according to Ex. 10-2 using 19.
Figure 8:
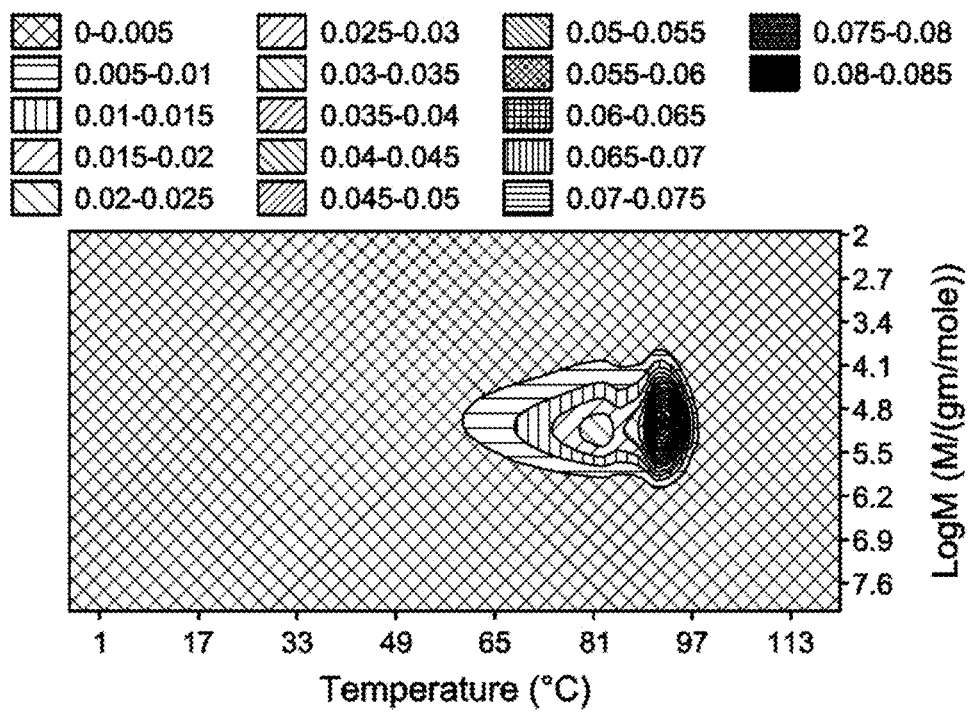
FIG. 8 are plots of CFC data for the polyethylene prepared according to Ex. 10-4 using 15.
Figure 8:
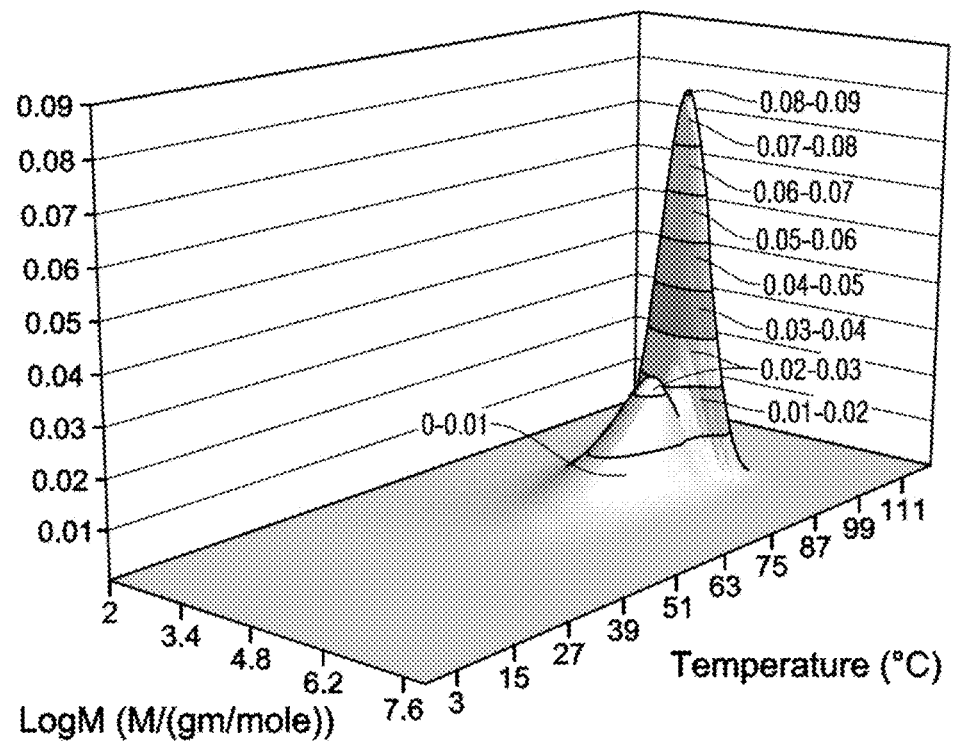
Figure 9:
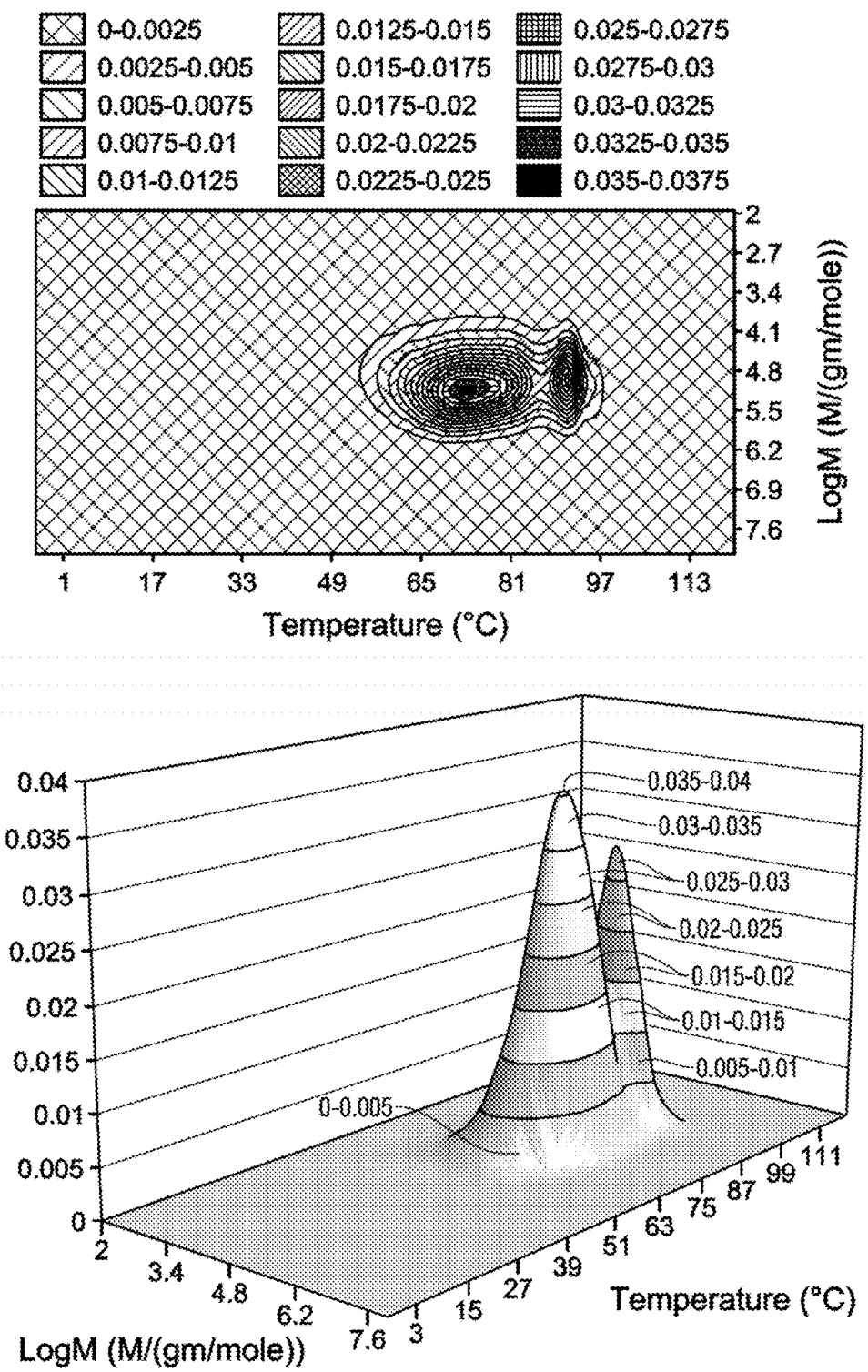
FIG. 9 are plots of CFC data for the polyethylene prepared according to Ex. 10-6 using 1.

FIGS. 3A-C are representative plots of dWt/d Log M versus Log M and a plot of 1-hexene Incorporation ($C_6$ wt %) versus Log M for supported catalysts A, B and K. Tables 3 and 4 provide experimental conditions and characterization of the ethylene-hexene copolymerization in a gas phase autoclave reactor at 85° C. As shown in FIGS. 3A and 3B and Tables 3 and 4, both catalyst A and catalyst B yield a polyethylene having very broad MWD, good $C_6$ incorporation, very low chain unsaturation (0.09 total unsaturation/ 1000 C) as well as $g'_{vis}$ of 1.0. Catalyst K produces polyethylene with relatively broad MWD (Mw/Mn of 4.0), good $C_6$ incorporation (8.2 wt % by GPC4D), $g'_{vis}$ of 1.0, and some chain unsaturation (0.64 total unsaturation/1000 C).

Table 5 shows Catalysts 1 through 22. Catalysts C are used as comparative metallocene catalysts.

TABLE 5

Catalysts 1 through 22 and comparative catalyst C

1

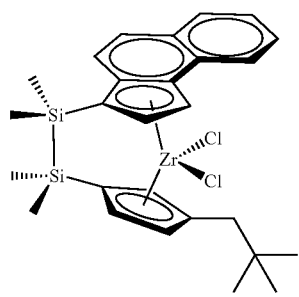

1:1.9 isomer ratio

TABLE 5-continued

Catalysts 1 through 22 and comparative catalyst C

2

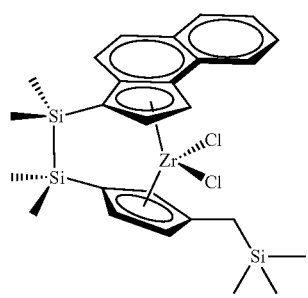

1:1.9 Isomer Ratio

3

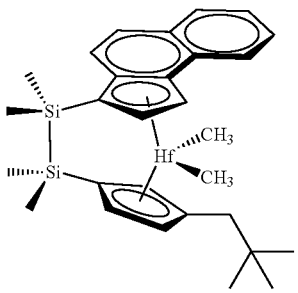

1:1.6 Isomer Ratio

TABLE 5-continued
Catalysts 1 through 22 and comparative catalyst C
4
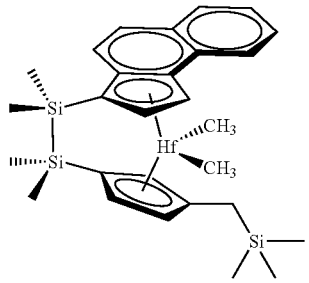
1:1.2 Isomer Ratio
5
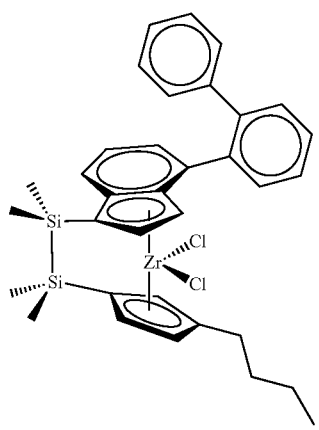
1.3:1 isomer ratio
6
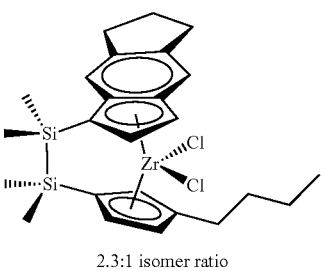
2.3:1 isomer ratio
7
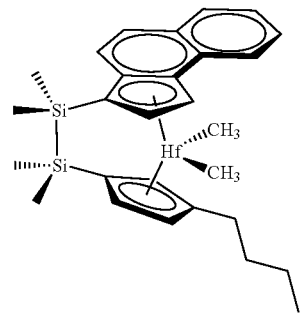
1:1 isomer ratio
TABLE 5-continued
Catalysts 1 through 22 and comparative catalyst C
8
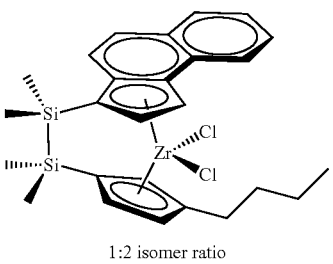
1:2 isomer ratio
9
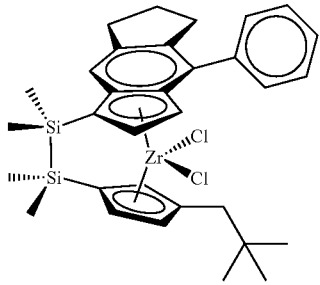
1:4.8 Isomer Ratio
10
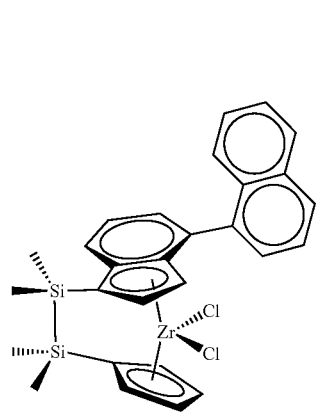
1:1.6 isomer ratio
11
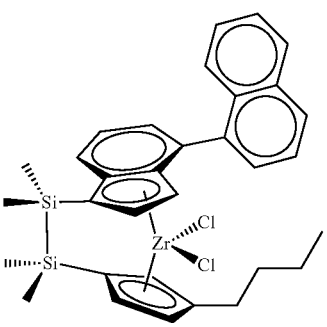
1:2:8:12 isomer ratio TABLE 5-continued
Catalysts 1 through 22 and comparative catalyst C
12
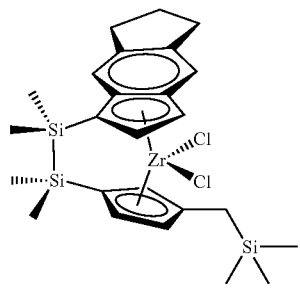
1:1.2 isomer ratio
13
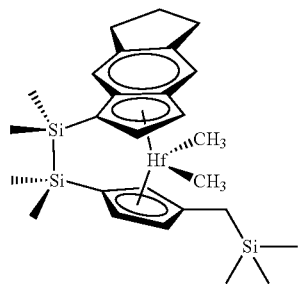
1:2.5 isomer ratio
14
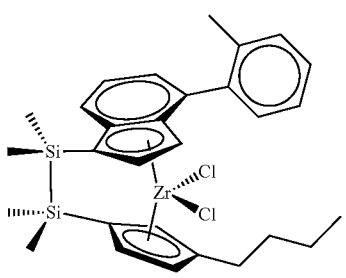
1:1.6 isomer ratio
15
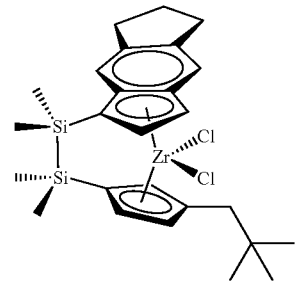
1:1.2 isomer ratio
16
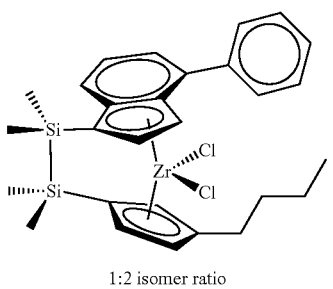
1:2 isomer ratio
TABLE 5-continued
Catalysts 1 through 22 and comparative catalyst C
17
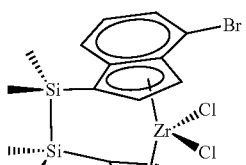
1:1 isomer ratio
18
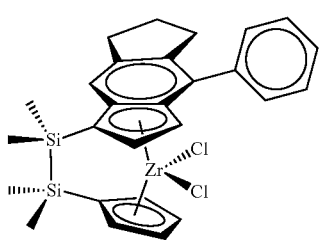
19
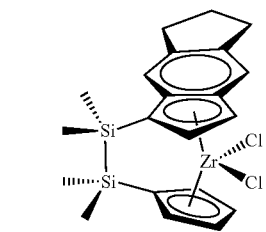
20
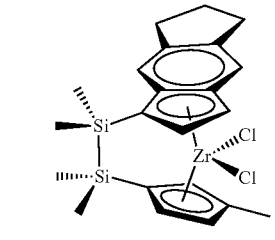
1:1 isomer ratio
21
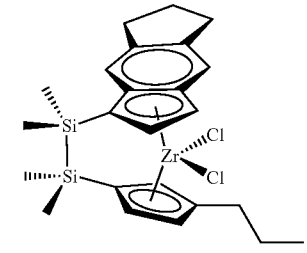
1:3.2 isomer ratio

TABLE 5-continued

Catalysts 1 through 22 and comparative catalyst C

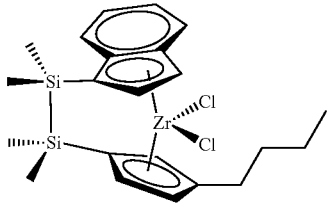

2.5:1 isomer ratio

22

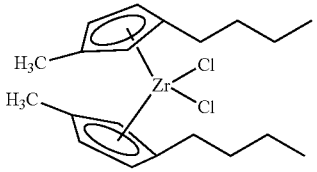

1:1 isomer ratio

C

TABLE 6

Ethylene Polymerization and Ethylene 1-Hexene Copolymerization Using Supported Catalysts.
Conditions: 0.3 mg catalysts, isohexane solvent, total volume = 5 mL, $T_p$ = 85° C., 130 psi C2.

| Cat. | C6 (μL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| C | 0 | 0.0 | 590361 | 292532 | 2.0 | 136.6 | 2668 | 0.0862 | 388 |
| C | 60 | 2.1 | 442995 | 236080 | 1.9 | 125.5 | 1409 | 0.0948 | 809 |
| C | 120 | 5.1 | 487050 | 255280 | 1.9 | 120.5 | 1064 | 0.0839 | 948 |
| C | 150 | 4.8 | 494901 | 254640 | 1.9 | 119.1 | 1028 | 0.0944 | 1104 |
| C | 180 | 5.3 | 531880 | 307726 | 1.7 | 118.1 | 1111 | 0.0952 | 1031 |
| C | 210 | 6.1 | 509437 | 289388 | 1.8 | 116.8 | 1042 | 0.0986 | 1138 |
| 1 | 0 | 0.0 | 479669 | 231855 | 2.1 | 136.2 | 1092 | 0.0899 | 990 |
| 1 | 60 | 3.7 | 445612 | 223970 | 2.0 | 121.3 | 585 | 0.0963 | 1979 |
| 1 | 120 | 5.3 | 598440 | 335445 | 1.8 | 117.0 | 408 | 0.0981 | 2890 |
| 1 | 150 | 6.7 | 571041 | 285775 | 2.0 | 115.5 | 463 | 0.0957 | 2486 |
| 1 | 180 | 6.4 | 768911 | 377876 | 2.0 | 113.9 | 518 | 0.0921 | 2138 |
| 1 | 210 | 9.6 | 792857 | 503704 | 1.6 | 111.8 | 634 | 0.0951 | 1804 |
| 2 | 0 | 0.0 | 613472 | 326334 | 1.9 | 136.5 | 1498 | 0.0909 | 730 |
| 2 | 60 | 2.4 | 595631 | 327012 | 1.8 | 122.6 | 980 | 0.0936 | 1149 |
| 2 | 120 | 4.8 | 704442 | 359755 | 2.0 | 117.5 | 600 | 0.0863 | 1729 |
| 2 | 150 | 6.5 | 742213 | 386018 | 1.9 | 115.4 | 624 | 0.0938 | 1808 |
| 2 | 180 | 7.4 | 748221 | 447078 | 1.7 | 114.2 | 740 | 0.0946 | 1537 |
| 2 | 210 | 8.7 | 696426 | 351437 | 2.0 | 112.1 | 758 | 0.0969 | 1537 |
| 3 | 0 | 0.0 | 1240414 | 480417 | 2.6 | 137.0 | 1157 | 0.0832 | 865 |
| 3 | 60 | 5.0 | 1098073 | 586904 | 1.9 | 120.6 | 1856 | 0.0933 | 605 |
| 3 | 120 | 8.0 | 1237364 | 618531 | 2.0 | 118.6 | 2390 | 0.0397 | 200 |
| 3 | 150 | 10.2 | 1056674 | 557171 | 1.9 | 118.6 | 2701 | 0.0317 | 141 |
| 3 | 180 | 13.9 | 1330940 | 528131 | 2.5 | 117.5 | 2701 | 0.0171 | 76 |
| 3 | 210 | 14.6 | 1058626 | 540458 | 2.0 | 117.1 | 2701 | 0.0178 | 79 |
| 4 | 0 | 0.0 | 1301283 | 564818 | 2.3 | 137.6 | 1802 | 0.0857 | 572 |
| 4 | 60 | 5.7 | 1205512 | 649540 | 1.9 | 118.9 | 2042 | 0.0903 | 532 |
| 4 | 120 | 10.2 | 1133524 | 597440 | 1.9 | 116.1 | 2441 | 0.046 | 227 |
| 4 | 150 | 13.8 | 1057761 | 655965 | 1.6 | 114.0 | 2701 | 0.0368 | 164 |
| 4 | 180 | 14.6 | 1136259 | 597995 | 1.9 | 115.3 | 2701 | 0.0285 | 127 |
| 4 | 210 | 16.4 | 1076428 | 694373 | 1.6 | 114.5 | 2701 | 0.0223 | 99 |
| 5 | 0 | 0.0 | 603115 | 246987 | 2.4 | 136.6 | 1379 | 0.0865 | 754 |
| 5 | 60 | 1.3 | 644307 | 247403 | 2.6 | 129.5 | 998 | 0.0903 | 1088 |
| 5 | 120 | 2.6 | 537125 | 178791 | 3.0 | 127.9 | 931 | 0.0944 | 1219 |
| 5 | 150 | 2.7 | 590267 | 228442 | 2.6 | 127.3 | 840 | 0.0861 | 1233 |
| 5 | 180 | 2.4 | 596299 | 267936 | 2.2 | 126.7 | 836 | 0.0853 | 1227 |
| 5 | 210 | 2.8 | 563958 | 200137 | 2.8 | 126.1 | 967 | 0.0921 | 1145 |
| 6 | 0 | 0.0 | 838458 | 276301 | 3.0 | 136.0 | 1182 | 0.0917 | 933 |
| 6 | 60 | 2.4 | 654572 | 280059 | 2.3 | 125.2 | 644 | 0.0939 | 1754 |
| 6 | 120 | 3.2 | 697183 | 336079 | 2.1 | 122.1 | 497 | 0.0914 | 2212 |
| 6 | 150 | 4.3 | 692954 | 314536 | 2.2 | 121.3 | 451 | 0.0949 | 2533 |
| 6 | 180 | 4.6 | 763860 | 396709 | 1.9 | 120.3 | 470 | 0.0974 | 2492 |
| 6 | 210 | 5.2 | 718248 | 336369 | 2.1 | 119.6 | 478 | 0.0996 | 2503 |
| 7 | 0 | 0.0 | 1127641 | 459700 | 2.5 | 136.7 | 1572 | 0.0861 | 659 |
| 7 | 60 | 4.9 | 1028656 | 543660 | 1.9 | 119.7 | 2701 | 0.049 | 218 |
| 7 | 120 | 7.3 | 1188055 | 541993 | 2.2 | 117.4 | 2701 | 0.0154 | 69 |
| 7 | 150 | 11.4 | 1153785 | 481812 | 2.4 | 116.6 | 2701 | 0.0125 | 56 |
| 7 | 180 | N/A | N/A | N/A | N/A | N/A | 2701 | 0.0082 | 37 |
| 7 | 210 | N/A | N/A | N/A | N/A | N/A | 2701 | 0.0063 | 28 |
| 8 | 0 | 0.0 | 543912 | 186233 | 2.9 | 136.2 | 1236 | 0.0885 | 861 |
| 8 | 60 | 3.5 | 521292 | 267777 | 1.9 | 123.4 | 768 | 0.0927 | 1452 |
| 8 | 120 | 5.7 | 536646 | 298883 | 1.8 | 118.5 | 566 | 0.0827 | 1758 |
| 8 | 150 | 6.3 | 586334 | 303959 | 1.9 | 116.5 | 715 | 0.0878 | 1476 |
| 8 | 180 | 7.2 | 561526 | 315374 | 1.8 | 114.4 | 662 | 0.0899 | 1634 |
| 8 | 210 | 8.0 | 599543 | 296033 | 2.0 | 112.7 | 907 | 0.0944 | 1252 |

TABLE 6-continued

Ethylene Polymerization and Ethylene 1-Hexene Copolymerization Using Supported Catalysts.
Conditions: 0.3 mg catalysts, isohexane solvent, total volume = 5 mL, $T_p$ = 85° C., 130 psi C2.

| Cat. | C6 (μL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| 9 | 0 | 0.0 | 670414 | 218279 | 3.1 | 135.4 | 1648 | 0.0708 | 517 |
| 9 | 60 | 3.4 | 632090 | 247191 | 2.6 | 126.4 | 1387 | 0.0800 | 694 |
| 9 | 120 | 4.6 | 669891 | 265904 | 2.5 | 123.3 | 1302 | 0.0784 | 724 |
| 9 | 150 | 5.4 | 691740 | 265851 | 2.6 | 122.7 | 1326 | 0.0762 | 691 |
| 9 | 180 | 5.5 | 703395 | 264555 | 2.7 | 121.5 | 1438 | 0.0803 | 672 |
| 9 | 210 | 6.5 | 738134 | 311388 | 2.4 | 121.3 | 1881 | 0.0814 | 520 |
| 10 | 0 | 0.0 | 572552 | 256686 | 2.2 | 135.4 | 1101 | 0.0899 | 982 |
| 10 | 60 | 1.3 | 446239 | 198543 | 2.2 | 125.2 | 868 | 0.0918 | 1272 |
| 10 | 120 | 2.7 | 431521 | 207544 | 2.1 | 122.3 | 949 | 0.1187 | 1504 |
| 10 | 180 | 3.5 | 416759 | 184179 | 2.3 | 118.4 | 793 | 0.0858 | 1301 |
| 11 | 0 | 0.0 | 631597 | 240374 | 2.6 | 135.7 | 1314 | 0.0899 | 822 |
| 11 | 60 | 1.1 | 633883 | 282605 | 2.2 | 127.1 | 1333 | 0.0938 | 846 |
| 11 | 120 | 2.1 | 579412 | 254607 | 2.3 | 124.4 | 1219 | 0.0839 | 828 |
| 11 | 180 | 2.9 | 553943 | 244084 | 2.3 | 122.1 | 1405 | 0.0866 | 741 |
| 12 | 0 | 0.0 | 708819 | 336889 | 2.1 | 136.1 | 1744 | 0.0762 | 525 |
| 12 | 60 | 1.3 | 690551 | 304253 | 2.3 | 125.8 | 1244 | 0.0923 | 892 |
| 12 | 120 | 3.1 | 706345 | 338301 | 2.1 | 122.2 | 865 | 0.0888 | 1234 |
| 12 | 180 | 3.2 | 710735 | 359331 | 2.0 | 120.0 | 625 | 0.0930 | 1789 |
| 13 | 0 | 0.0 | 1698299 | 733623 | 2.3 | 136.6 | 1596 | 0.0834 | 628 |
| 13 | 60 | 1.3 | 1299882 | 436651 | 3.0 | 125.1 | 1334 | 0.0925 | 834 |
| 13 | 120 | 3.3 | 1321409 | 568060 | 2.3 | 122.2 | 1122 | 0.0837 | 897 |
| 13 | 180 | 4.3 | 1377228 | 542923 | 2.5 | 120.7 | 1568 | 0.0783 | 600 |

TABLE 7

Ethylene Polymerization and Ethylene 1-Hexene Copolymerization Using Supported Catalysts.
Conditions: 0.3 mg catalysts, isohexane solvent, total volume = 5 mL, $T_p$ = 85° C., 130 psi C2.

| Cat. | C6 (μL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| 14 | 0 | 0.0 | 790881 | 300210 | 2.6 | 135.9 | 1049 | 0.0809 | 927 |
| 14 | 60 | 1.3 | 689813 | 253825 | 2.7 | 127.1 | 905 | 0.0821 | 1091 |
| 14 | 120 | 2.3 | 656719 | 289968 | 2.3 | 125.2 | 822 | 0.0813 | 1190 |
| 14 | 150 | 2.9 | 659080 | 280417 | 2.4 | 123.9 | 747 | 0.0824 | 1327 |
| 14 | 180 | 3.3 | 603683 | 231494 | 2.6 | 123.5 | 756 | 0.0840 | 1337 |
| 14 | 210 | 3.4 | 651914 | 300964 | 2.2 | 122.8 | 790 | 0.0857 | 1304 |
| 15 | 0 | 0.0 | 747827 | 289713 | 2.6 | 135.3 | 1112 | 0.0790 | 855 |
| 15 | 60 | 2.0 | 639802 | 276191 | 2.3 | 125.0 | 676 | 0.0816 | 1451 |
| 15 | 120 | 3.6 | 669325 | 292977 | 2.3 | 121.8 | 816 | 0.0806 | 1187 |
| 15 | 150 | 4.3 | 677492 | 296308 | 2.3 | 120.7 | 484 | 0.0859 | 2134 |
| 15 | 180 | 4.6 | 710733 | 298963 | 2.4 | 119.5 | 452 | 0.0892 | 2376 |
| 15 | 210 | 5.1 | 751969 | 360995 | 2.1 | 118.7 | 427 | 0.0873 | 2459 |
| 16 | 0 | 0.0 | 810108 | 350599 | 2.3 | 135.9 | 1851 | 0.0764 | 496 |
| 16 | 60 | 1.3 | 674607 | 283852 | 2.4 | 126.6 | 1303 | 0.0775 | 715 |
| 16 | 120 | 2.6 | 697569 | 320415 | 2.2 | 124.0 | 1284 | 0.0778 | 728 |
| 16 | 150 | 3.3 | 668219 | 264333 | 2.5 | 123.0 | 1105 | 0.0795 | 865 |
| 16 | 180 | 3.8 | 670219 | 295224 | 2.3 | 122.3 | 1224 | 0.0817 | 802 |
| 16 | 210 | 4.1 | 653682 | 260015 | 2.5 | 121.3 | 1257 | 0.0800 | 766 |
| 17 | 0 | 0.0 | 677883 | 299471 | 2.3 | 135.7 | 1127 | 0.0833 | 889 |
| 17 | 60 | 1.7 | 580343 | 245904 | 2.4 | 125.6 | 1038 | 0.0800 | 926 |
| 17 | 120 | 2.8 | 639133 | 276054 | 2.3 | 122.7 | 1256 | 0.0811 | 777 |
| 17 | 150 | 3.5 | 583981 | 242907 | 2.4 | 120.7 | 803 | 0.0867 | 1299 |
| 17 | 180 | 3.9 | 607141 | 292506 | 2.1 | 119.4 | 887 | 0.0844 | 1145 |
| 17 | 210 | 5.1 | 607642 | 279840 | 2.2 | 118.5 | 1035 | 0.0860 | 1000 |
| 18 | 60 | 2.0 | 584665 | 274859 | 2.1 | 124.0 | 2565 | 0.0839 | 393 |
| 18 | 120 | 4.4 | 569202 | 272539 | 2.1 | 119.7 | 2657 | 0.0800 | 362 |
| 18 | 150 | 4.8 | 599809 | 311102 | 1.9 | 119.2 | 2058 | 0.0787 | 460 |
| 18 | 180 | 5.9 | 535357 | 212253 | 2.5 | 118.5 | 2113 | 0.0827 | 471 |
| 18 | 210 | 6.6 | 559666 | 230385 | 2.4 | 117.9 | 2504 | 0.0837 | 402 |
| 19 | 0 | 0.0 | 982972 | 308299 | 3.2 | 134.8 | 1260 | 0.0773 | 738 |
| 19 | 60 | 2.4 | 825626 | 292475 | 2.8 | 122.3 | 764 | 0.0841 | 1324 |
| 19 | 180 | 5.3 | 861052 | 321236 | 2.7 | 115.3 | 798 | 0.0849 | 1279 |
| 19 | 240 | 6.6 | 769045 | 294513 | 2.6 | 113.0 | 652 | 0.0853 | 1572 |
| 19 | 300 | 7.5 | 754818 | 284753 | 2.7 | 112.0 | 799 | 0.0859 | 1293 |
| 19 | 360 | 8.6 | 650595 | 281956 | 2.3 | 110.3 | 912 | 0.0859 | 1132 |
| 20 | 0 | 0.0 | 951720 | 329244 | 2.9 | 135.1 | 1309 | 0.0801 | 736 |
| 20 | 60 | 1.9 | 874664 | 348812 | 2.5 | 123.5 | 904 | 0.0827 | 1100 |
| 20 | 180 | 4.7 | 914924 | 404540 | 2.3 | 117.0 | 1327 | 0.0815 | 738 |

TABLE 7-continued

Ethylene Polymerization and Ethylene 1-Hexene Copolymerization Using Supported Catalysts.
Conditions: 0.3 mg catalysts, isohexane solvent, total volume = 5 mL, $T_p$ = 85° C., 130 psi C2.

| Cat. | C6 (μL) | C6 wt % | Mw (Rapid GPC) | Mn (Rapid GPC) | PDI (Rapid GPC) | Primary Tm (° C.) | time (s) | yield (g) | activity (g pol/g cat · h) |
|---|---|---|---|---|---|---|---|---|---|
| 20 | 240 | 5.4 | 828843 | 313968 | 2.6 | 115.5 | 603 | 0.0597 | 1191 |
| 20 | 300 | 7.0 | 816256 | 308813 | 2.6 | 114.1 | 986 | 0.0887 | 1081 |
| 20 | 360 | 7.4 | 751387 | 219575 | 3.4 | 113.3 | 1142 | 0.0835 | 879 |
| 21 | 0 | 0.0 | 945251 | 339761 | 2.8 | 135.2 | 1321 | 0.0804 | 732 |
| 21 | 60 | 1.9 | 725108 | 257725 | 2.8 | 125.0 | 1039 | 0.0805 | 932 |
| 21 | 180 | 4.5 | 836829 | 326984 | 2.6 | 119.1 | 713 | 0.082 | 1384 |
| 21 | 240 | 5.1 | 779653 | 308867 | 2.5 | 117.2 | 479 | 0.0866 | 2174 |
| 21 | 300 | 6.3 | 778856 | 294914 | 2.6 | 116.0 | 516 | 0.0873 | 2033 |
| 21 | 360 | 6.9 | 751091 | 309141 | 2.4 | 114.7 | 573 | 0.0862 | 1808 |
| 22 | 0 | 0.0 | 766760 | 284299 | 2.7 | 136.0 | 1000 | 0.0782 | 940 |
| 22 | 60 | 1.4 | 640362 | 271830 | 2.4 | 126.1 | 547 | 0.0835 | 1836 |
| 22 | 120 | 2.8 | 617018 | 253024 | 2.4 | 122.3 | 442 | 0.0874 | 2380 |
| 22 | 150 | 3.8 | 610909 | 248058 | 2.5 | 121.3 | 404 | 0.0919 | 2733 |
| 22 | 180 | 4.4 | 634990 | 263927 | 2.4 | 120.5 | 374 | 0.0926 | 2979 |
| 22 | 210 | 4.6 | 635386 | 248524 | 2.6 | 119.5 | 356 | 0.0913 | 3088 |
| C | 0 | 0.0 | 569201 | 272444 | 2.1 | 135.2 | 2700 | 0.0526 | 234 |
| C | 60 | 2.0 | 529359 | 301145 | 1.8 | 124.6 | 1667 | 0.0745 | 537 |
| C | 120 | 4.6 | 532668 | 287815 | 1.9 | 119.2 | 1236 | 0.0801 | 779 |
| C | 150 | 4.8 | 531690 | 290151 | 1.8 | 118.0 | 1221 | 0.0828 | 815 |
| C | 180 | 5.2 | 562051 | 318456 | 1.8 | 116.7 | 981 | 0.0818 | 1002 |
| C | 210 | 5.2 | 547359 | 264037 | 2.1 | 115.9 | 957 | 0.0869 | 1091 |

TABLE 8

Ethylene-Hexene Copolymerization in Gas Phase Autoclave Reactor at 85° C. using supported 5 and 6.

| Ex. | Cat. | Condition | Cat. (mg) | Yield (g) | Activity (g/g · h) | $C_6$ (wt. %) (GPC4D) | Mw (g/mol) | Mw/Mn | $g'_{vis}$ | $T_{75}$-$T_{25}$ (° C.) |
|---|---|---|---|---|---|---|---|---|---|---|
| 8-1 | 5 | 1.86 H2/C2 (ppm/mol %); 0.025 C6/C2 (mol/mol) | 29.5 | 97.0 | 3288 | 5.22 | 123805 | 4.0 | 1.0 | 14.9 |
| 8-2 | 5A | 2.07 H2/C2 (ppm/mol %); 0.0235 C6/C2 (mol/mol) | 30.1 | 113.9 | 3784 | 6.56 | 116541 | 4.1 | 0.98 | 18.7 |
| 8-3 | 5B | 2.18 H2/C2 (ppm/mol %); 0.0292 C6/C2 (mol/mol) | 33.0 | 112.2 | 3400 | 4.26 | 114234 | 3.9 | 1.0 | 5.2 |
| 8-4 | 6 | 1.39 H2/C2 (ppm/mol %); 0.0212 C6/C2 (mol/mol) | 22.0 | 160.5 | 7295 | 6.23 | 184383 | 3.4 | 1.0 | 14.6 |
| 8-5 | 6 | 1.56 H2/C2 (ppm/mol %); 0.0201 C6/C2 (mol/mol) | 20.2 | 160.4 | 7941 | 5.67 | 185848 | 3.1 | 1.0 | 17.5 |

Note:
1) 5 is two isomers in 1.3/1 ratio; 5A is two isomers in 5/1 ratio; 5B is two isomers in 1/20 ratio.
2) Ex. 8-5 was carried out with 11.7 mol % Iso-pentane in gas-phase.

TABLE 9

$^1$H NMR Characterization of Polyethylenes Produced in Examples in Table 8.

| Ex. | Cat. | Methyl/ 1000C | Vinylenes/ 1000C | Trisubstituted olefins/ 1000C | Vinyls/ 1000C | Vinylidenes/ 1000C | total unsaturation/ 1000C |
|---|---|---|---|---|---|---|---|
| 8-1 | 5 | 8.9 | 0.13 | 0.11 | 0.04 | 0.01 | 0.29 |
| 8-2 | 5A | 10.8 | 0.15 | 0.11 | 0.04 | 0 | 0.30 |
| 8-3 | 5B | 7.6 | 0.13 | 0.10 | 0.03 | 0 | 0.26 |
| 8-4 | 6 | 10.2 | 0.25 | 0.23 | 0.06 | 0 | 0.54 |
| 8-5 | 6 | 9.7 | 0.36 | 0.33 | 0.05 | 0 | 0.74 |

TABLE 10

Ethylene-Hexene Copolymerization in Gas Phase Autoclave Reactor at 85° C. using supported.

| Ex. | Cat. | Condition | Cat. (mg) | Yield (g) | Activity (g/g · h) | $C_6$ (wt. %) (GPC4D) | Mw (g/mol) | Mw/Mn | $g'_{vis}$ | $T_{75}$-$T_{25}$ (° C.) |
|---|---|---|---|---|---|---|---|---|---|---|
| 10-1 | 17 | 2.92 H2/C2 (ppm/mol %); 0.0271 C6/C2 (mol/mol) | 22.3 | 63.0 | 2825 | 8.04 | 117284 | 2.9 | 1.0 | 20.7 |
| 10-2 | 19 | 1.66 H2/C2 (ppm/mol %); 0.0197 C6/C2 (mol/mol) | 20.5 | 109.7 | 5351 | 6.86 | 194169 | 2.7 | 1.0 | 10.4 |
| 10-3 | 21 | 1.28 H2/C2 (ppm/mol %); 0.0233 C6/C2 (mol/mol) | 27.0 | 87.0 | 3222 | 4.70 | 161807 | 3.2 | 1.0 | 7.5 |
| 10-4 | 15 | 1.42 H2/C2 (ppm/mol %); 0.0216 C6/C2 (mol/mol) | 14.4 | 46.0 | 3194 | 5.88 | 143141 | 3.1 | 1.0 | 13.0 |
| 10-5 | I | 0.74 H2/C2 (ppm/mol %); 0.0214 C6/C2 (mol/mol) | 23.6 | 25.1 | 1064 | 8.32 | 158850 | 4.7 | 1.0 | 23.2 |
| 10-6 | 1 | 1.58 H2/C2 (ppm/mol %); 0.0177 C6/C2 (mol/mol) | 25.3 | 122.6 | 4846 | 8.35 | 147293 | 2.4 | 1.0 | 16.0 |
| 10-7 | K | 1.48 H2/C2 (ppm/mol %); 0.0204 C6/C2 (mol/mol) | 18.8 | 46.4 | 2468 | 5.82 | 149271 | 3.2 | 1.0 | 14.9 |

TABLE 11

$^1$H NMR Characterization of Polyethylenes Produced in Examples in Table 10

| Ex. | Cat. | Methyl/ 1000C | Vinylenes/ 1000C | Trisubstituted olefins/ 1000C | Vinyls/ 1000C | Vinylidenes/ 1000C | total unsaturation/ 1000C |
|---|---|---|---|---|---|---|---|
| 10-1 | 17 | 14.1 | 0.13 | 0.09 | 0.02 | 0 | 0.24 |
| 10-2 | 19 | 11.1 | 0.17 | 0.11 | 0.01 | 0 | 0.29 |
| 10-3 | 21 | 9.2 | 0.15 | 0.09 | 0.03 | 0 | 0.27 |
| 10-4 | 15 | 14.9 | 0.22 | 0.06 | 0.02 | 0 | 0.30 |
| 10-5 | I | 15.2 | 0.23 | 0.20 | 0.07 | 0 | 0.50 |
| 10-6 | 1 | 14.4 | 0.25 | 0.21 | 0.06 | 0 | 0.52 |
| 10-7 | K | 10.1 | 0.12 | 0.10 | 0.06 | 0 | 0.28 |

Tables 8-11 also provide experimental conditions and characterization of the ethylene-hexene copolymerization in a gas phase autoclave reactor at 85° C. Catalysts 5, 6, 15, 21 and I produce polyethylene with relatively broad MWD (Mw/Mn of 3 or more) and broad composition distribution (see CFC and TREF below) with good Mw capabilities. Under similar conditions, catalysts 1, 17 and 19 produce polyethylene with relatively narrow MWD but with broad/bimodal composition distribution (see CFC data). In addition, catalyst 1 also have a combination of very high comonomer incorporation capability, high Mw capability as well as high activity.

Cross-fractionation chromatography (CFC) data show that multimodal polyethylene products with various types of composition distribution have been produced in Examples using inventive catalysts.

As shown in Tables 3, 8 and 10, inventive catalysts as described herein in general have broad composition distribution.

Benefits that may be achieved by the catalyst compounds, catalyst systems and methods described herein include generation of polymers having broad molecular weight distribution (high Mw/Mn) linearity (suggested by high $g'_{vis}$), and improved comonomer incorporation. High Mw/Mn, linearity, and improved comonomer incorporation are useful for improving balance of processability and toughness.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of

What is claimed is:

1. A catalyst compound represented by formula (I):

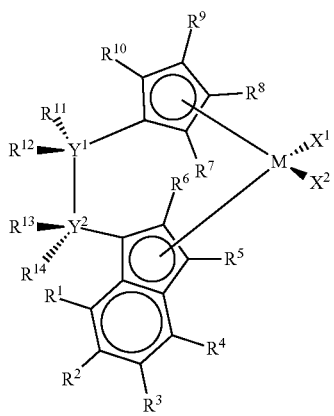

(I)

wherein:

M is a group 4 metal;

$Y^1$ and $Y^2$ are independently Si, Ge, or C, where at least one of $Y^1$ and $Y^2$ is not C;

$X^1$ and $X^2$ are independently hydrogen, halide, hydroxyl, or $C_1$-$C_{50}$ substituted or unsubstituted hydrocarbyl, alkoxide, or combination thereof, or $X^1$ and $X^2$ are joined together to form a metallocycle ring, or $X^1$ and $X^2$ are joined to form a chelating ligand, or an alkylidene;

each of $R^1$, $R^2$, $R^3$, $R^5$, $R^6$, $R^7$, $R^9$, $R^{10}$, $R^{11}$, $R^{12}$, $R^{13}$, and $R^{14}$ is independently hydrogen, halogen, $C_1$-$C_{50}$ hydrocarbyl or $C_1$-$C_{50}$ substituted hydrocarbyl, halocarbyl, silylcarbyl, alkoxyl, siloxyl, or one or more of $R^1$ and $R^2$, $R^2$ and $R^3$, and $R^5$ and $R^6$, are joined to form a saturated cyclic ring, substituted saturated cyclic ring, a substituted unsaturated cyclic ring, or an unsubstituted unsaturated cyclic ring;

$R^4$ is halogen, silylcarbyl, substituted silylcarbyl, $C_1$-$C_{40}$ hydrocarbyl, substituted $C_1$-$C_{40}$ hydrocarbyl, $C_6$-$C_{10}$ aryl, substituted $C_6$-$C_{10}$ aryl, fluorenylidenyl, substituted fluorenylidenyl, or —NR'$_2$, —SR', —OR, —OSiR'$_3$, —PR'$_2$, where each R' is hydrogen, halogen, $C_1$-$C_{10}$ alkyl, or $C_6$-$C_{10}$ aryl, or $R^3$ and $R^4$, are joined to form a saturated cyclic ring, substituted saturated cyclic ring, a substituted unsaturated cyclic ring, or an unsubstituted unsaturated cyclic ring, or $R^4$ is hydrogen and $R^2$ and $R^3$ are joined to form a saturated cyclic ring, substituted saturated cyclic ring, or an unsubstituted unsaturated cyclic ring;

$R^8$ is halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl.

2. The catalyst compound of claim 1, wherein-$R^8$ is hydrogen, halogen, $C_1$-$C_{40}$ hydrocarbyl, substituted $C_1$-$C_{40}$ hydrocarbyl, silylcarbyl, silyl, substituted silylcarbyl, $C_6$-$C_{10}$ aryl, substituted $C_6$-$C_{10}$ aryl, —NR'$_2$, —SR', —OR, —OSiR'$_3$, —PR'$_2$, where each R' is hydrogen, halogen, $C_1$-$C_{10}$ alkyl, or phenyl.

3. The catalyst compound of claim 1, wherein $X^1$ and $X^2$ are independently halide, $C_1$-$C_{10}$ hydrocarbyl, or $C_1$-$C_{10}$ substituted hydrocarbyl.

4. The catalyst compound of claim 1, wherein $R^4$ is halogen, $C_6$-$C_{10}$ aryl, substituted $C_6$-$C_{10}$ aryl, fluorenylidenyl, or substituted fluorenylidenyl.

5. The catalyst compound of claim 1, wherein $R^8$ is $C_1$-$C_{20}$ hydrocarbyl or substituted $C_1$-$C_{20}$ hydrocarbyl.

6. The catalyst compound of claim 1, wherein $R^8$ is substituted or unsubstituted methyl, ethyl, propyl, iso-propyl, n-butyl, iso-butyl, or tert-butyl.

7. The catalyst compound of claim 1, wherein $R^2$ and $R^3$ combine to form a cyclobutyl ring, a cyclopentyl ring, or cyclohexyl ring.

8. The catalyst compound of claim 1, wherein $R^6$ is hydrogen, methyl, ethyl, propyl, iso-propyl, n-butyl, iso-butyl, or tert-butyl.

9. The catalyst compound of claim 1, wherein M is Ti, Hf, or Zr.

10. The catalyst compound of claim 1, wherein $Y^1$ and $Y^2$ are Si.

11. A catalyst compound represented by a formula below, where the Zr in each formula is optionally replaced by Hf:

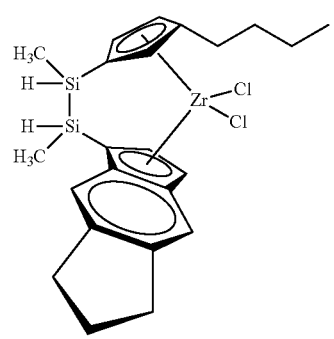

1

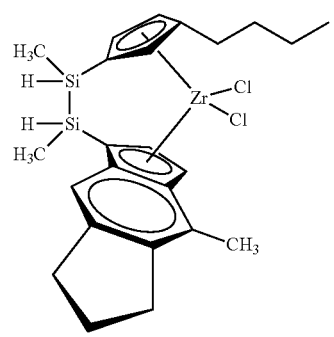

2

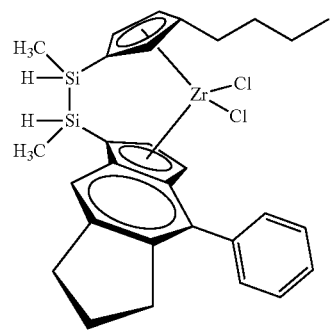

3

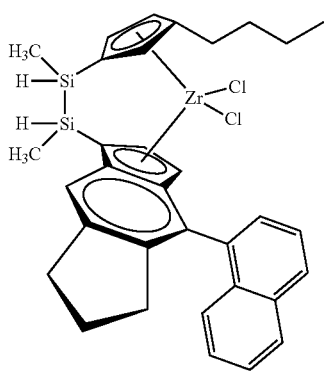
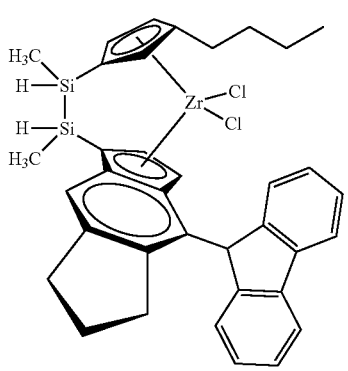
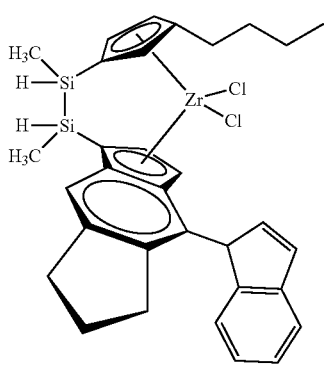
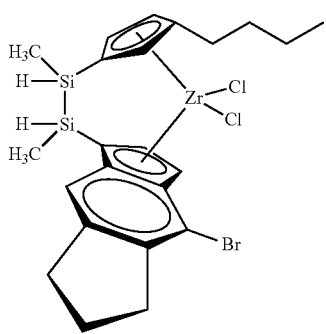
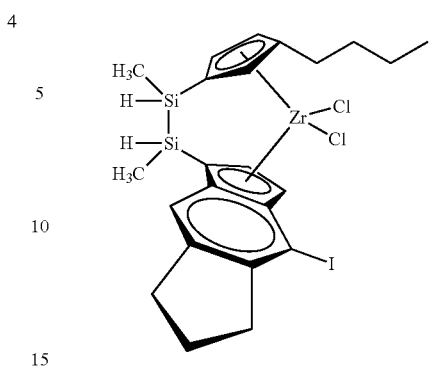
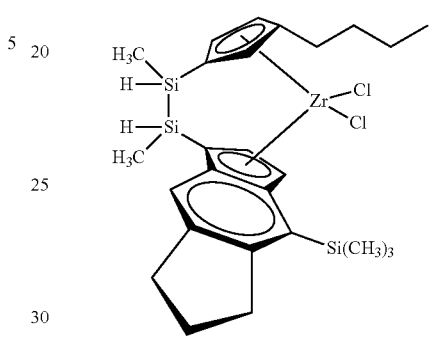
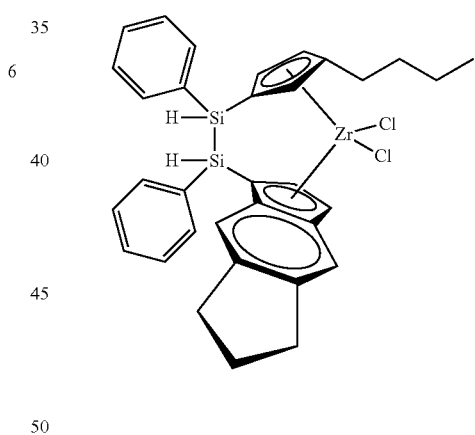
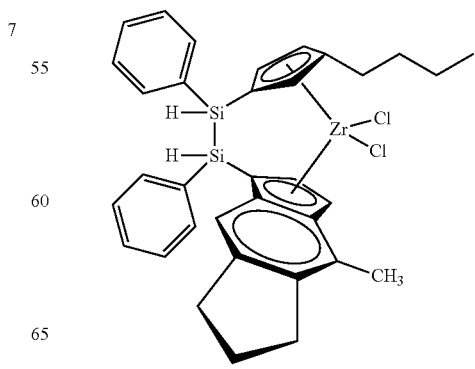

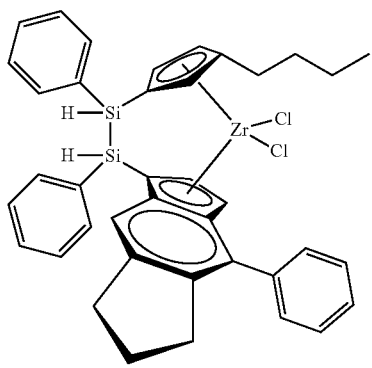
12
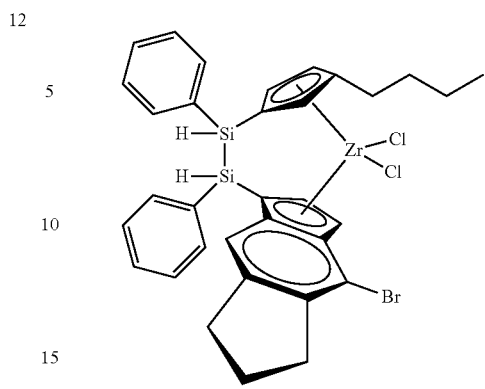
16
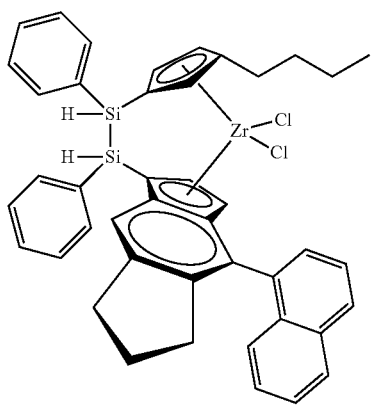
13
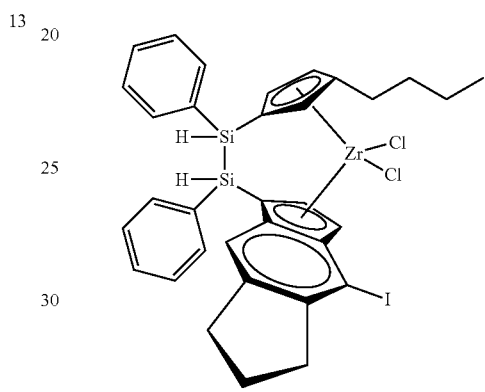
17
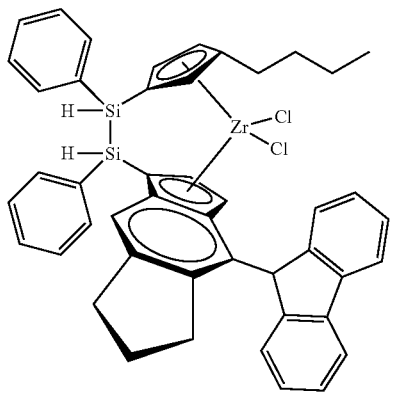
14
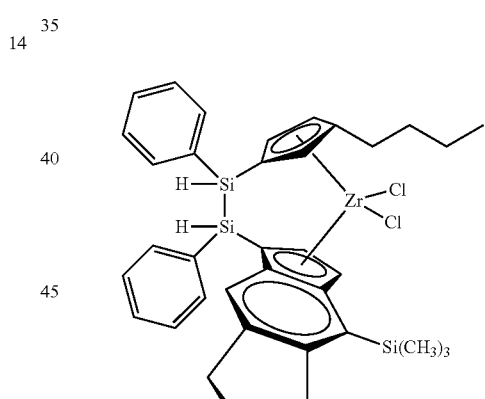
18
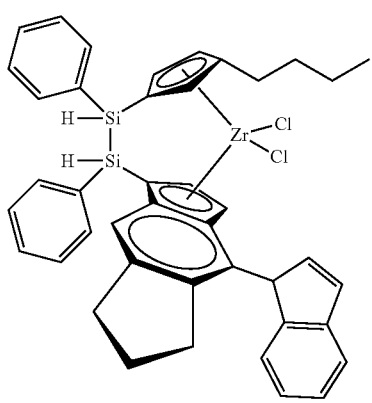
15
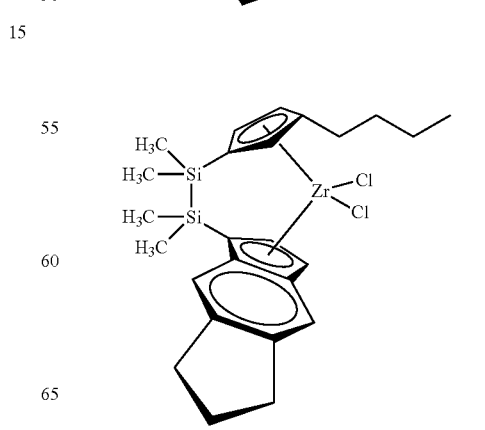
19

20
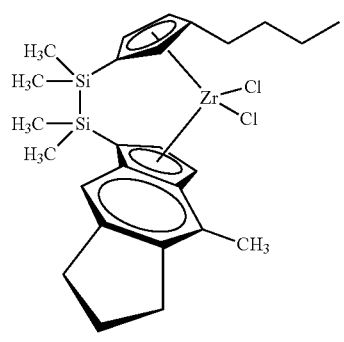
21
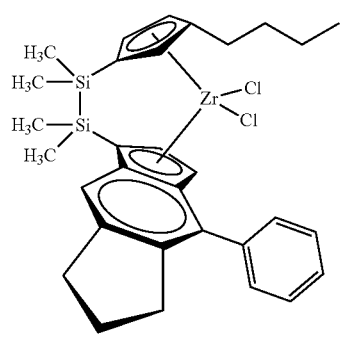
22
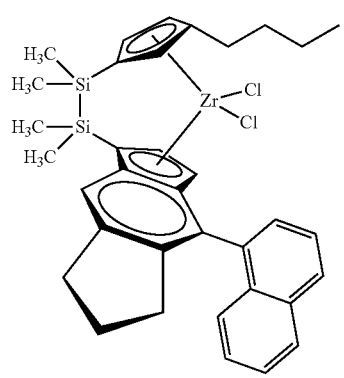
23
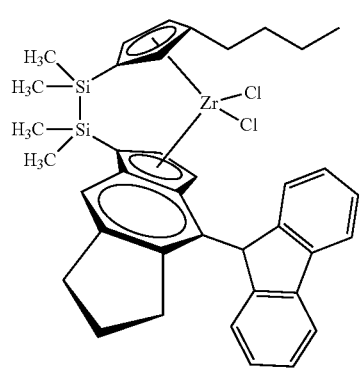
24
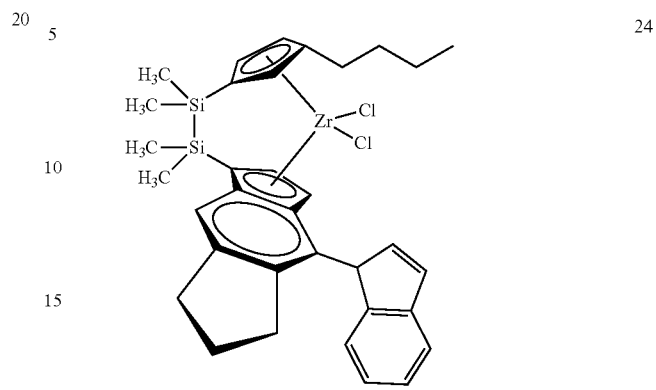
25
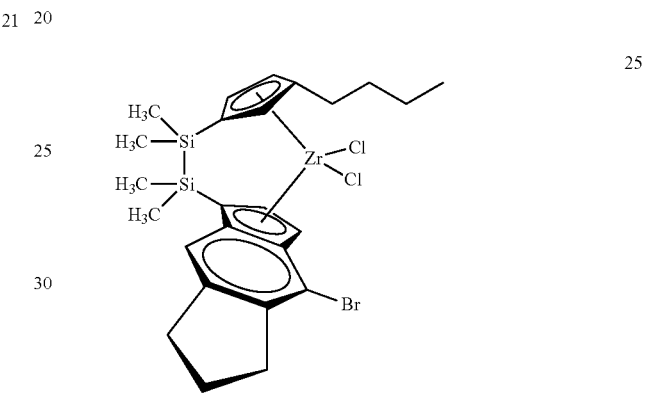
26
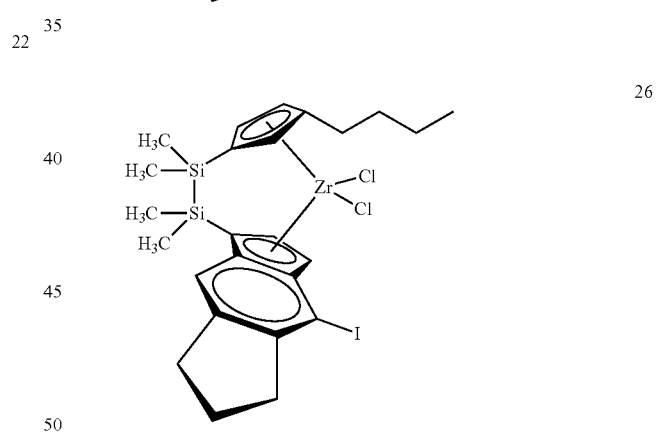
27
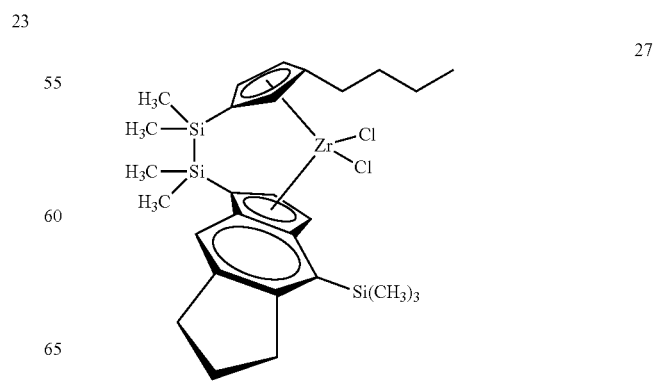

28
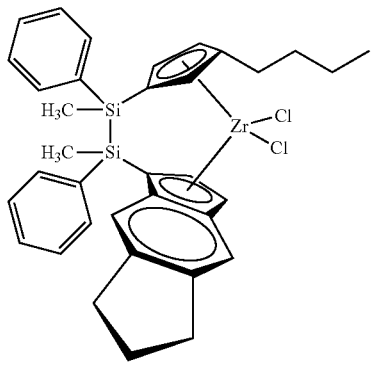
29
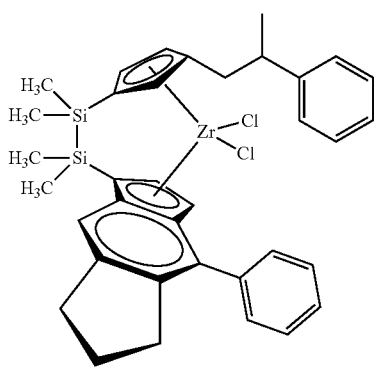
30
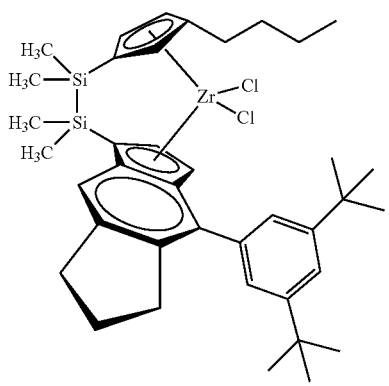
31
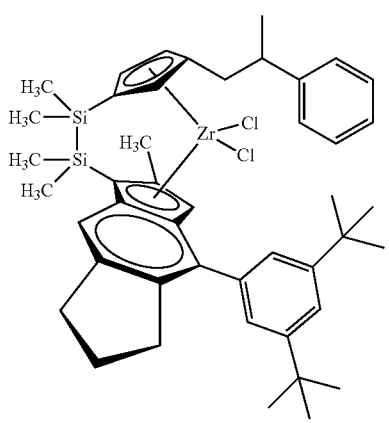
32
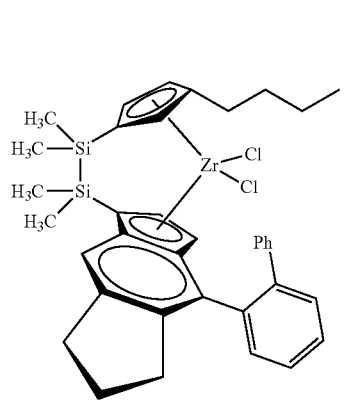
33
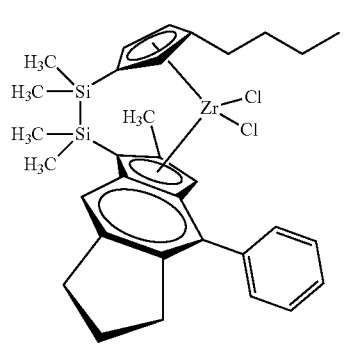
34
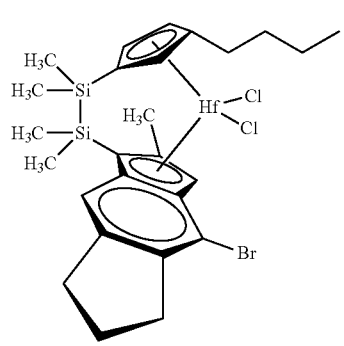
35
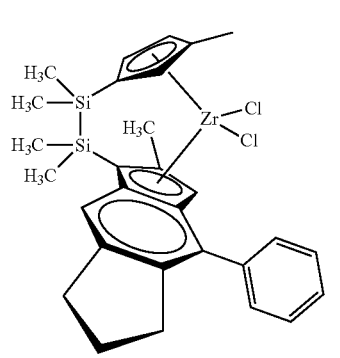

36
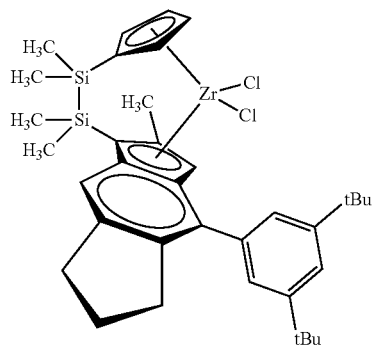
37
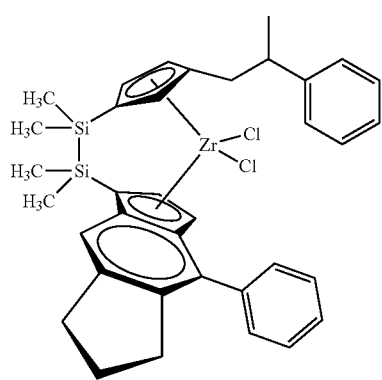
38
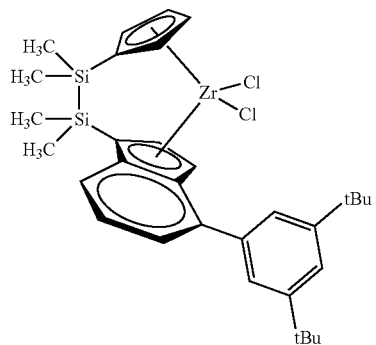
39
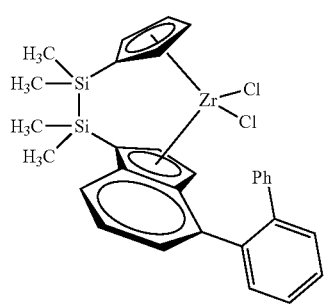
40
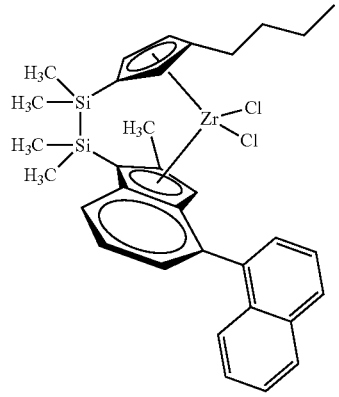
41
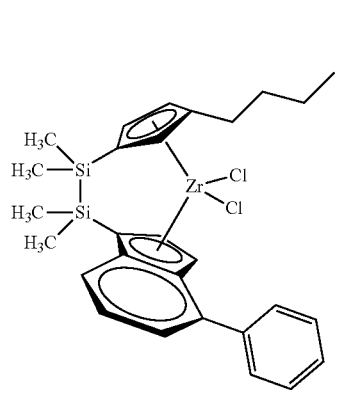
42
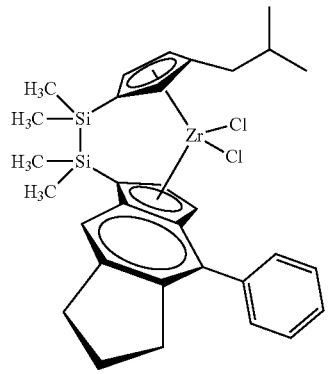
43
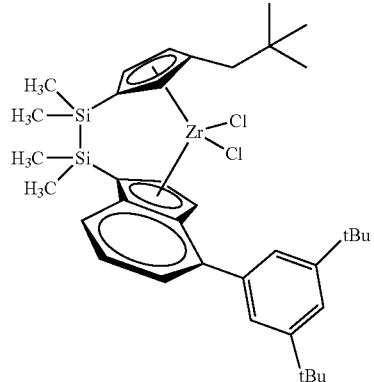

-continued
44
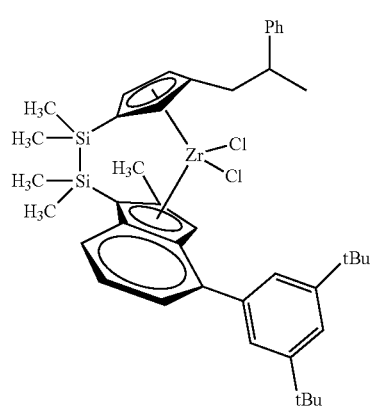
45
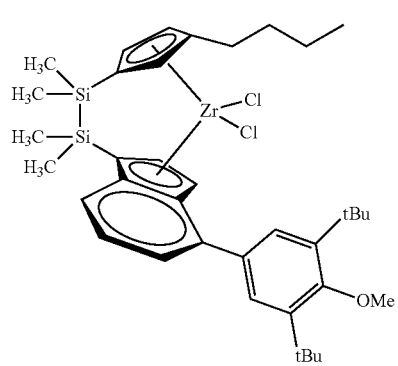
46
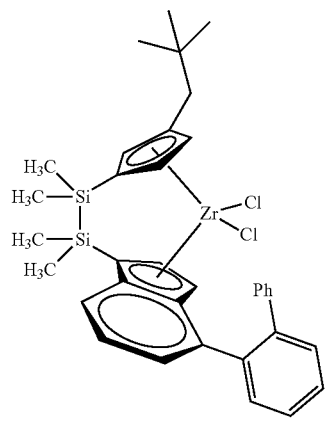
47
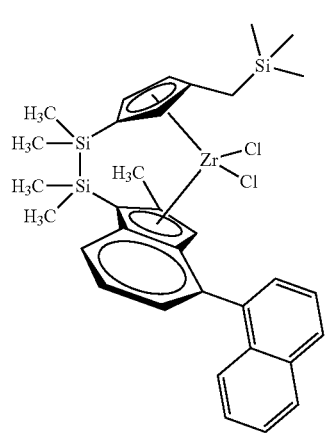
-continued
48
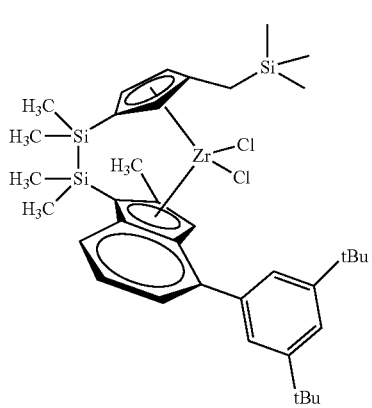
49
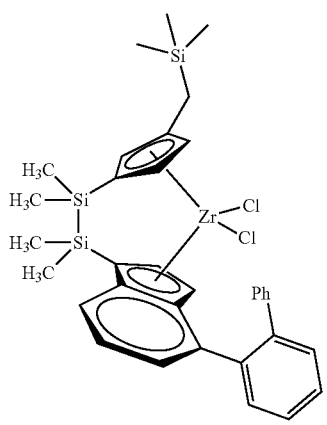
50
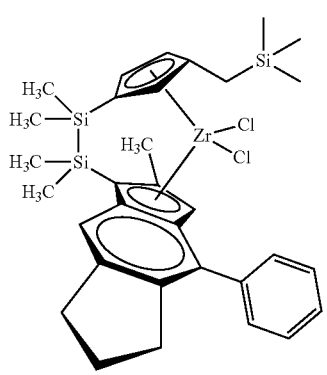
51
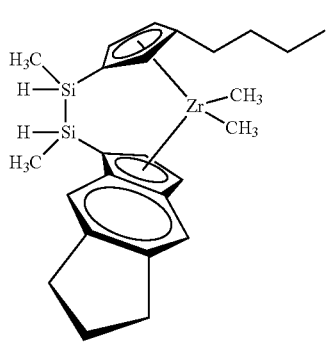

199
-continued
52
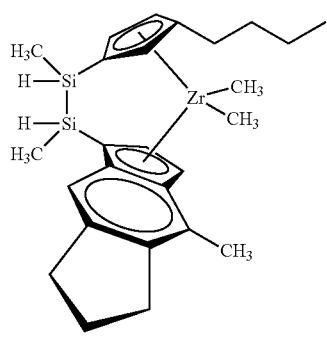
53
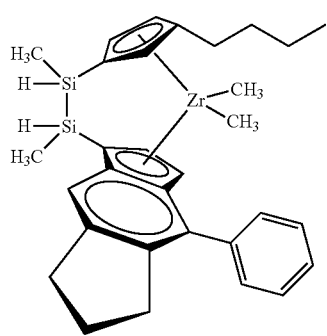
54
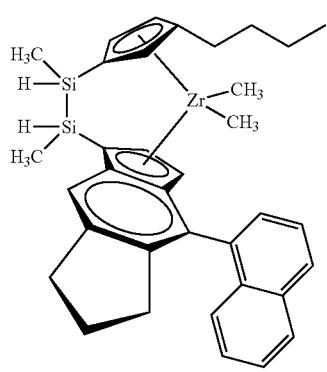
55
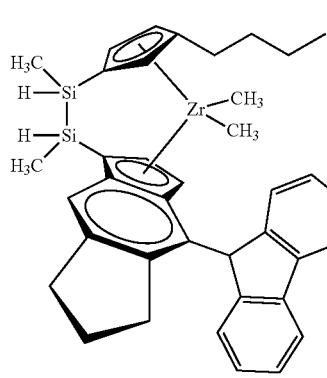
200
-continued
56
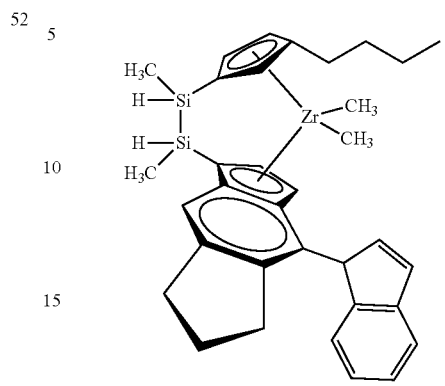
57
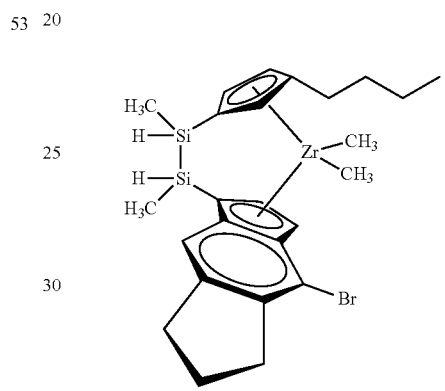
58
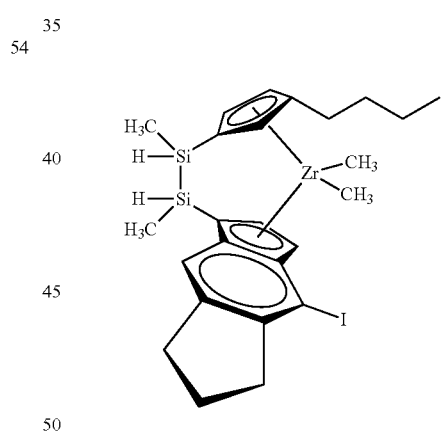
59
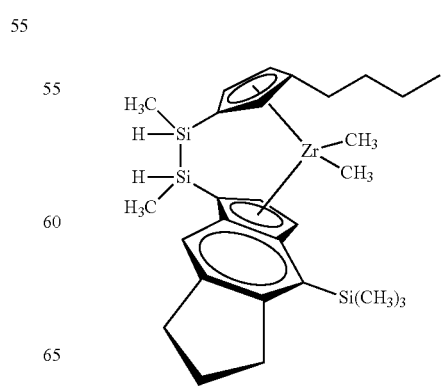

-continued
60 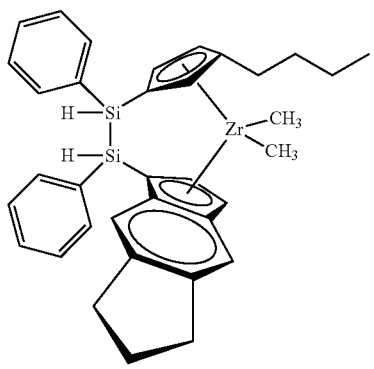
61 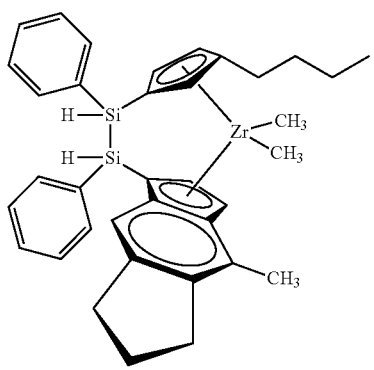
62 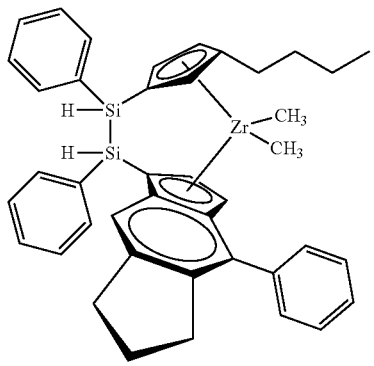
63 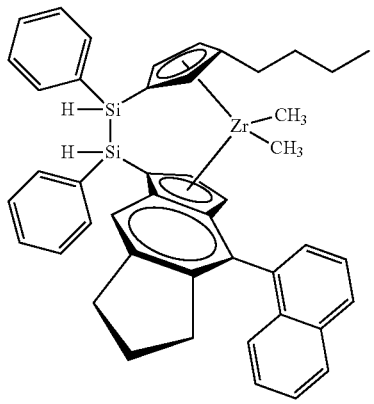
-continued
64 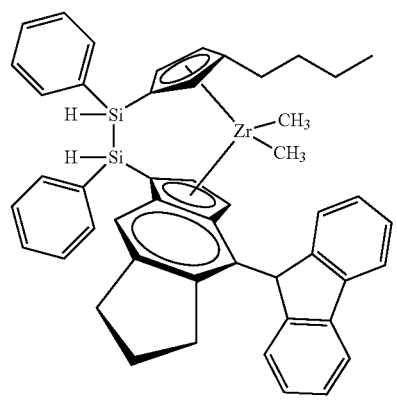
65 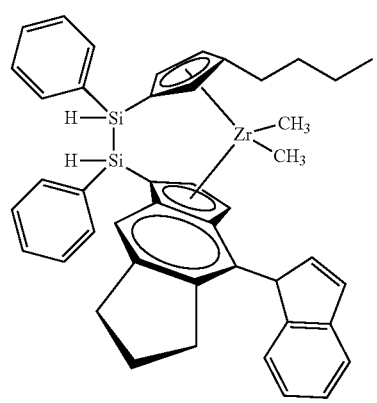
66 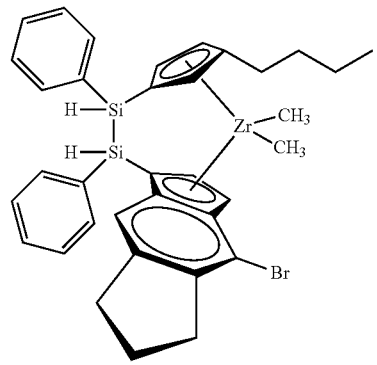
67 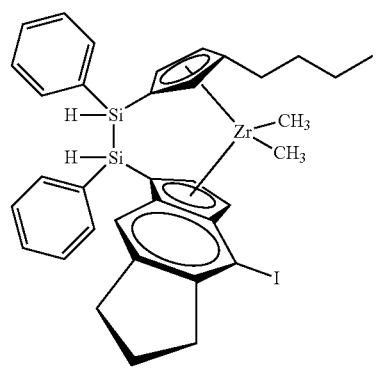

203
-continued
68
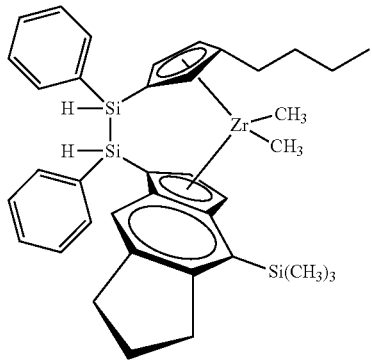
69
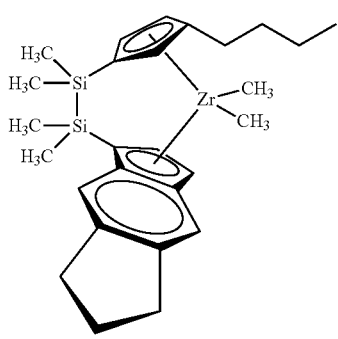
70
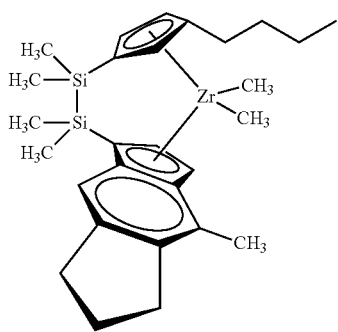
71
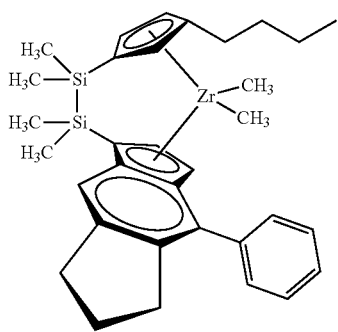
204
-continued
72
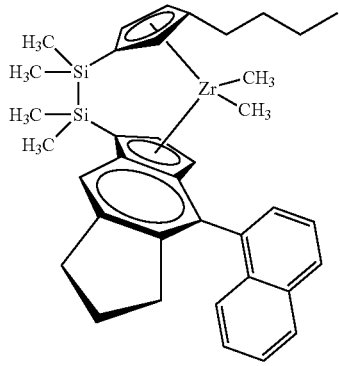
73
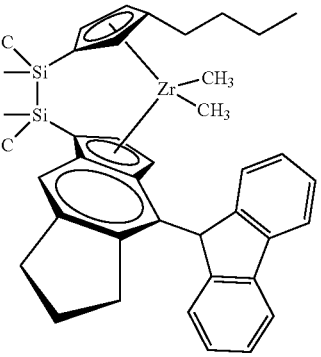
74
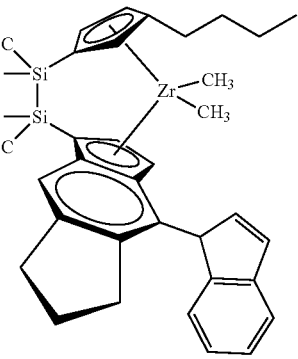
75
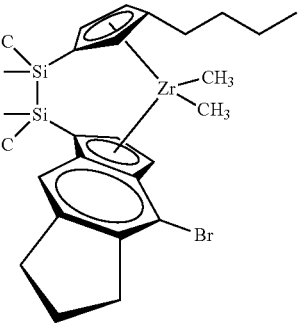

205
-continued
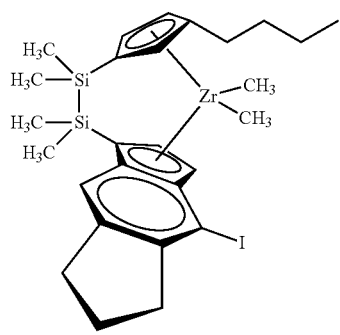
76
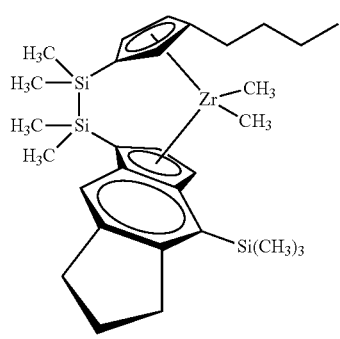
77
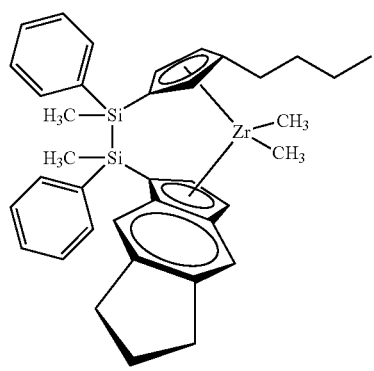
78
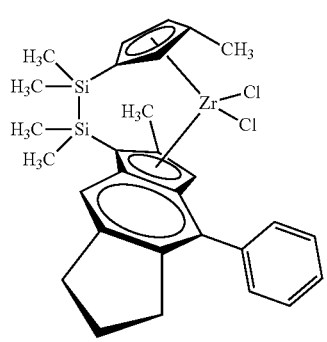
79
206
-continued
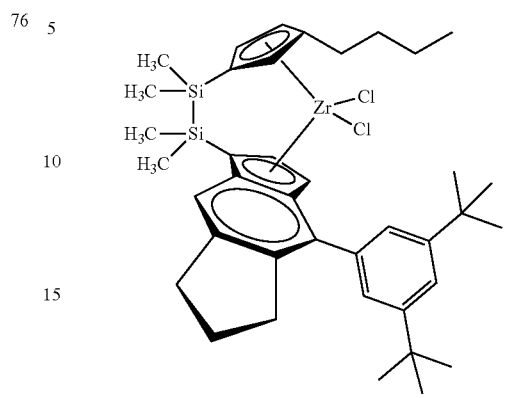
80
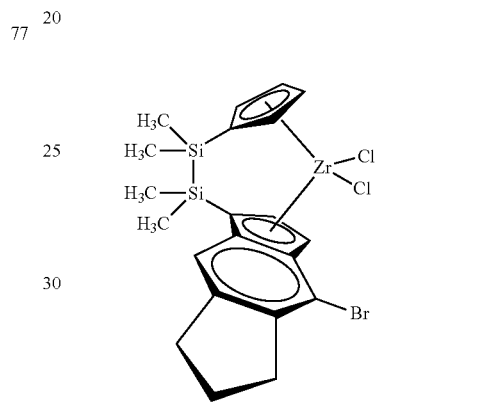
81
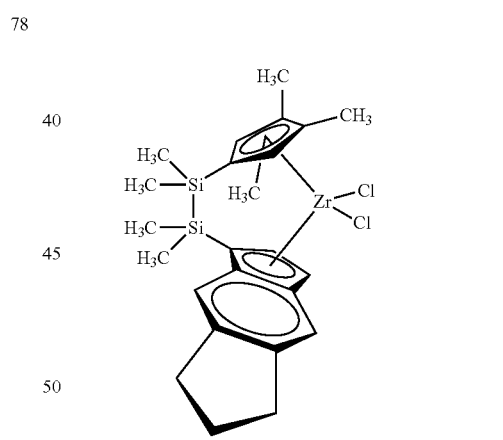
82
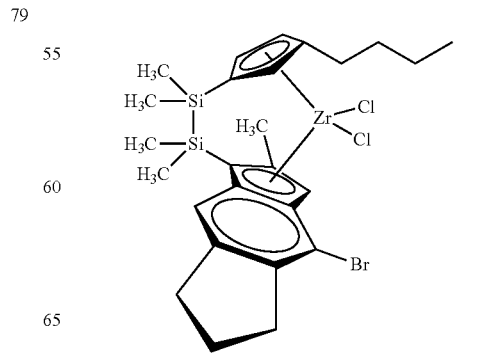
83

84
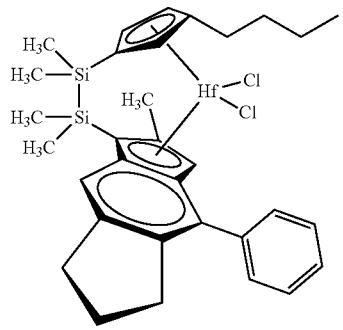
85
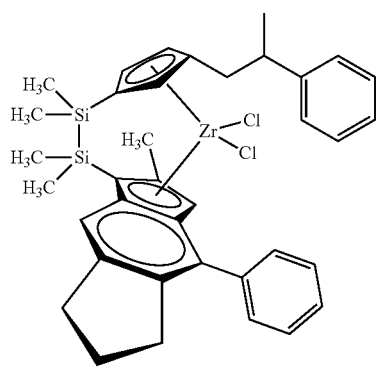
86
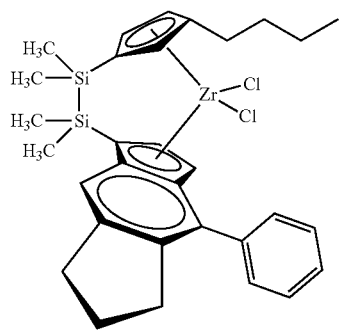
87
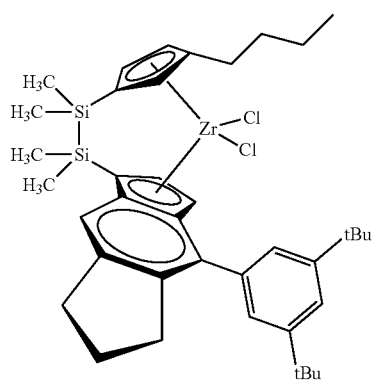
88
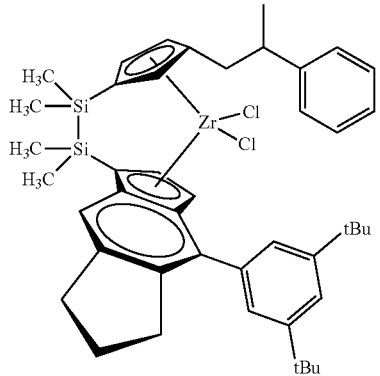
89
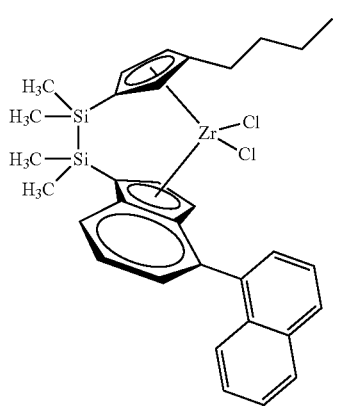
90
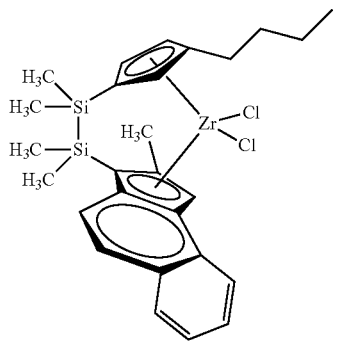
91
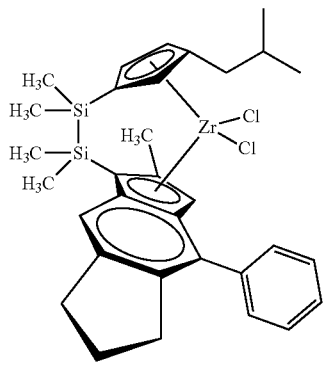

92
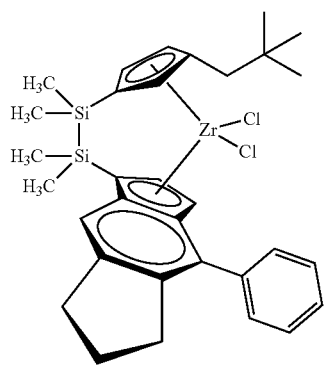
93
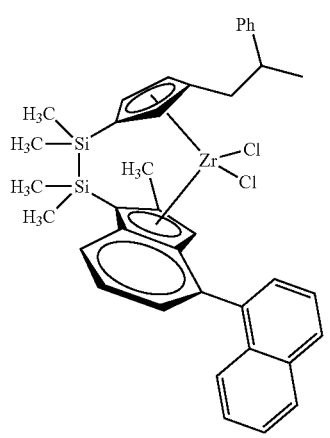
94
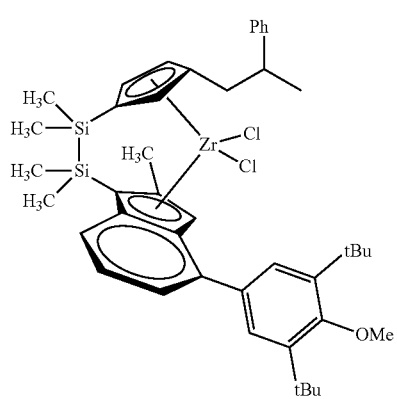
95
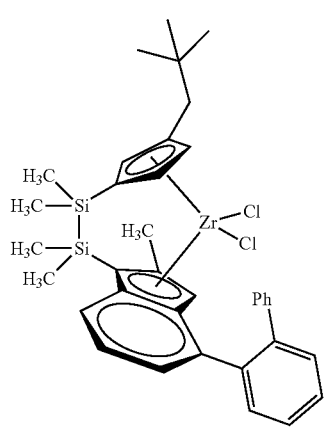
96
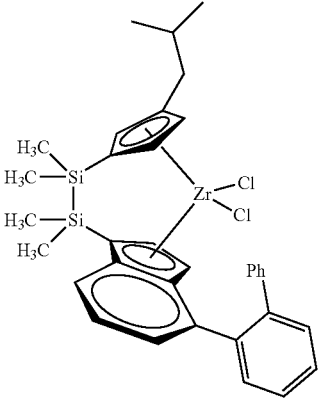
97
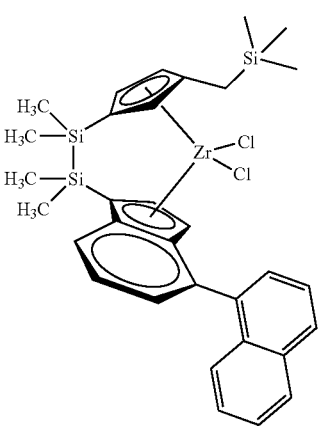
98
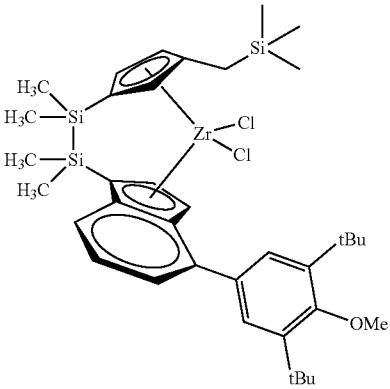
99
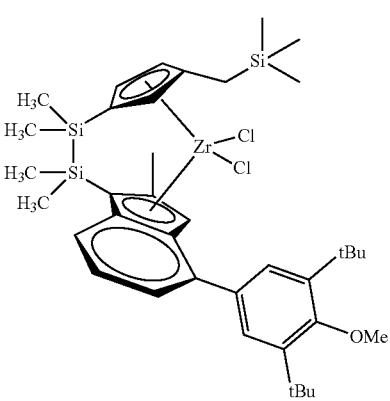

211
-continued
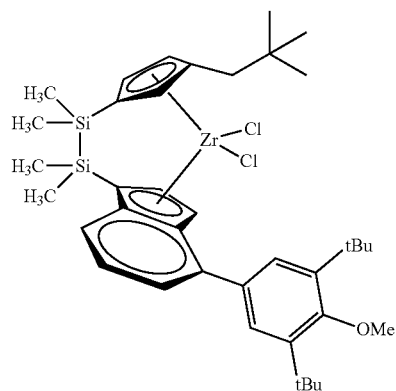
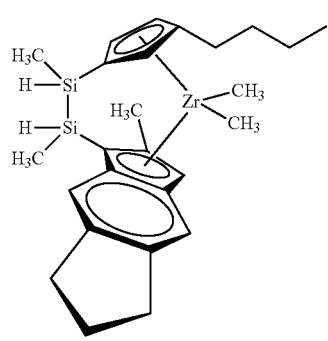
101
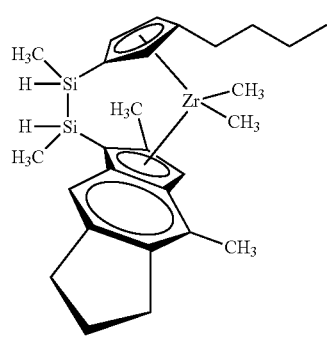
102
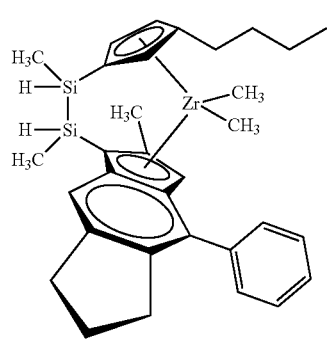
103
212
-continued
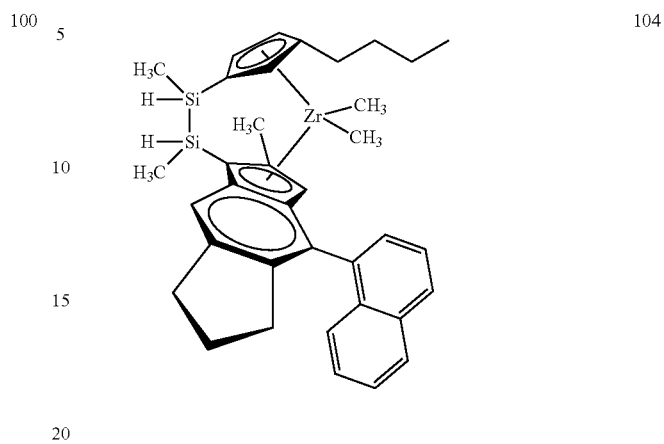
100
104
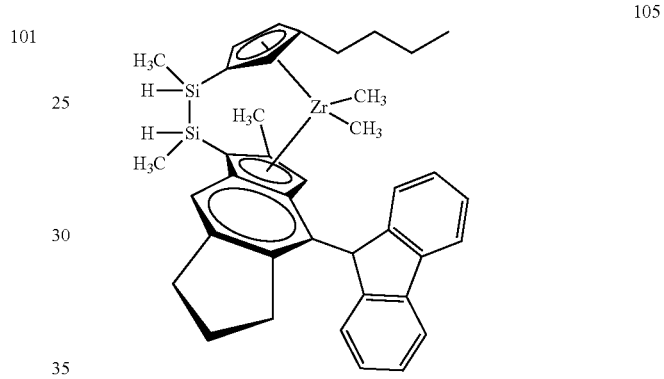
105
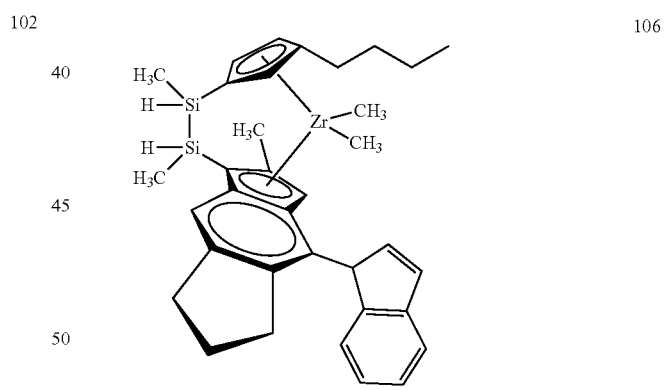
106
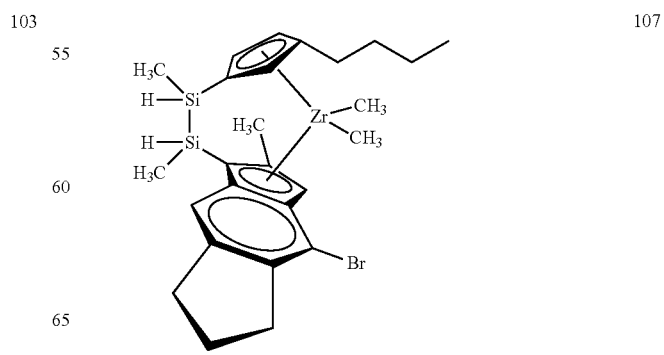
107

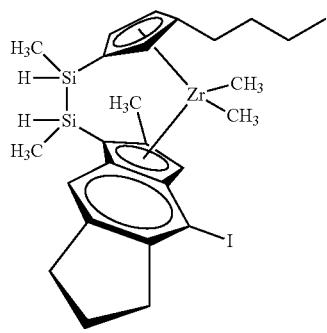
108
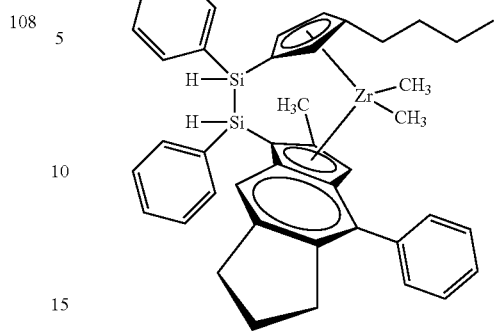
112
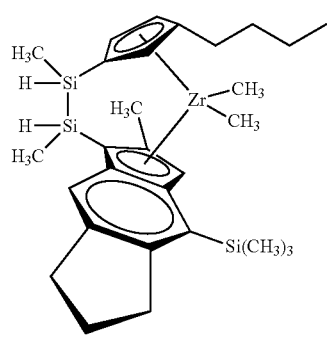
109
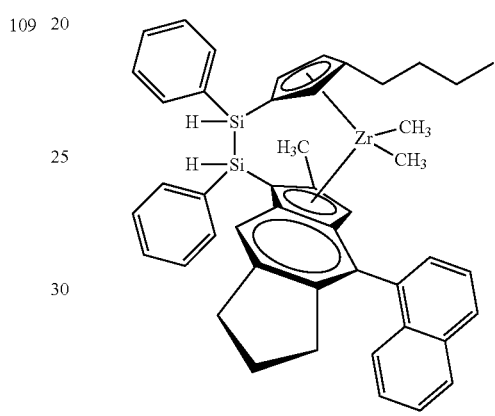
113
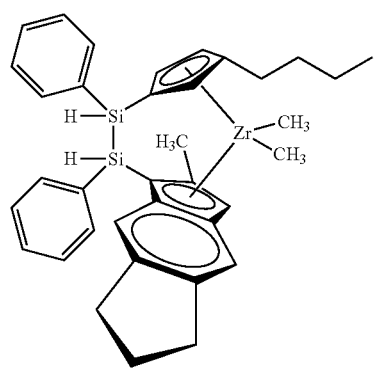
110
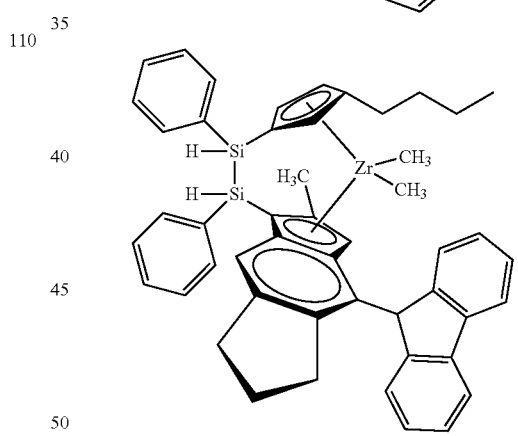
114
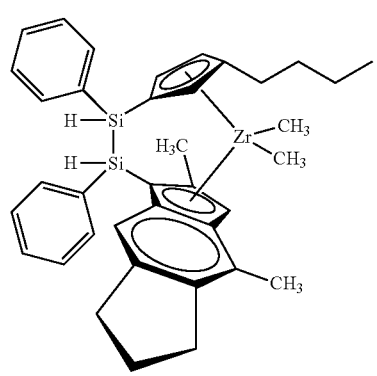
111
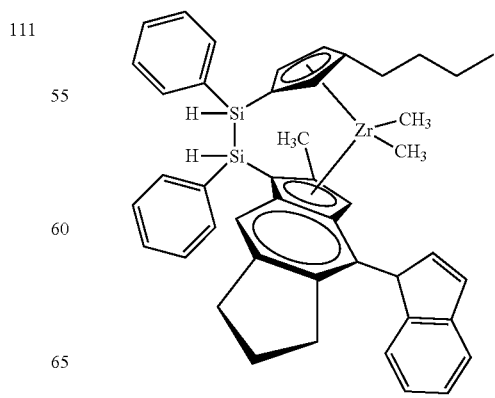
115

-continued
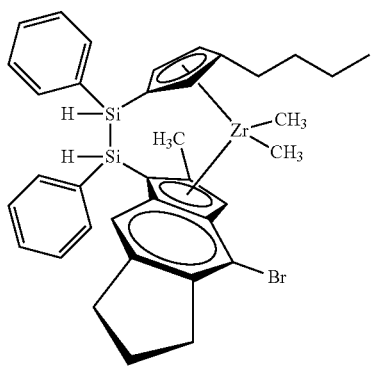
115
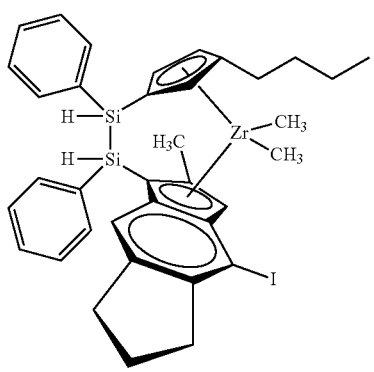
117
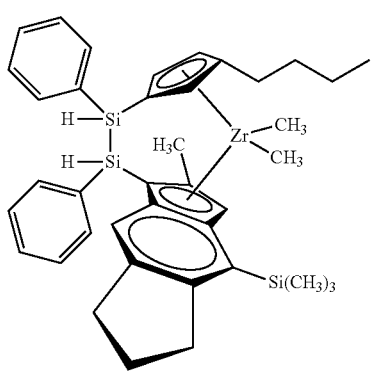
118
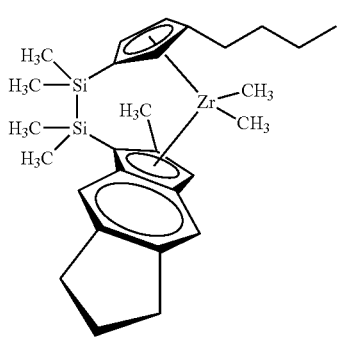
119
-continued
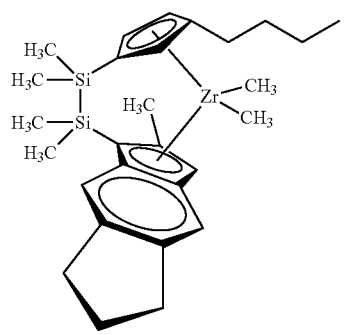
120
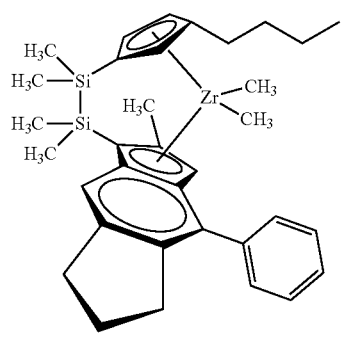
121
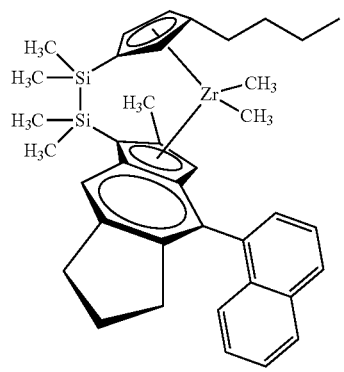
122
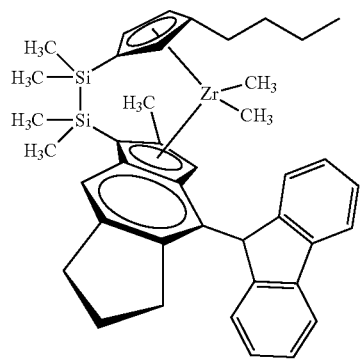
123

217
-continued
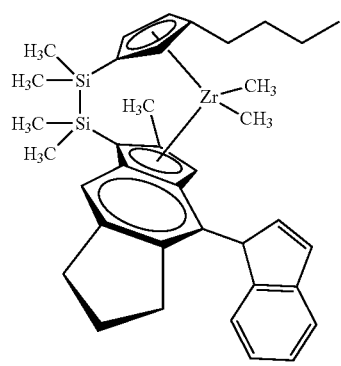
124
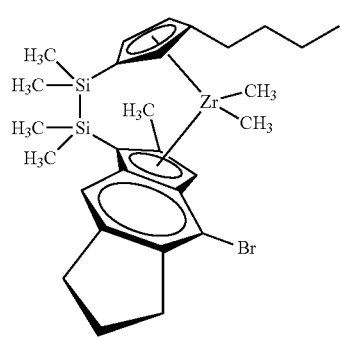
125
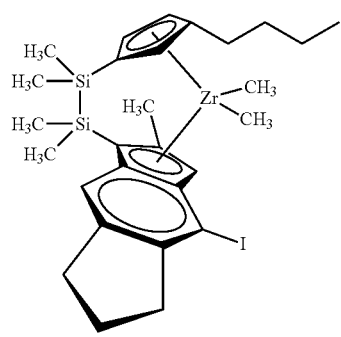
126
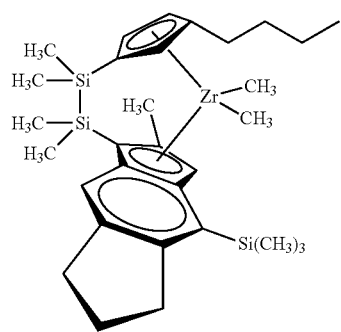
127
218
-continued
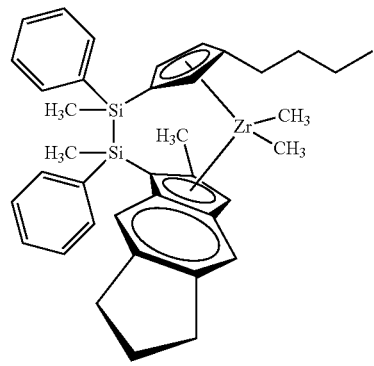
128
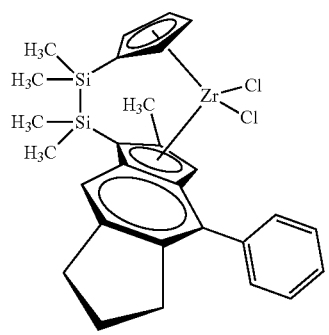
129
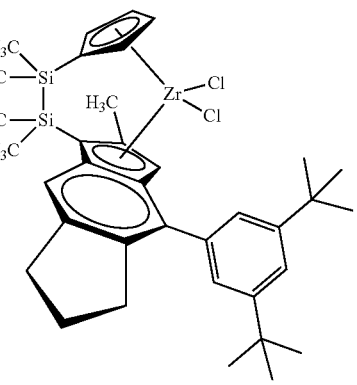
130
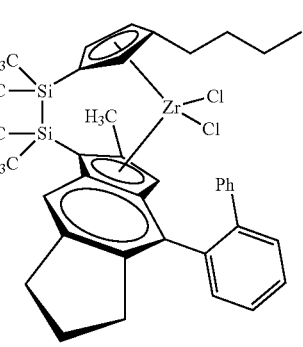
131

219
-continued
132
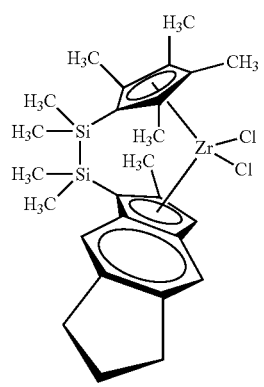
133
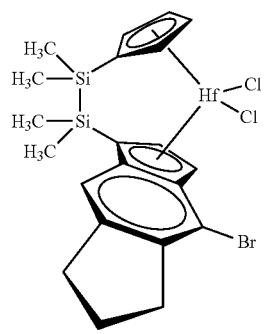
134
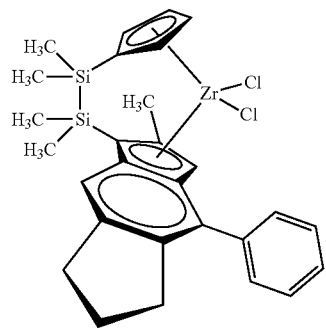
135
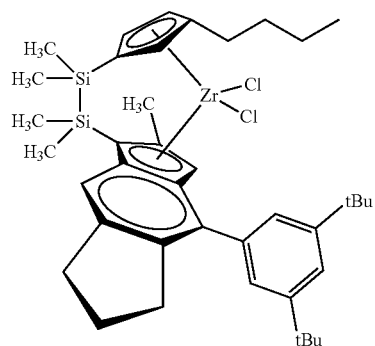
220
-continued
136
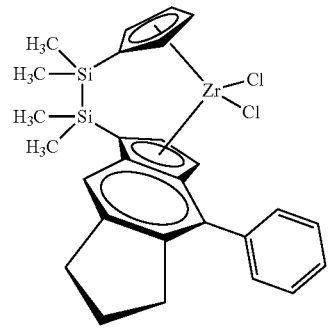
137
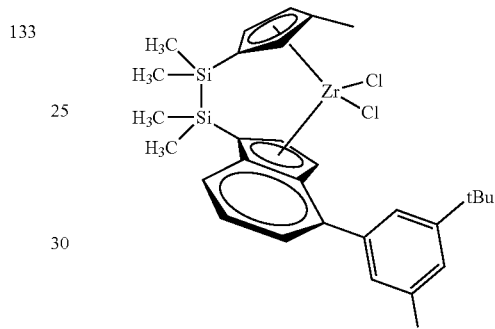
138
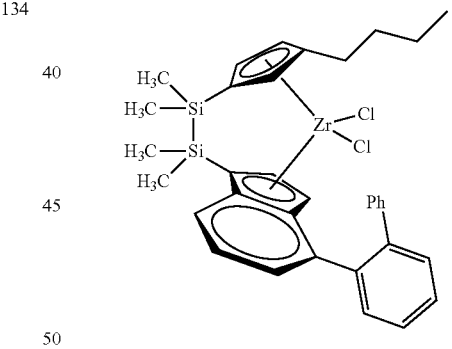
139
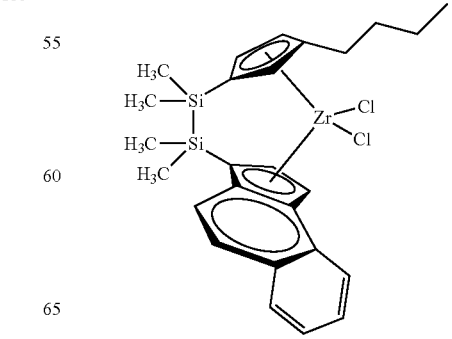

221
-continued
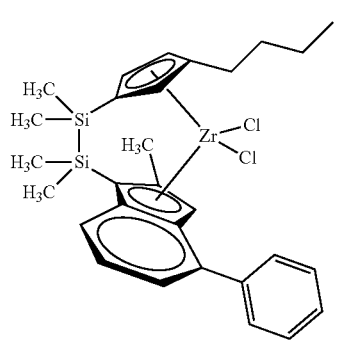
140
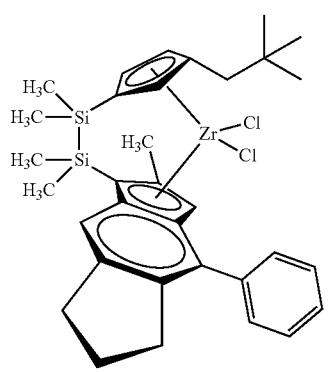
141
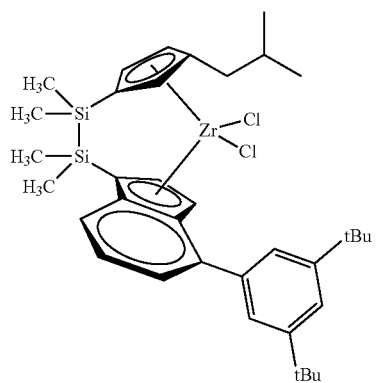
142
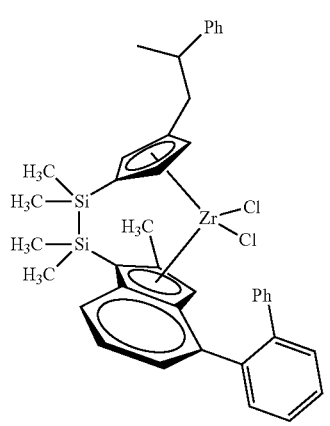
143
222
-continued
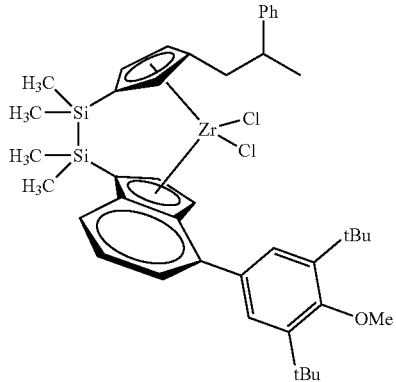
144
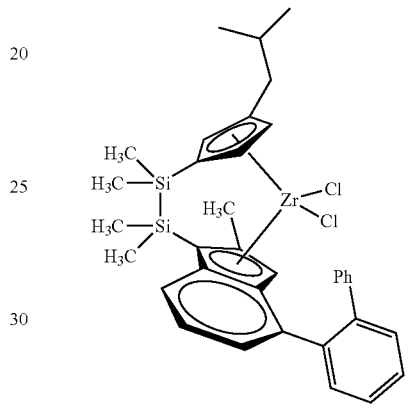
145
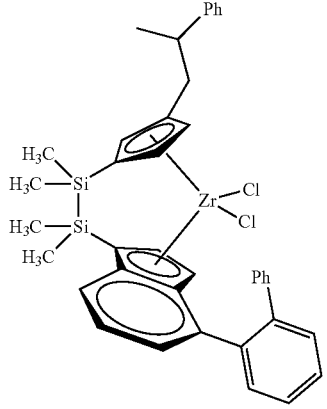
146
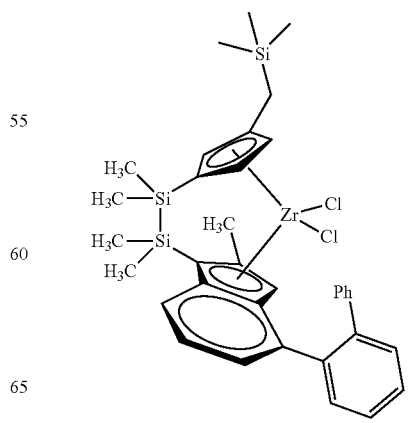
147

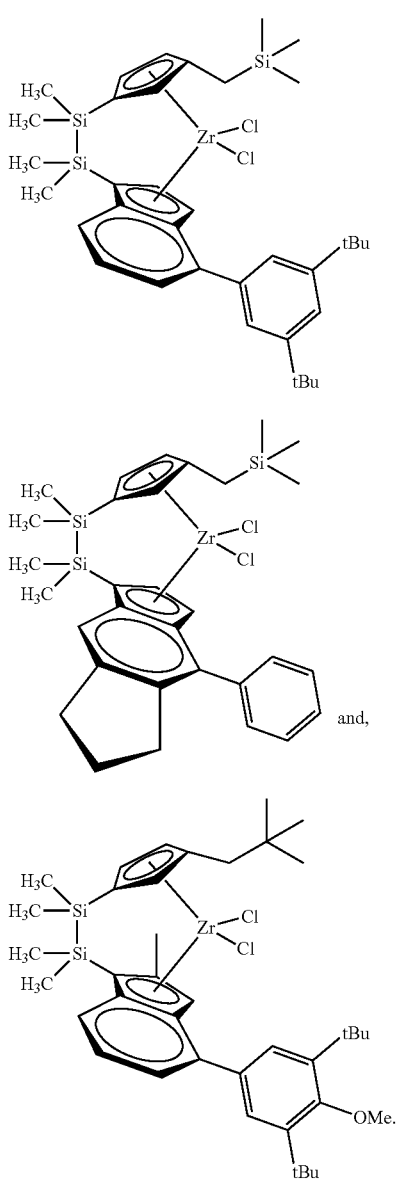

triphenylcarbenium tetrakis(perfluorobiphenyl)borate,
triphenylcarbenium tetrakis(3,5-bis(trifluoromethyl)phenyl)borate,
triphenylcarbenium tetra(perfluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate, and
tropillium tetrakis(perfluoronaphthyl)borate.

17. The catalyst system of claim 12, wherein the activator comprises alkylalumoxane.

18. The catalyst system of claim 15, wherein the support material is selected from the group consisting of $Al_2O_3$, $ZrO_2$, $SiO_2$, and $SiO_2/Al_2O_3$.

19. The catalyst system of claim 18, wherein the support material is fluorided.

20. The catalyst system of claim 15, wherein the support material is silica.

21. A method of polymerizing olefins to produce a polyolefin comprising:
    contacting at least one olefin with the catalyst system of claim 12; and
    obtaining a polyolefin.

22. The method of claim 21, wherein
    $R^4$ is halogen, $C_6$-$C_{10}$ aryl, or $C_6$-$C_{10}$ substituted aryl;
    $R^6$ is methyl; and
    $R^8$ is $C_3$-$C_{10}$ substituted hydrocarbyl or $C_3$-$C_{10}$ unsubstituted hydrocarbyl.

23. The method of claim 21, further comprising alkylalumoxane present at a molar ratio of aluminum to catalyst compound group 4 metal of 100:1 or more.

24. The method of claim 21, wherein the catalyst system further comprises an activator represented by the formula:

$$(Z)_a^+(A^{d-})$$

wherein Z is (L-H) or a reducible Lewis acid, L is a neutral base; H is hydrogen; $(L-H)^+$ is a Bronsted acid; $A^{d-}$ is a non-coordinating anion having the charge d−; and d is an integer from 1 to 3.

25. The method of claim 21, wherein the catalyst system further comprises an activator represented by the formula:

$$(Z)_a^+(A^{d-})$$

wherein $A^{d-}$ is a non-coordinating anion having the charge d−; and d is an integer from 1 to 3;
Z is a reducible Lewis acid represented by the formula: $(Ar_3C^+)$, where Ar is aryl or heteroaryl a $C_1$ to $C_{40}$ hydrocarbyl, or a substituted $C_1$-$C_{40}$ hydrocarbyl.

26. The method of claim 21, wherein the method occurs at a temperature of 0° C. to 300° C., at a pressure in the range of from 0.35 MPa to 10 MPa, and at a time up to 300 min.

27. The method of claim 21, wherein the olefins comprise ethylene, propylene, butene, pentene, hexene, heptene, octene, nonene, decene, undecene, dodecene, or mixtures thereof.

28. The method of claim 21, further comprising introducing the first catalyst compound represented by Formula (I) into a reactor as a slurry.

29. The method of claim 21, wherein the polymer produced has a Mw/Mn greater than 3.5.

30. The method of claim 21, wherein the polymer produced has a Mw/Mn of 3.5 or more and a $g'_{vis}$ of 0.98 or more.

12. A catalyst system comprising: (a) the catalyst compound of claim 1, and (b) an activator.

13. The catalyst system of claim 12, wherein one catalyst compound represented by formula (I) is present.

14. The catalyst system of claim 12 further comprising: (c) a bridged or unbridged metallocene catalyst compound other than the catalyst of compound (a).

15. The catalyst system of claim 12, further comprising a support material.

16. The catalyst system of claim 12, wherein the activator comprises one or more of:
N,N-dimethylanilinium tetra(perfluorophenyl)borate,
N,N-dimethylanilinium tetrakis(perfluoronaphthyl)borate,
N,N-dimethylanilinium tetrakis(perfluorobiphenyl)borate,
N,N-dimethylanilinium tetrakis(3,5-bis(trifluoromethyl)phenyl)borate,
triphenylcarbenium tetrakis(perfluoronaphthyl)borate, 31. The method of claim 21, wherein the polymer produced has a Mw/Mn greater than 6.

32. The method of claim 21, wherein the polymer produced has a Mw/Mn of 6 or more and a $g'_{vis}$ of 0.98 or more and total unsaturation/1000 C of 0.15 or less.

33. The method of claim 21, wherein the polymer produced has a Mw/Mn of 3.5 or more, a $g'_{vis}$ of 0.98 or more, and a zero or positive slope that transitions to a negative slope in the GPC-4D plot of comonomer incorporation vs molecular weight (log M).

34. The method of claim 21, wherein the polymer produced has a Mw/Mn of 2 or more, a $g'_{vis}$ of 0.98 or more, and a zero or positive slope that transitions to a negative slope in the GPC-4D plot of comonomer incorporation vs molecular weight (log M)).

35. The method of claim 21, wherein the polymer produced has a Mw/Mn of 3 or more, a $g'_{vis}$ of 0.98 or more, and a zero or positive slope that transitions to a negative slope in the GPC-4D plot of comonomer incorporation vs molecular weight (log M).

36. The method of claim 21, wherein the polymer produced has a Mw/Mn of 2 or more, preferably 2.5 or more, a $g'_{vis}$ of 0.98 or more, preferably 0.99 or more, more preferably 1.0 or more, and a zero or positive slope in the GPC-4D plot of comonomer incorporation vs molecular weight (log M)).

37. The method of claim 21, wherein the method occurs at a temperature of 0° C. to 300° C., at a pressure in the range of from 0.35 MPa to 10 Mpa, and at a time up to 300 min and the polyolefin produced has a total unsaturation/1000 C of 0.8 or less, preferably 0.7 or less.

38. The method of claim 21, wherein the method occurs at a temperature of 0° C. to 300° C., at a pressure in the range of from 0.35 Mpa to 10 Mpa, and at a time up to 300 min and the polyolefin produced has a total unsaturation/1000 C of 1.0 or less.

39. The method of claim 21, wherein the method occurs at a temperature of 0° C. to 300° C., at a pressure in the range of from 0.35 Mpa to 10 Mpa, and at a time up to 300 min and the polyolefin produced has an Mw/Mn of 6 or more and total unsaturation/1000 C of 0.15 or less.

40. The compound of claim 1, wherein $R^3$ and $R^4$ are joined to form a saturated cyclic ring, substituted saturated cyclic ring, a substituted unsaturated cyclic ring, or an unsubstituted unsaturated cyclic ring.

41. The catalyst compound of claim 1, wherein $R^7$, $R^9$ and $R^{10}$ are H.

42. A catalyst system comprising the catalyst compound of claim 2 and an activator.

43. A catalyst system comprising the catalyst compound of claim 11 and an activator.

44. A catalyst compound represented by a formula below, where the Zr in each formula is optionally replaced by Hf:

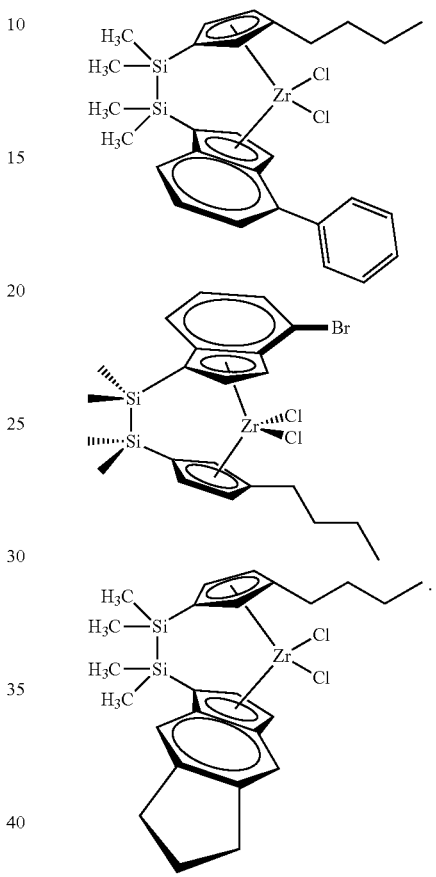

45. The catalyst compound of claim 44, wherein the Zr in each formula is not optionally replaced by Hf.

* * * * *